US012669865B2

(12) United States Patent
Pinczuk et al.

(10) Patent No.: US 12,669,865 B2
(45) Date of Patent: Jun. 30, 2026

(54) DISPLAY SYSTEM AND USER INTERFACE

(71) Applicant: ResMed Pty Ltd, Bella Vista (AU)

(72) Inventors: Michael Pinczuk, Sydney (AU); James Sung, Sydney (AU); Ian Andrew Law, Dublin (IE); Garth Berriman, Sydney (AU)

(73) Assignee: ResMed Pty Ltd, Bella Vista (AU)

( * ) Notice: Subject to any disclaimer, the term of this patent is extended or adjusted under 35 U.S.C. 154(b) by 0 days.

(21) Appl. No.: 18/852,197

(22) PCT Filed: Mar. 30, 2023

(86) PCT No.: PCT/AU2023/050244
§ 371 (c)(1),
(2) Date: Sep. 27, 2024

(87) PCT Pub. No.: WO2023/183980
PCT Pub. Date: Oct. 5, 2023

(65) Prior Publication Data
US 2025/0216937 A1 Jul. 3, 2025

(30) Foreign Application Priority Data
Mar. 30, 2022 (AU) ................................ 2022900810

(51) Int. Cl.
*G06F 3/01* (2006.01)
(52) U.S. Cl.
CPC ................................... *G06F 3/013* (2013.01)

(58) Field of Classification Search
CPC ... G06F 3/013; G02B 27/017; G02B 27/0176; G02B 2027/0138; G02B 2027/014;
(Continued)

(56) References Cited

U.S. PATENT DOCUMENTS

| 4,782,832 | A | 11/1988 | Trimble et al. |
| 4,944,310 | A | 7/1990 | Sullivan |

(Continued)

FOREIGN PATENT DOCUMENTS

| WO | WO 98/004310 A1 | 2/1998 |
| WO | WO 98/034665 A1 | 8/1998 |

(Continued)

OTHER PUBLICATIONS

"*Respiratory Physiology*", by John B. West, Lippincott Williams & Wilkins, 9th edition published 2012 (8 pages).
(Continued)

*Primary Examiner* — Mihir K Rayan
(74) *Attorney, Agent, or Firm* — Nixon & Vanderhye P.C.

(57) ABSTRACT

Disclosed is a head-mounted display system comprising a head-mounted display unit producing a computer-generated output for a user. The head-mounted display unit includes at least one sensor. The at least one sensor may be configured to measure a parameter associated with digital eye strain for the user. The at least one sensor may be configured to communicate a measured parameter to a processor, wherein the processor is configured to effect change on the computer-generated output based on the measured parameter.

19 Claims, 128 Drawing Sheets

(58) Field of Classification Search
CPC . G06T 19/003; G06T 19/006; G06T 2215/16;
G06V 40/16; G06V 40/165; G06V
40/171; G06V 40/18; H04N 13/332
See application file for complete search history.

(56)                    References Cited

U.S. PATENT DOCUMENTS

| | | | |
|---|---|---|---|
| 5,687,715 A | 11/1997 | Landis | |
| 6,050,717 A * | 4/2000 | Kosugi | G05B 19/409 |
| | | | 700/17 |
| 6,532,959 B1 | 3/2003 | Berthon-Jones | |
| 6,581,594 B1 | 6/2003 | Drew et al. | |
| 7,866,944 B2 | 1/2011 | Kenyon et al. | |
| 8,636,479 B2 | 1/2014 | Kenyon et al. | |
| 8,638,014 B2 | 1/2014 | Sears et al. | |
| 8,733,349 B2 | 5/2014 | Bath et al. | |
| 10,921,595 B2 * | 2/2021 | Rakshit | G06F 3/012 |
| 10,962,789 B1 | 3/2021 | Lewis | |
| 12,311,256 B2 * | 5/2025 | Cheung | G02B 27/017 |
| 2009/0044808 A1 | 2/2009 | Guney et al. | |
| 2009/0050156 A1 | 2/2009 | Ng et al. | |
| 2010/0000534 A1 | 1/2010 | Kooij et al. | |
| 2014/0292637 A1 * | 10/2014 | Peng | G02B 27/017 |
| | | | 345/156 |
| 2016/0080720 A1 * | 3/2016 | Fullam | A61B 3/14 |
| | | | 345/156 |
| 2017/0276948 A1 | 9/2017 | Welch et al. | |
| 2017/0293356 A1 | 10/2017 | Khaderi et al. | |
| 2020/0218342 A1 | 7/2020 | Murali et al. | |
| 2022/0217325 A1 * | 7/2022 | Lee | G06V 40/19 |

FOREIGN PATENT DOCUMENTS

| | | | |
|---|---|---|---|
| WO | WO 2000/078381 A1 | 12/2000 | |
| WO | WO 2004/073778 A1 | 9/2004 | |
| WO | WO 2005/063328 A1 | 7/2005 | |
| WO | WO 2006/074513 A1 | 7/2006 | |
| WO | WO 2006/130903 A1 | 12/2006 | |
| WO | WO 2009/052560 A1 | 4/2009 | |
| WO | WO 2010/135785 A1 | 12/2010 | |
| WO | WO 2012/133020 A1 | 10/2012 | |
| WO | WO 2012/171072 A1 | 12/2012 | |
| WO | WO 2013/020167 A1 | 2/2013 | |

OTHER PUBLICATIONS

International Search Report for PCT/AU2023/050244, mailed Apr. 28, 2023, 7 pages.
Written Opinion of the ISA for PCT/AU2023/050244, mailed Apr. 28, 2023, 5 pages.

* cited by examiner

Frontal bone

Supraorbital
foramen

Nasal bones

Septal cartilage

Lateral cartilage

Sesamoid
cartilage

Greater alar
cartilage

Medial crus
of greater alar
cartilage

Anterior nasal spine

Infraorbital
foramen

Lesser nasal
cartilage

Alar fibrofatty
tissue

Septal cartilage

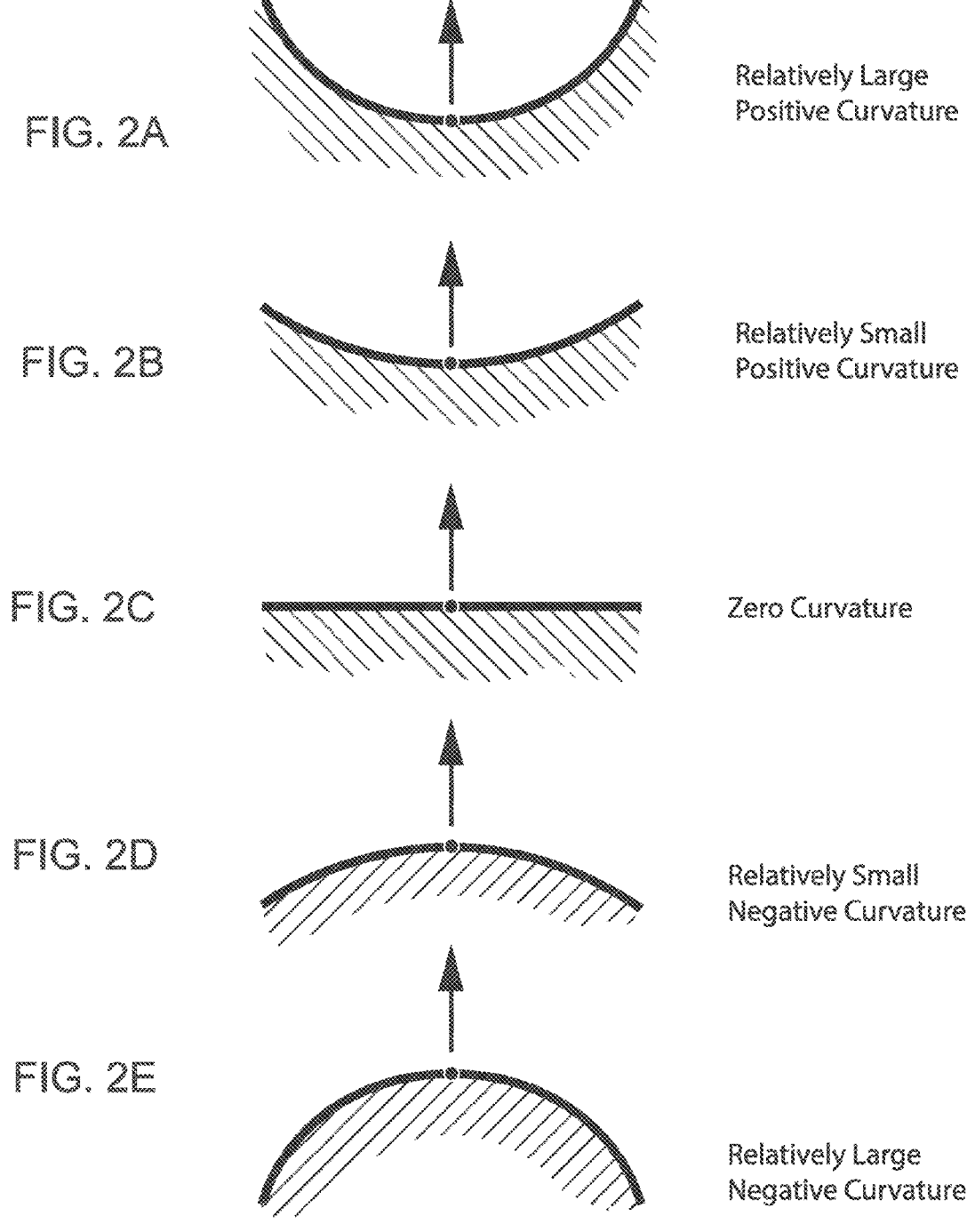
FIG. 2A     Relatively Large Positive Curvature
FIG. 2B     Relatively Small Positive Curvature
FIG. 2C     Zero Curvature
FIG. 2D     Relatively Small Negative Curvature
FIG. 2E     Relatively Large Negative Curvature

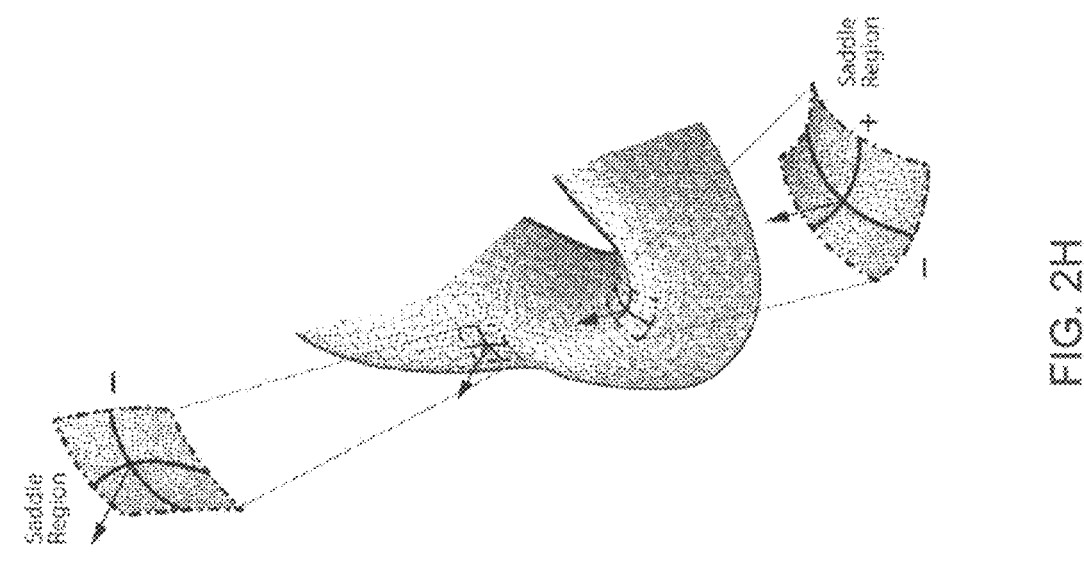
FIG. 2F
FIG. 2H
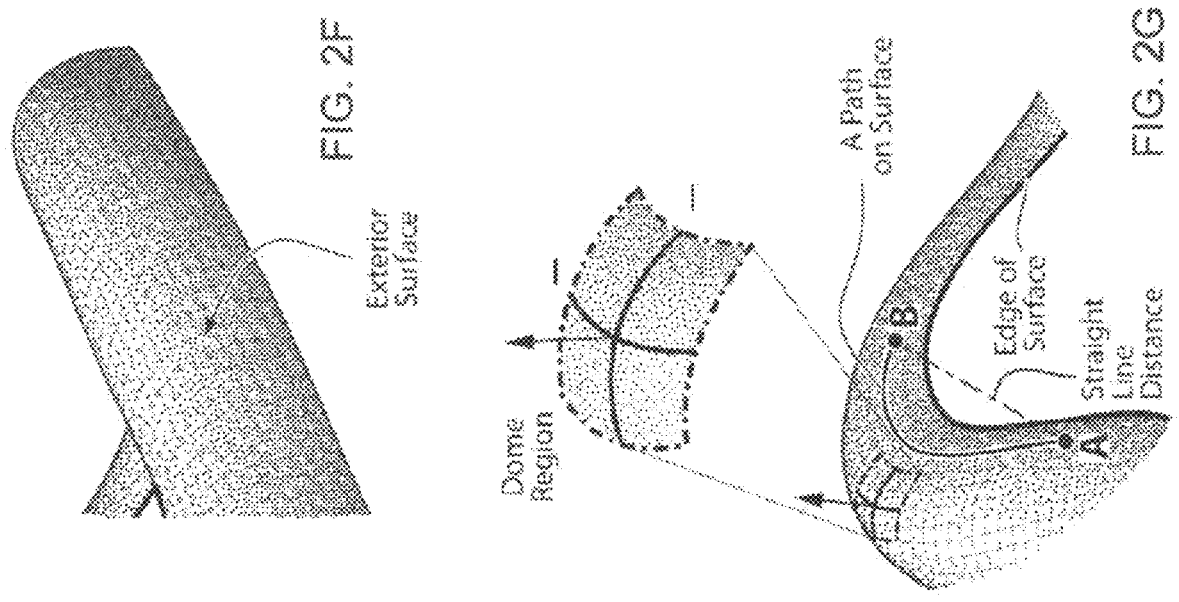
FIG. 2G

Left ear helix
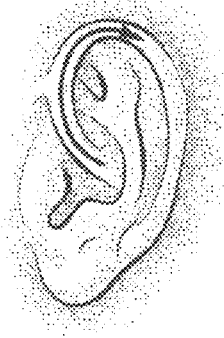
FIG. 2I
Right ear helix
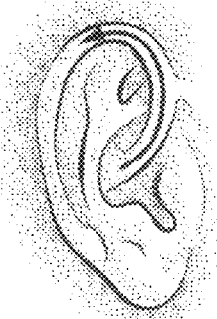
FIG. 2K
T2
B
B
N
N
T
T
T1
Right-hand helix
Right-hand positive
FIG. 2J
Left-hand rule
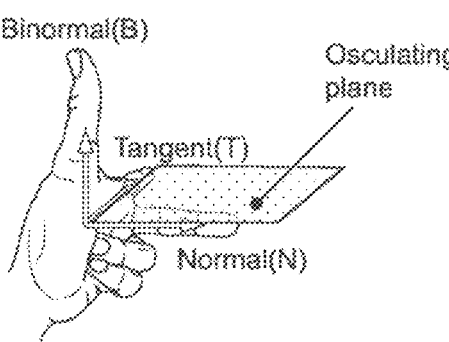
FIG. 2L
Right-hand rule
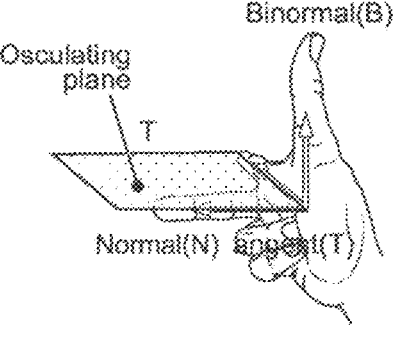
FIG. 2M

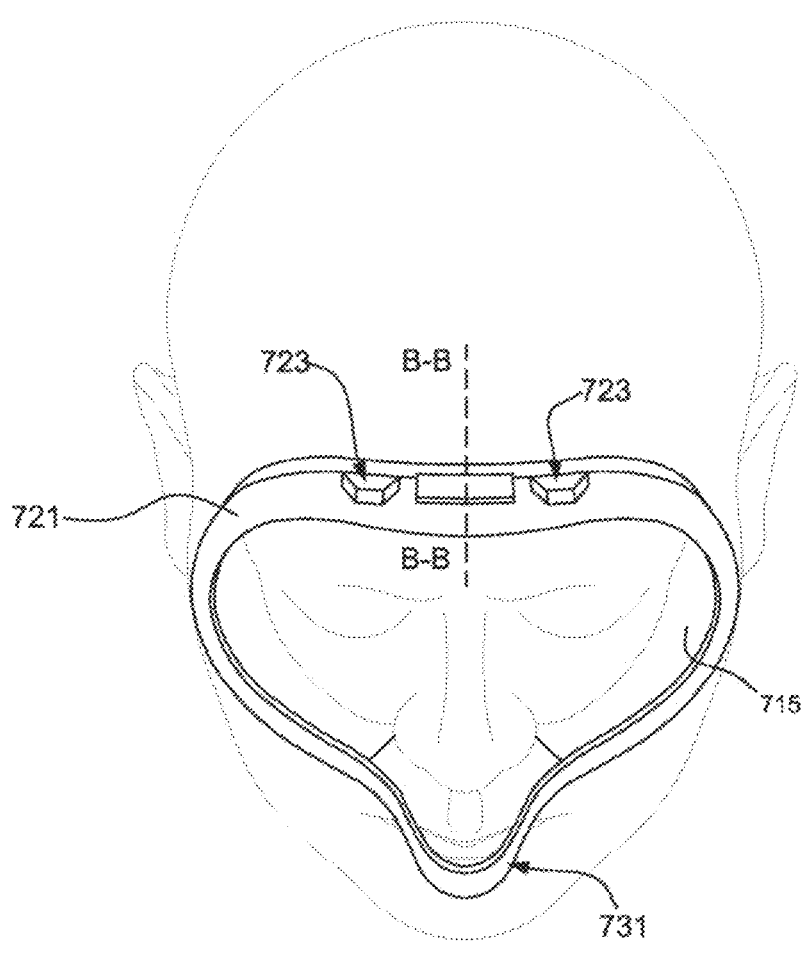
FIG. 16c
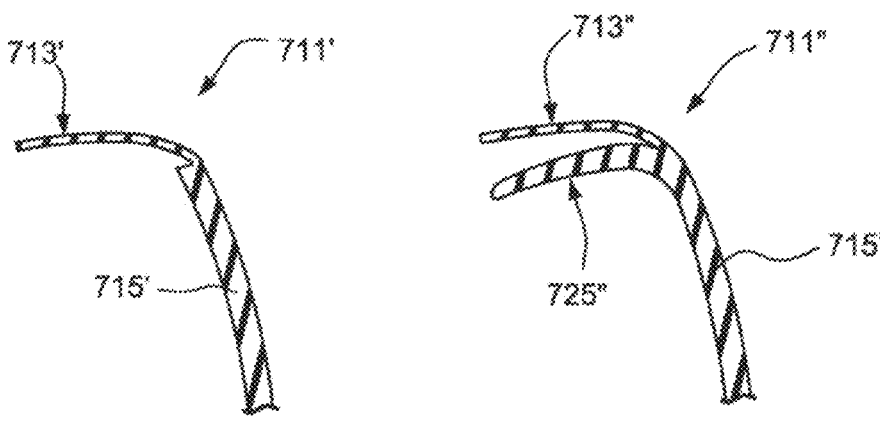
FIG. 17a                    FIG. 17b

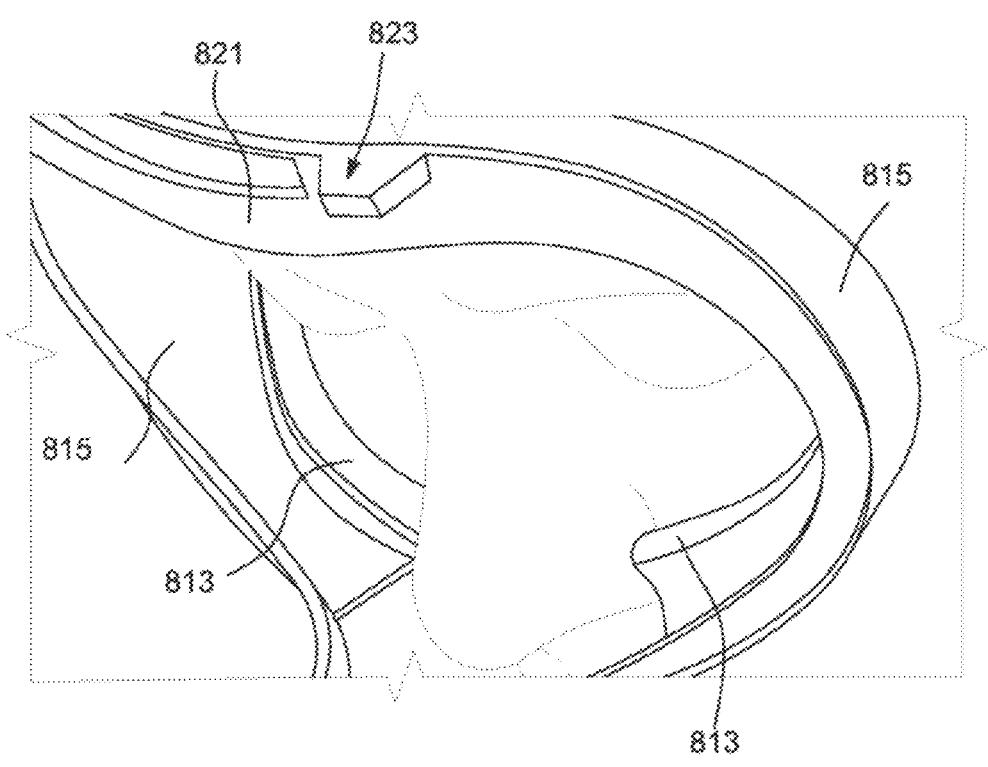
FIG. 20d
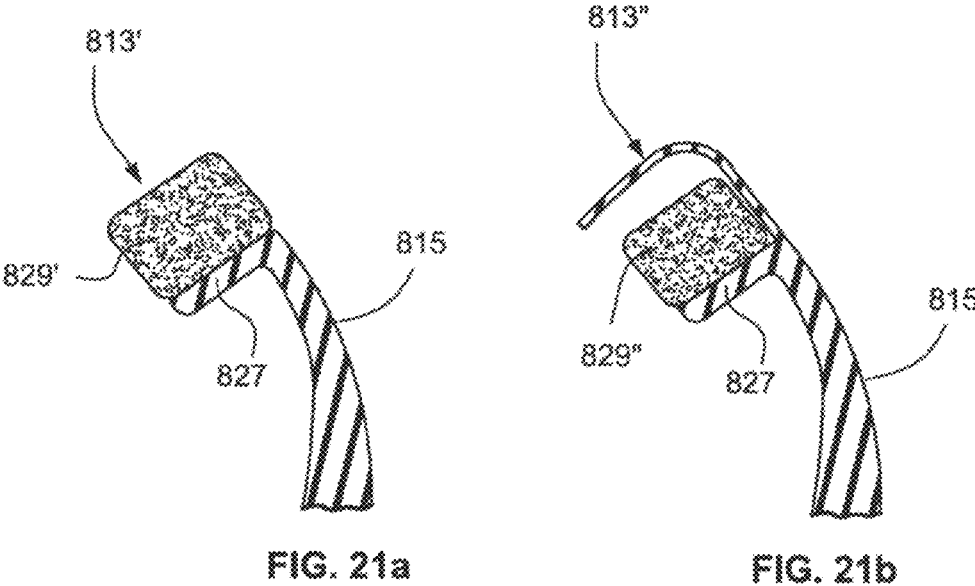
FIG. 21a          FIG. 21b

|  | -3σ | Mean Shape | +3σ |
|---|---|---|---|
| PCA 1 | | | |
| PCA 2 | | | |
| PCA 3 | | | |
| PCA 4 | | | |

1205

1215

1219

1210

1210

1205

1219

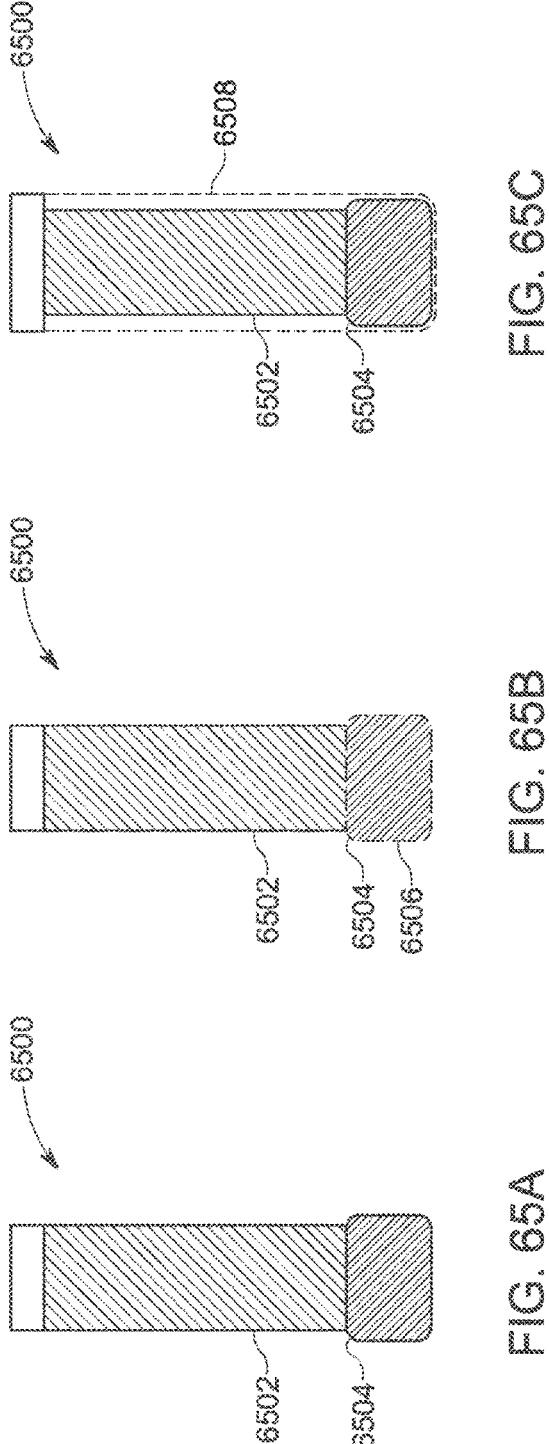

DISPLAY SYSTEM AND USER INTERFACE

CROSS-REFERENCE TO RELATED APPLICATIONS

This application is the U.S. national phase of International Application No. PCT/AU2023/050244 filed Mar. 30, 2023, which designated the U.S. and claims priority to AU 2022900810 filed Mar. 30, 2022, the entire contents of each of which are hereby incorporated by reference.

1 BACKGROUND OF THE TECHNOLOGY

1.1 Field of the Technology

The disclosure relates generally to head mounted displays and systems including a display unit, interfacing structures and or components and display control systems. The present technology finds particular application in the use of virtual reality head mounted displays and is herein described in that context. However, it is to be appreciated that the disclosure may have broader application and be used in other head-mounted display arrangement including augmented reality displays.

1.2 BACKGROUND OF THE TECHNOLOGY

It is to be understood that, if any prior art is referred to herein, such reference does not constitute an admission that the prior art forms a part of the common general knowledge in the art, in Australia or any other country.

1.2.1 Immersive Technology

An immersive technology refers to technology that attempts to replicate or augment a physical environment through the means of a digital or virtual environment by creating a surrounding sensory feeling, thereby creating a sense of immersion.

In particular, an immersive technology provides the user visual immersion, and creates virtual objects and/or a virtual environment. The immersive technology may also provide immersion for at least one of the other five senses.

1.2.2 Virtual Reality

Virtual reality (or VR) head-mounted displays enable a user to have a fully immersive experience of a virtual environment and have broad application in fields such as communications, training, medical and surgical practice, engineering and video gaming.

Virtual reality head mounted displays typically are provided as a system that includes a display unit which is arranged to be held in an operational position in front of a user's face. The unit typically includes a housing containing a display and a user interface structure constructed and arranged to be in opposing relation with the user's face. The user interface structure may extend about the display and define in conjunction with the housing, a viewing opening to the display. The user interfacing structure may engage with the face and include a cushion for user comfort and/or be light sealing to cut ambient light from the display. The head-mounted display system further comprises a positioning and stabilising structure that is disposed on the user's head to maintain the display unit in position.

1.2.3 Augmented Reality

Augmented reality (AR) is a computer-generated three-dimensional image or environment that is presented to a user.

While similar to VR, AR differs in that the virtual environment created at least in part by the electronic screen is observed in combination with the user's physical environment. In other words, AR creates virtual objects in order to alter and/or enhance the user's physical environment with elements of a virtual environment. The result of AR is a combined environment that includes physical and virtual objects, and therefore an environment that is both physical and virtual.

For example, images created by the electronic screen may be overlayed into the user's physical environment. Only a portion of an AR combination environment presented to the user includes is virtual. Thus, the user may wish to continue to receive ambient stimulation from their physical environment while using an AR device (e.g., in order to continue to observe the physical or non-virtual component of the combination environment).

Since AR may be used with the user's physical environment, an AR device may not be electrically connected, or otherwise tethered, to a computer or video game console. Instead the AR device may include a battery, or other power source. This may provide the user with the greatest freedom of movement, so that they can explore a variety of physical environments while using the AR device.

This key difference between VR and AR may lead to different types of wearable electronic screens. As described above, a user of a VR device may wish to block ambient light, so the housing of the electronic screen may be opaque in order to limit or prevent ambient light from reaching the user. However, the user of an AR device may want to see the virtual environment blended with their actual environment. The electronic screen in an AR device may be similarly supported in front of the user's eyes, but, screens in AR devices may be transparent or translucent, and the screens may not be supported by an opaque housing (or opaque material may not substantially obstruct the user's line of sight). This may allow the user to continue receiving ambient stimulation, where the virtual environment is simultaneously present. Notwithstanding, some VR devices that do not have a transparent screen through which the user can see their real world surroundings may be configurable for AR by acquiring real-time video of the user's real-world surroundings from the user's perspective (e.g. with cameras on the display housing) and displaying it on the display screen.

Additionally, a person using an AR device may be more mobile than a person using a VR device (e.g., because an AR user can see their physical environment and/or are not tethered to a computer or video game console). Thus, a person using an AR device may wish to wear the device for an extended period of time, while also moving around (e.g., walking, running, biking, etc.). Including components, like batteries, on the AR device may make the AR device uncomfortable for the user's head and/or neck, and may discourage the user from wearing the AR device for long periods of time.

1.2.4 Mixed Reality

Mixed reality (MR) is similar to AR but may be more immersive because the MR device may provide the user more ways to interact with virtual objects or environment than an AR device. The virtual reality in MR may also be overlayed and/or blended with the user's physical environment. Unlike AR however, a user may be able to interact with the virtual environment akin to what occurs in VR. In other words, while AR may present only a computer generated image in the physical environment, MR may present the user with the same or similar computer generated image but allow for interaction with the image in the physical environment (e.g., using a hand to "grab" an object produced virtually). Thus, the virtual environment may further merge with a physical environment so that the combined environment better replicates an actual environment.

1.2.5 Head-Mounted Display Interface

A head-mounted display interface enables a user to have an immersive experience of a virtual environment and have broad application in fields such as communications, training, medical and surgical practice, engineering, and video gaming.

Different head-mounted display interfaces can each provide a different level of immersion. For example, some head-mounted display interfaces can provide the user with a total immersive experience. One example of a total immersive experience is virtual reality (VR). The head-mounted display interface can also provide partial immersion consistent with using an AR device.

VR head-mounted display interfaces typically are provided as a system that includes a display unit which is arranged to be held in an operational position in front of a user's face. The display unit typically includes a housing containing a display and a user interface structure constructed and arranged to be in opposing relation with the user's face. The user interface structure may extend about the display and define, in conjunction with the housing, a viewing opening to the display. The user interfacing structure may engage with the face and include a cushion for user comfort and/or be light sealing to block ambient light from the display. The head-mounted display system further comprises a positioning and stabilizing structure that is disposed on the user's head to maintain the display unit in position.

Other head-mounted display interfaces can provide a less than total immersive experience. In other words, the user can experience elements of their physical environment, as well as a virtual environment. Examples of a less than total immersive experience are augmented reality (AR) and mixed reality (MR).

AR and/or MR head-mounted display interfaces are also typically provided as a system that includes a display unit which is arranged to be held in an operational position in front of a user's face. Likewise, the display unit typically includes a housing containing a display and a user interface structure constructed and arranged to be in opposing relation with the user's face. The head-mounted display system of the AR and/or MR head-mounted display is also similar to VR in that it further comprises a positioning and stabilizing structure that is disposed on the user's head to maintain the display unit in position. However, AR and/or MR head-mounted displays do not include a cushion that totally seals ambient light from the display, since these less than total immersive experience require an element of the physical environment. Instead, head-mounted displays in augmented and/or mixed allow the user to see the physical environment in combination with the virtual environment.

In any types of immersive technology, it is important that the head-mounted display interface is comfortable in order to allow the user to wear the head-mounted display for extended periods of time. Additionally, it is important that the display is able to provide changing images with changing position and/or orientation of the user's head in order to create an environment, whether partially or entirely virtual, that is similar to or replicates one that is entirely physical.

1.2.5.1 Interfacing Structure

Head-mounted displays may include a user interfacing structure. Since a head mounted display may be in direct contact with the user's face or other parts of the head, the shape and configuration of the interfacing portion can have a direct impact on the effectiveness and comfort of the display unit.

The design of a user interfacing structure presents a number of challenges. The face has a complex three-dimensional shape. The size and shape of noses and heads vary considerably between individuals. Since the head includes bone, cartilage and soft tissue, different regions of the face respond differently to mechanical forces.

One type of interfacing structure extends around the periphery of the display unit and is intended to seal against the user's face when force is applied to the user interface with the interfacing structure in confronting engagement with the user's face. The interfacing structure may include a pad made of a polyurethane (PU). With this type of interfacing structure, there may be gaps between the interfacing structure and the face, and additional force may be required to force the display unit against the face in order to achieve the desired contact.

The regions not engaged by the user interface may allow gaps to form between the facial interface and the user's face through which undesirable light pollution may ingress into the display unit (e.g., particularly when using virtual reality). The light pollution or "light leak" may decrease the efficacy and enjoyment of the overall immersive experience for the user. In addition, previous systems may be difficult to adjust to enable application for a wide variety of head sizes. Further still, the display unit and associated stabilizing structure may often be relatively heavy and may be difficult to clean which may thus further limit the comfort and useability of the system.

Another type of interfacing structure incorporates a flap seal of thin material positioned about a portion of the periphery of the display unit so as to provide a sealing action against the face of the user. Like the previous style of interfacing structure, if the match between the face and the interfacing structure is inconsistent or imperfect, additional force may be required to achieve a seal, or light may leak into the display unit in-use. Furthermore, if the shape of the interfacing structure does not match or complement the shape of the user's head or face, it may crease or buckle in-use, giving rise to undesirable light penetration.

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the users nose. To the extent to which there is a mismatch between the shape of the users' face and the interfacing structure, it is advantageous for the interfacing structure or a related component to be adaptable in order for an appropriate contact or other relationship to form.

1.2.5.2 Positioning and Stabilizing

To hold the display unit in its correct operational position, the head-mounted display system further comprises a positioning and stabilizing structure that is disposed on the user's head. These structures may be responsible for providing forces to counter gravitational forces of the head-mounted display and/or interfacing structure. In the past these structures have been formed from expandable rigid structures that are typically applied to the head under tension to maintain the display unit in its operational position. Such systems have been prone to exert a clamping pressure on the user's face which can result in user discomfort at localised stress points. Also, previous systems may be difficult to adjust to allow wide application head sizes. Further, the display unit and associated stabilizing structure are often heavy, difficult to clean which further limit the comfort and useability of the system.

Certain other head mounted display systems may be functionally unsuitable for the present field. For example, positioning and stabilizing structures designed for ornamental and visual aesthetics may not have the structural capabilities to maintain a suitable pressure around the face. For example, an excess of clamping pressure may cause discomfort to the user, or alternatively, insufficient clamping pressure on the users' face may not effectively seal the display from ambient light.

Certain other head mounted display systems may be uncomfortable or impractical for the present technology. For example, if the system is used for prolonged time periods.

As a consequence of these challenges, some head mounted displays suffer from being one or more of obtrusive, aesthetically undesirable, costly, poorly fitting, difficult to use, and uncomfortable especially when worn for long periods of time or when a user is unfamiliar with a system. Wrongly sized positioning and stabilizing structures can give rise reduced comfort and in turn, shortened periods of use.

Therefore, an interfacing portion of a user interface used for the fully immersive experience of a virtual environment are subject to forces corresponding to the movement of a user during the experience.

1.2.5.3 Materials

Materials used in head mounted display assemblies have included dense foams for contacting portions in the interfacing structures, rigid shells for the housings, and positioning and stabilizing structures formed from rigid plastic clamping structures. These materials have various drawbacks including not permitting the skin covered by the material to breath, being inflexible, difficult to clean and to prone trapping bacteria. As a result, products made with such material may be uncomfortable to wear for extended periods of time, causes skin irritation in some individuals and limit the application of the products

2 BRIEF SUMMARY OF THE TECHNOLOGY

Disclosed is a positioning and stabilising structure for a head-mounted display that comprises a rear support structure arranged, in use, to contact a posterior region of the user's head. In some forms, the rear support structure includes a hoop having an occipital portion and a parietal portion.

The hoop or at least one of the portions may be resiliently extensible along at least a portion of is length. In some forms, the hoop is flexible along at least a portion of its length. In some forms, where the rear support structure is a hoop, the occipital portion may extend low on the user head such that it resists upward movement (as a result of its locational in contact with the occipital region of the head) and as such provides an anchor for the system. In some forms the hoop is orientated in a generally upright plane (such upright plane including as an example the coronal plane).

In some forms, the rear support structure is disposed posterior of the otobasion superior of the user.

Also disclosed is a positioning and stabilising structure for a head-mounted display comprising; a back support portion arranged in use to contact a posterior region of the user's head; and a front support portion that is arranged to contact an anterior region of the users head, the back and front support portions extending transverse to the sagittal plane. In some forms, the positioning and stabilising structure further comprises an adjustment mechanism to allow adjustment between the back and front portions.

In some forms, the adjustment mechanism allows lateral adjustment between the back and front support portions. In some forms, the adjustment mechanism allows angular adjustment between the front and rear portions.

Also disclosed is a positioning and stabilising structure for a head-mounted display comprising; a back support portion arranged in use to contact a posterior region of the user's head; and a front support portion that is arranged to contact an anterior region of the users head, the back and front support portions extending transverse to the sagittal plane and being laterally offset from one another.

In some forms, the back or occipital support portion is biased into contact with the occipital region of the user.

Also disclosed is a positioning and stabilising structure for a head-mounted display comprising; a support portion arranged in use to accommodate the weight of the display unit of the head mounted display, and one or more adjustment mechanisms that allow adjustment of the position of the display unit relative to the support portion.

In some forms, the adjustment of the display relative to the support portion may be angular and/or in an anterior-posterior direction relative to the user's head Also disclosed is a positioning and stabilising structure for a head-mounted display includes resilient components that are extensible and rigidisiers that are substantially inextensible and resilient.

In some forms, the positioning and stabilising structure further comprises opposing connectors that are disposed on opposing sides of, and extending along the temporal regions of, the user's head to interconnect the rear support structure or support portion to the display unit In some forms, the connectors are rigid along at least a portion of their length. In some forms, the connectors each comprise an arm having an anterior end connected to the display unit and a posterior end connected to the rear support structure or one of the support portions. In some forms, the arm is rigid. In some forms, the posterior end of the arm is disposed at or posterior to the otobasion superior of the user.

In some forms, at least one of the connectors further comprising an adjustment mechanism for adjustment of the positioning and stabilising structure to fit different size heads. In some forms, the adjustment mechanism is disposed at the connection between the posterior end of the of the temporal arm and the rear support structure.

In some forms, the positioning and stabilising structure includes one or more connection tabs that connects to the arm and the adjustment mechanism allows for adjustment of the effective length of the tab. In some forms, a posterior end of the connector arm incorporates an eyelet that is arranged to receive the connection tab, the adjustment mechanism comprising a releasably fastening arrangement to fasten the connecting tab to the temporal arm. The releasable fastening arrangement may arranged to secure a free end of the connection tab back onto a proximal portion of the tab. Other types of releasable fastening arrangement may take other forms, such as clips or retainers that allow a friction, interference, snap or other mechanical fixing arrangement.

In some forms, the positioning and stabilising structure may further include a forehead support connector. In some forms, the forehead support connector may extend generally in the direction of the sagittal plane and connects the rear support structure, or front support portion to a superior edge region of the display unit. The forehead support connector may comprise a strap. The forehead connector support strap may resiliently extensible along at least a portion of is length. The forehead connector strap may be flexible along at least a portion of its length.

The forehead support connector may further include an adjustment mechanism for adjustment of the positioning and stabilising structure to fit different size heads. The adjustment mechanism may adjusts the effective length of the forehead connector strap when the connector is in that form.

In some forms, the forehead support connector further comprises a forehead support rigidiser that provides rigidification to a portion of the connector. In some forms, the forehead support rigidiser provides rigidification to a portion of the forehead support connector located along the frontal region of the user's head. The extent and positioning of the rigidiser may assist in correct positioning of display unit and relieve pressure being applied to zygomatic bone of the user. In some forms, the rigidiser may be adjustable (angularly or translational) on other components of the forehead support connector, such as the forehead connector strap to allow fine positioning of the head display and assisting in improving user comfort and fit.

In some forms, the positioning and stabilising structure further include additional rigidisers which may bridge other portions of the structure, such as the rear support, front or back support portions and/or connector arms. These rigidisers may assist in controlling the movement of the display unit about the rear support structure to further stabilise and support the system. In particular, these rigidisers may limit hinging movement at the connection of the temporal connectors to the rear support. The rigidisers may also extend through along the occipital region of the rear support structure to further anchor the display unit in its correction operational position. The rigidisier may be adjustable (angularly or translational) on other components of the forehead support connector to further assist in comfort, adjustability, and fit.

In some forms, the positioning and stabilising structure may allow for upward pivoting movement of the display unit to allow for movement of the display unit to a non operational position without removal of the positional and stabilising structure. In some forms this may be provide by release mechanism at the frontal connector support and/or providing limited hinging regions at the temporal connectors.

The positional and stabilising structure in any form described above may be incorporated in a hood or other head wear either integrated therein or releasably connected thereto. The positional and stabilising structure may also include other components integrated therein such as audio, tactile (haptic) stimulation or feedback.

Also disclosed is an interfacing structure of the head mounted display constructed and arranged to be in opposing relation with the user's face.

In some forms, the interfacing structure comprises a face engaging surface including one or more regions of silicone, or one or more layers of a textile material or foam.

In some forms, the interfacing structure may have varying compliance to allow more selective distribution of force onto a user's face. In some forms, one or more regions of the face engaging surface may be formed to have varying thicknesses and/or varying surface finishes, whereby the resultant face engaging surface can have a variable compliance therealong when compressed against a user's face in use.

In some forms, the interfacing structure comprises includes a face engaging portion, a support structure to support the face engaging portion in position, and a rigid chassis.

Also disclosed is an interfacing structure for a head mounted display that the interfacing structure extending about the display and defining a viewing opening to the display. In some forms the structure may include a plurality adjustable face engaging portions being located at a respective one of the left and right hand sides of the interfacing structure. The adjustable face engaging portions may be movable relative to each other.

In some forms, the adjustable face engaging portions may be movable relative to a chassis of the interfacing structure. The interfacing structure may include an adjustment mechanism, such as a sliding tab or rack-and-pinion style adjustment mechanism, to allow a user to selectively adjust the spacing of the face engaging portions.

In some forms, the interfacing structure includes components and/or regions that are removably mountable to a housing of the display unit.

Further disclosed is a head mounted-display system including a positional and stabilising structure and/or an interfacing structure in any form described above, and a display unit connected thereto.

Disclosed is a head-mounted display system comprising a head-mounted display unit producing a computer-generated output for a user. The head-mounted display unit includes at least one sensor. The at least one sensor can be configured to measure a parameter associated with digital eye strain for the user. The at least one sensor can be configured to communicate a measured parameter to a processor, wherein the processor is configured to effect change on the computer-generated output based on the measured parameter.

In some forms of the head mounted display the sensor may be configured to measure the time the display unit is in use.

In some forms of the head mounted display the sensor is configured to measure a parameter relating to eye activity.

In some forms, the parameter is one or more of blink frequency, eye movement or squinting.

In some forms of the head mounted display, the change effected on the display unit comprises either an audible sound or a visual change.

3 BRIEF DESCRIPTION OF THE DRAWINGS

The present technology is illustrated by way of example, and not by way of limitation, in the figures of the accompanying drawings, in which like reference numerals refer to similar elements including:

3.1 Facial Anatomy

FIG. 1*a* is a front view of a face with several features of surface anatomy identified including the endocanthion, superciliary arch and epicranius, lip superior, upper vermilion, nasal ala, nasolabial sulcus and cheilion. Also indicated is the left and right side of the sagittal plane and the directions superior, inferior, radially inward and radially outward;

FIG. 1*b* is a side view of a head with several features of surface anatomy identified including the temporomandibular joint, glabella, sellion, nasal bridge, zygomatic arch/bone, otobasion superior, external occipital protuberance, otobasion inferior, pronasale, subnasale, alar crest point and the temporalis muscle. Also indicated are the directions superior & inferior, and anterior & posterior;

FIG. 1c is a further side view of a head. The approximate location of the Frankfort horizontal is indicated. The coronal plane is also indicated;

FIG. 1d shows a lateral view of a skull with the outline of the surface of a head, as well as several muscles. The following bones are shown: frontal, sphenoid, nasal, zygomatic, maxilla, mandible, parietal, temporal and occipital. The following muscles are shown: masseter minor and trapezius; and FIG. 1e shows an anterolateral view of a nose. The following bones are shown: frontal, supraorbital foramen, nasal, septal cartilage, lateral cartilage, orbit and infraorbital foramen.

3.2 Shape of Structures

FIG. 2a shows a schematic of a cross-section through a structure at a point. An outward normal at the point is indicated. The curvature at the point has a positive sign, and a relatively large magnitude when compared to the magnitude of the curvature shown in FIG. 2b;

FIG. 2b shows a schematic of a cross-section through a structure at a point. An outward normal at the point is indicated. The curvature at the point has a positive sign, and a relatively small magnitude when compared to the magnitude of the curvature shown in FIG. 2a;

FIG. 2c shows a schematic of a cross-section through a structure at a point. An outward normal at the point is indicated. The curvature at the point has a value of zero;

FIG. 2d shows a schematic of a cross-section through a structure at a point. An outward normal at the point is indicated. The curvature at the point has a negative sign, and a relatively small magnitude when compared to the magnitude of the curvature shown in FIG. 2c;

FIG. 2e shows a schematic of a cross-section through a structure at a point. An outward normal at the point is indicated. The curvature at the point has a negative sign, and a relatively large magnitude when compared to the magnitude of the curvature shown in FIG. 2d;

FIGS. 2f-2h shows a seal forming structure. An exterior surface of the cushion is indicated. An edge of the surface is indicated. A path on the surface between points A and B is indicated. A straight-line distance between A and B is indicated. Two saddle regions and a dome region are indicated;

Figure 1A:
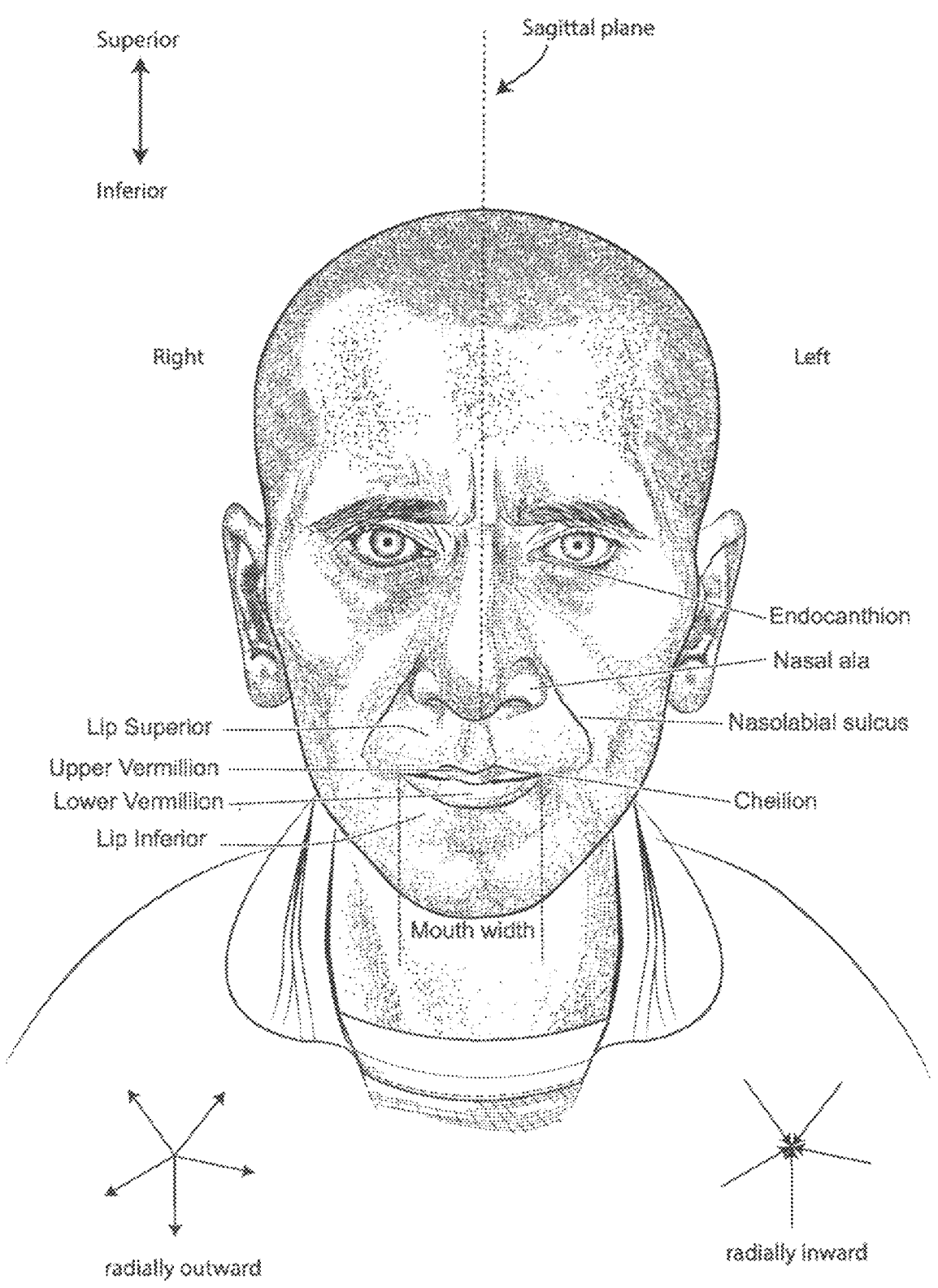
Figure 1B:
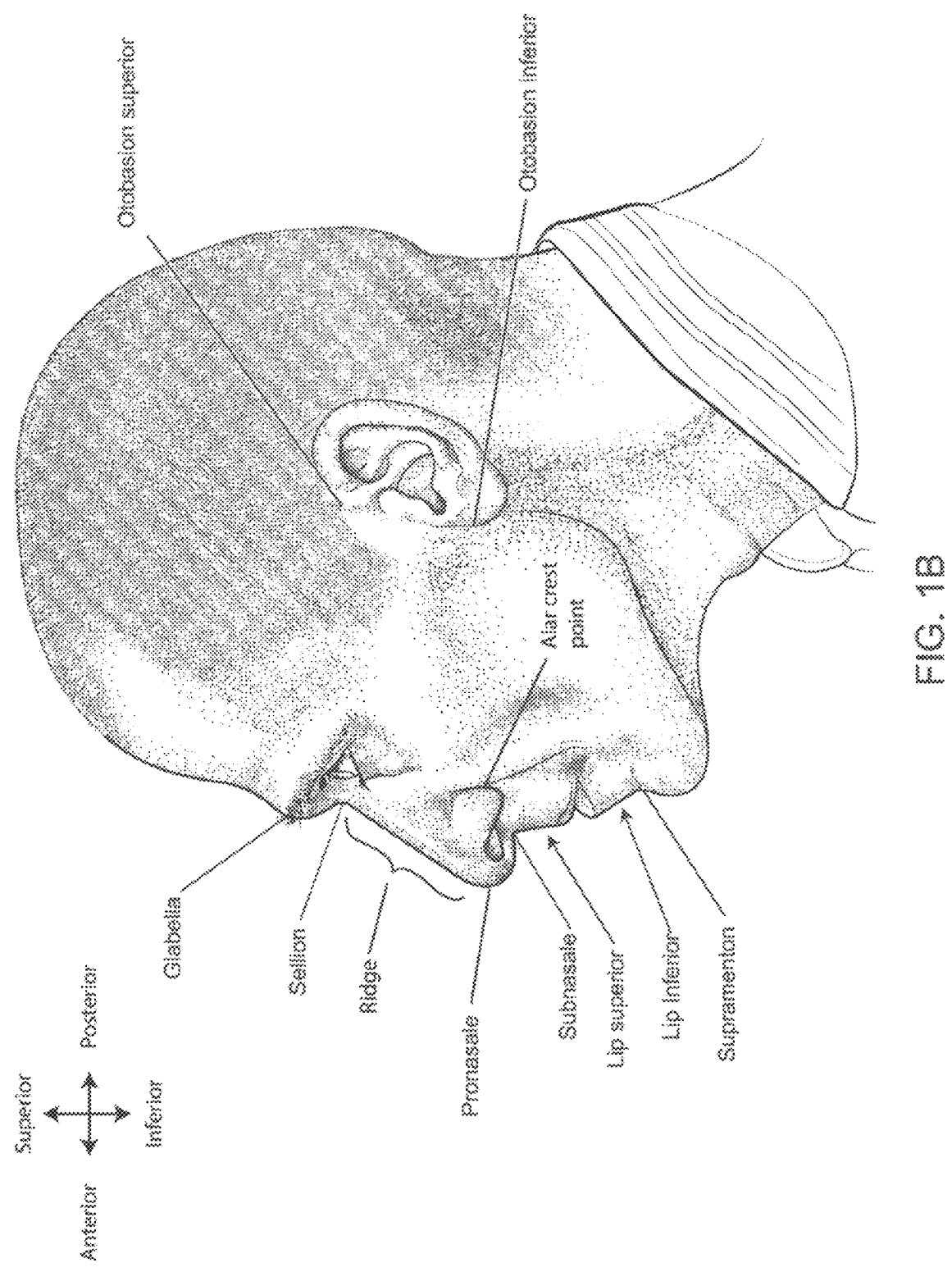
Figure 1C:
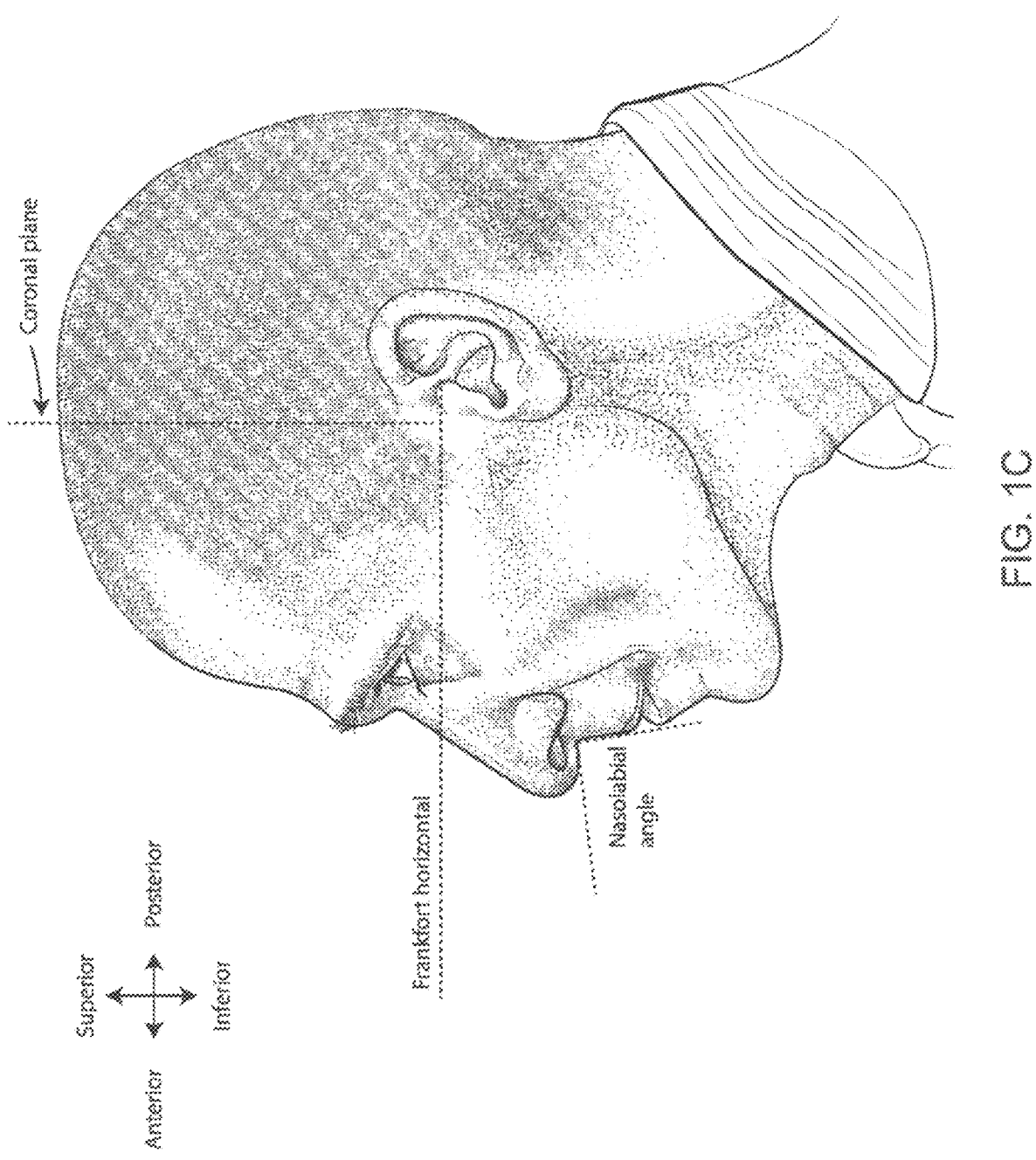
Figure 1D:
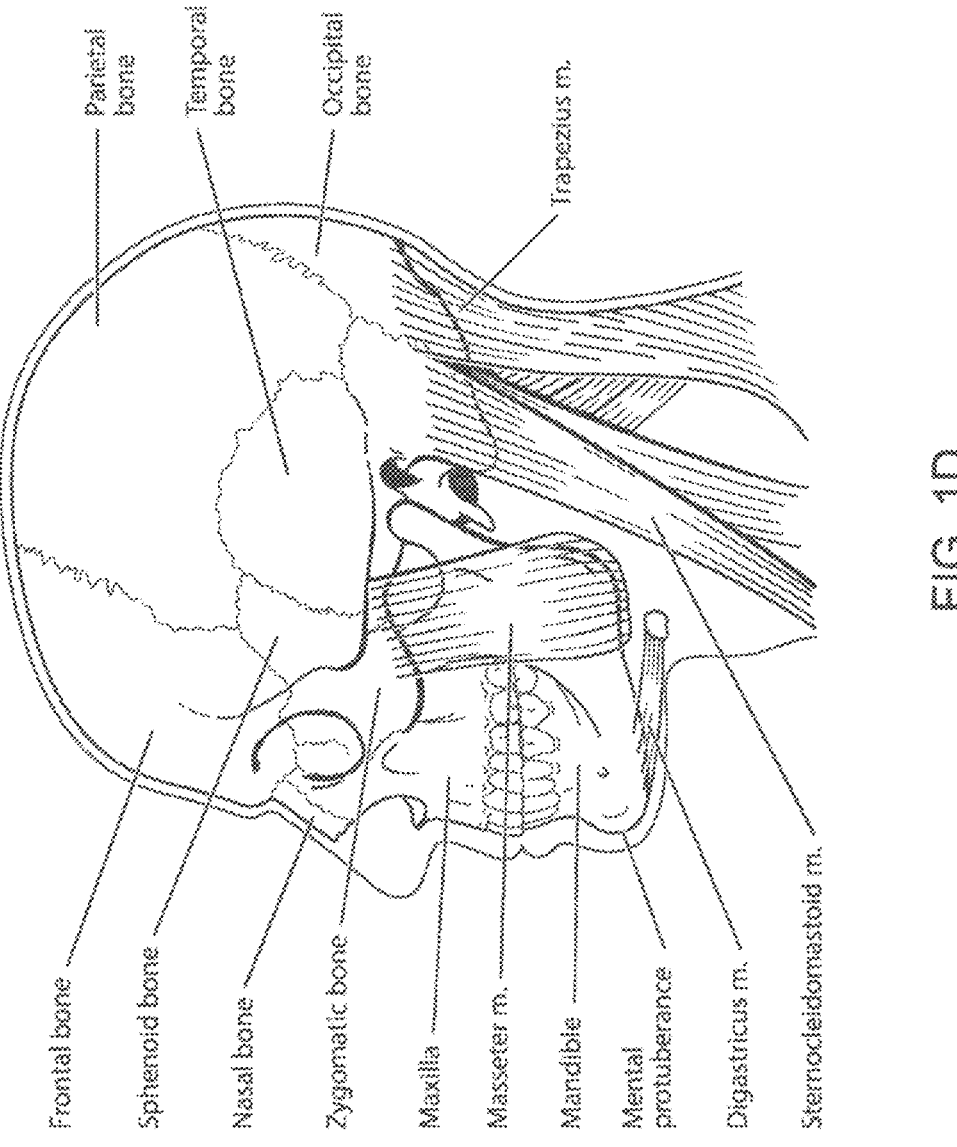
Figure 1E:
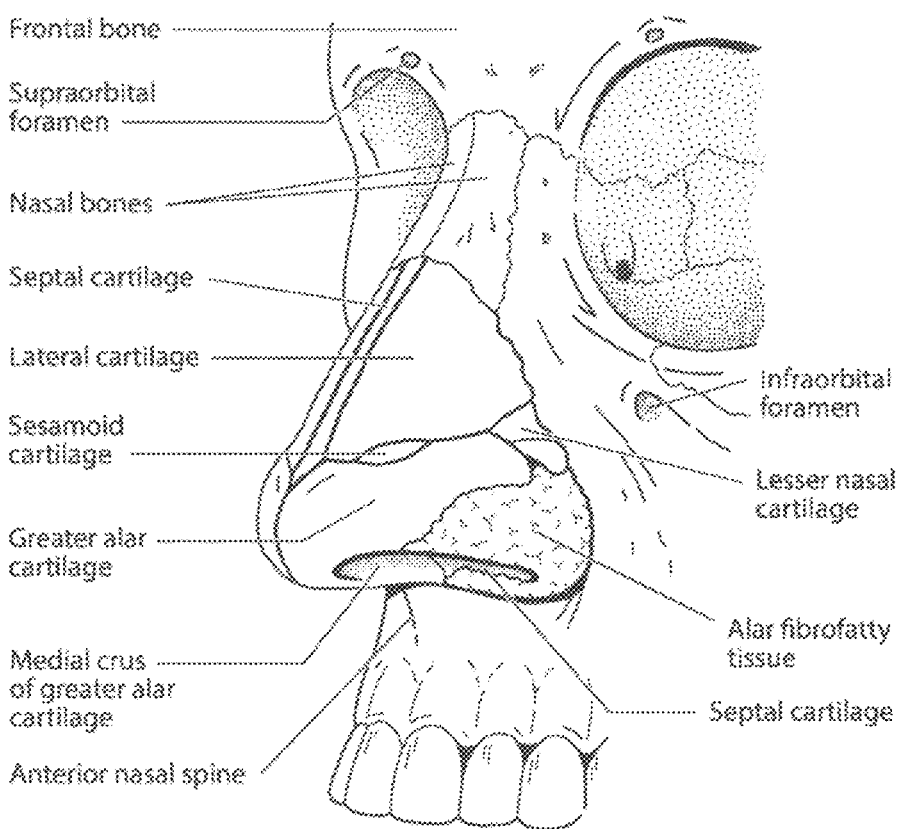
Figure 2N:
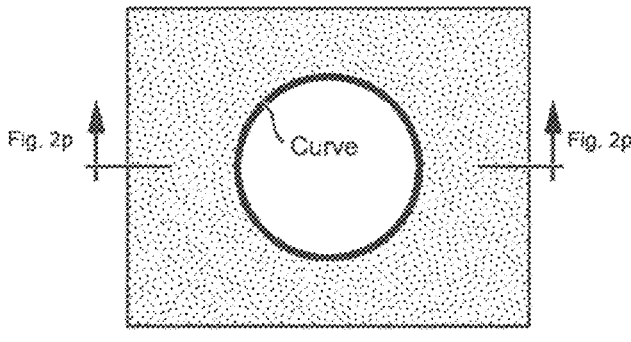
FIG. 2n shows the surface of a structure, with a one-dimensional hole in the surface. The illustrated plane curve forms the boundary of a one-dimensional hole.
Figure 2O:
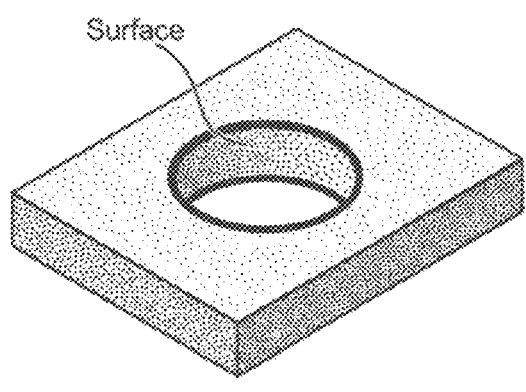
FIG. 2i shows a left ear, including the left ear helix.
FIG. 2j shows a right-hand helix.
FIG. 2k shows a right ear, including the right ear helix.
FIG. 2l illustrates a left-hand rule.
FIG. 2m illustrates a right-hand rule.
Figure 2P:
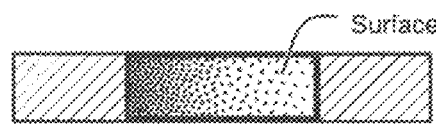

FIG. 2o shows a cross-section through the structure of FIG. 2n. The illustrated surface bounds a two-dimensional hole in the structure of FIG. 2n; and FIG. 2p shows a perspective view of the structure of FIG. 2n, including the two-dimensional hole and the one-dimensional hole. Also shown is the surface that bounds a two-dimensional hole in the structure of FIG. 2n.

3.3 Head Mounted Display 3.3.1 Positioning and Stabilising Structure

Figure 3A:
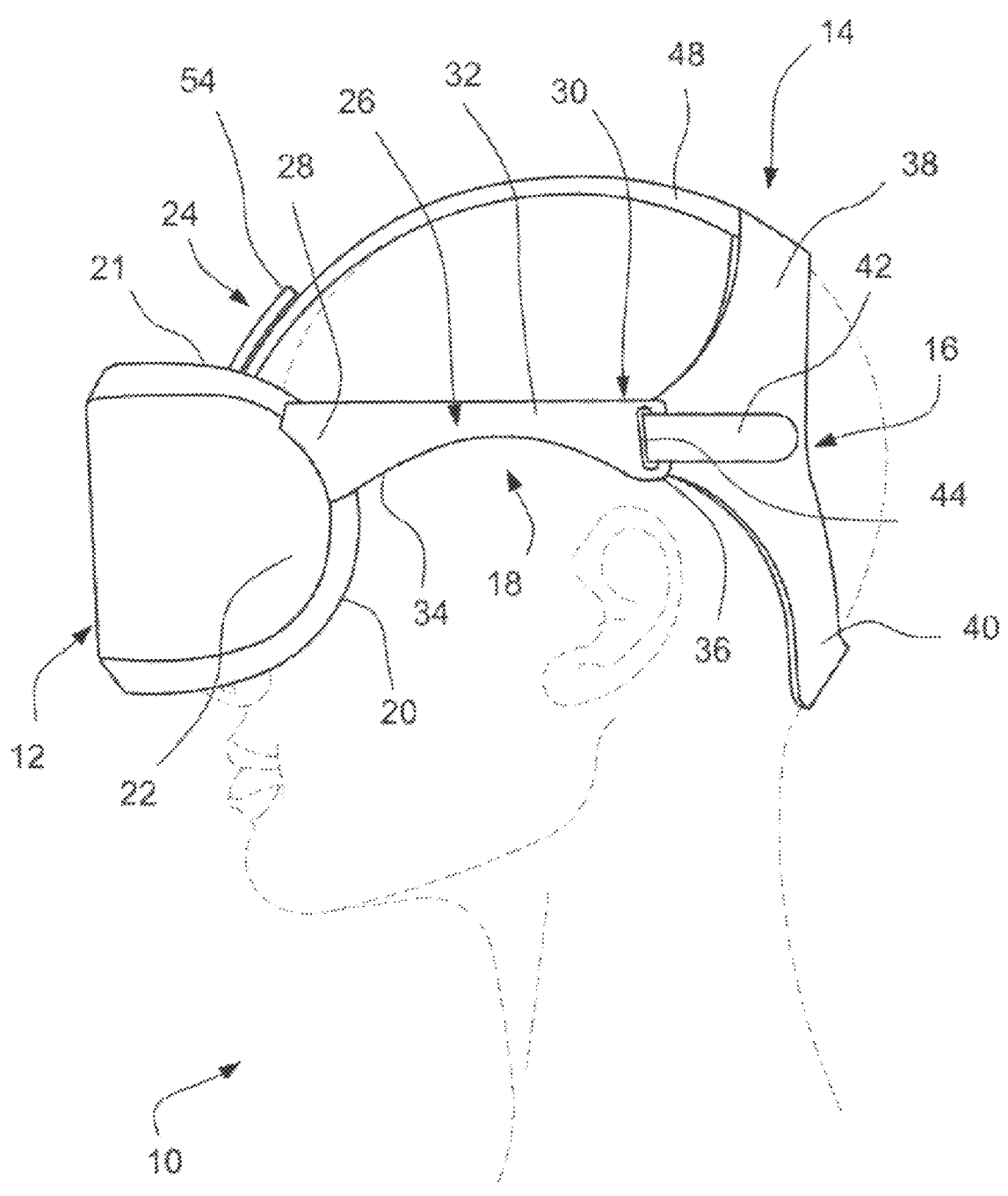
Figure 3B:
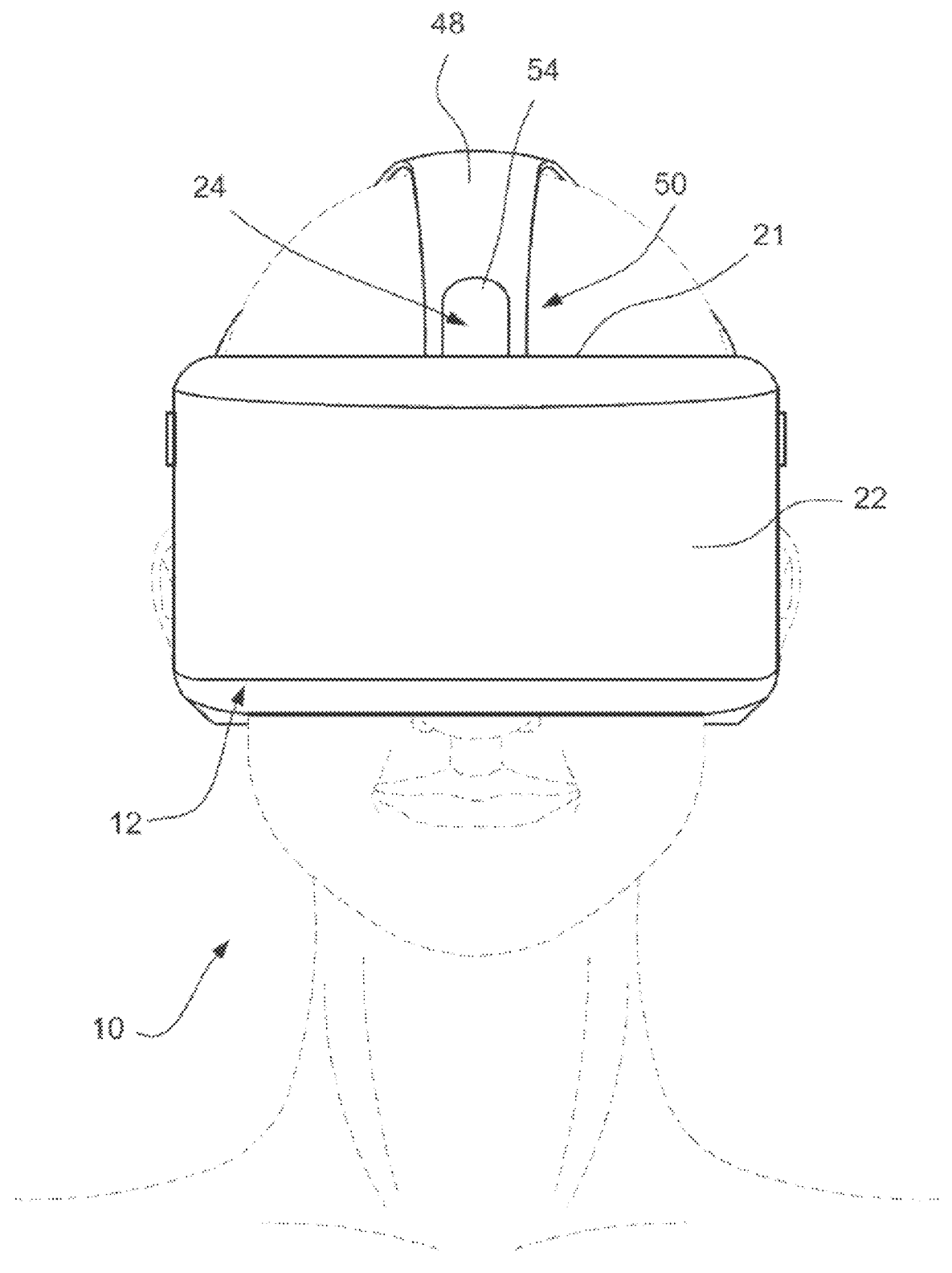
Figure 3C:
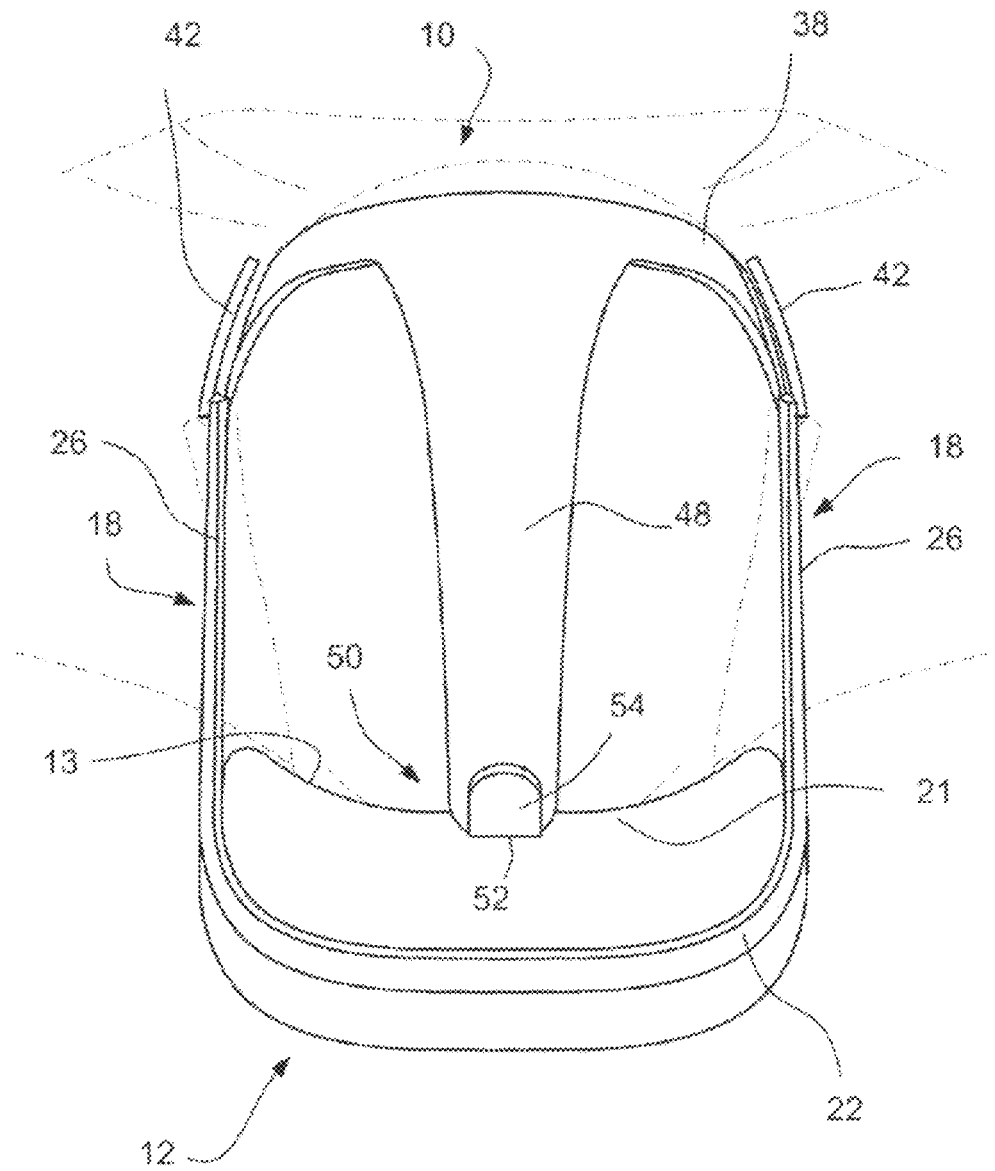
Figure 4A:
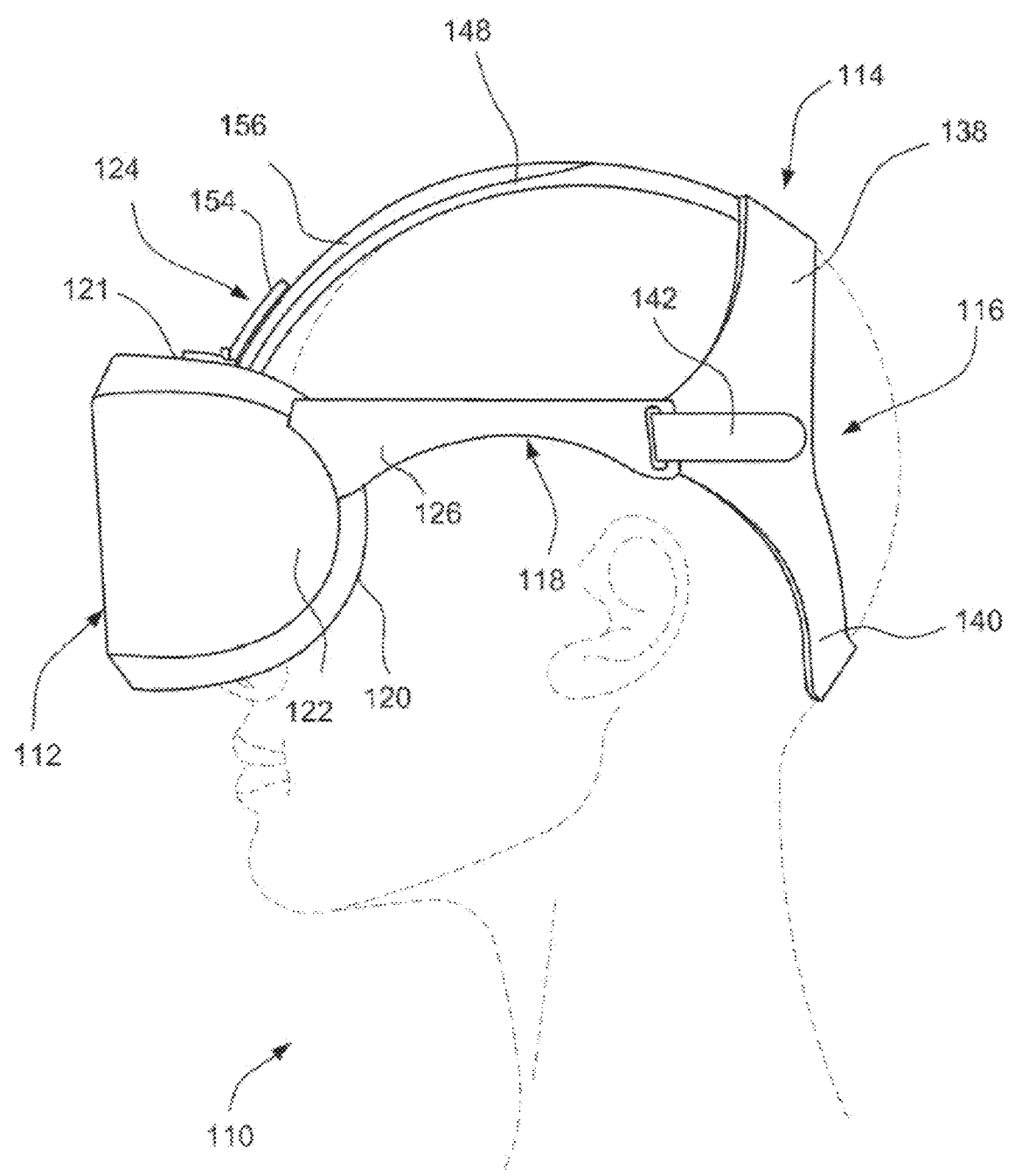
Figure 4B:
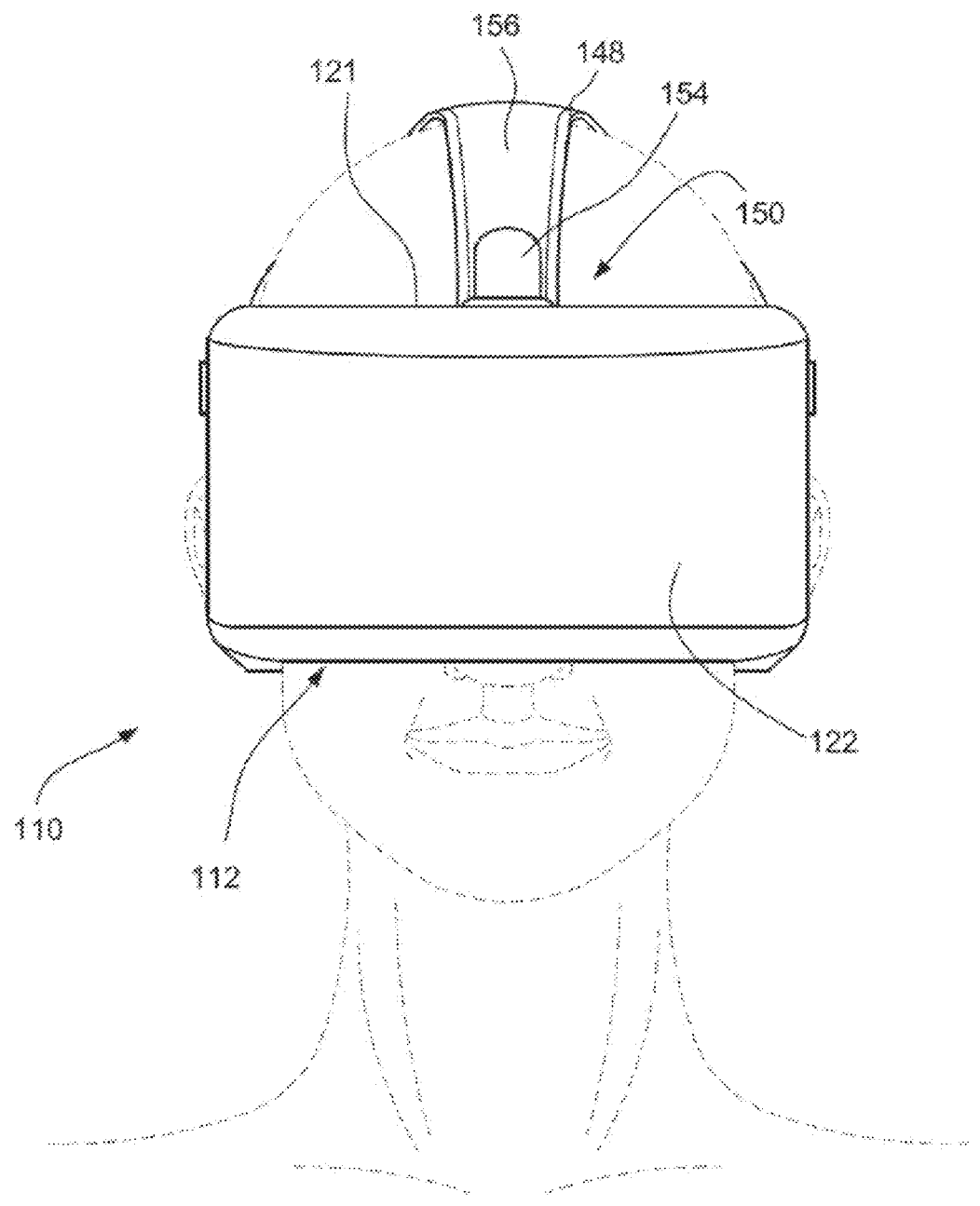
Figure 4C:
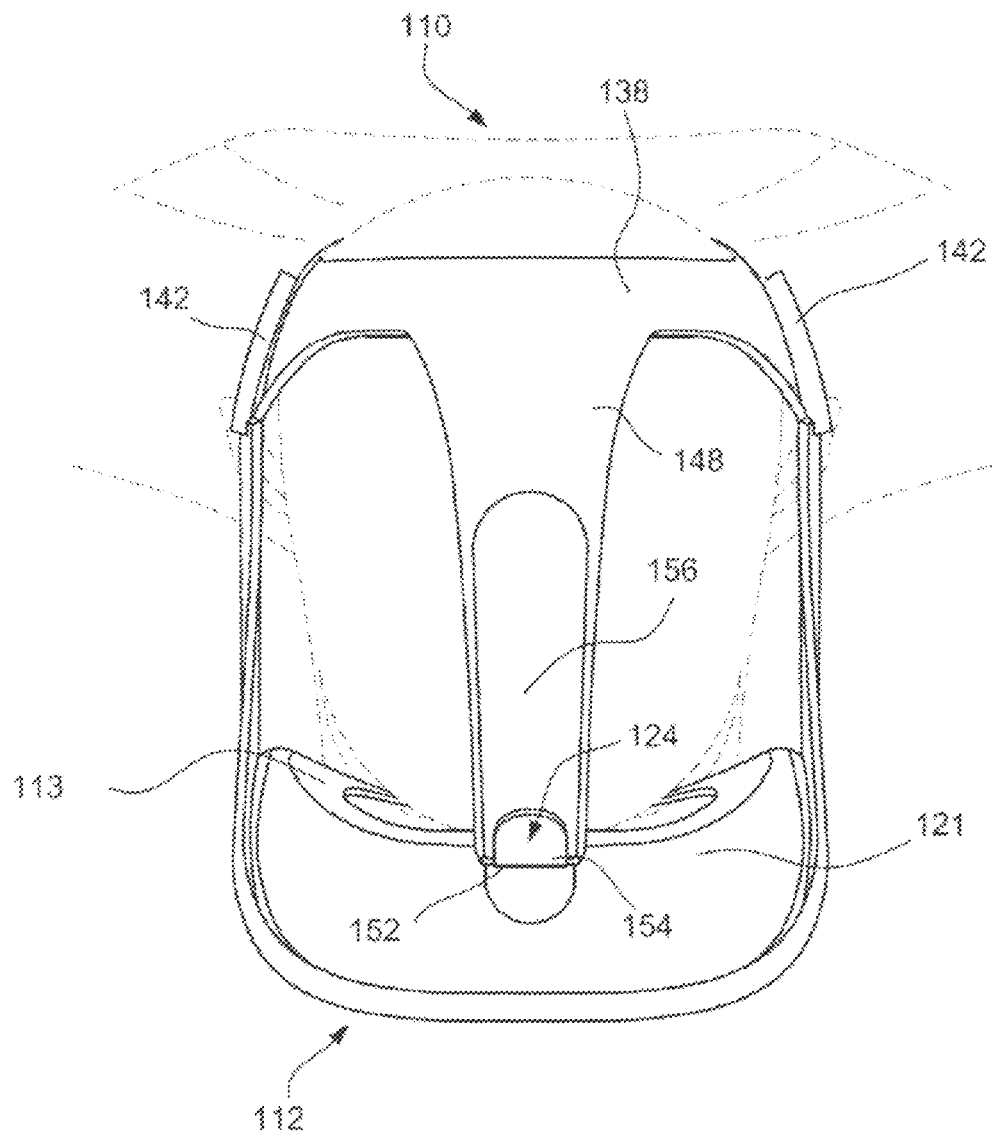
Figure 5A:
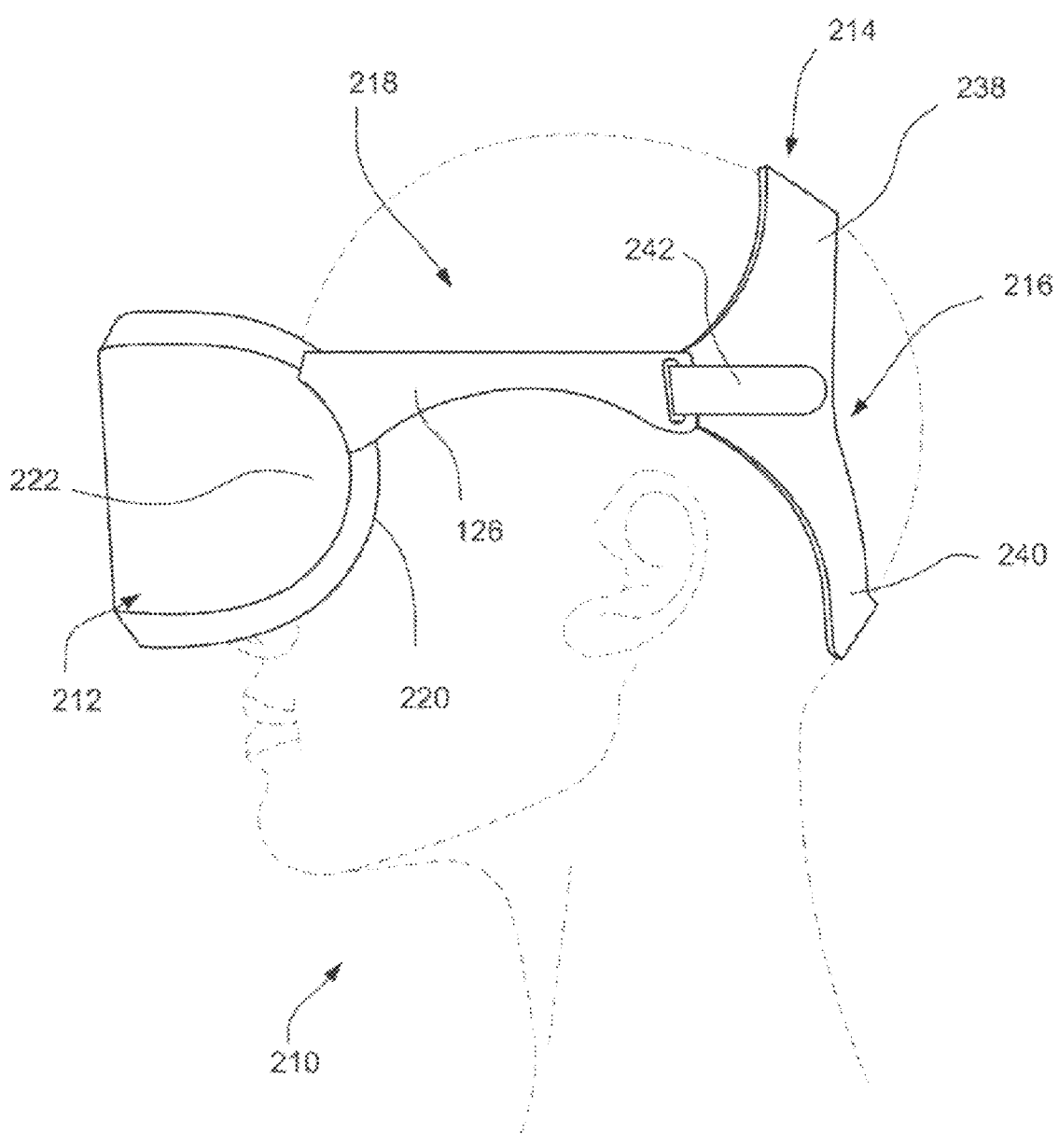
Figure 5B:
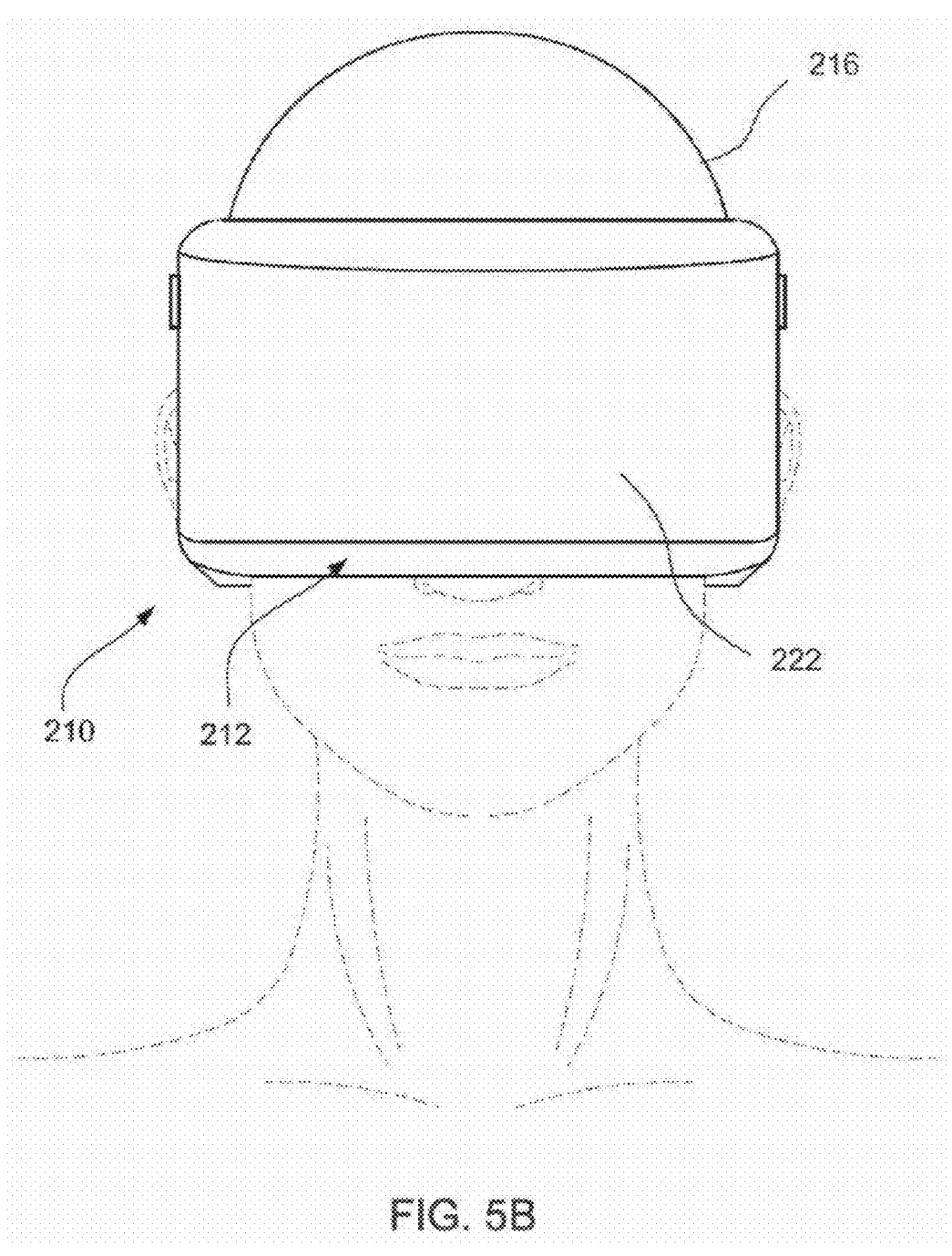
Figure 5C:
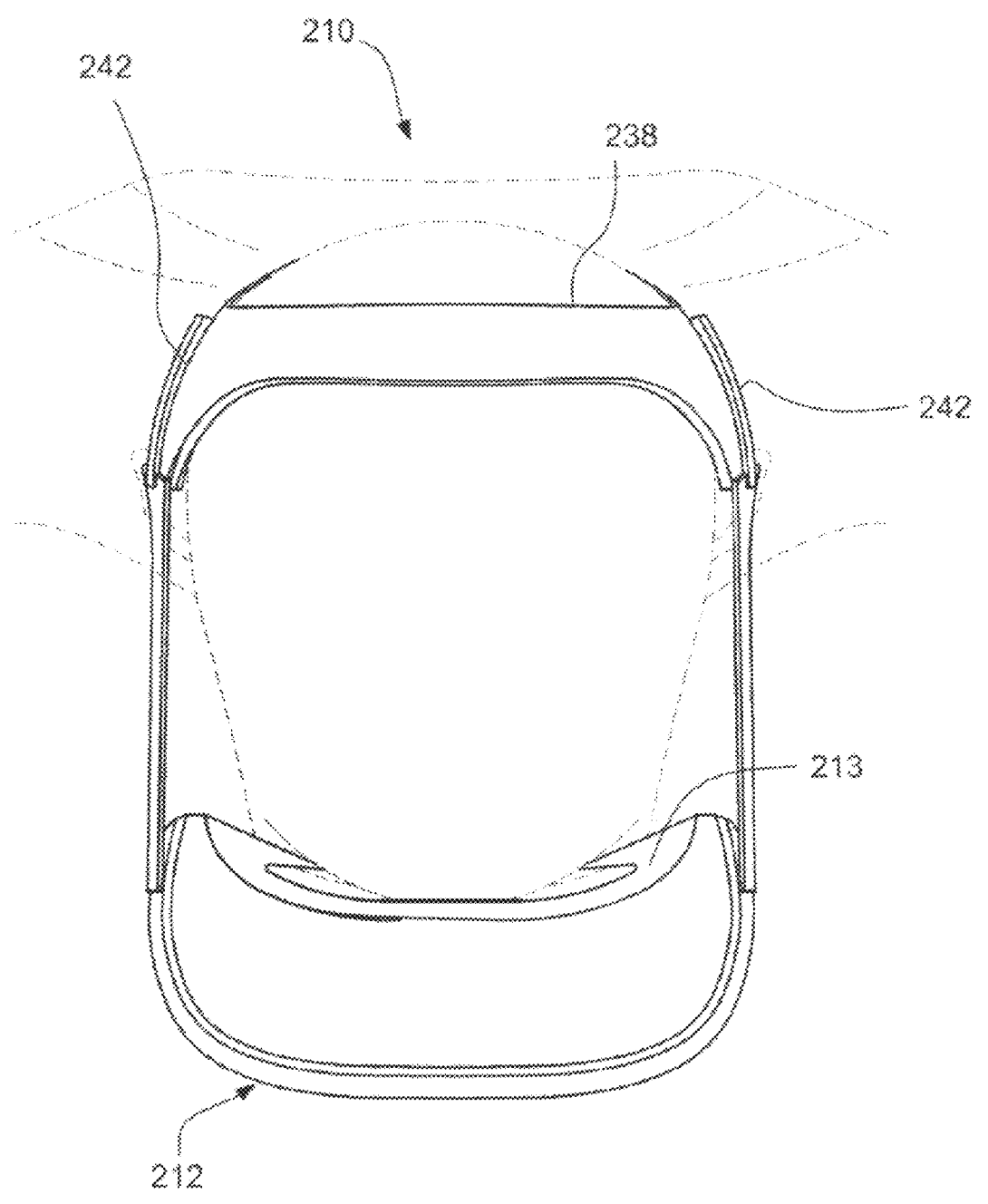
Figure 6:
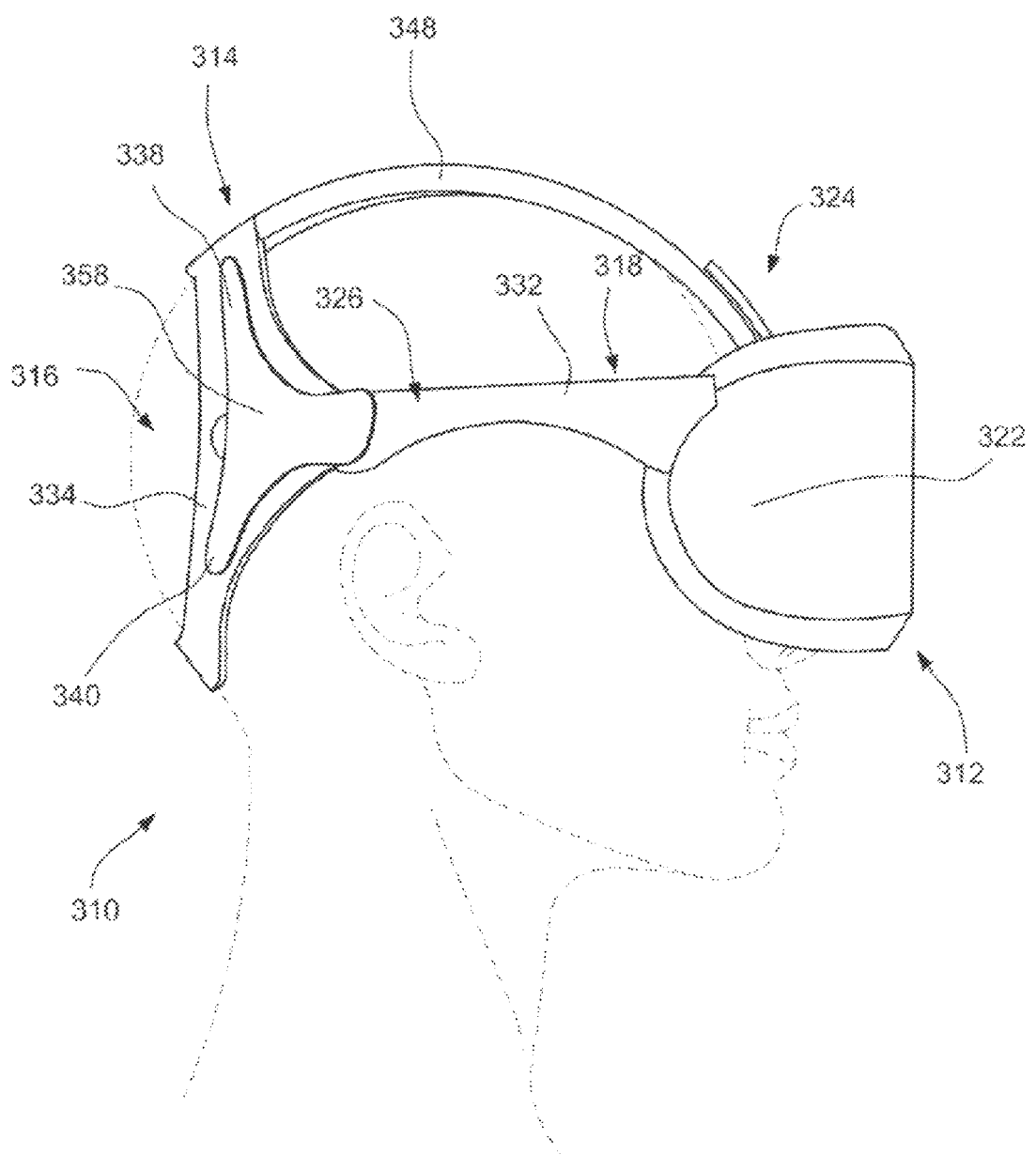
Figure 7A:
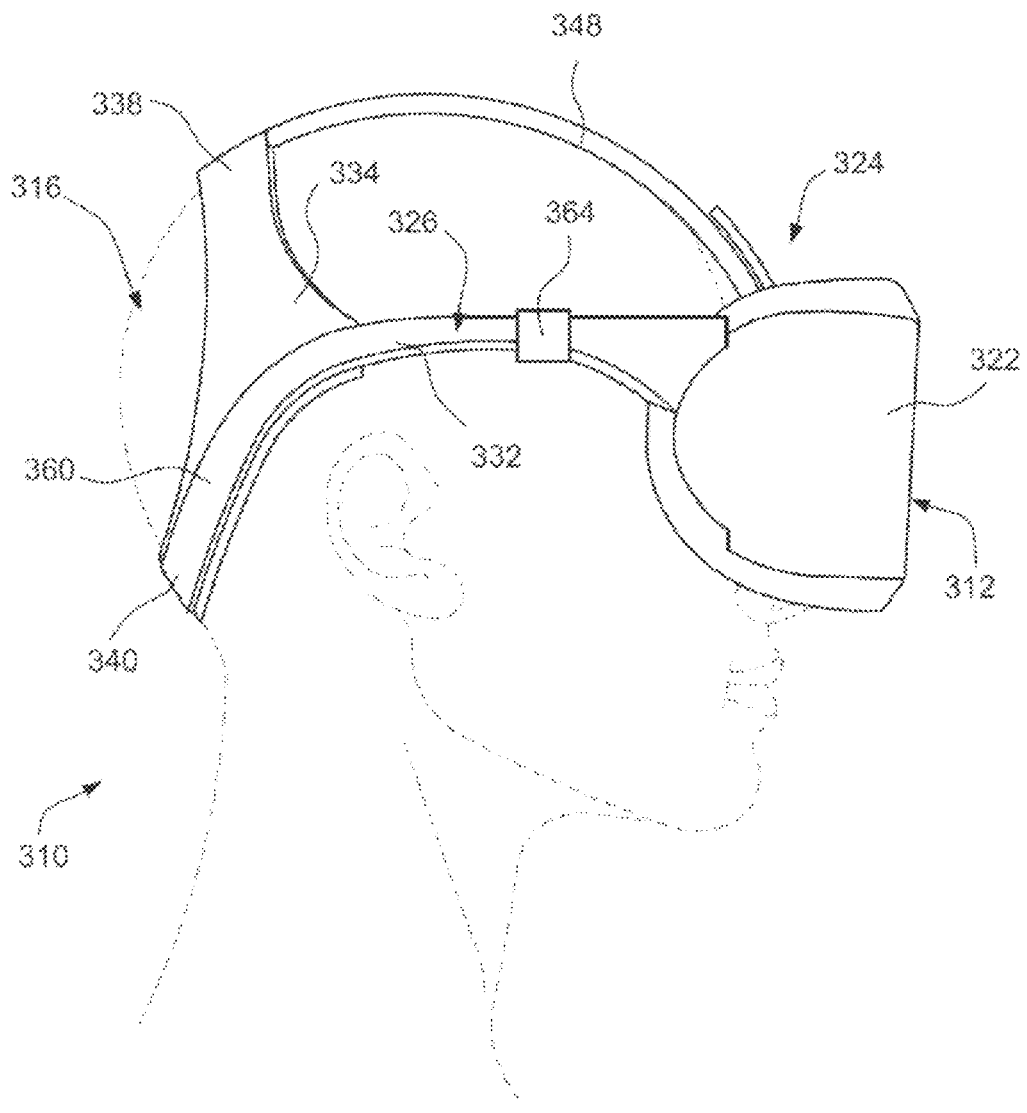
Figure 7B:
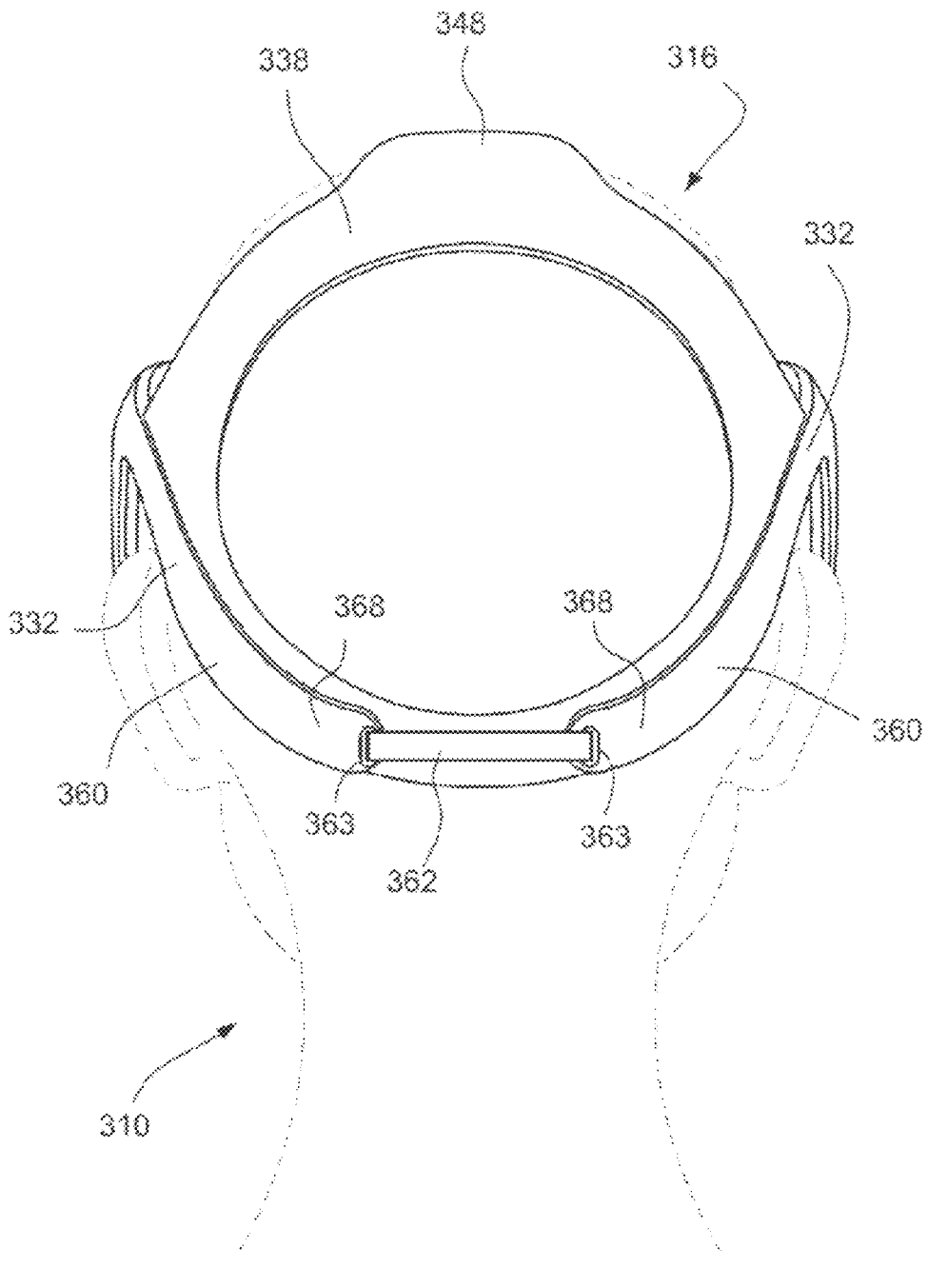
Figure 7C:
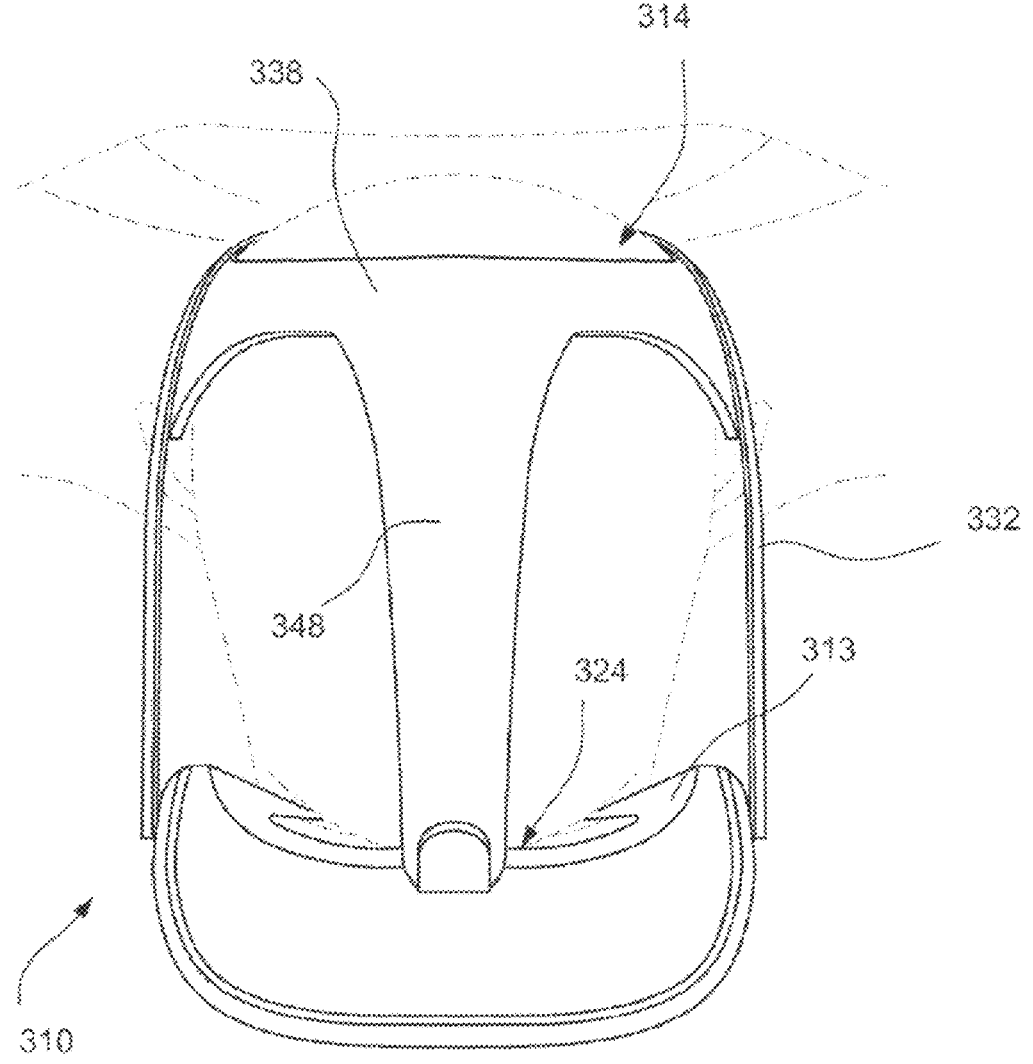
Figure 8:
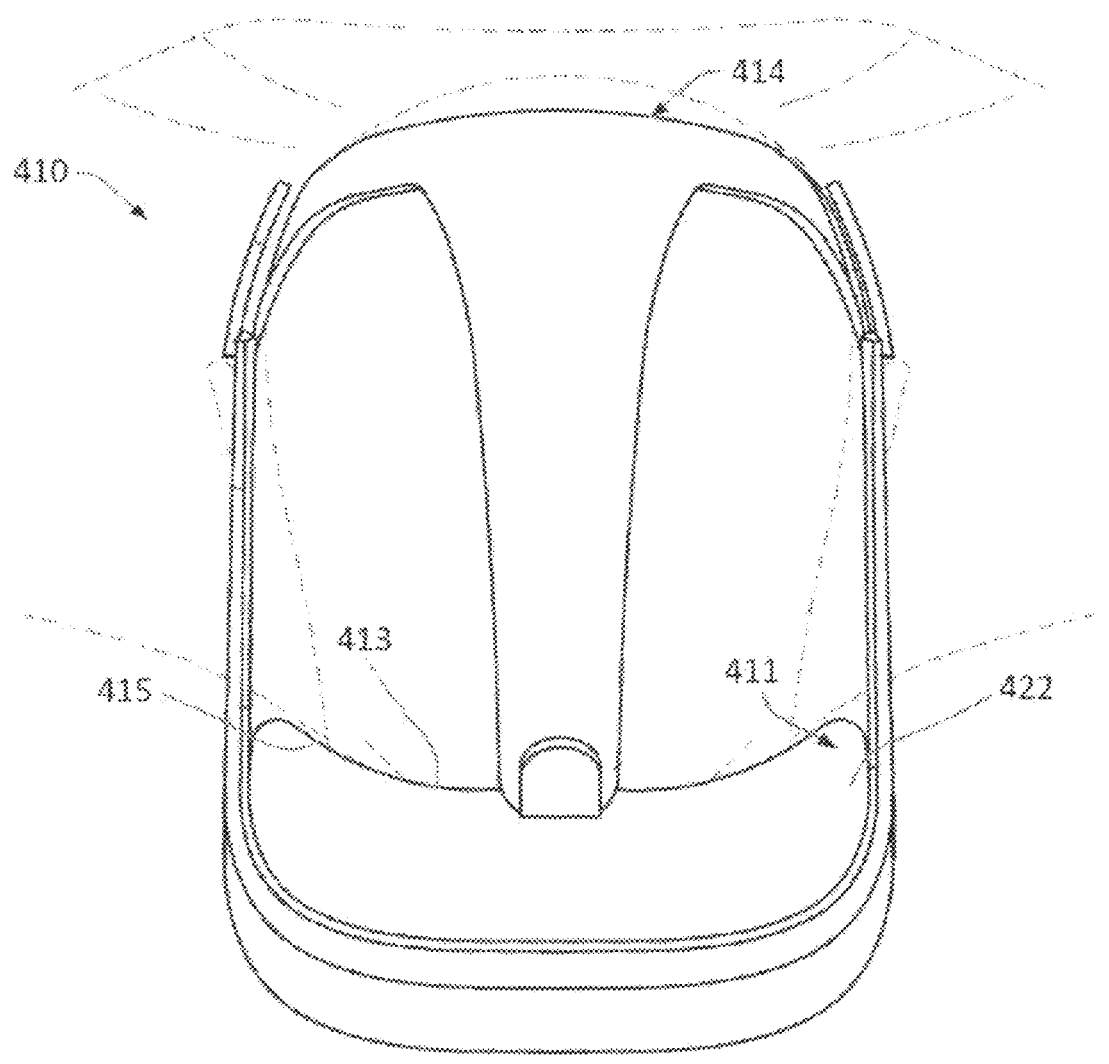
Figure 9A:
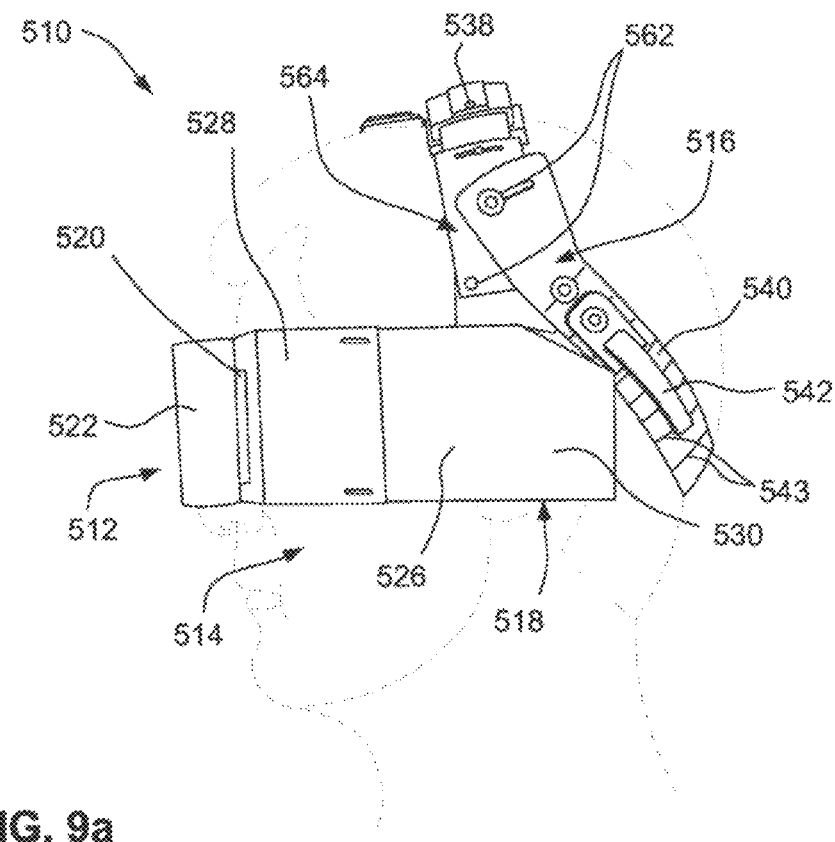
Figure 9B:
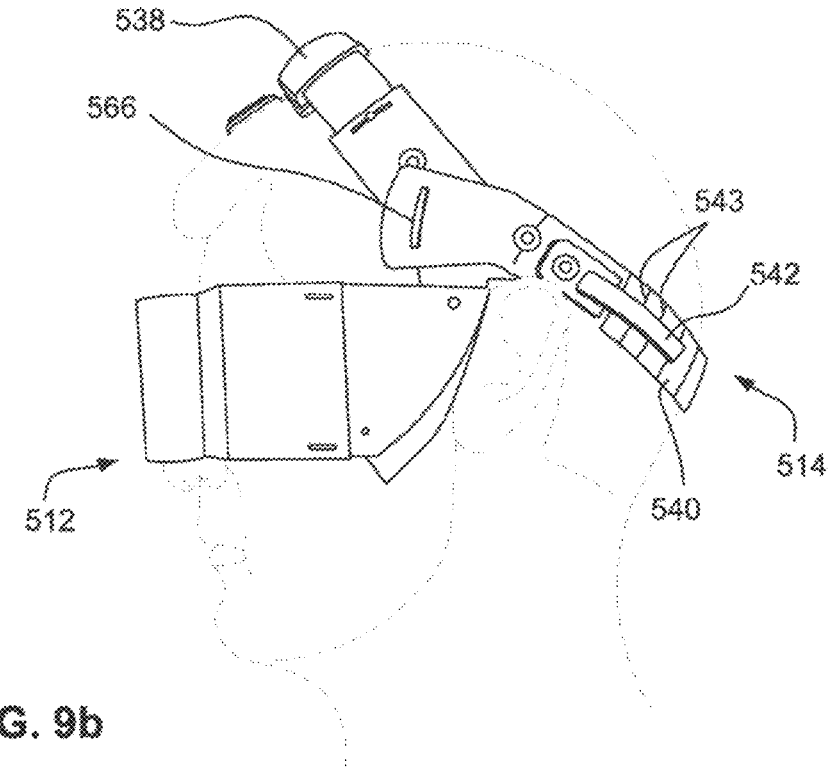
Figures 10A, 10B:
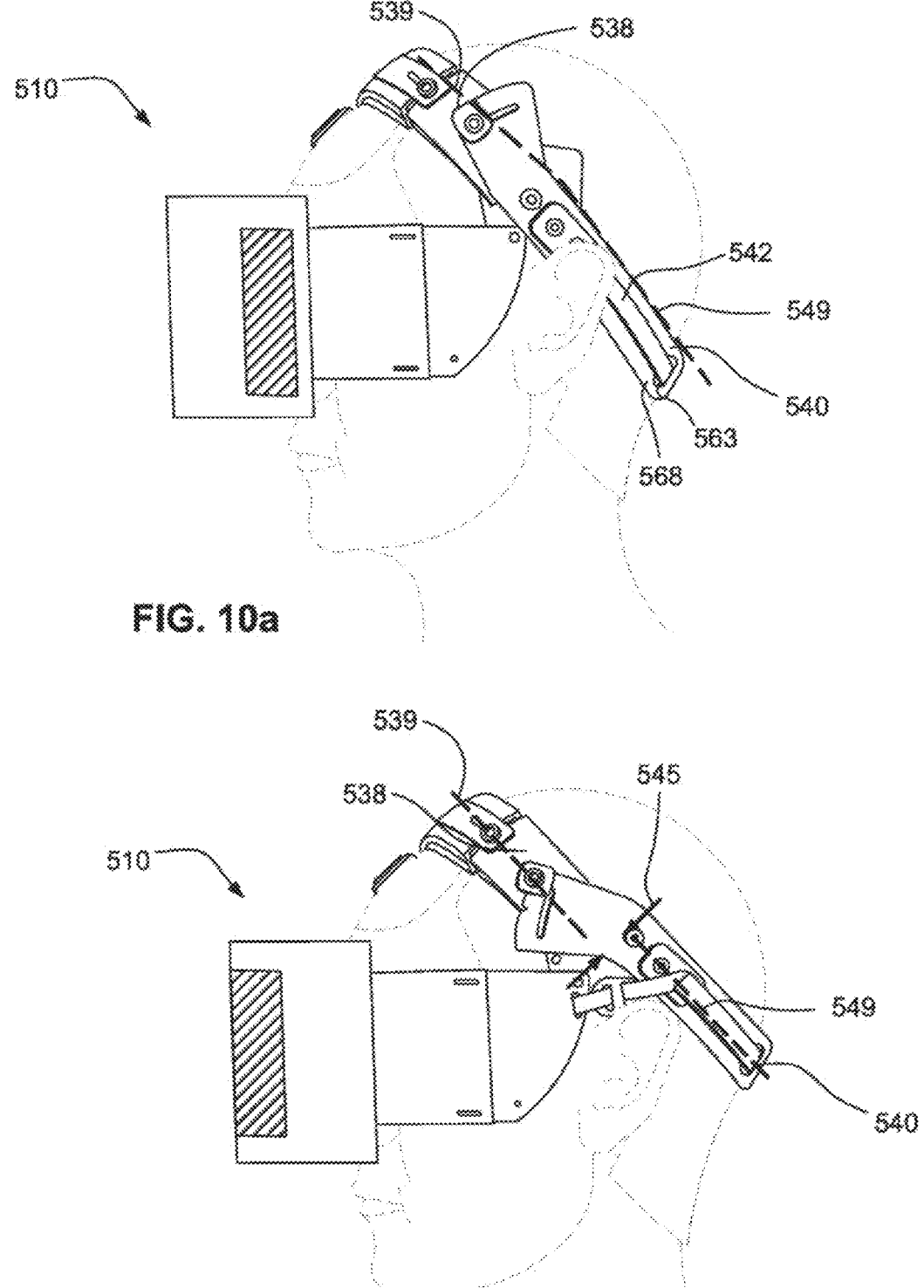
Figure 10C:
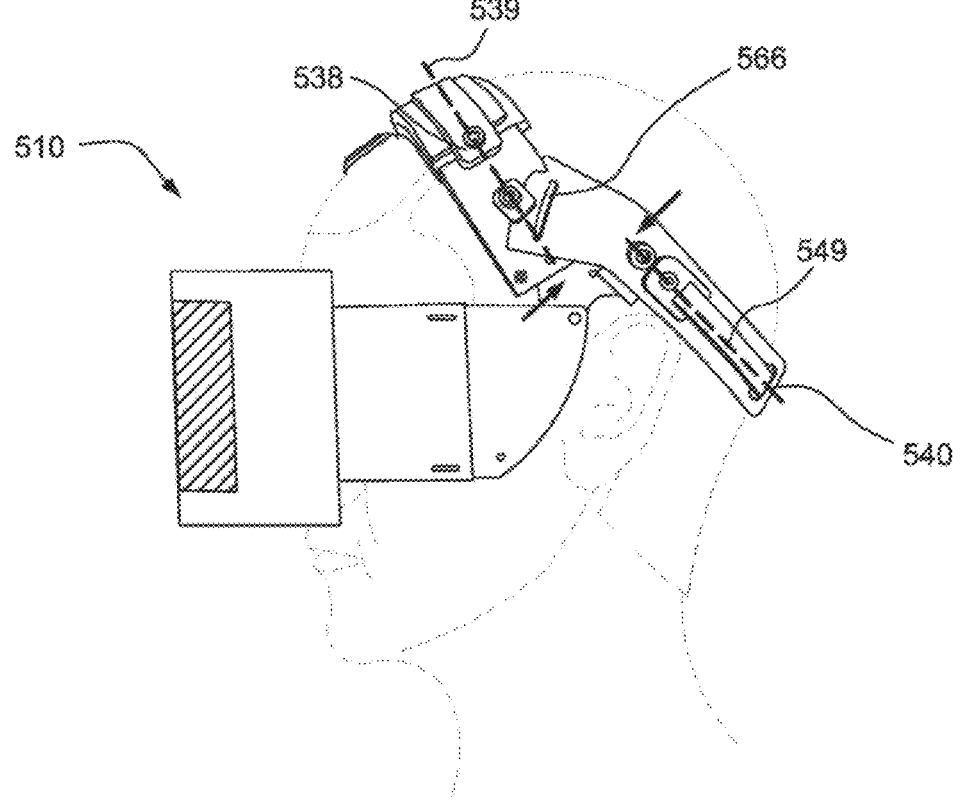
Figure 11A:
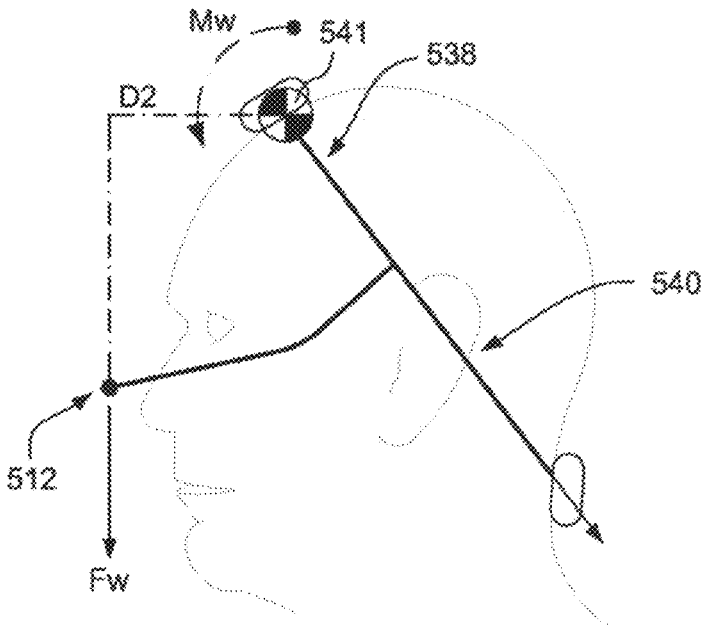
Figure 11B:
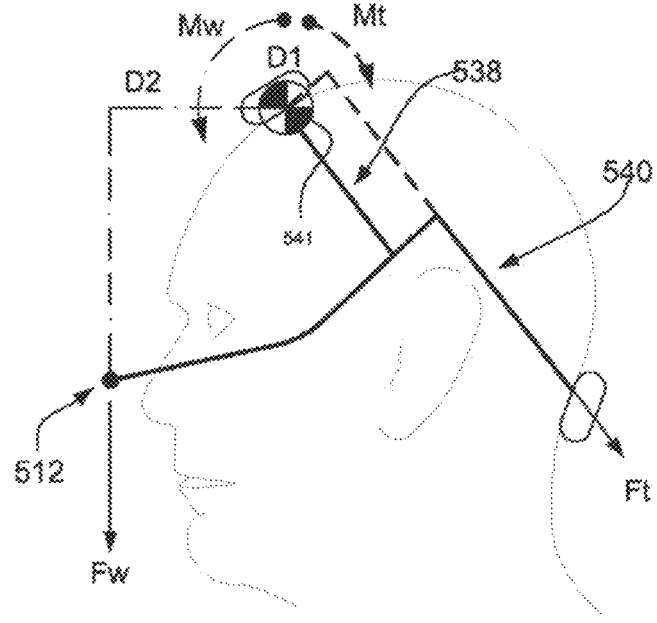
Figure 11C:
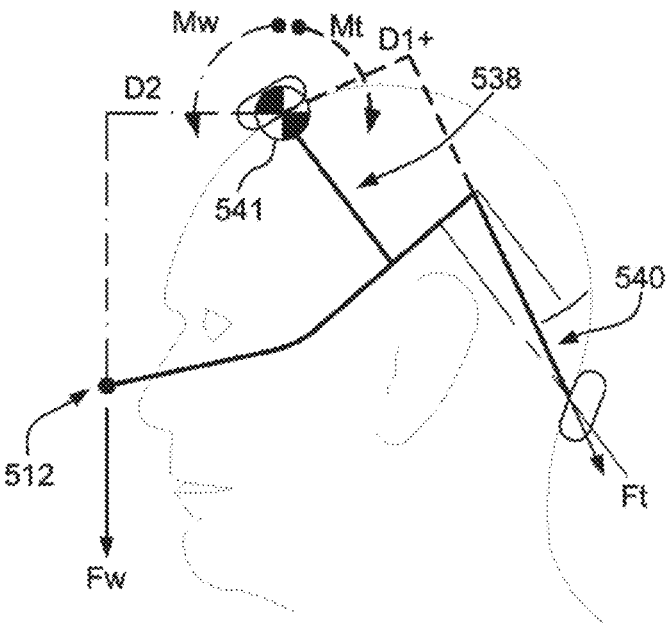
Figure 12A:
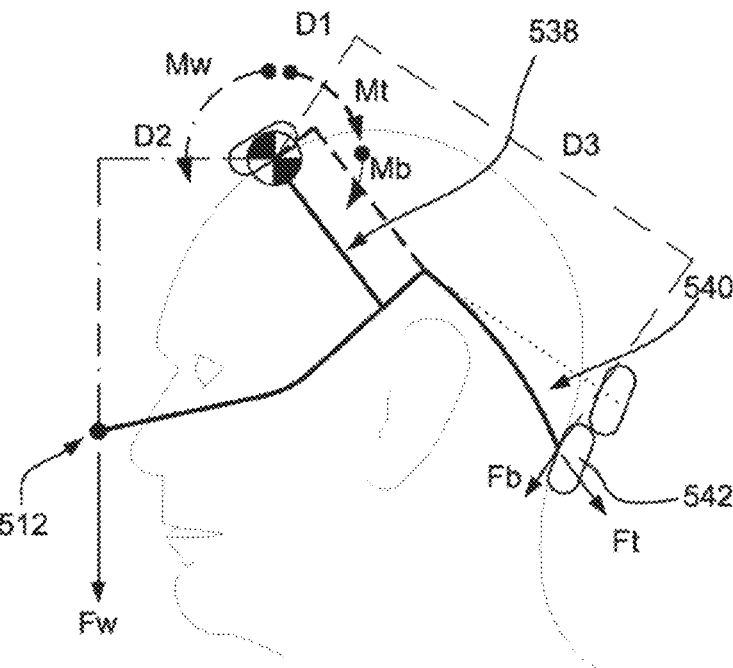
Figures 12B, 12C:
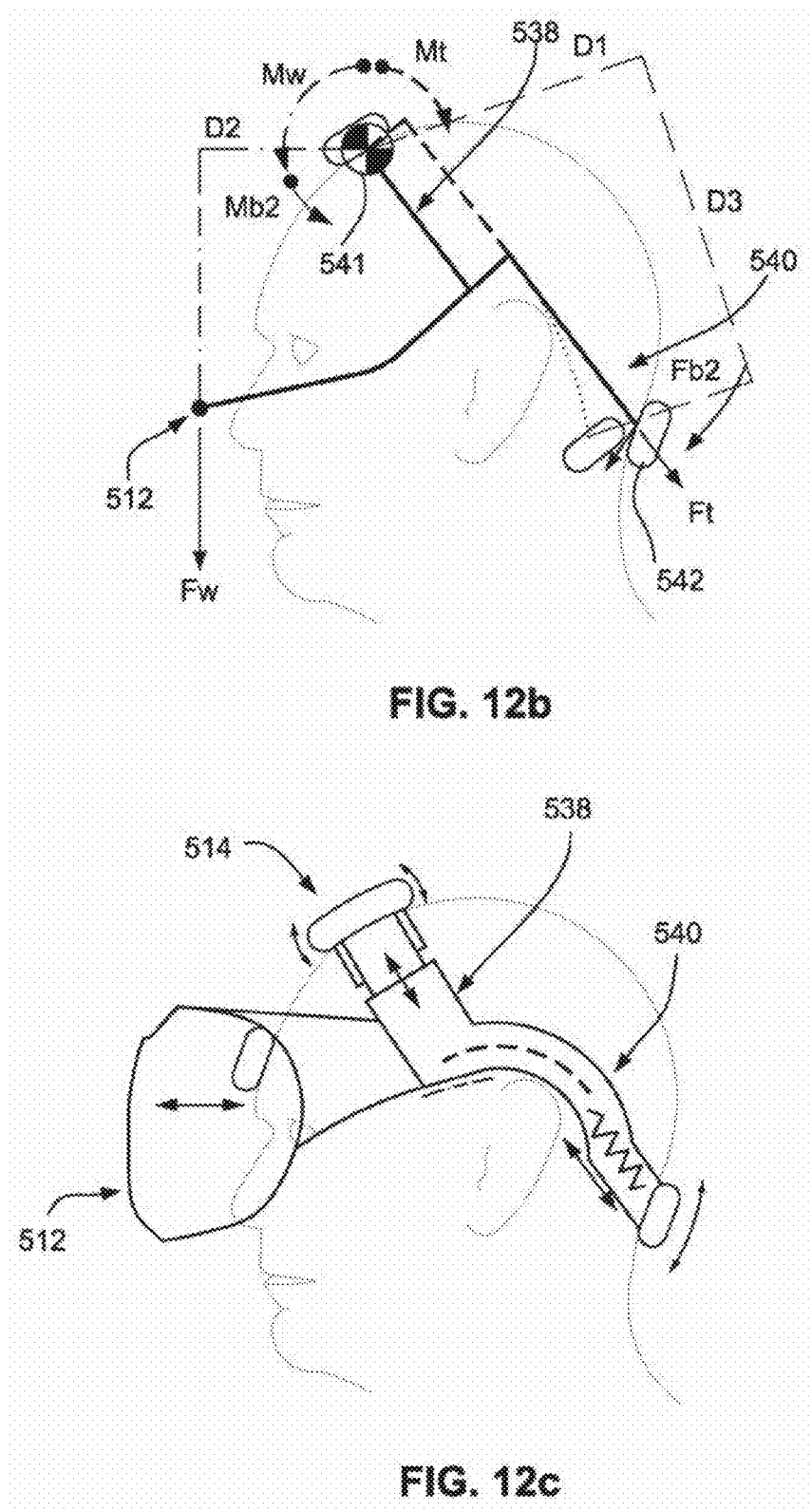
Figures 13A, 13B:
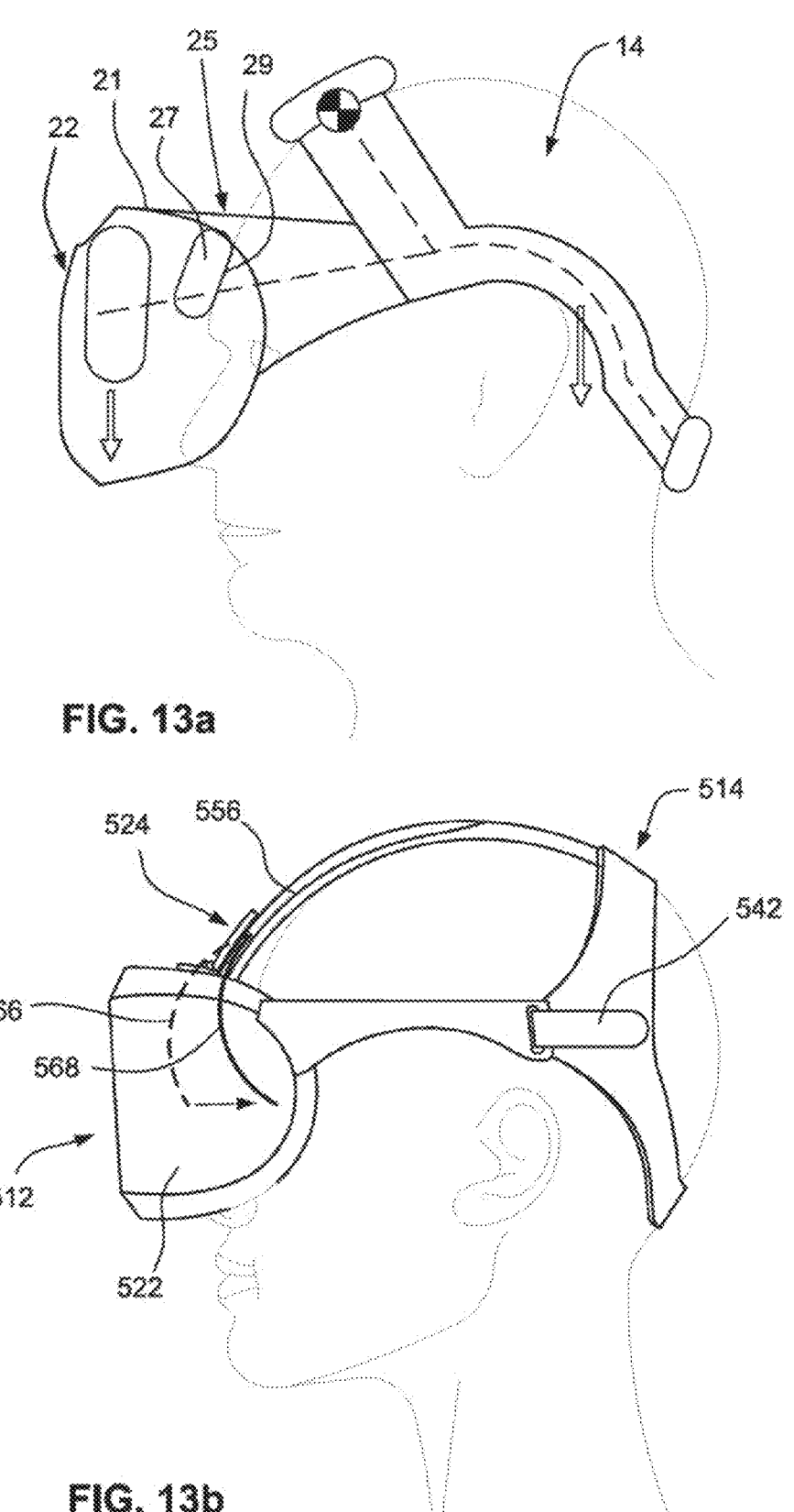
Figure 14A:
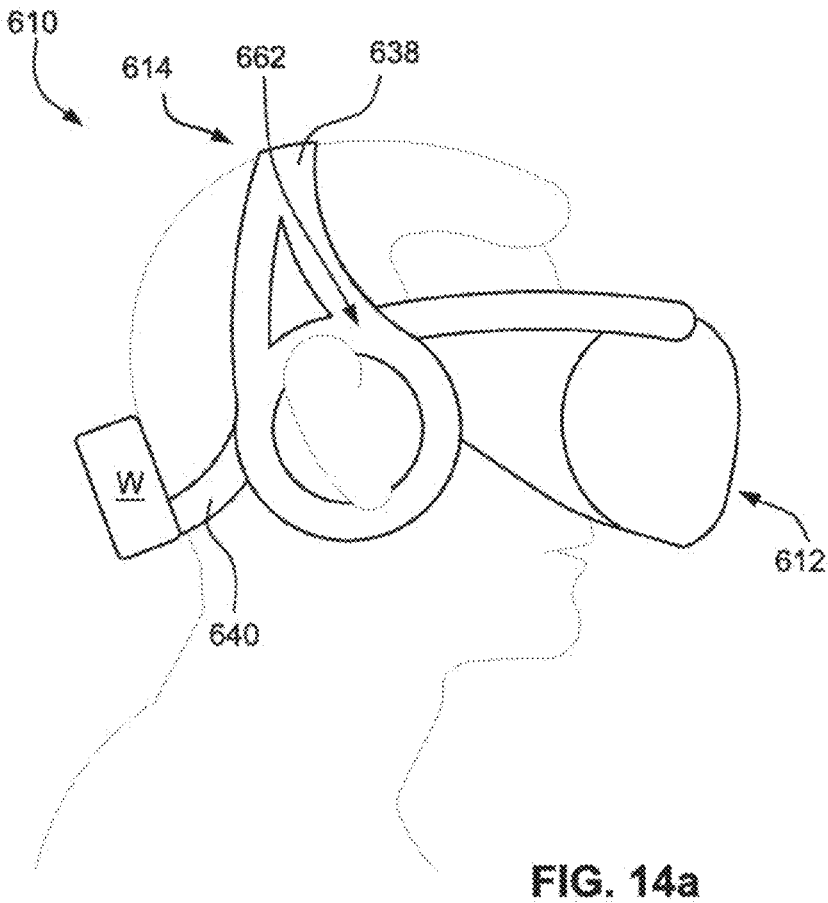

FIGS. 3a-3c are respective side, front and top views of a first embodiment of a positioning and stabilising structure of a head-mounted display;

FIGS. 4a-4c are respective side, front and top views of a second embodiment of a positioning and stabilising structure of a head mounted display;

FIGS. 5a-5c are respective side, front and top views of a third embodiment of a positioning and stabilising structure of a head-mounted display assembly;

FIG. 6 is a side view of a fourth embodiment of a positioning and stabilising structure of head-mounted display;

FIGS. 7a-7c are respective side, front and top views of a variation of the fourth embodiment of a head-mounted display;

FIG. 8 is a top view of a variation of the fourth embodiment of a head-mounted display assembly, in-use;

FIGS. 9a-9b are side views of an embodiment of a positioning and stabilising structure of a head-mounted display;

FIGS. 10a-10c are side views of an embodiment of a positioning and stabilising structure of a head-mounted display;

FIGS. 11a-11c are schematic side views of a positioning and stabilising structure of a head-mounted display;

FIGS. 12a-12b are schematic side views of a positioning and stabilising structure of a head-mounted display;

FIG. 12c is a schematic side view of the positioning and stabilising structure of a head mounted display illustrating adjustability characteristics;

FIG. 13a-b are schematic side views of positioning and stabilising structures including forehead support arrangements of a head-mounted display;

FIG. 14a is a schematic side view of a further embodiment of a positioning and stabilising device, in-use.

Figure 14B:
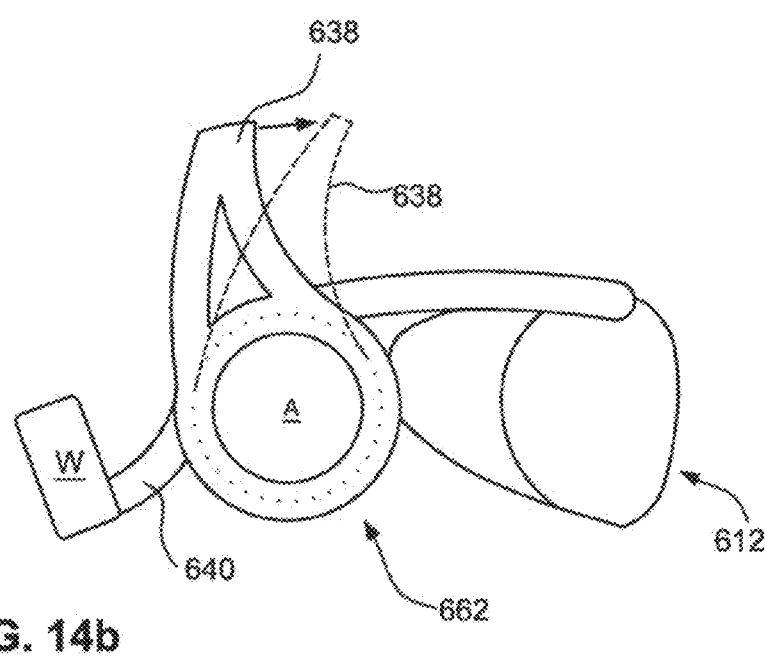

FIG. 14b is a schematic side view of a further embodiment of a positioning and stabilising device with a frontal portion configured in examples of first and second configurations.

Figures 14C, 14D:
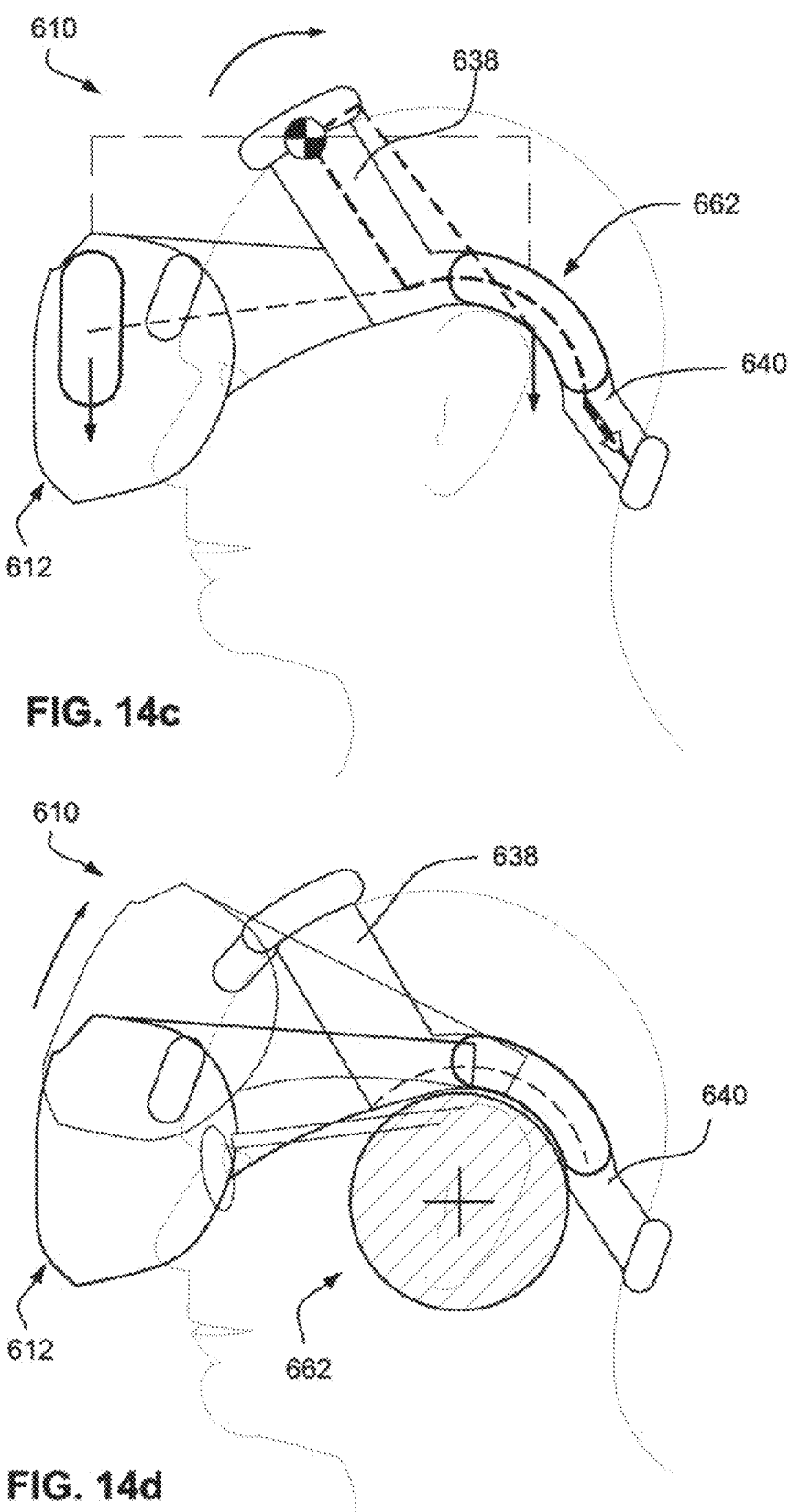

FIG. 14c is a schematic side view of a further embodiment of a positioning and stabilising device illustrating vector locations.

Figure 15A:
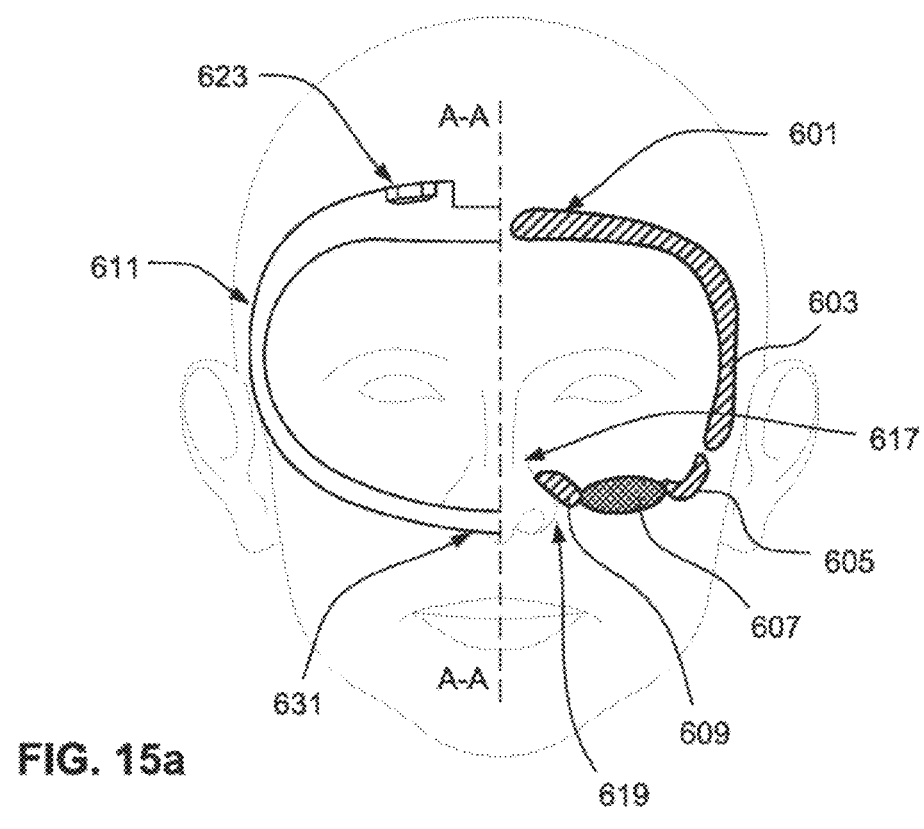

FIG. 14d is a schematic side view of a further embodiment of a positioning and stabilising device with a display unit configured in examples of first and second configurations 3.3.2 Interfacing Structures FIG. 15a is a split front view across Axis A-A of an embodiment of the interfacing structure in use, the left-hand side showing the location of the interfacing structure and the right-hand side showing approximate facial areas that are engaged by the interfacing structure.

Figure 15B:
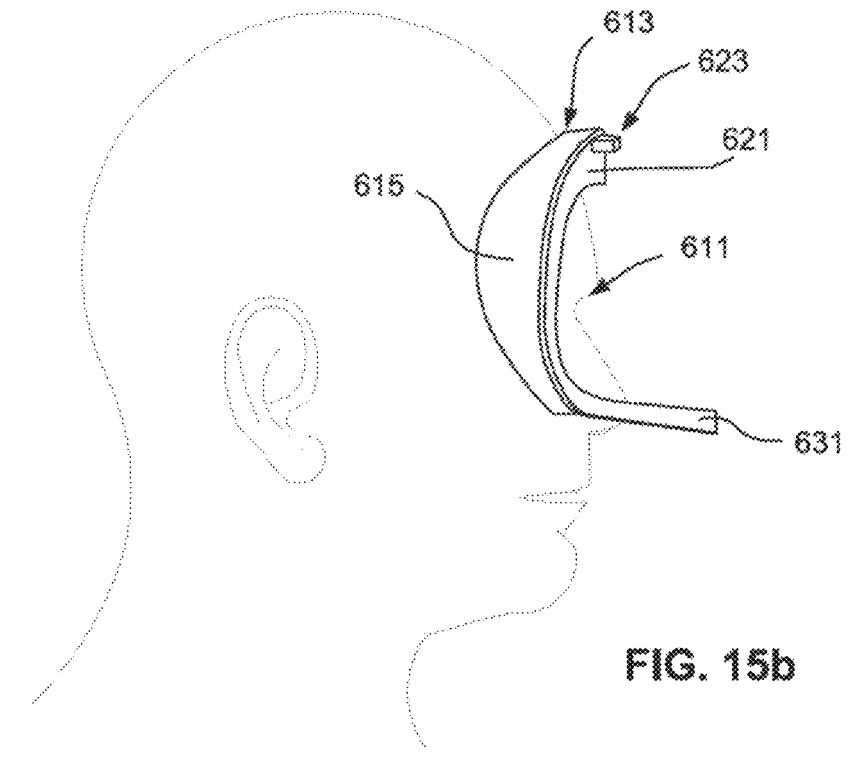

FIG. 15b is a side view of the interfacing structure of FIG. 15a, in use.

Figure 16A:
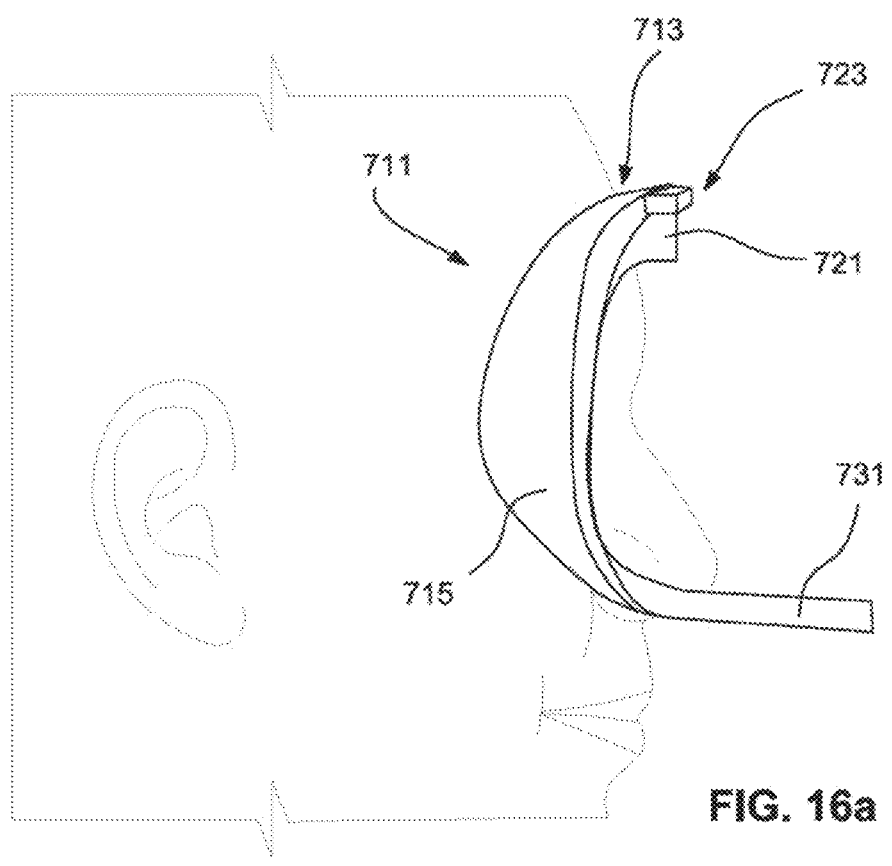
Figure 16B:
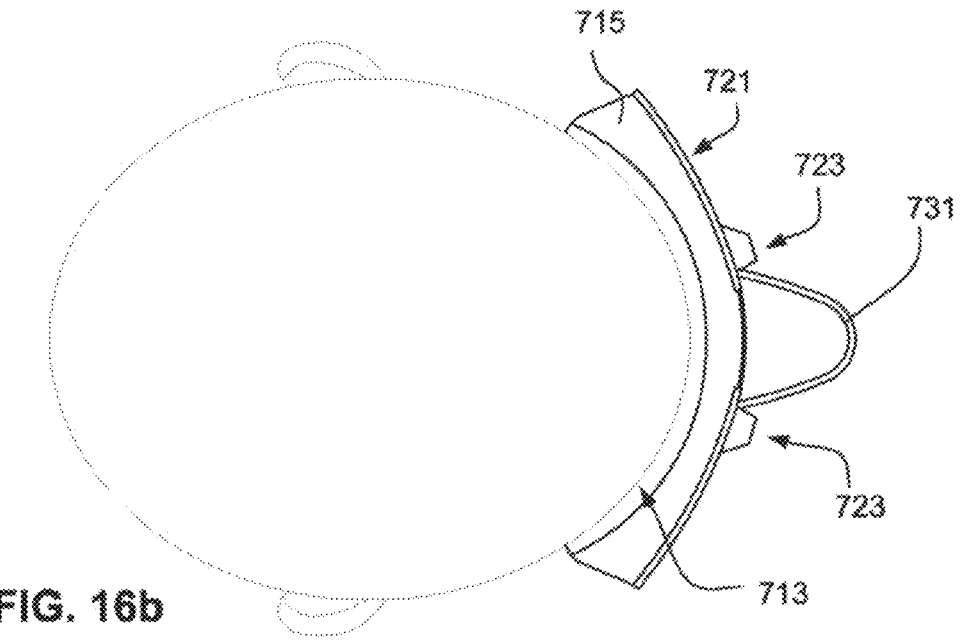

FIGS. 16a, 16b, and 16c are side, top and frontal superior views, respectively, of a second embodiment of the interfacing structure in use.

FIG. 17a is a side cross section view through axis B-B of FIG. 16c, showing an embodiment of the support structure and face engaging surface.

FIG. 17b is a side cross section view through axis B-B of FIG. 16c, showing a second embodiment of the support structure and face engaging surface, further comprising a supporting flange.

Figure 18:
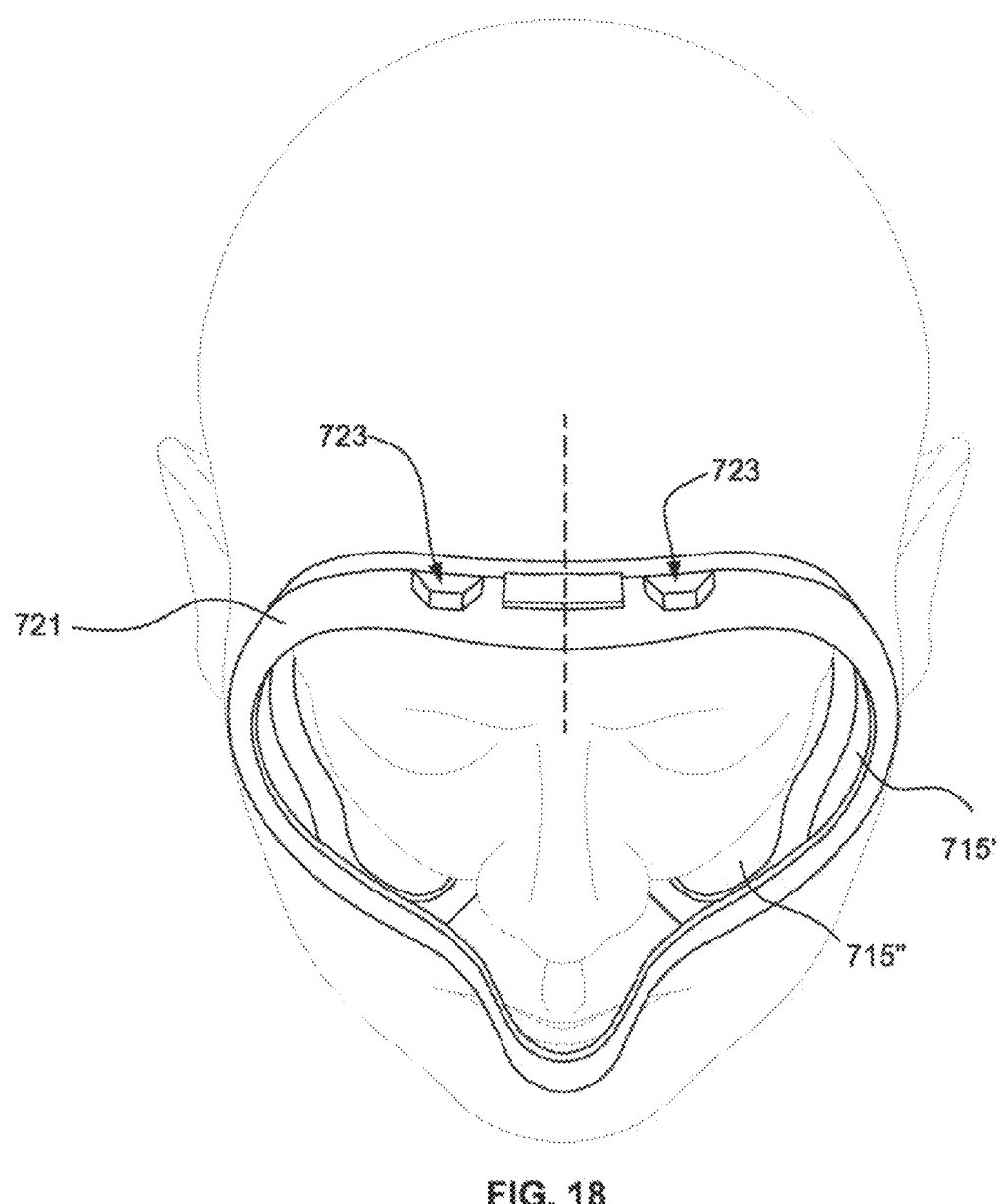

FIG. 18 is a frontal superior view of a third embodiment of the interfacing structure, in use.

Figure 19:
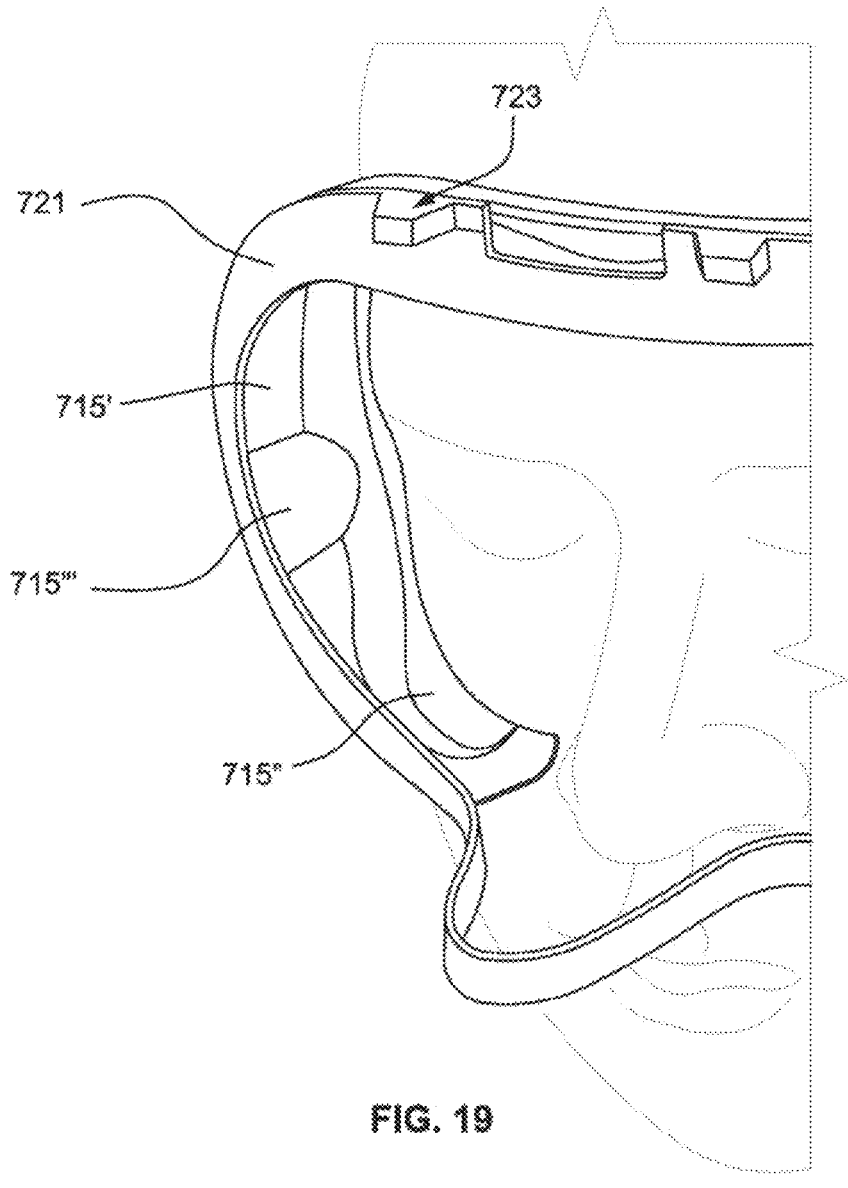

FIG. 19 is a partial frontal superior view of a fourth embodiment of the interfacing structure, in use.

FIGS. 20*a*, 20*b*, 20*c* and 20*d* are frontal superior, side, top and frontal superior from a side angle views, respectively, of a fifth embodiment of the interfacing structure in use.

Figure 20A:
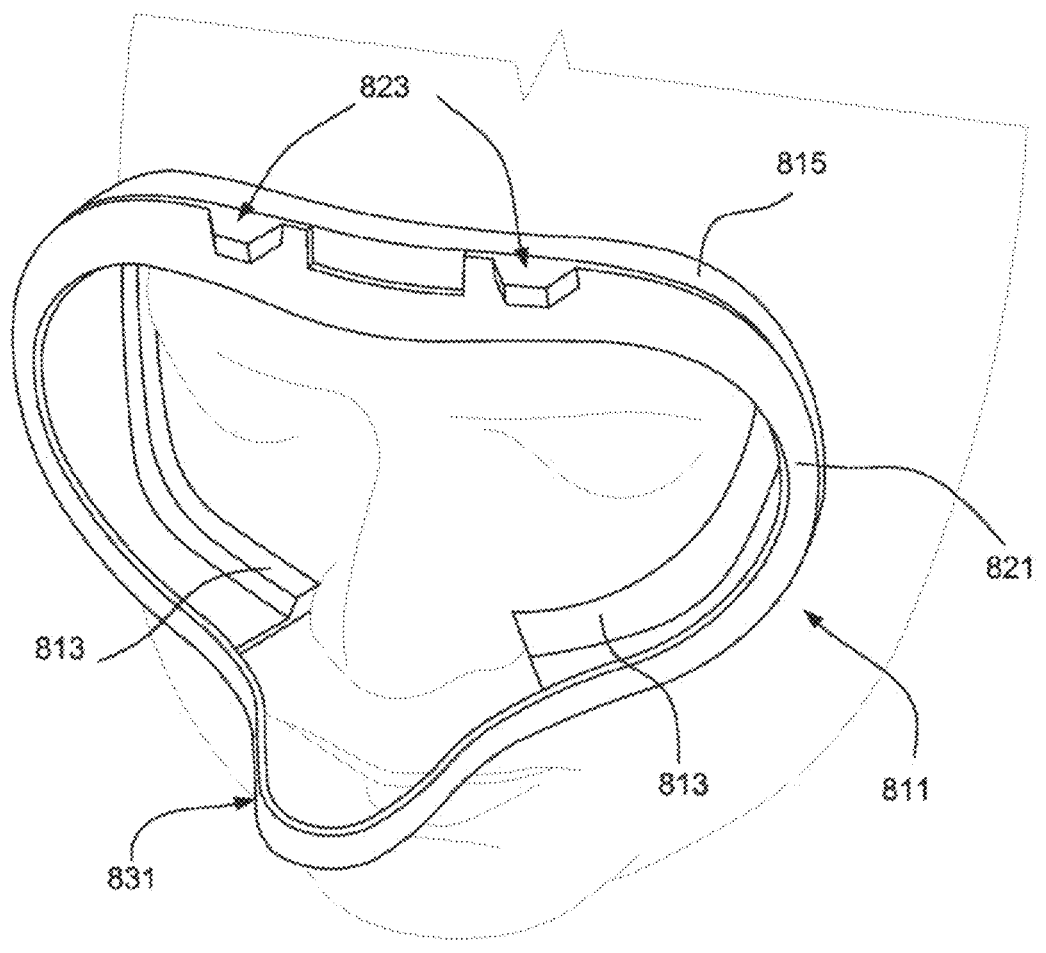
Figures 20B, 20C:
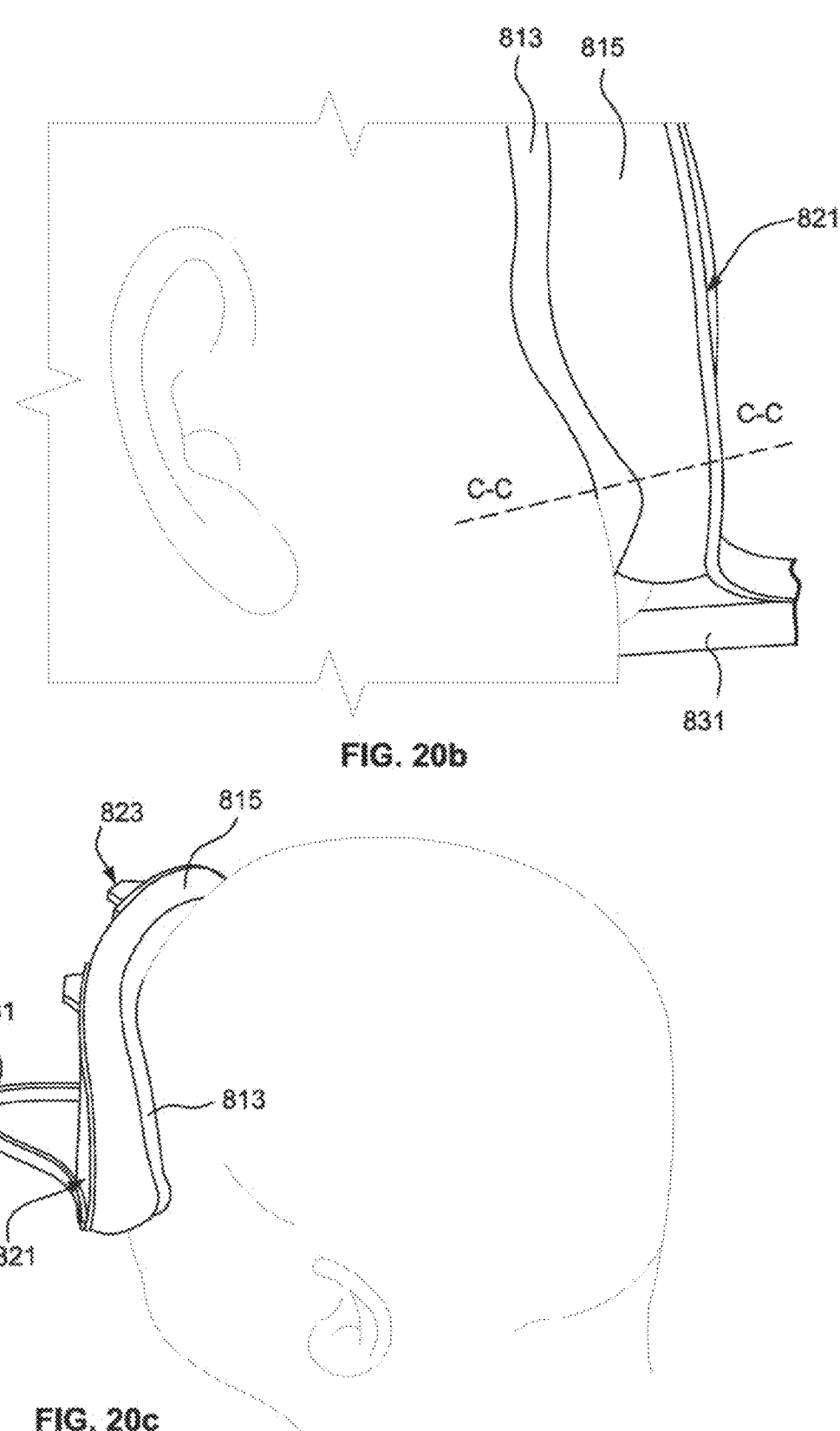

FIG. 21*a* is a side cross section view through axis C-C of FIG. 20*b*, showing an embodiment of a foam cushion face engaging surface attached directly to an upper portion of the support structure.

FIG. 21*b* is a side cross section view through axis C-C of FIG. 20*b*, showing an embodiment of a face engaging surface that covers a foam cushion under layer, the foam cushion being attached directly to an upper portion of the support structure.

Figure 22:
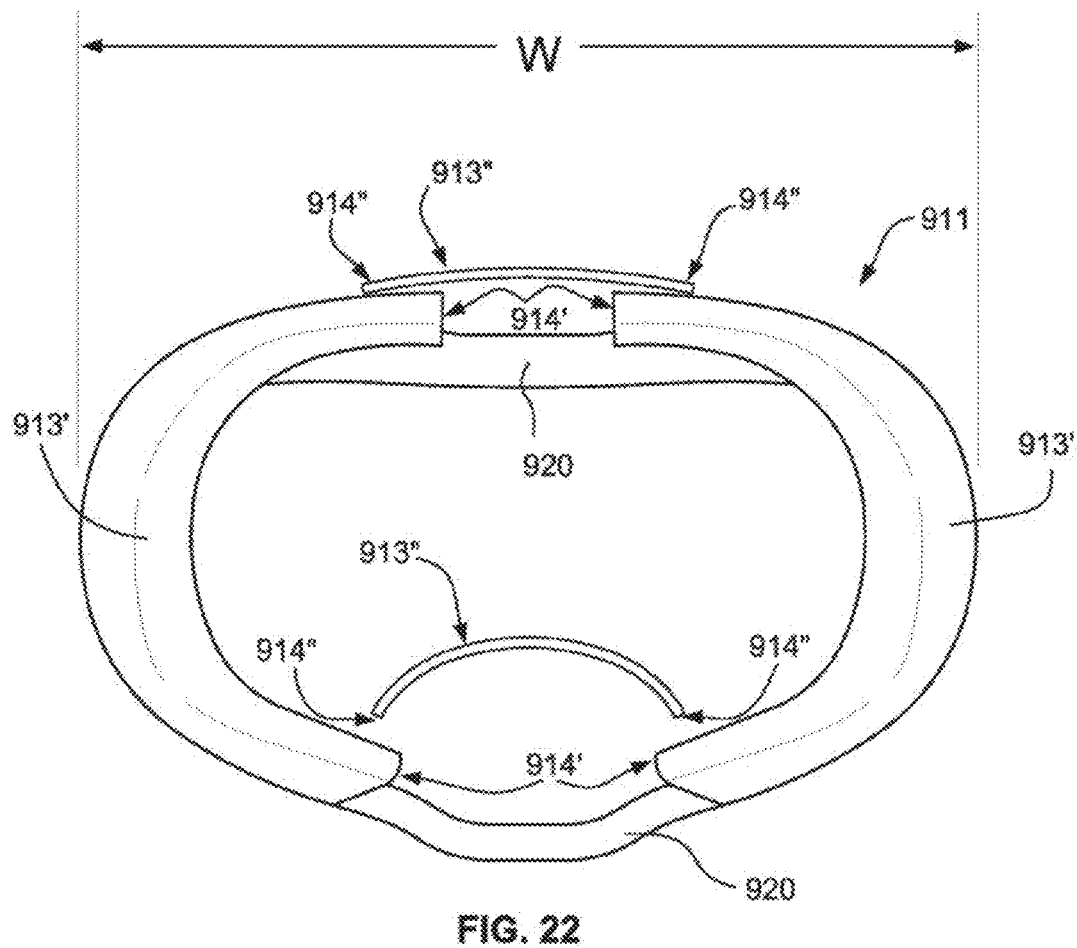

FIG. 22 is a rear view of a sixth embodiment of the interfacing structure in use, the interfacing structure being adjustable in width.

Figure 23A:
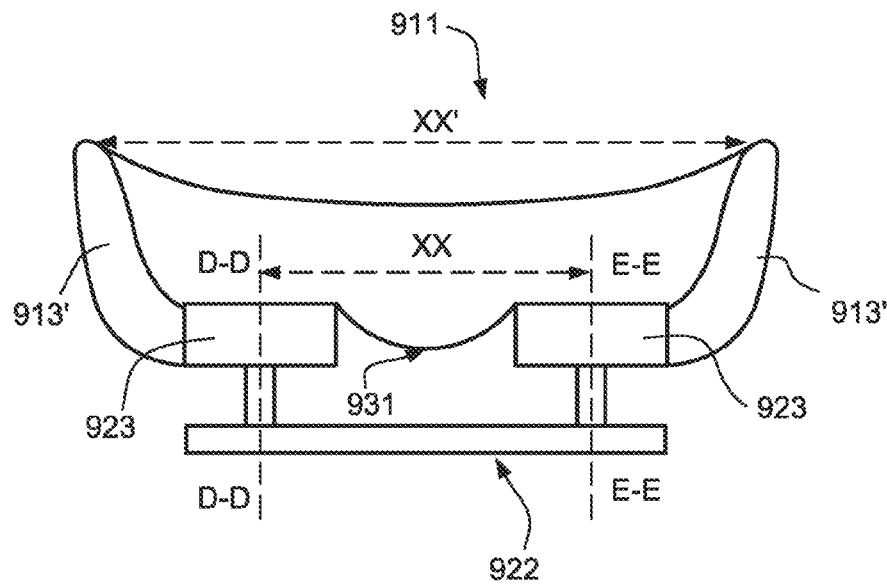
Figure 23B:
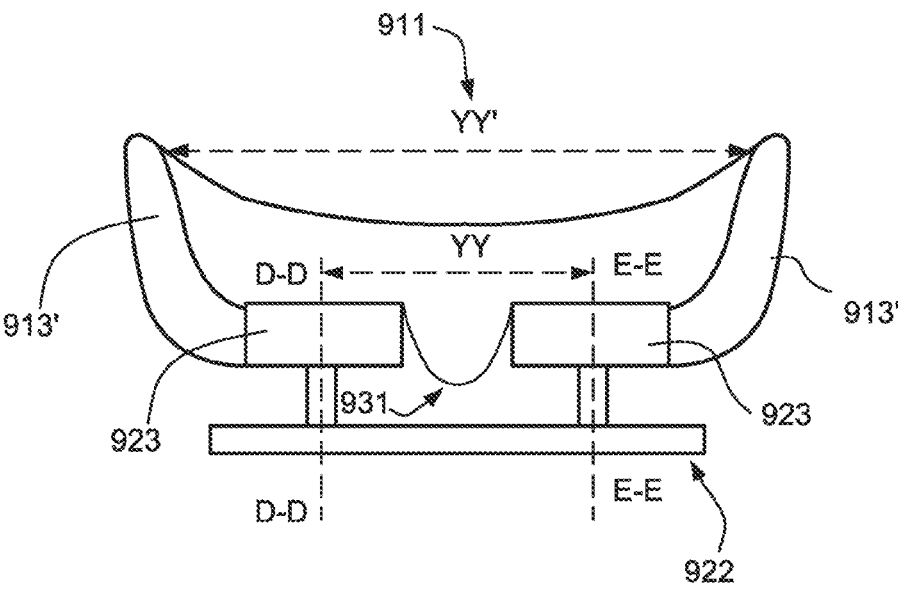

FIGS. 23*a* and 23*b* are a cross-section view from below of a further embodiment of the adjustable interfacing structure in use, at a wider lens width and narrower lens width respectively.

Figure 24:
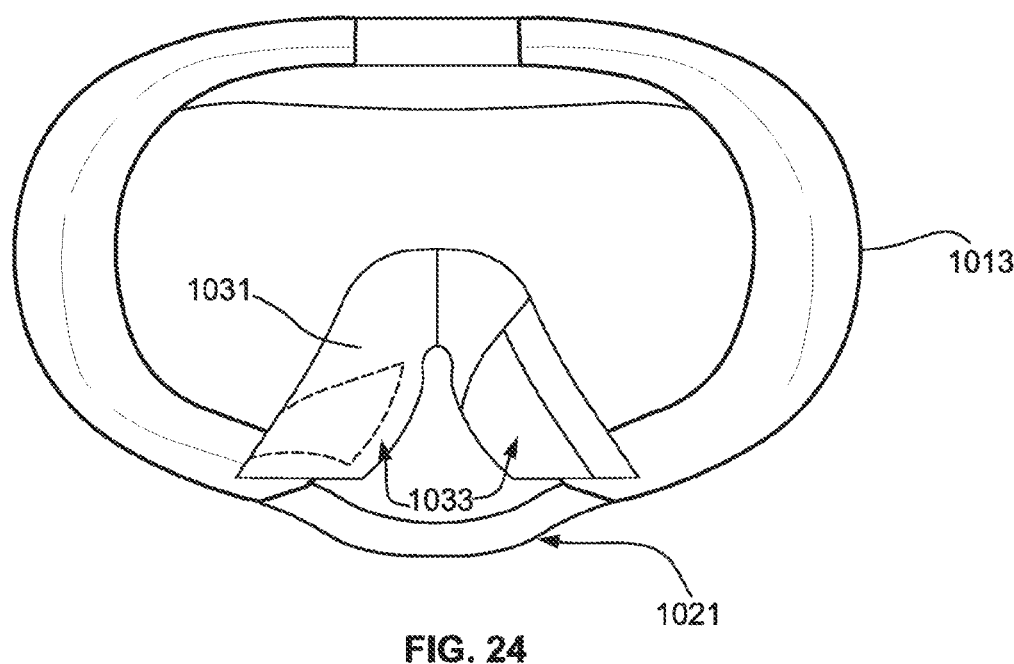

FIG. 24 is a rear view of a seventh embodiment of the interfacing structure in use.

3.3.3 Anthropometrical Data Models

Figure 25A:
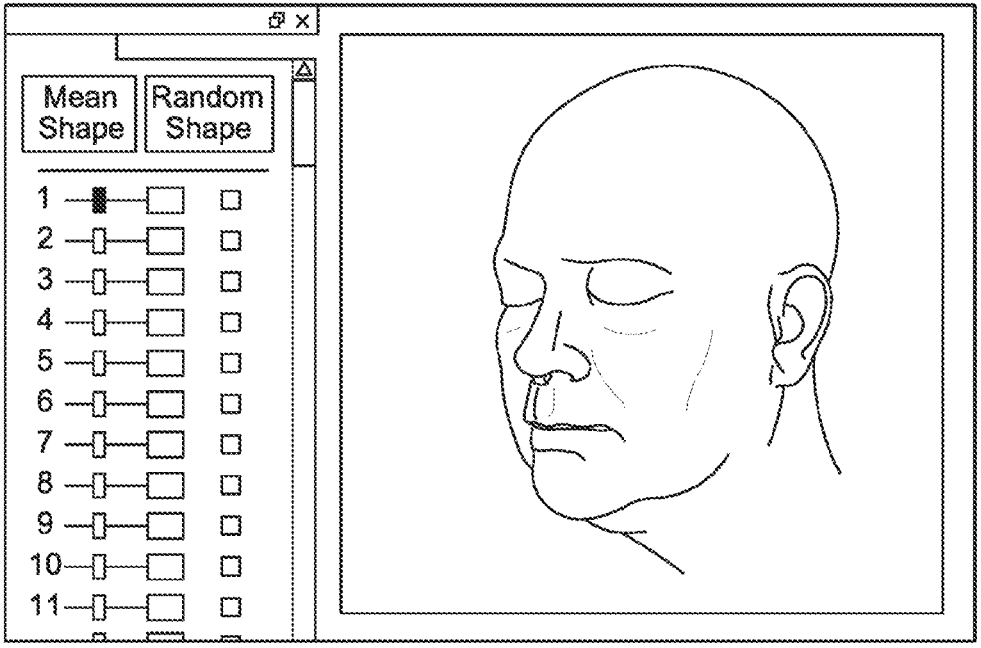
Figure 25B:
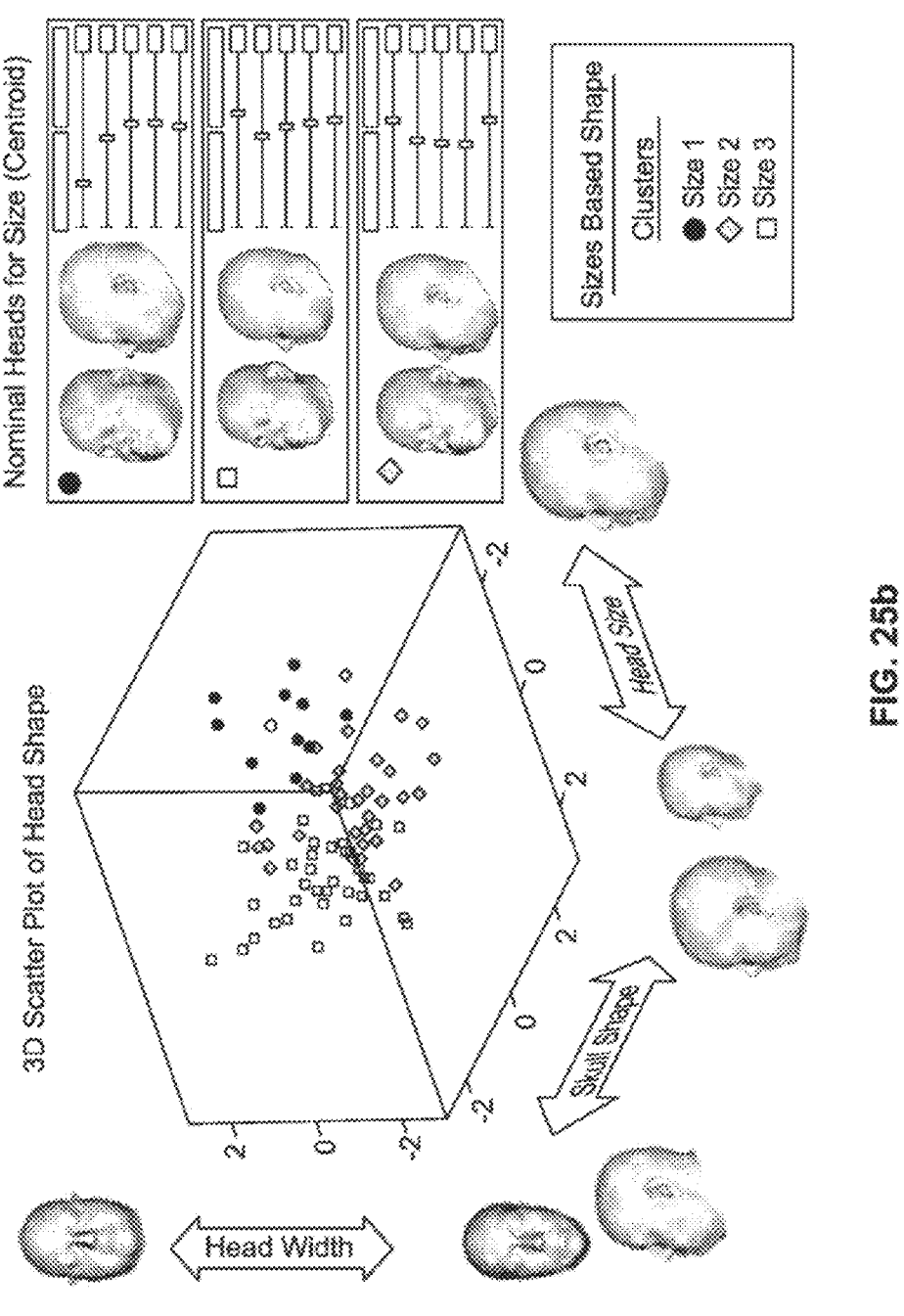

FIGS. 25*a*-25*b* are an anthropometrical data model of sizing and clustering based on head shape variation.

Figures 26A, 26B:
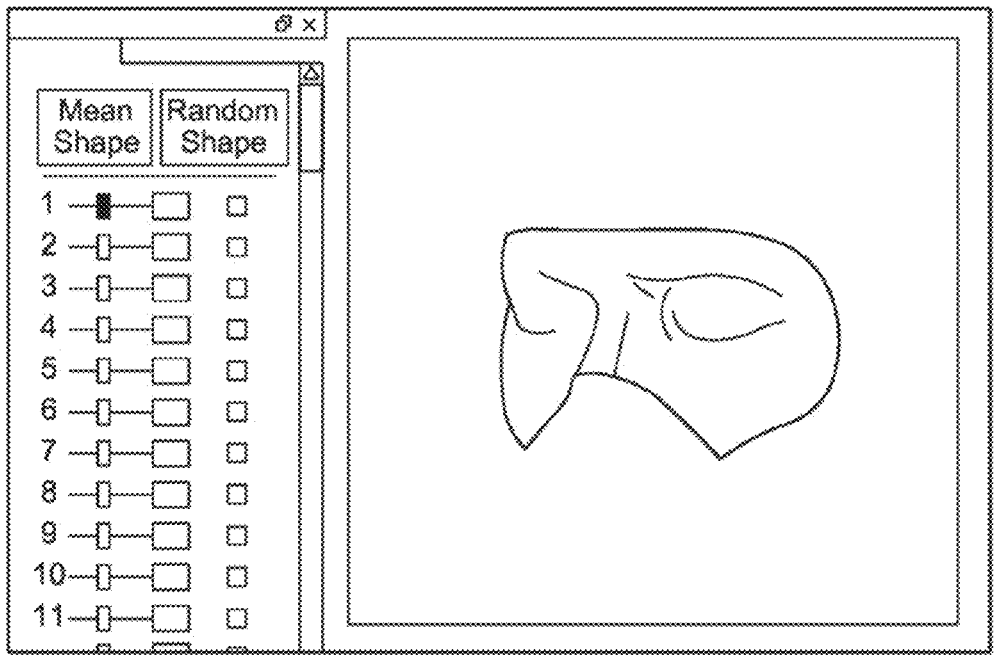

FIGS. 26*a*-26*b* are an anthropometrical data model of sizing based on nominated facial zones.

Figure 27A:
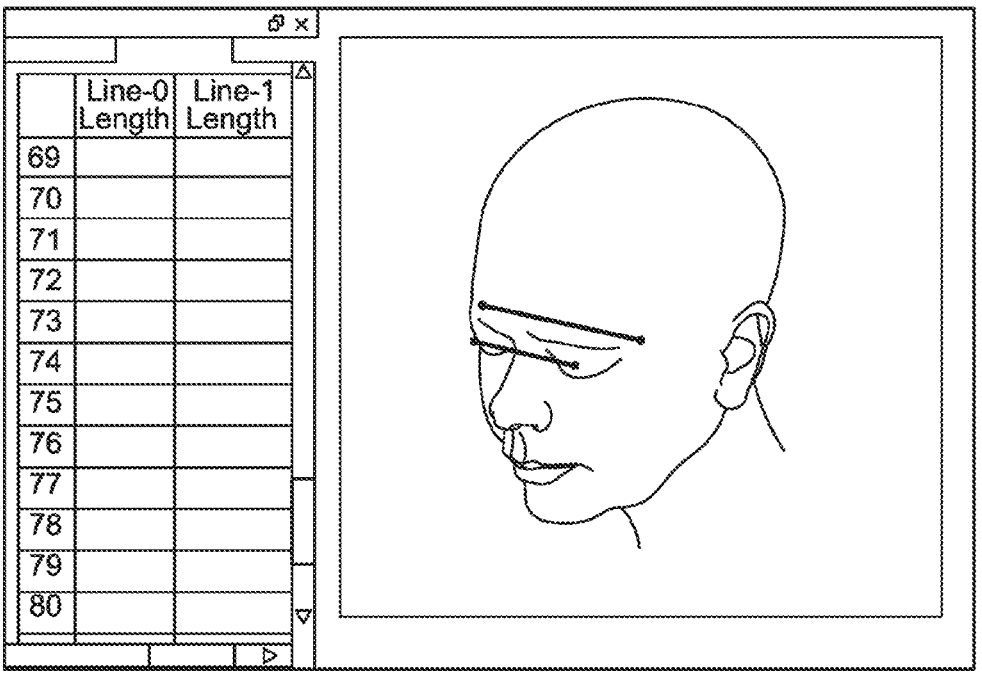
Figure 27B:
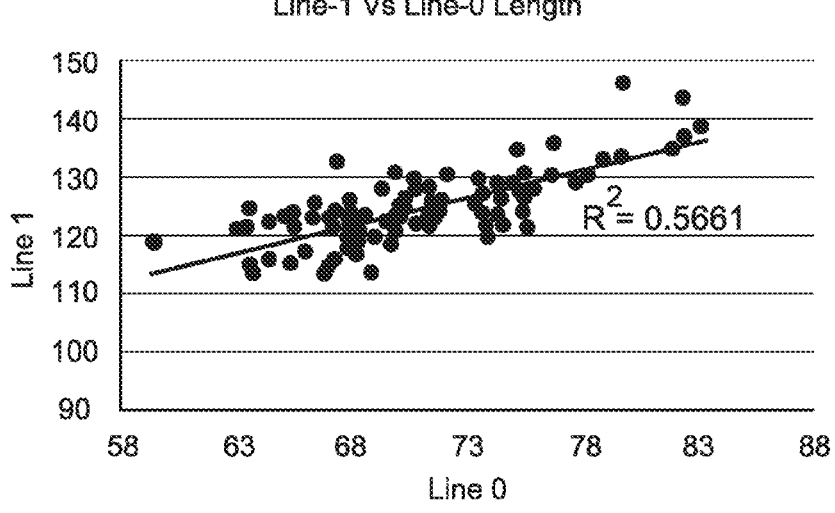

FIG. 27*a*-27*b* are an anthropometrical data model of sizing based on anthropometrical landmarks.

3.4 Additional Aspects of the Present Technology

Figure 28A:
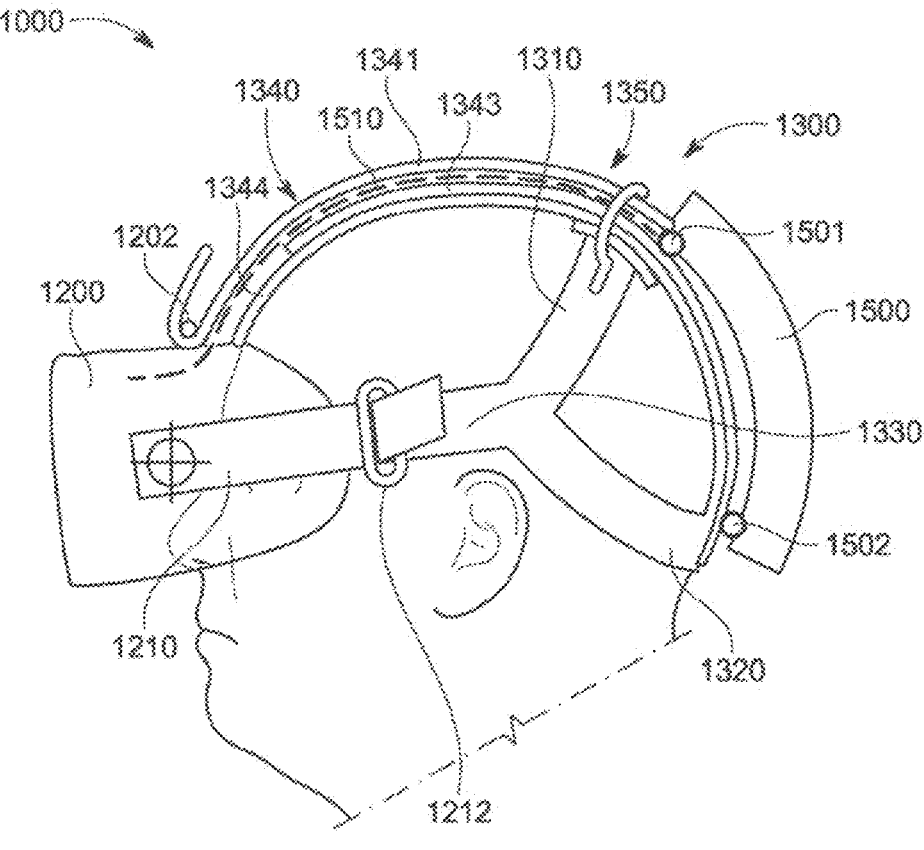
Figure 28B:
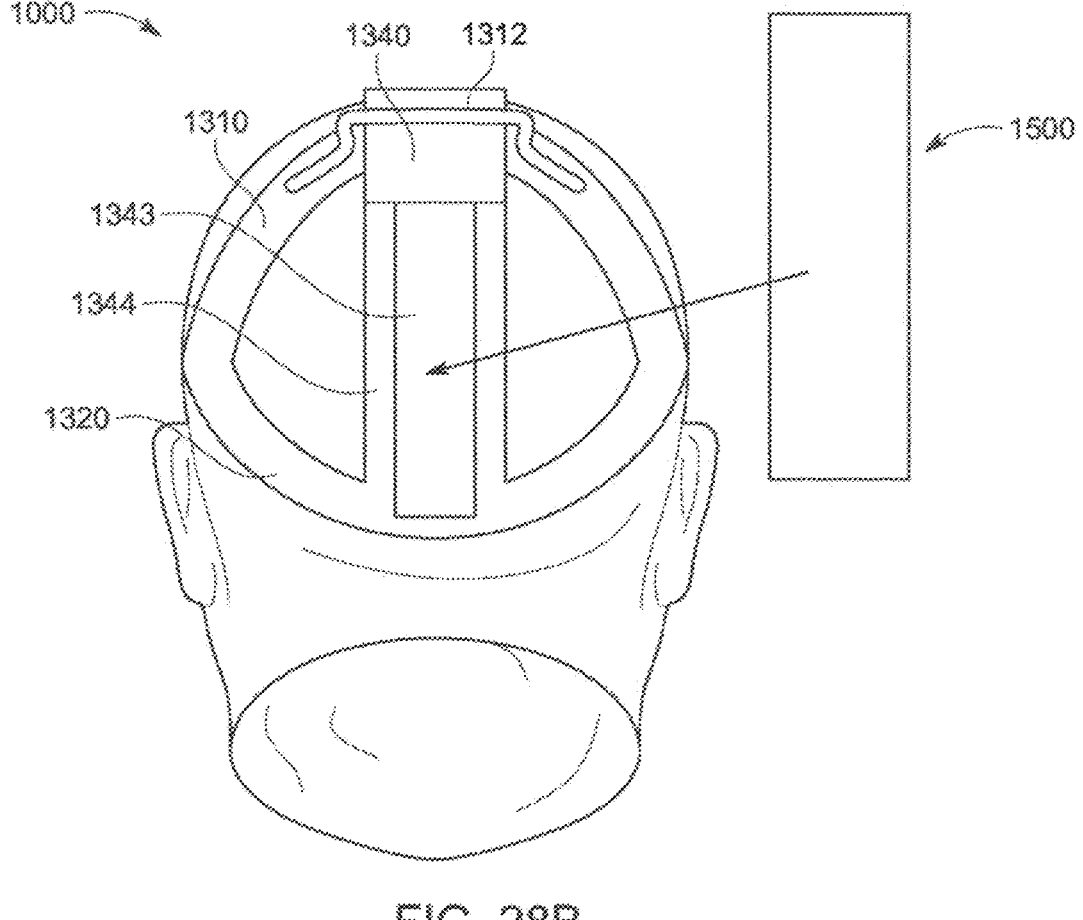

FIG. 28A is a schematic side view of a head-mounted display system according to another example of the present technology, in use;

FIG. 28B is a schematic rear view of the head-mounted display system shown in FIG. 7A, in use.

Figure 28C:
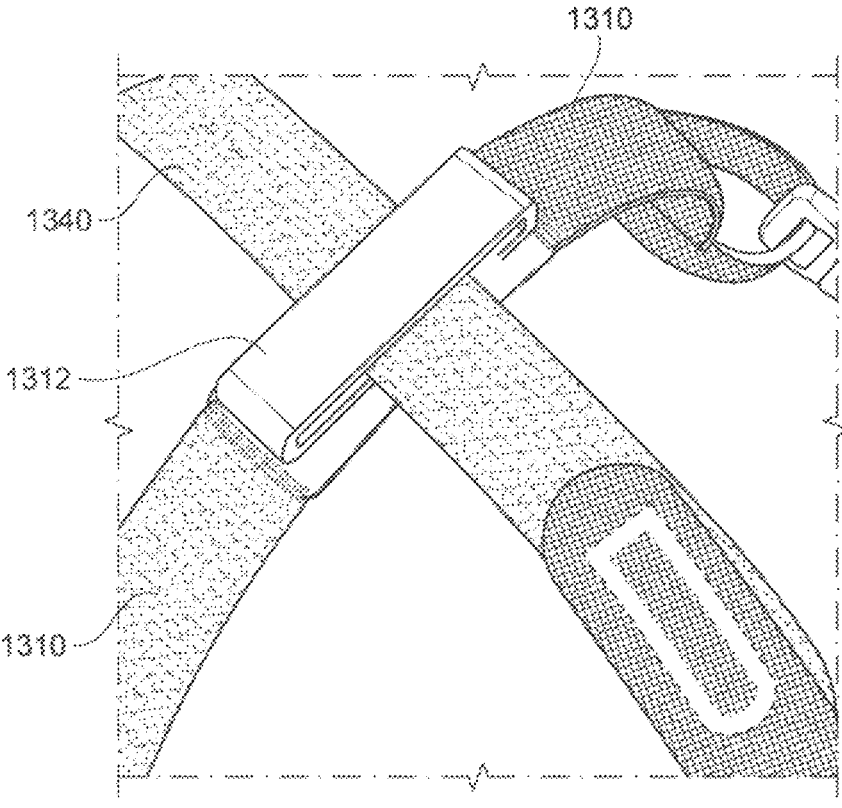

FIG. 28C shows components of a positioning and stabilising structure of the head-mounted display system shown in FIG. 28A.

Figure 29:
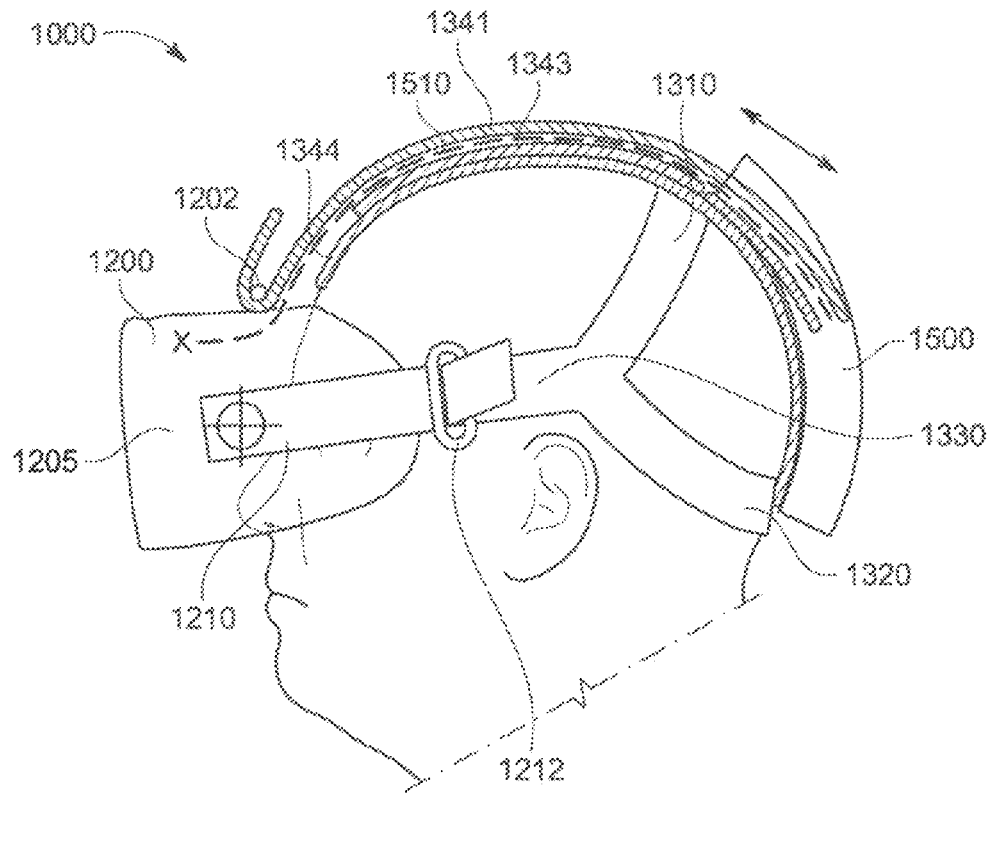

FIG. 29 shows a schematic side view of a head-mounted display system according to another example of the present technology, in use.

Figure 30:
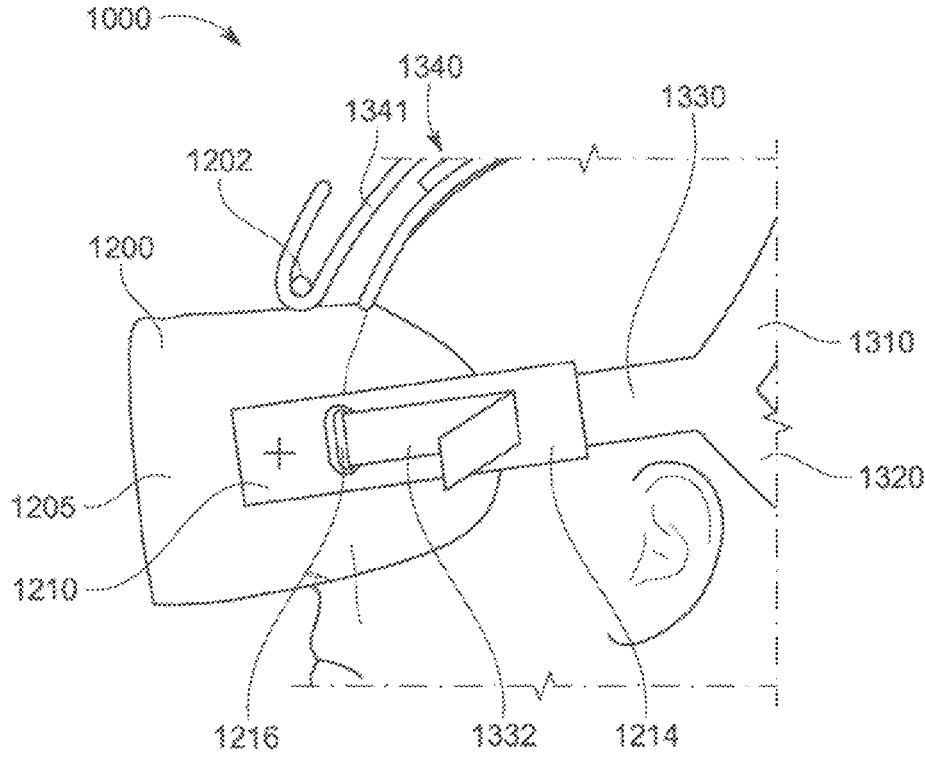

FIG. 30 shows a schematic side view of a portion of a head-mounted display system according to another example of the present technology, in use.

Figure 31A:
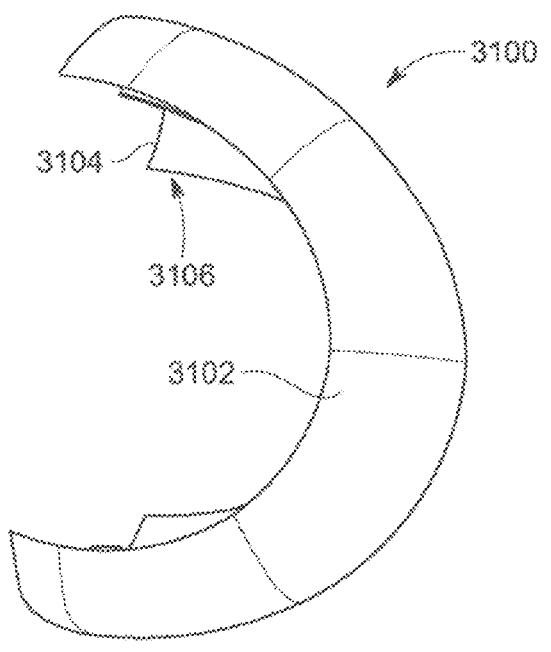
Figure 32A:
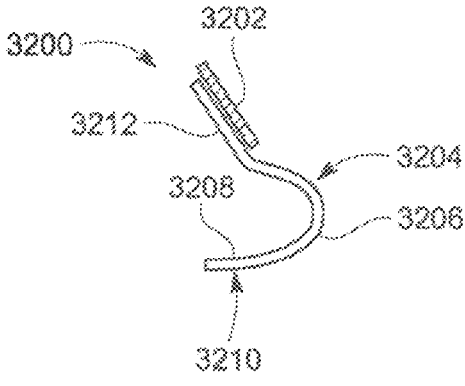
Figure 32B:
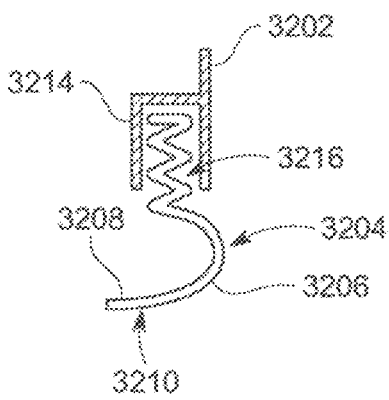
Figure 33A:
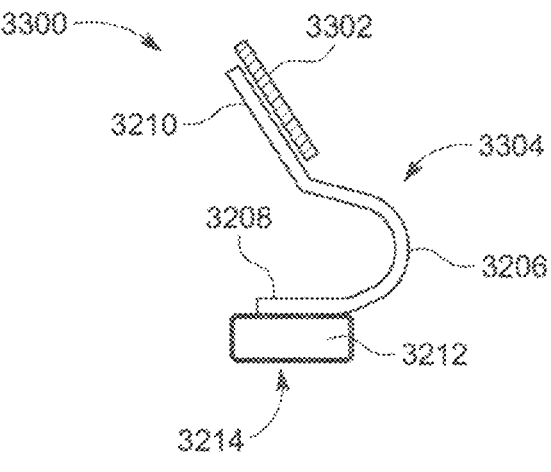
Figure 33B:
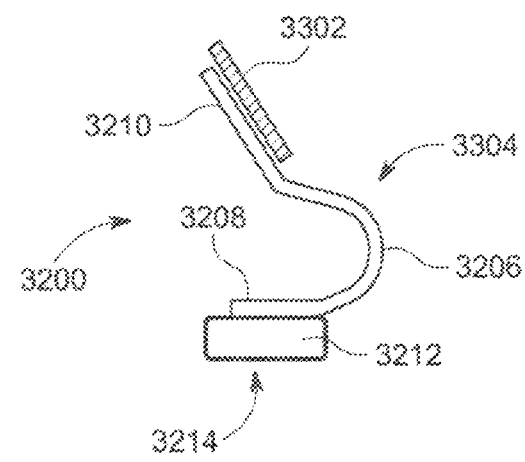
Figure 33C:
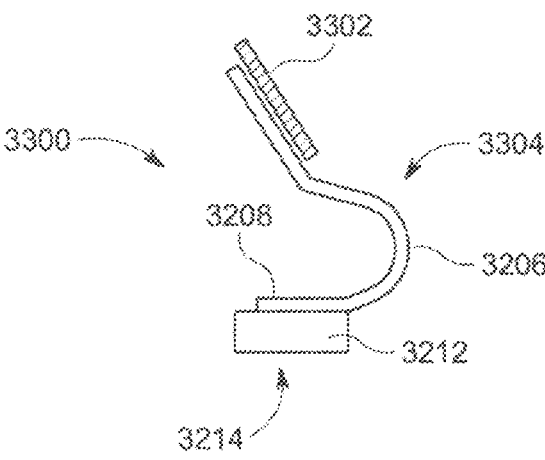

FIGS. 31A, 32B, and 33C are side, rear, and frontal views, respectively, of a further embodiment of an interfacing structure.

Figure 32C:
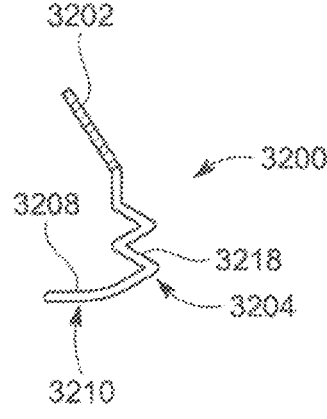

FIGS. 32A-32C are side cross-section views showing further embodiments of interfacing structures according to another example of the present technology.

FIGS. 33A-33C are side cross-section views showing further embodiments of interfacing structures according to another example of the present technology.

Figure 34A:
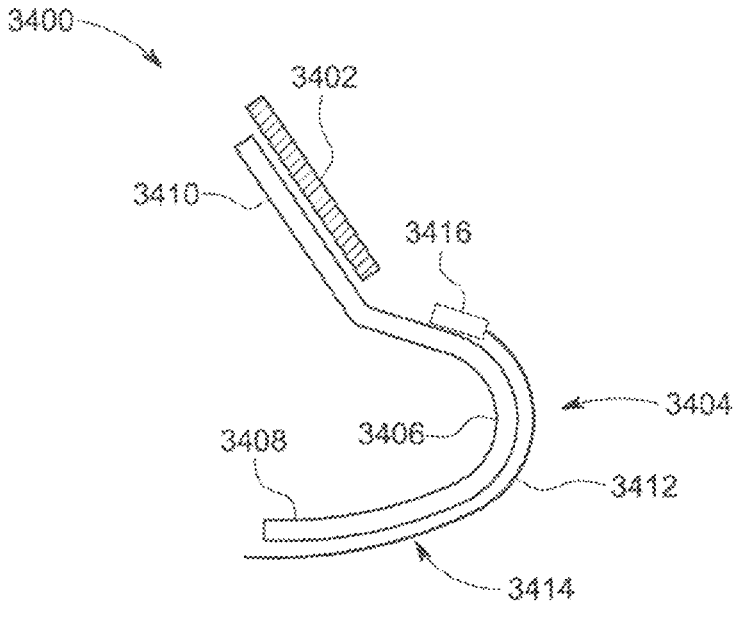
Figure 34B:
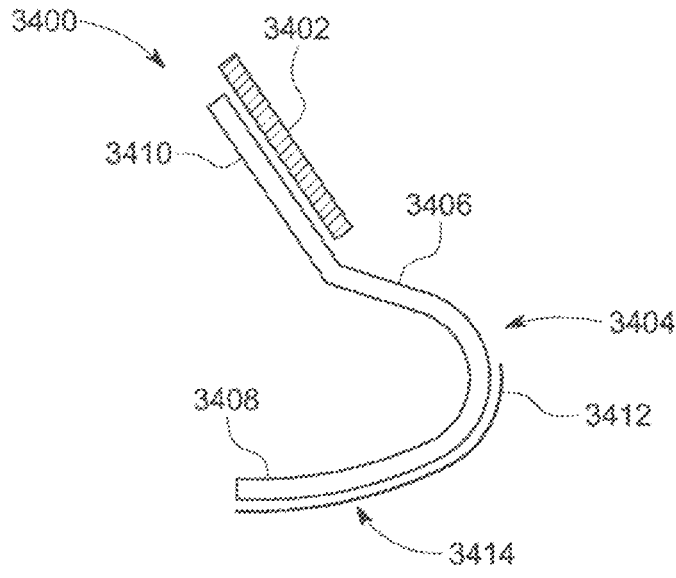

FIGS. 34A and 34B are side cross-section views showing further embodiments of interfacing structures according to another example of the present technology.

FIGS. 35A-35E are side cross-section views showing further embodiments of interfacing structures according to another example of the present technology.

FIGS. 36A-36E are show a further embodiment of an interfacing structure according to another example of the present technology.

Figure 37A:
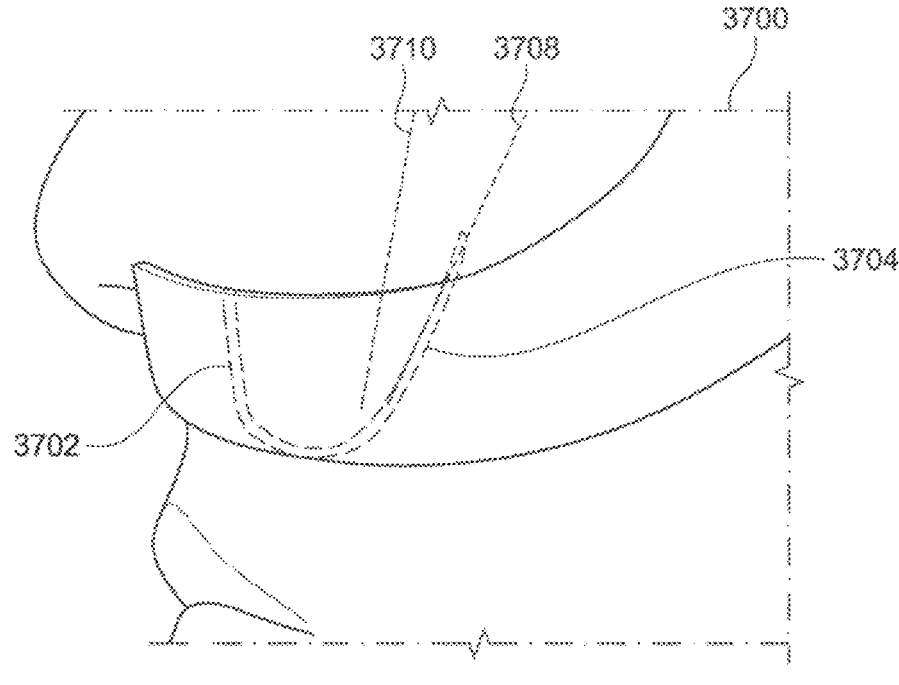
Figure 37B:
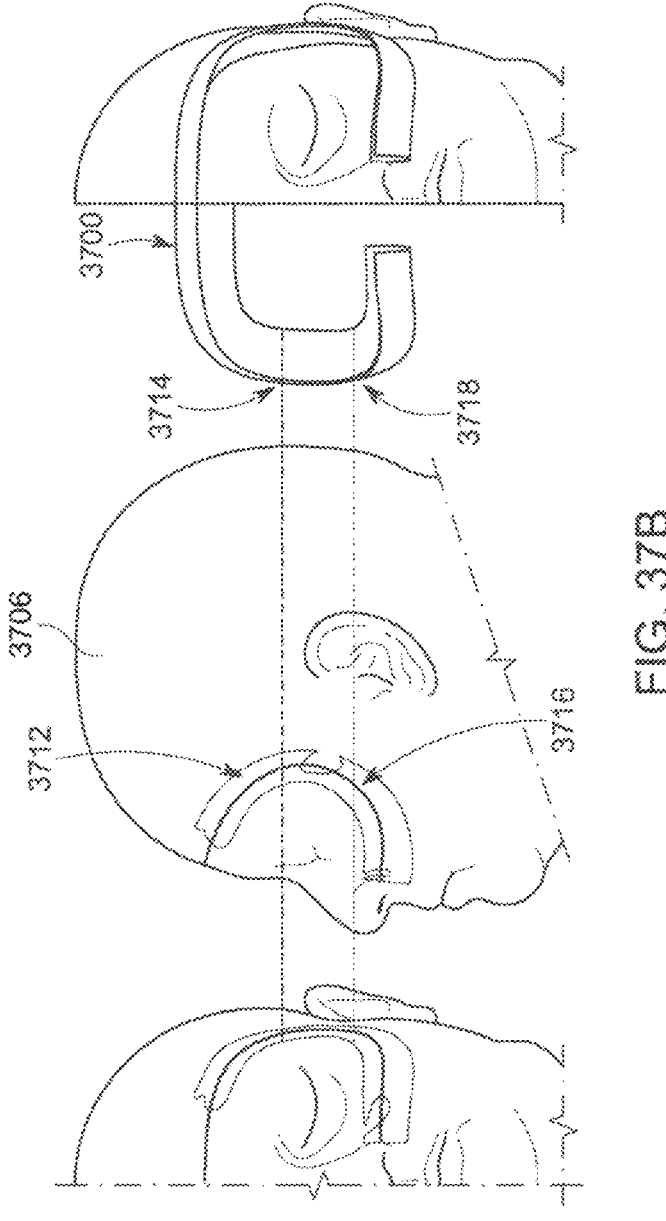

FIGS. 37A and 37B are show a further embodiment of an interfacing structure according to another example of the present technology.

Figure 38A:
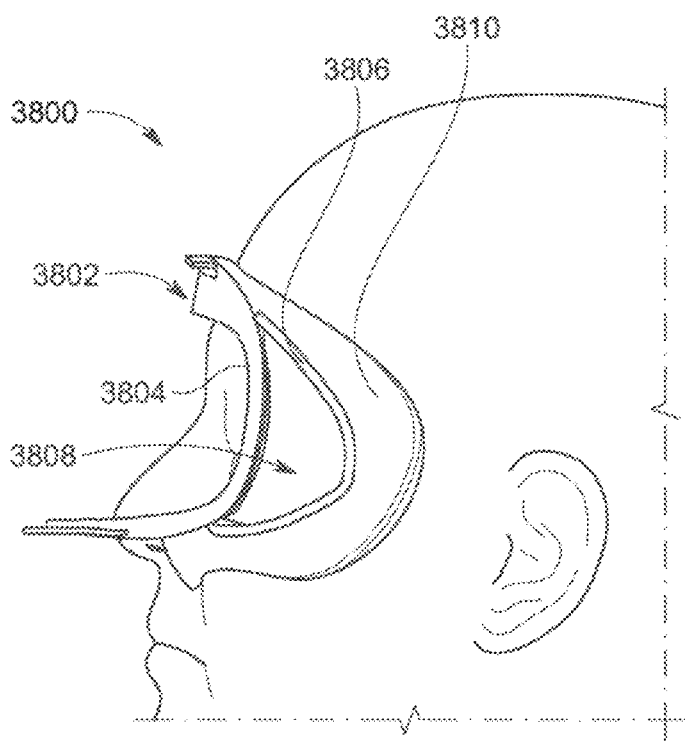
Figure 38B:
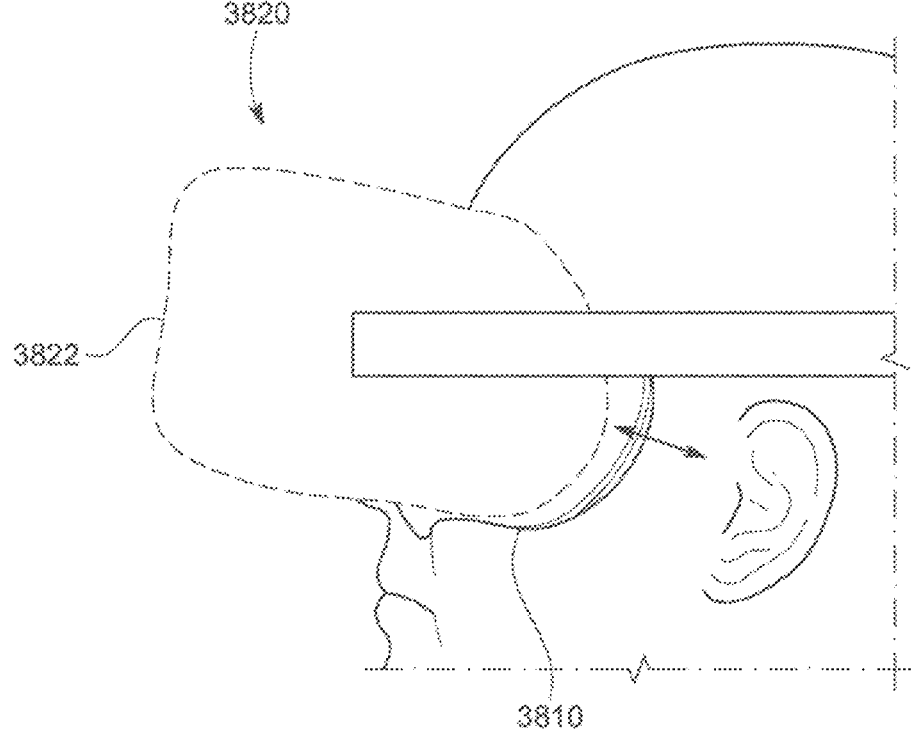
Figure 38C:
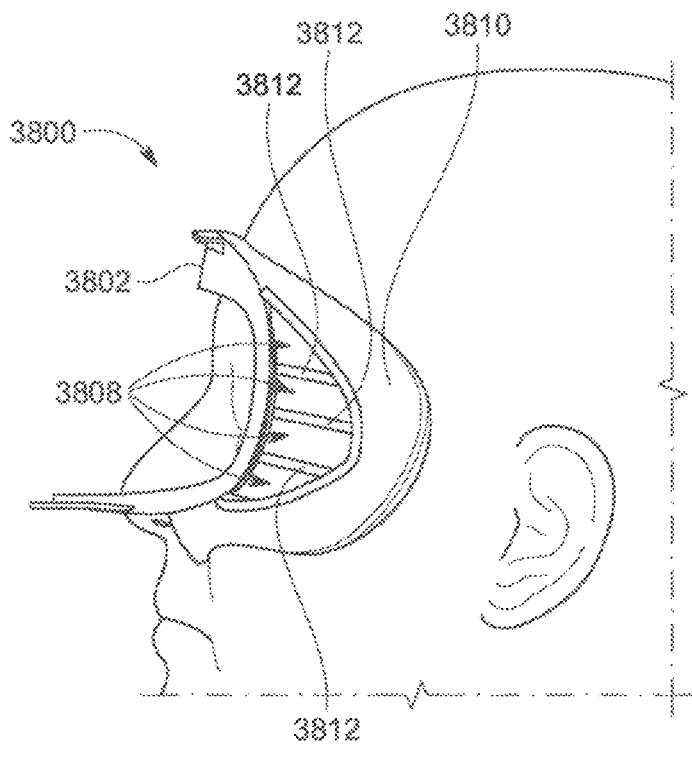

FIGS. 38A-38C show further embodiments of interfacing structures according to another example of the present technology.

Figure 38D:
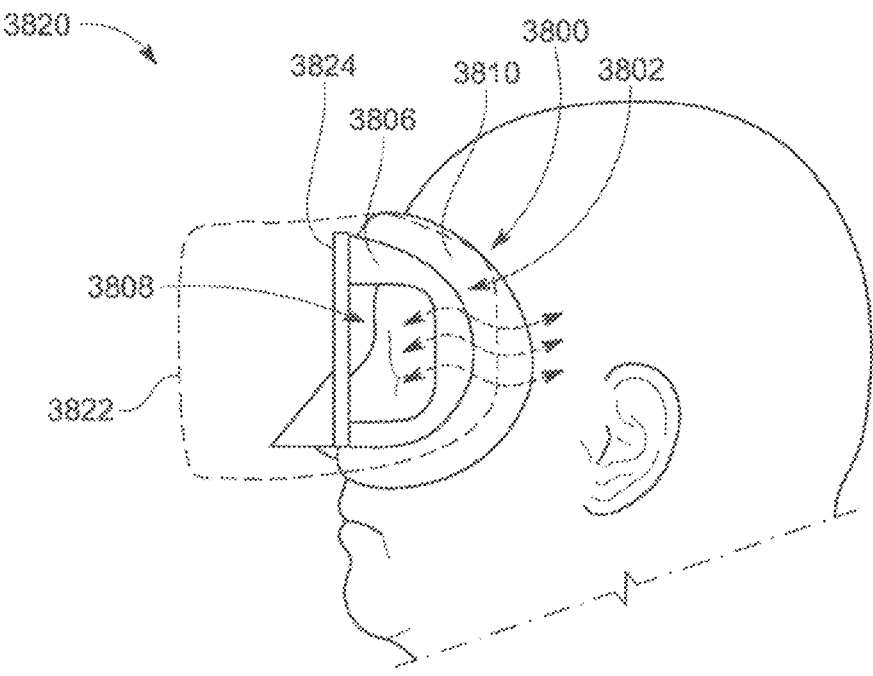
Figure 38E:
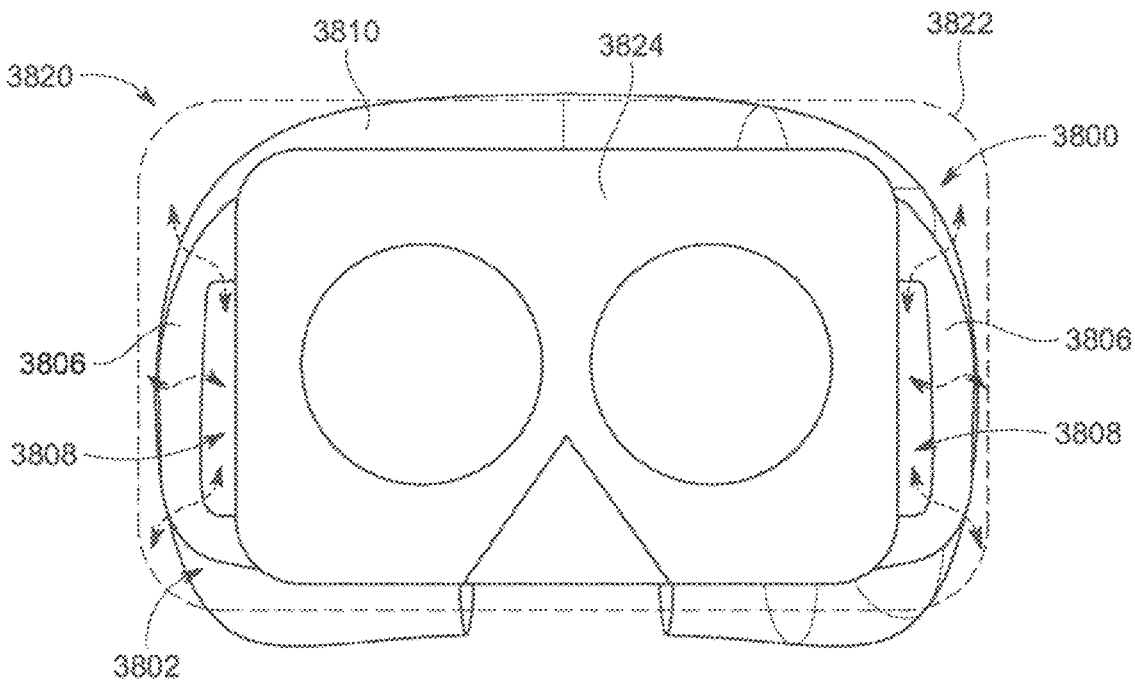

FIGS. 38D and 38E show a further embodiment of an interfacing structure according to another example of the present technology.

Figures 39A, 39B:
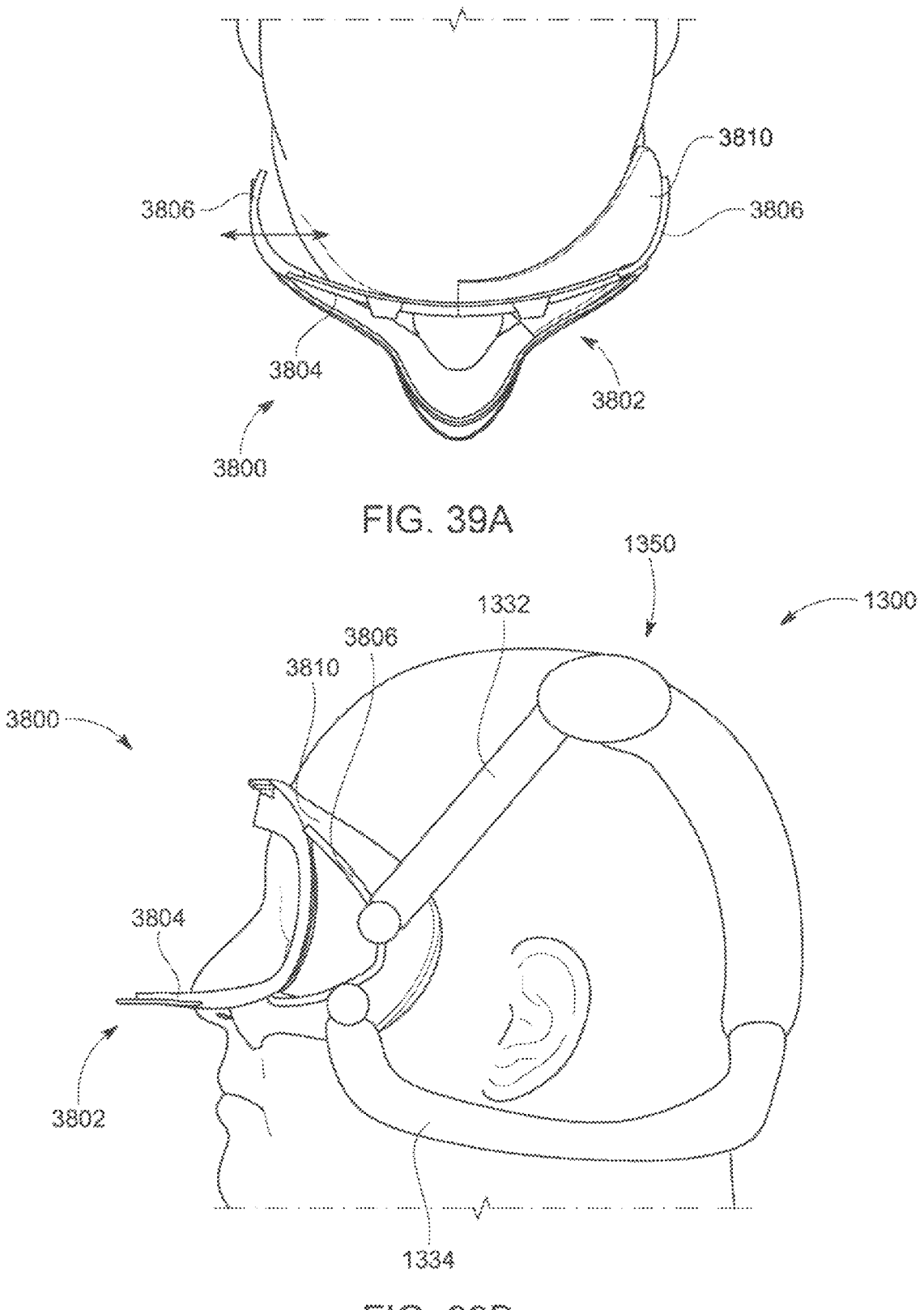

FIG. 39A shows an interfacing structure according to another example of the present technology.

Figure 39C:
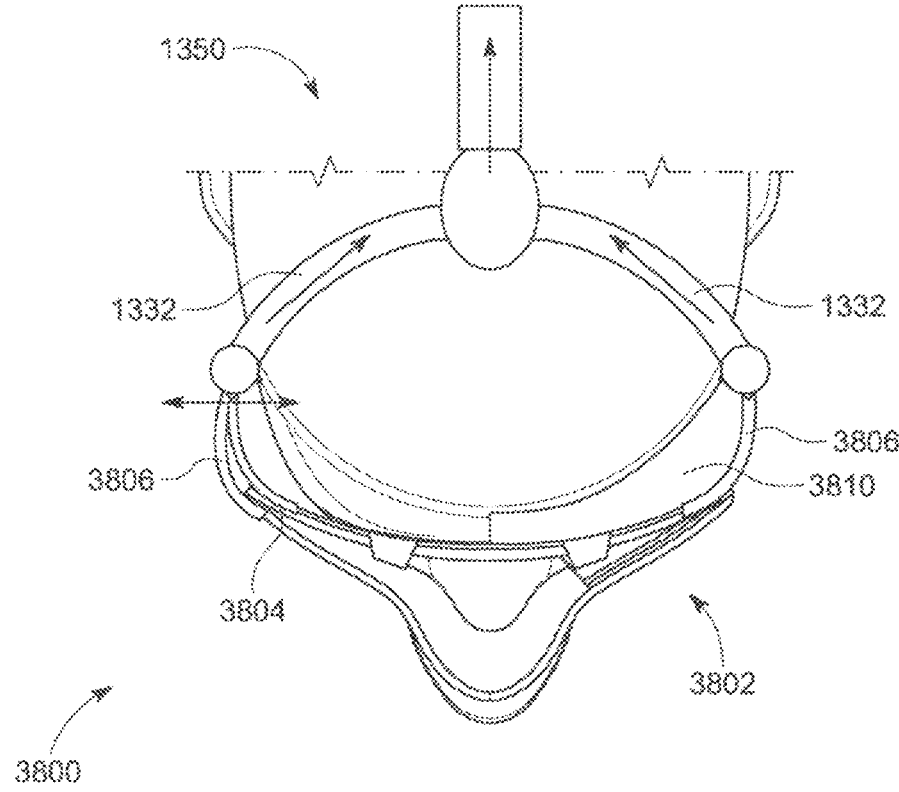

FIG. 39B-39C show an interfacing structure and positioning and stabilising structure according to another example of the present technology.

Figure 39D:
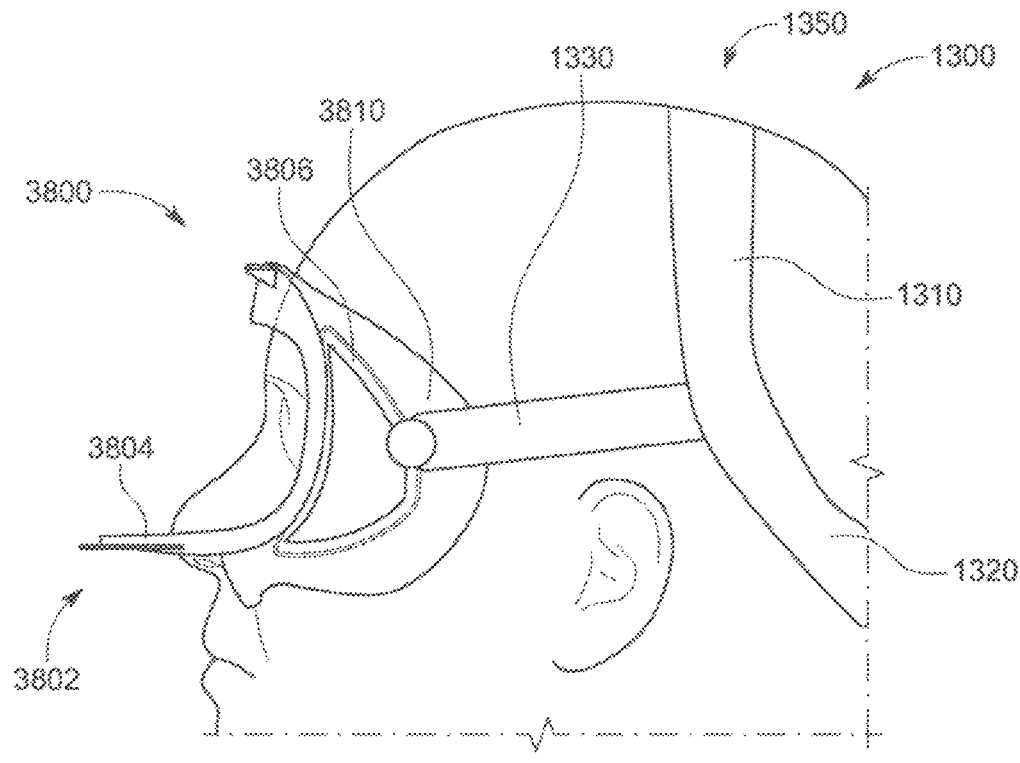

FIG. 39D shows an interfacing structure and positioning and stabilising structure according to another example of the present technology.

Figure 40A:
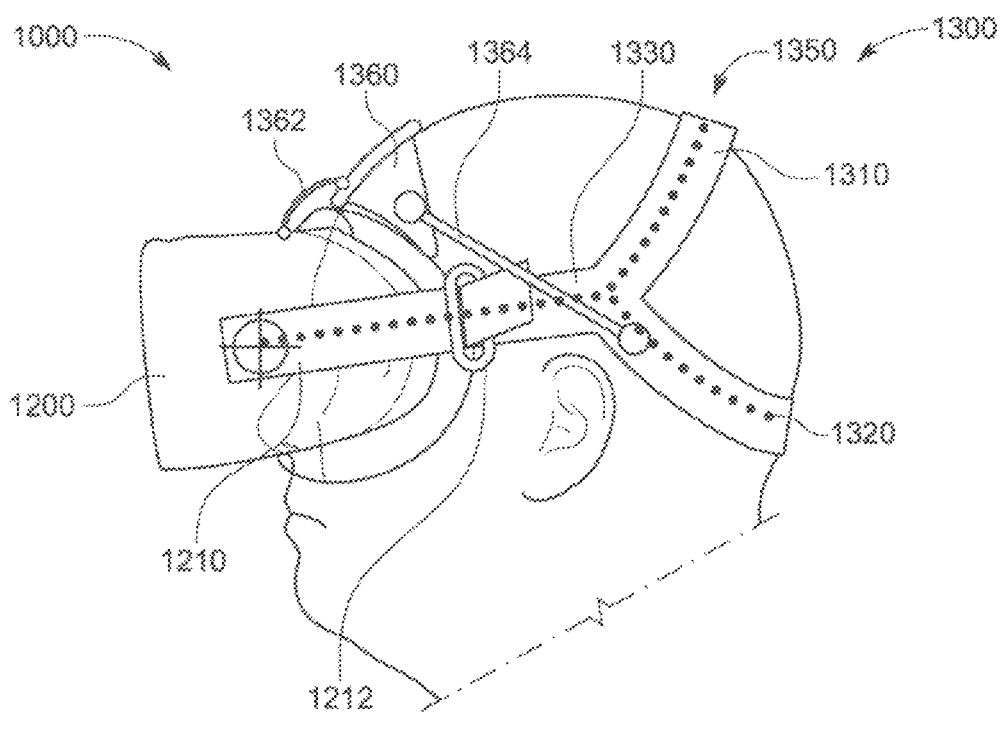

FIG. 40A shows a head-mounted display system according to another example of the present technology.

Figure 40B:
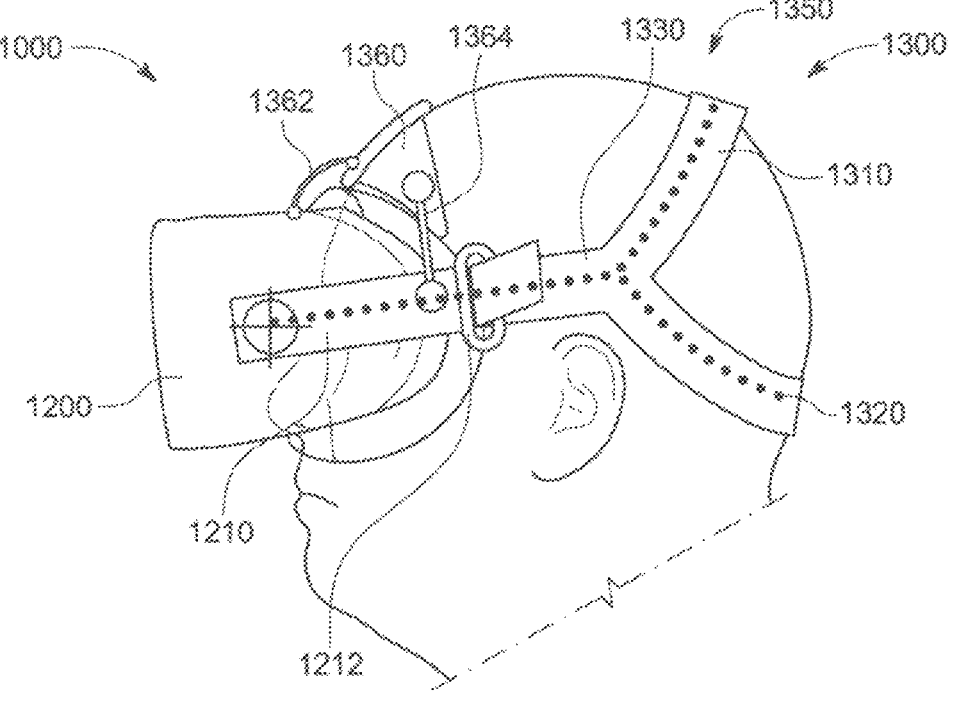

FIG. 40B shows a head-mounted display system according to another example of the present technology.

Figure 41A:
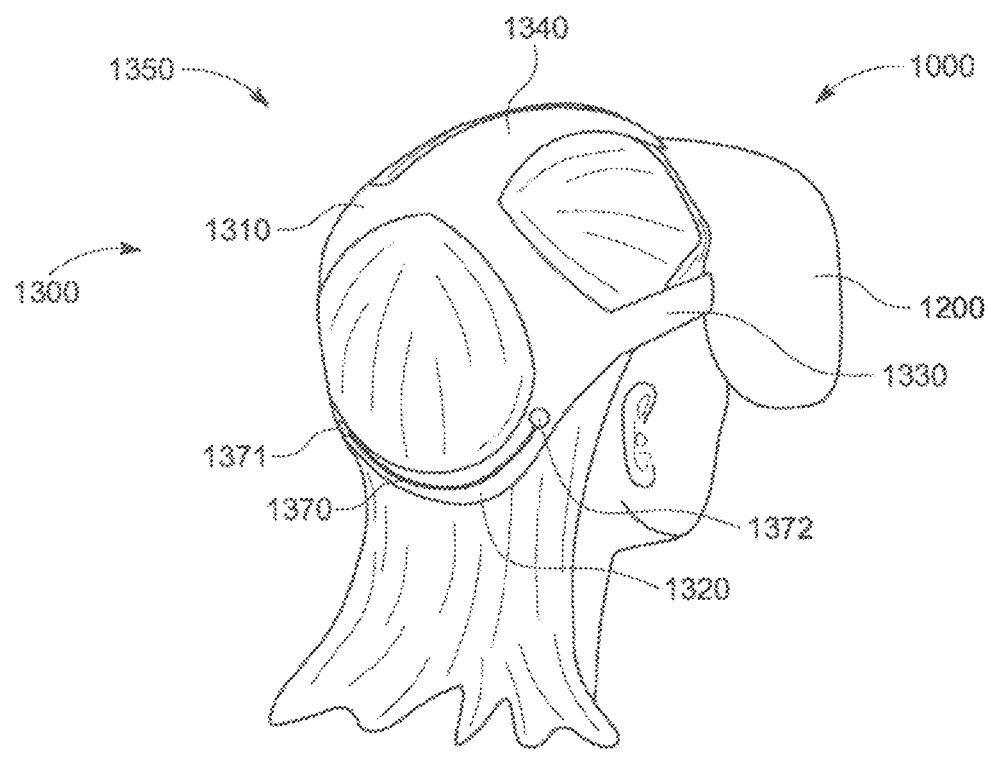
Figure 41B:
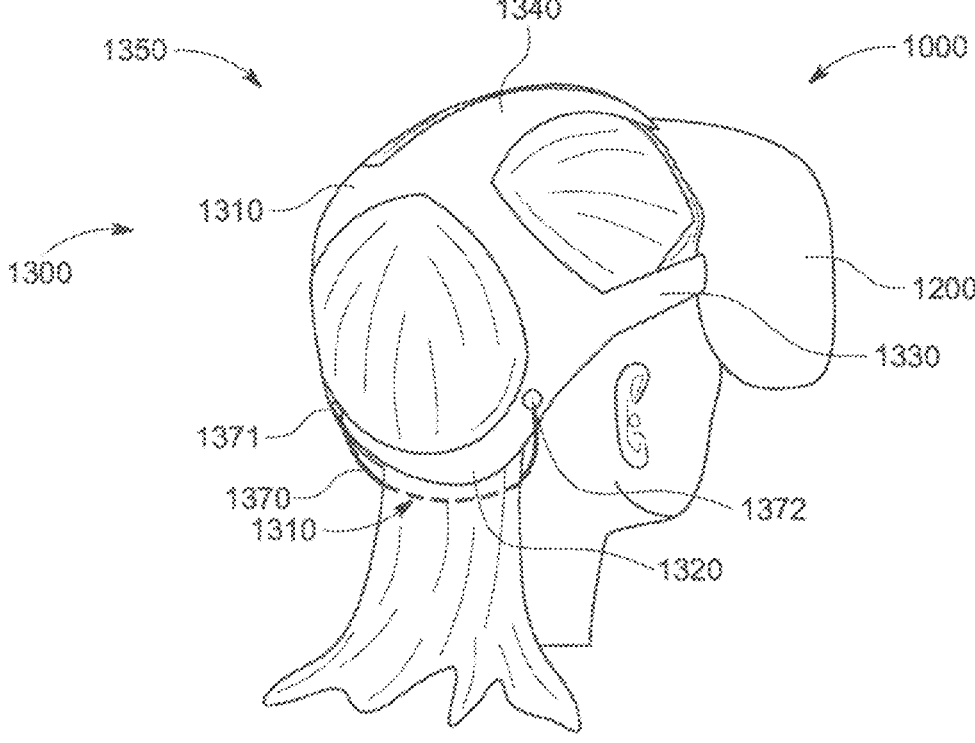

FIGS. 41A-41B show a head-mounted display system according to another example of the present technology.

FIGS. 42A-42E show a head-mounted display system according to another example of the present technology.

Figures 43A, 43B, 43C:
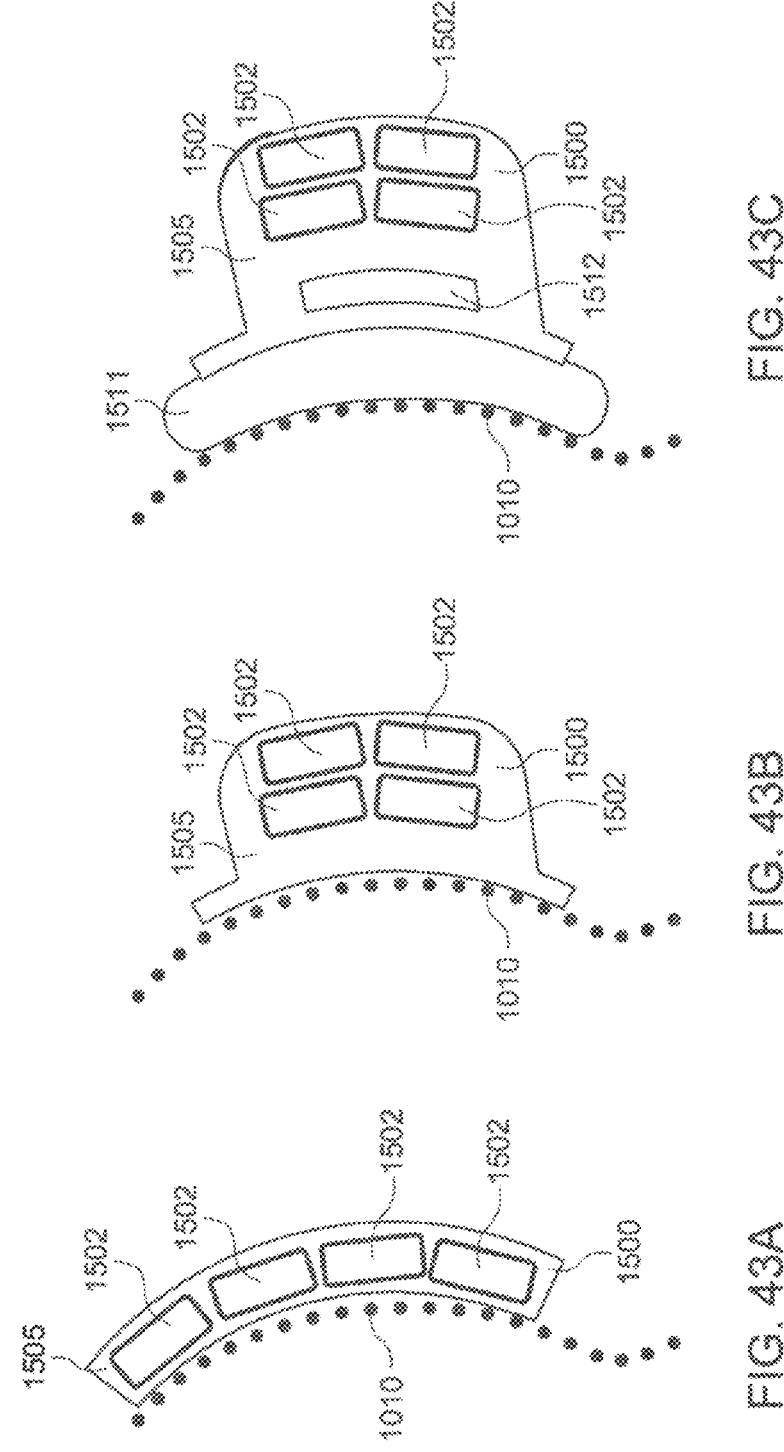

FIGS. 43A-43C show battery packs according to examples of the present technology.

FIGS. 44A-44D show a head-mounted display system according to another example of the present technology.

FIGS. 45A-45D show components of positioning and stabilising structures according to examples of the present technology.

Figure 46A:
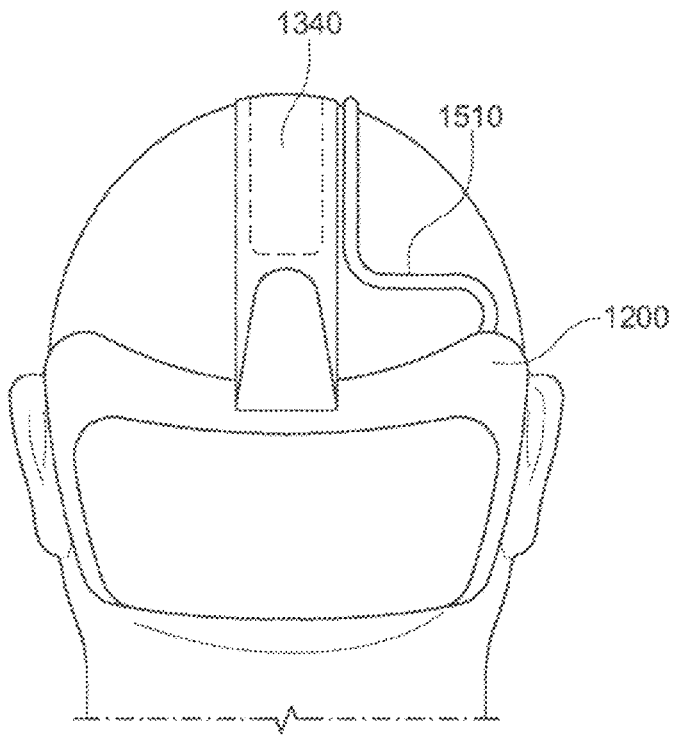
Figure 46B:
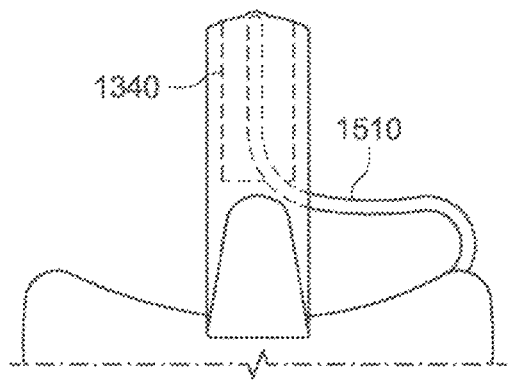
Figure 46C:
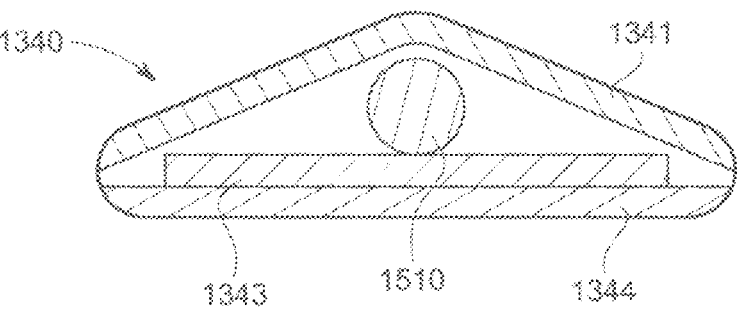

FIGS. 46A-46C show a head-mounted display system according to another example of the present technology.

Figure 47A:
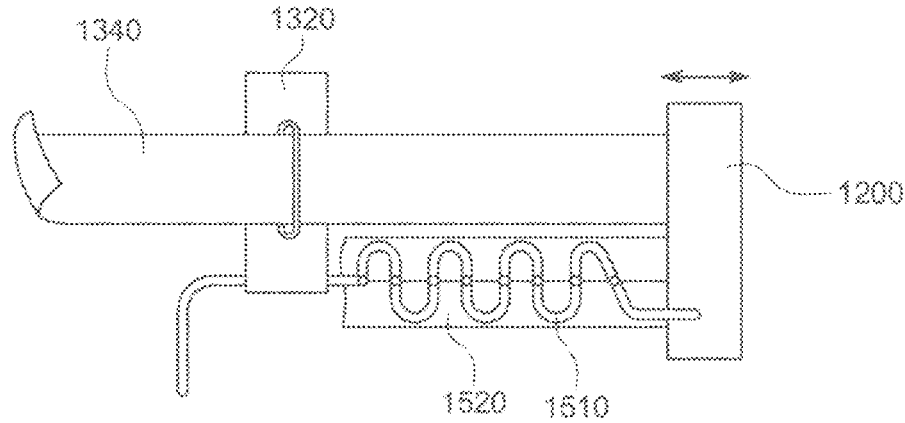
Figure 47B:
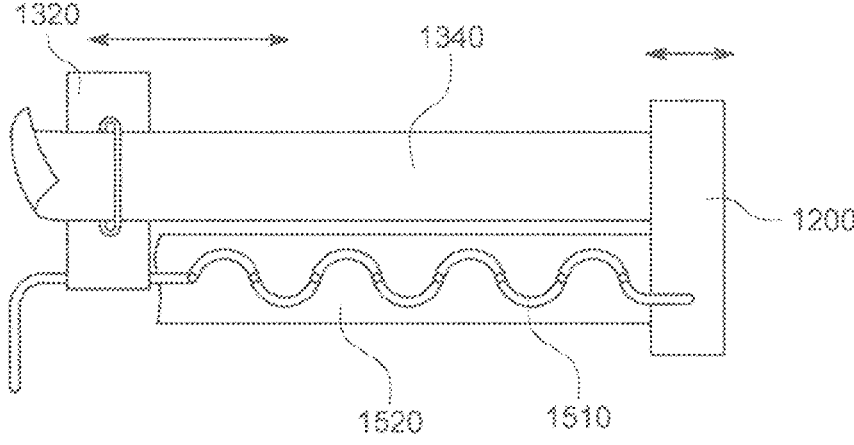

FIGS. 47A-47B show a power cord strap portion according to an example of the present technology.

Figure 48:
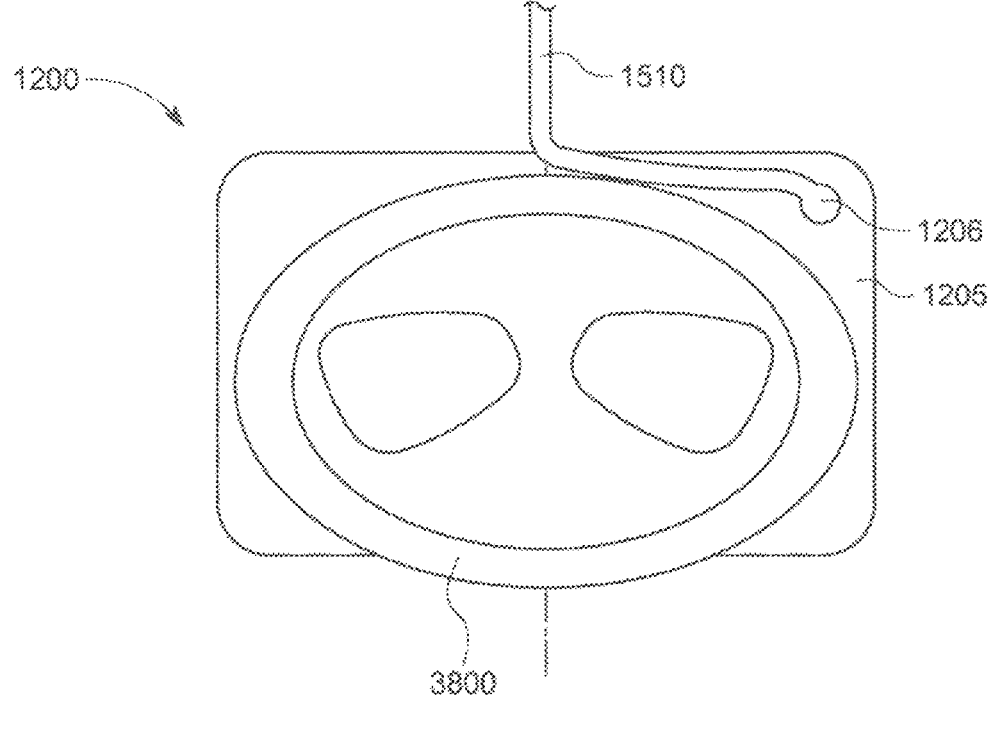

FIG. 48 shows a head-mounted display unit according to an example of the present technology.

FIGS. 49A-49E show head-mounted display systems according to examples of the present technology having power cords.

FIGS. 50A-50D show arms according to examples of the present technology.

Figure 51A:
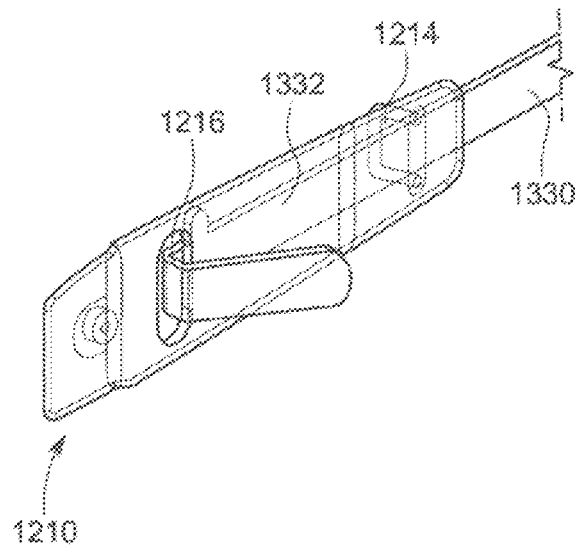
Figure 51B:
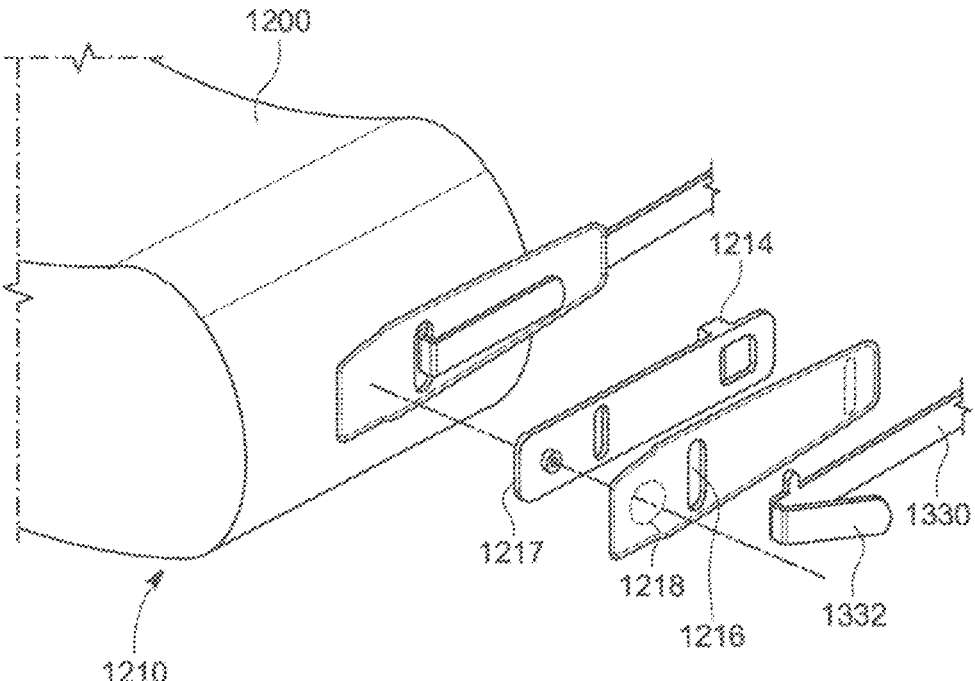

FIGS. 51A-51B show an arm according to a further example of the present technology.

Figure 52A:
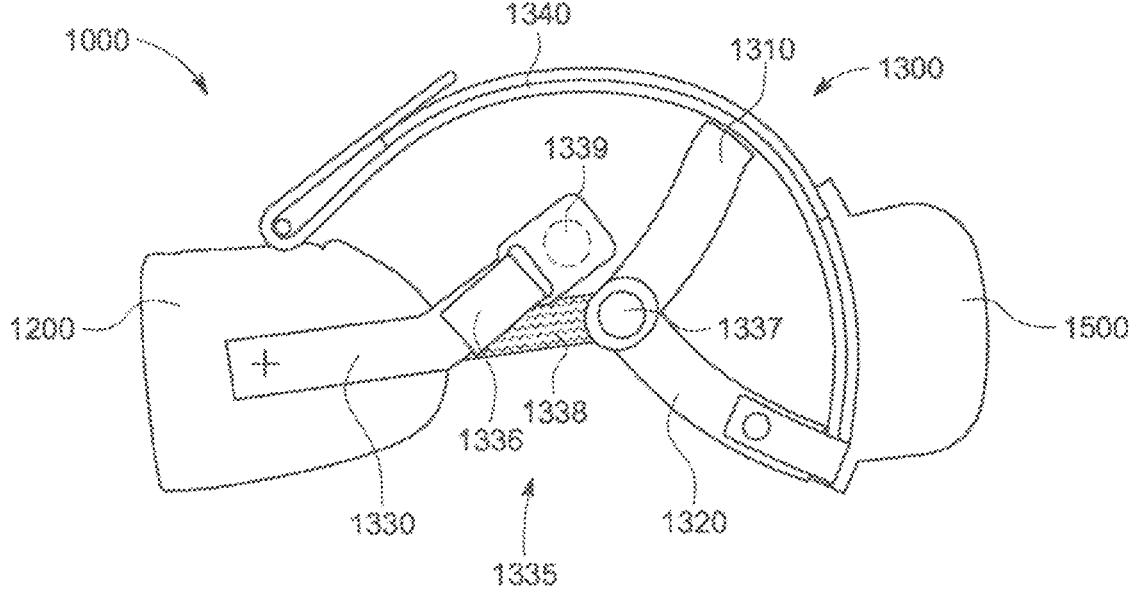
Figure 52B:
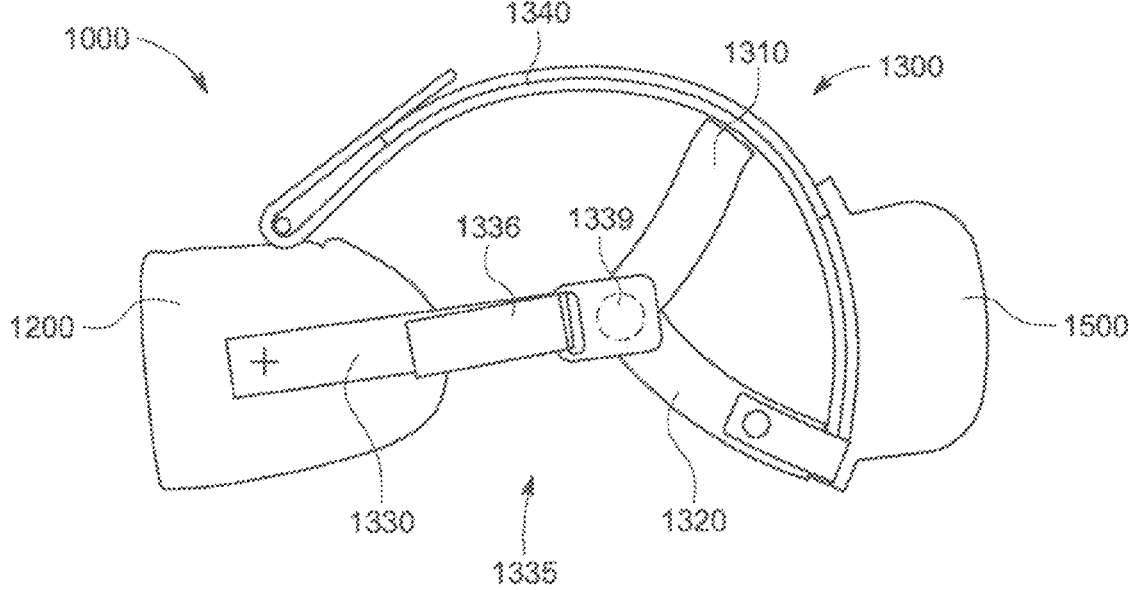

FIGS. 52A-52B show a head-mounted display system according to another example of the present technology.

Figures 53A, 53B:
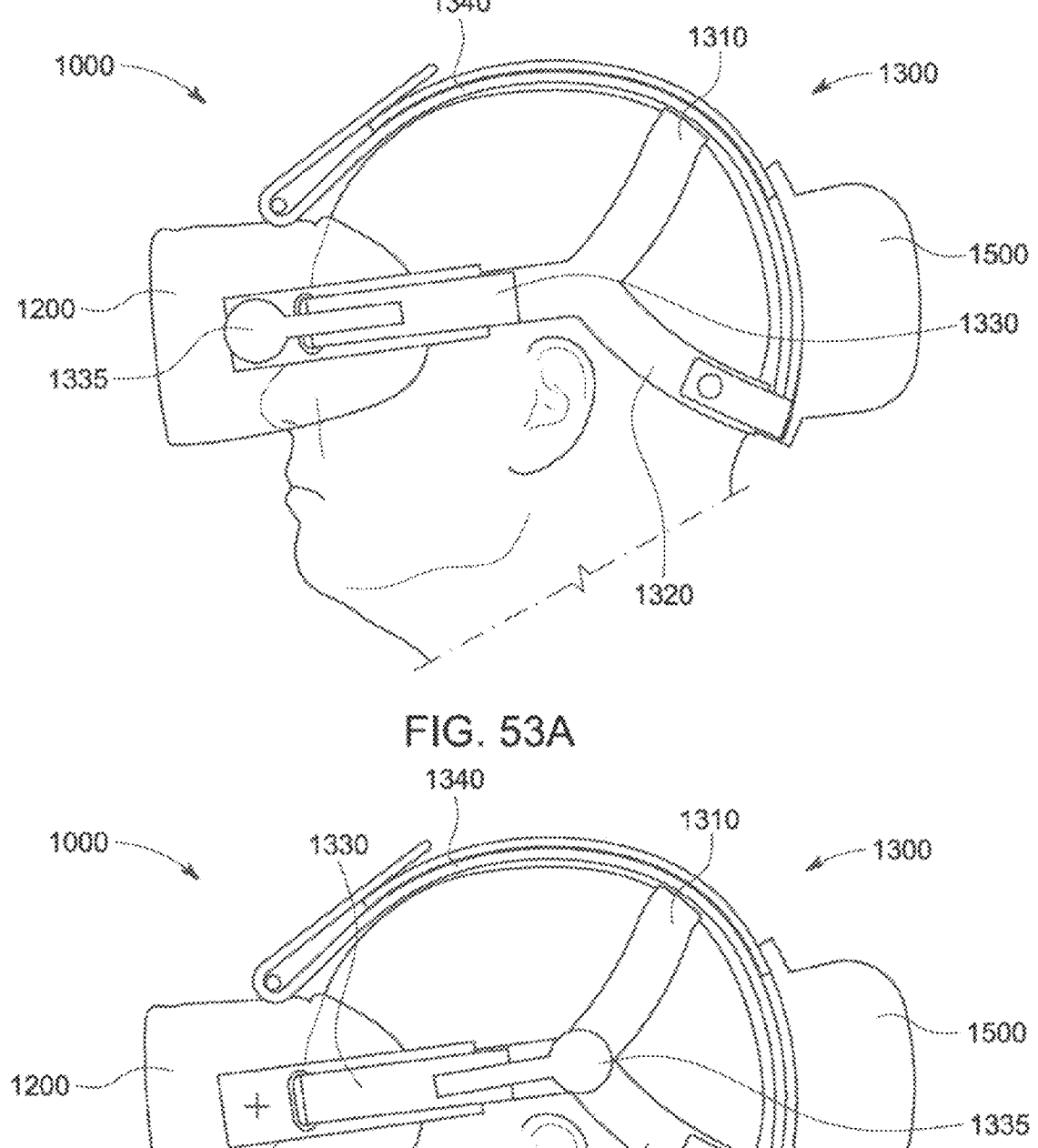
Figure 53C:
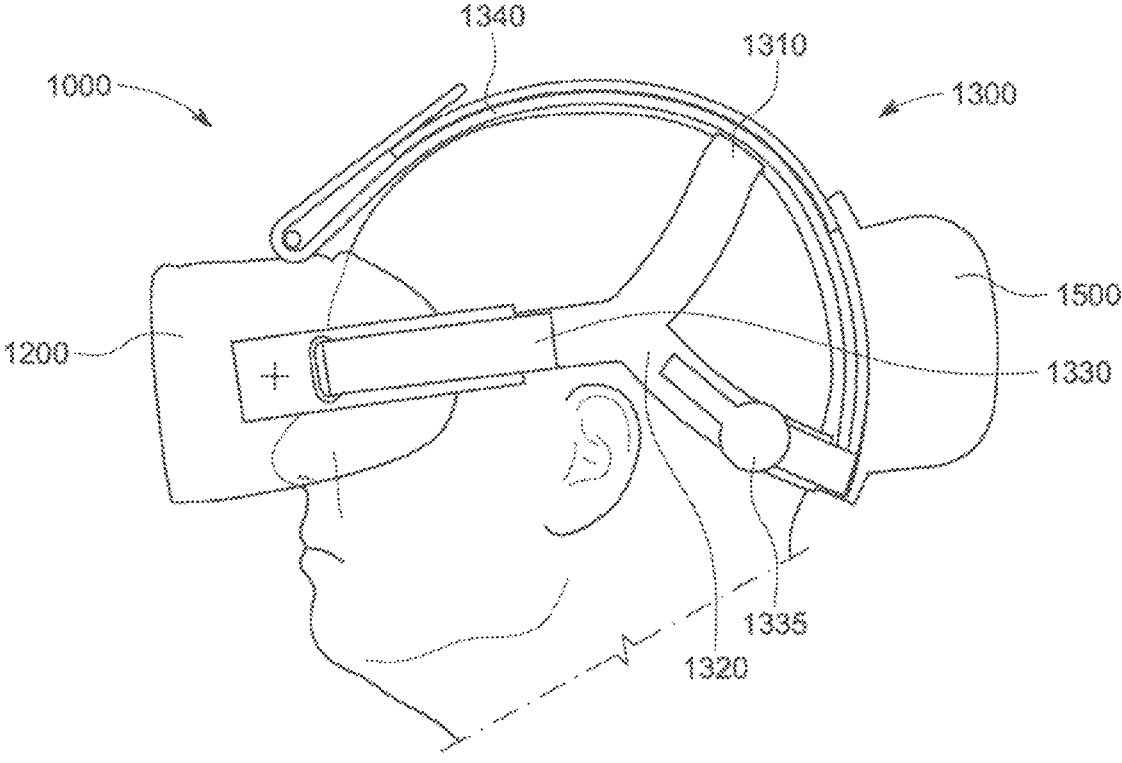

FIGS. 53A-53C show head-mounted display systems according to examples of the present technology.

Figure 54:
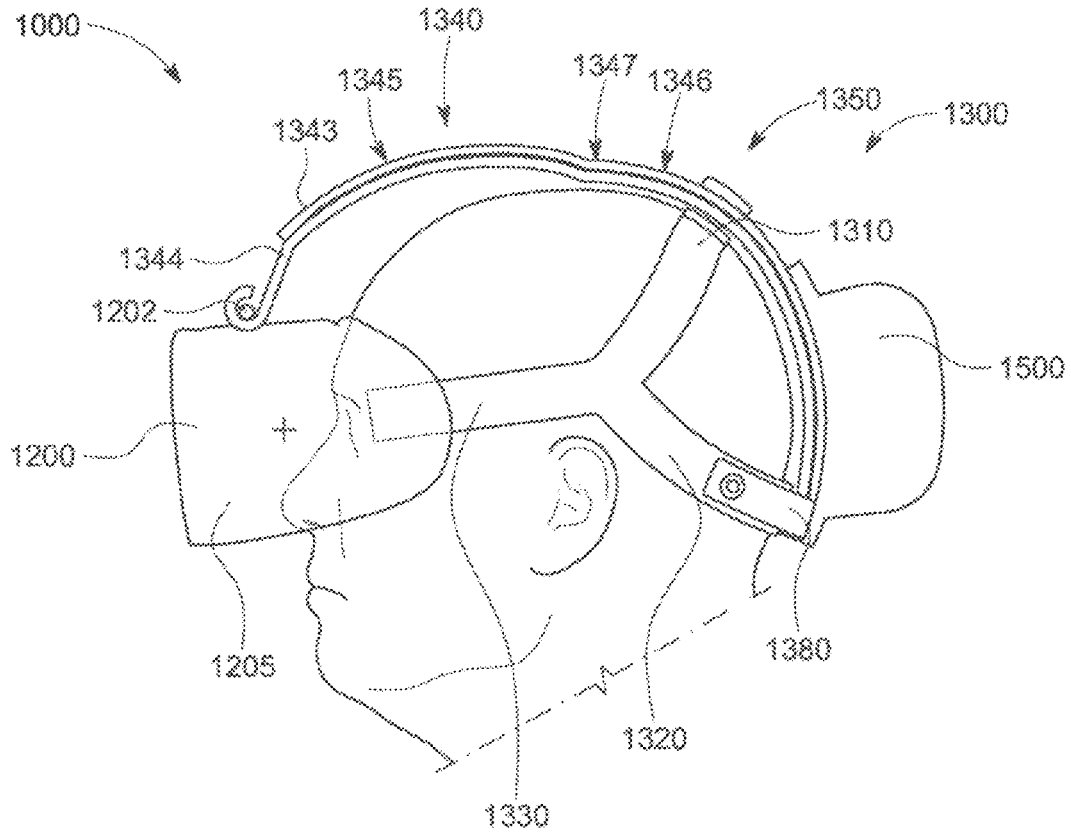

FIG. 54 shows a head-mounted display system according to another example of the present technology.

FIGS. 55A-55I show a head-mounted display unit according to another example of the present technology.

Figure 55A:
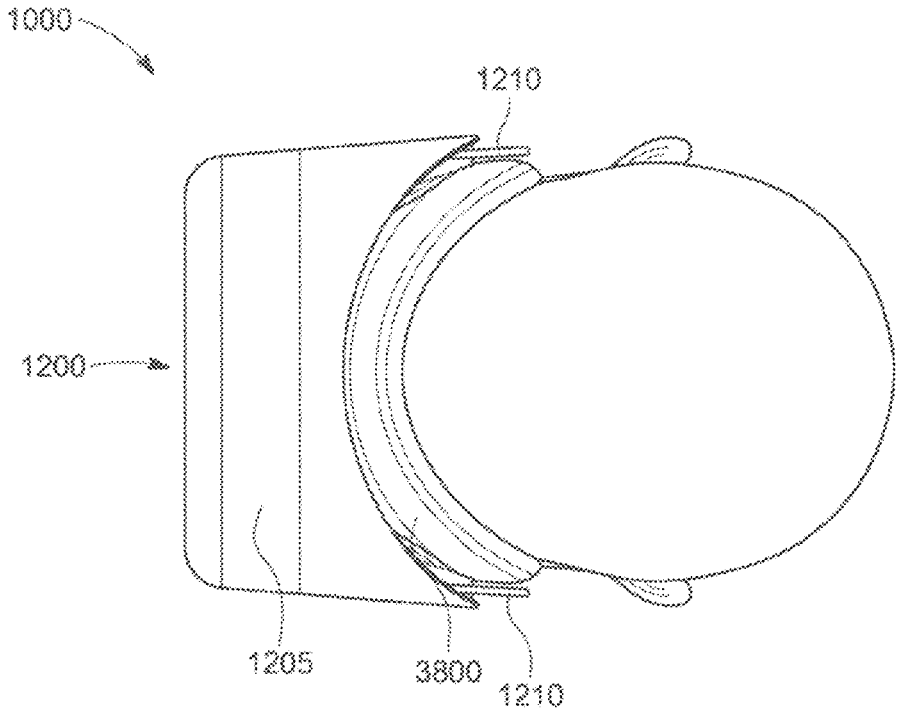
Figure 55B:
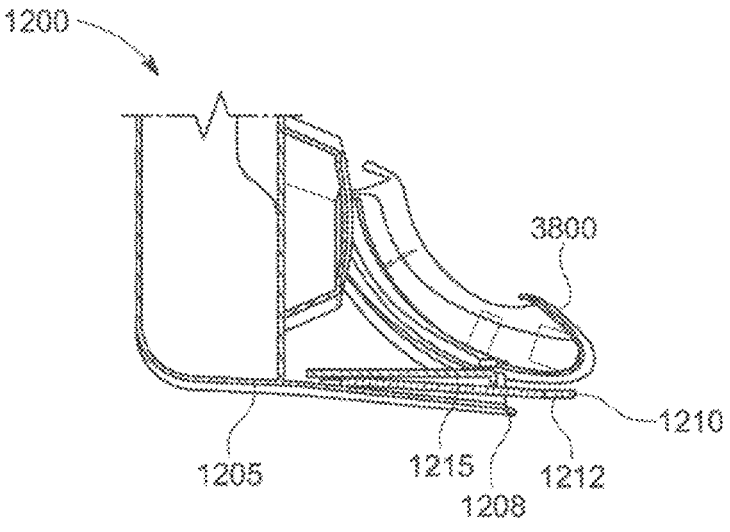
Figure 55C:
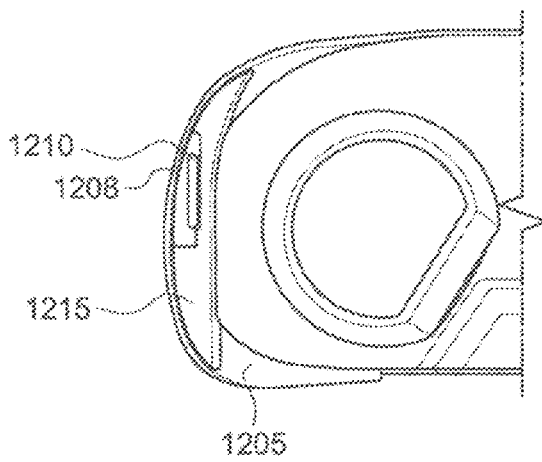
Figures 55D, 55E:
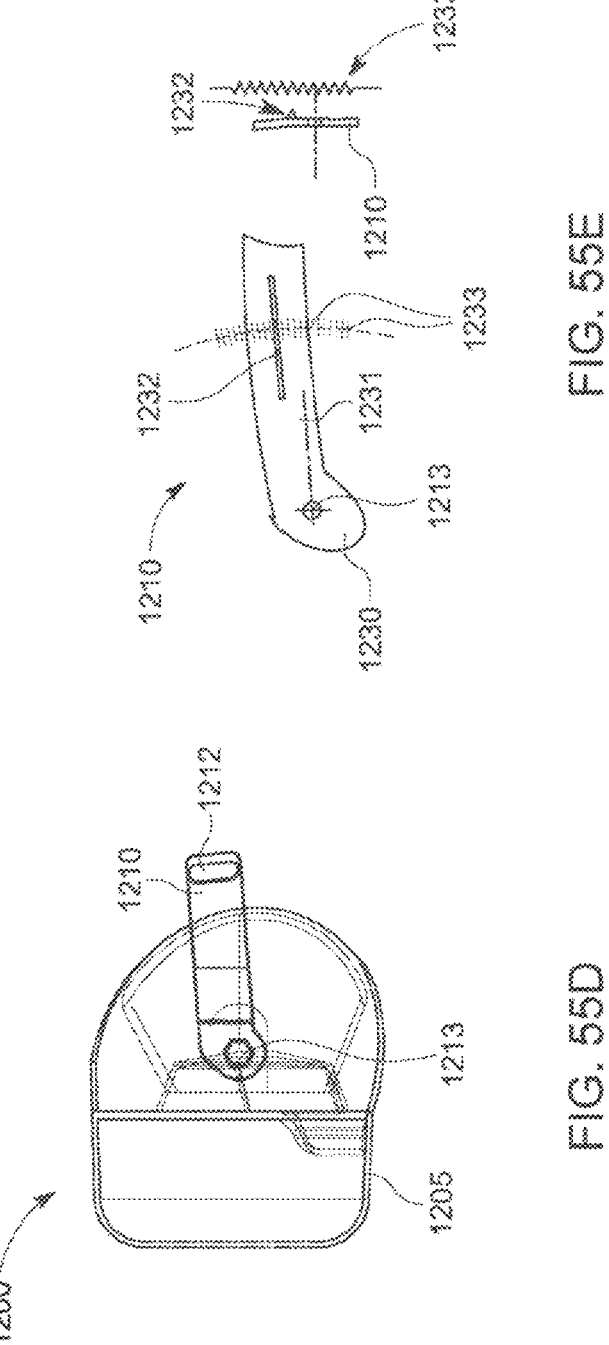
Figures 55F, 55G:
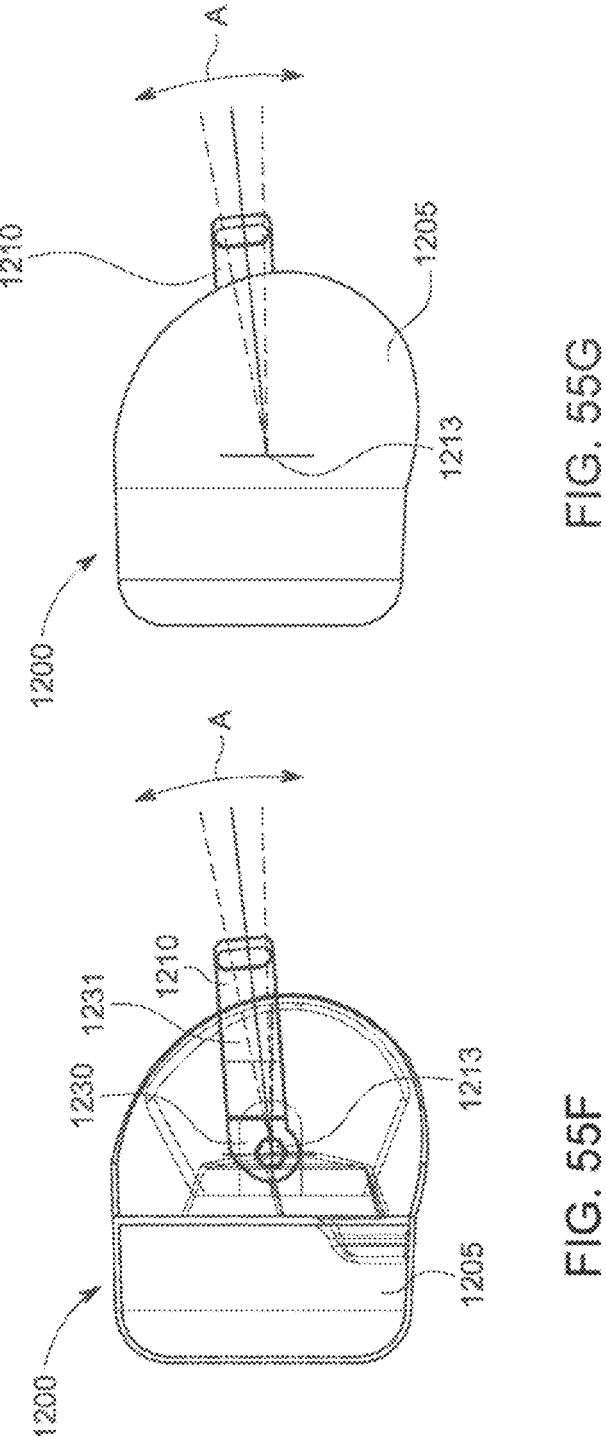
Figures 55H, 55I:
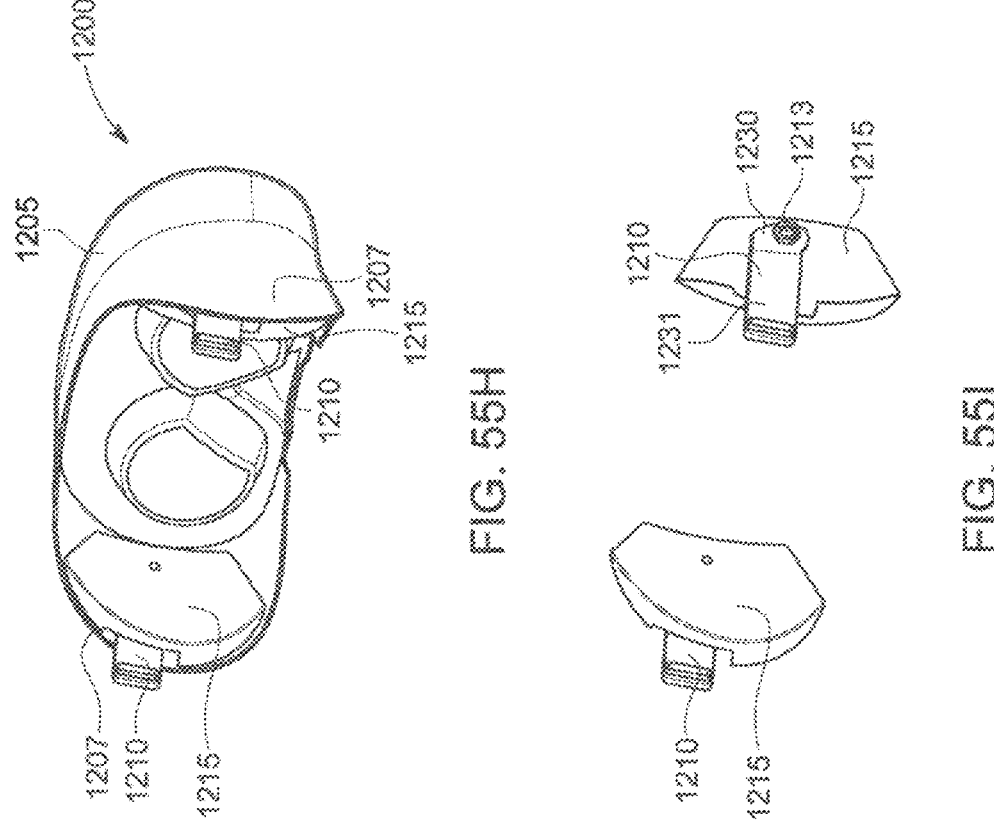
Figure 55J:
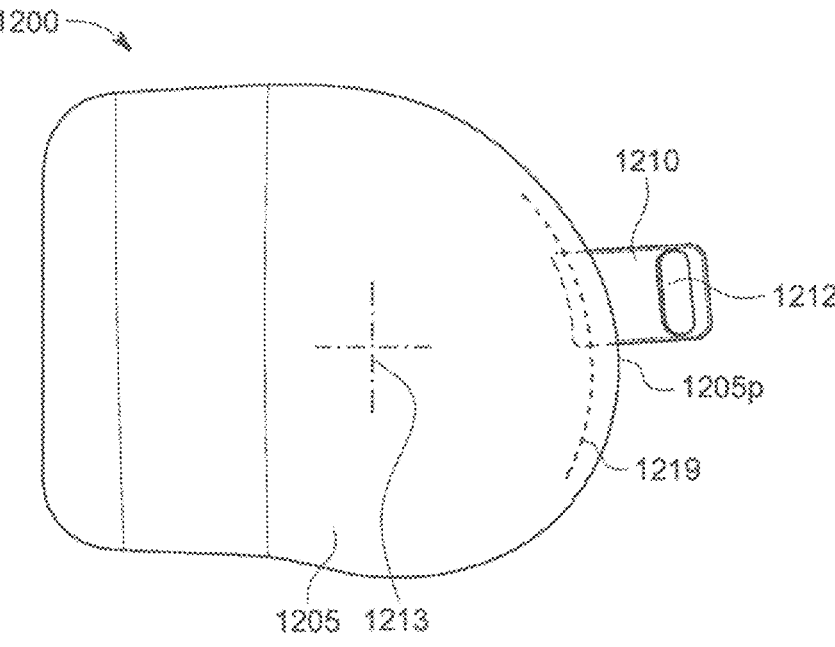

FIG. 55J shows a head-mounted display unit according to another example of the present technology.

Figure 55K:
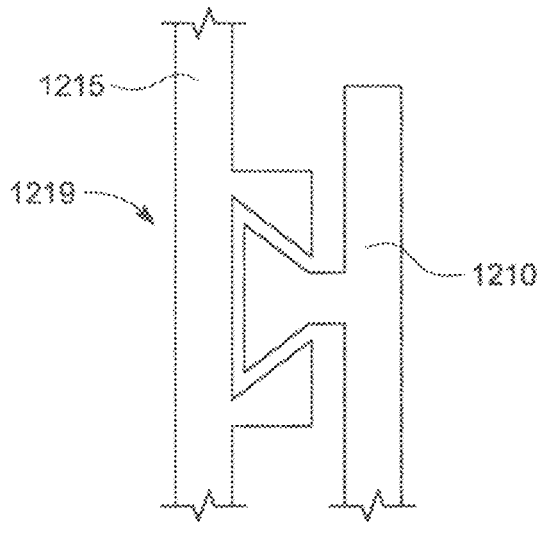
Figure 55L:
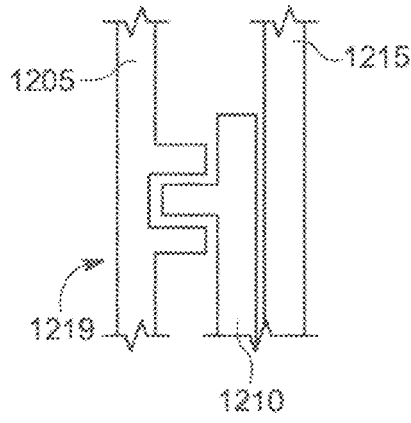
Figure 55M:
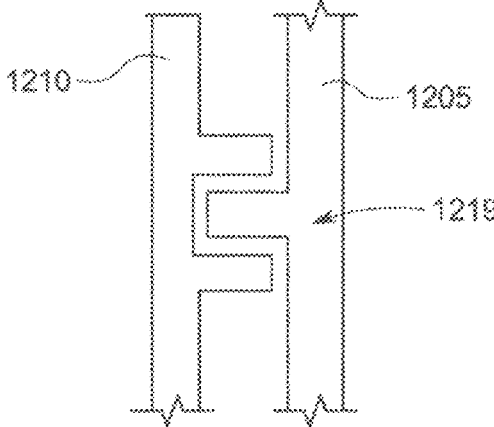

FIGS. 55K-55M show connections between an arm and a guide of head-mounted display units according to examples of the present technology.

Figure 56A:
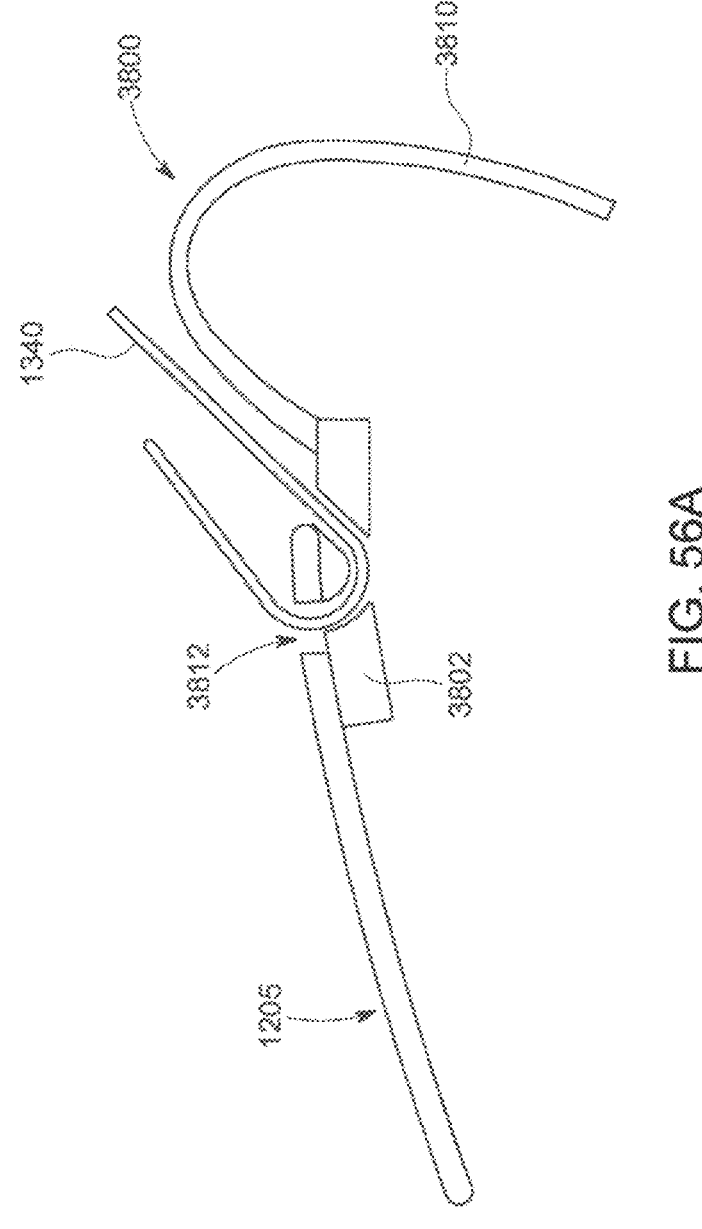
Figure 56B:
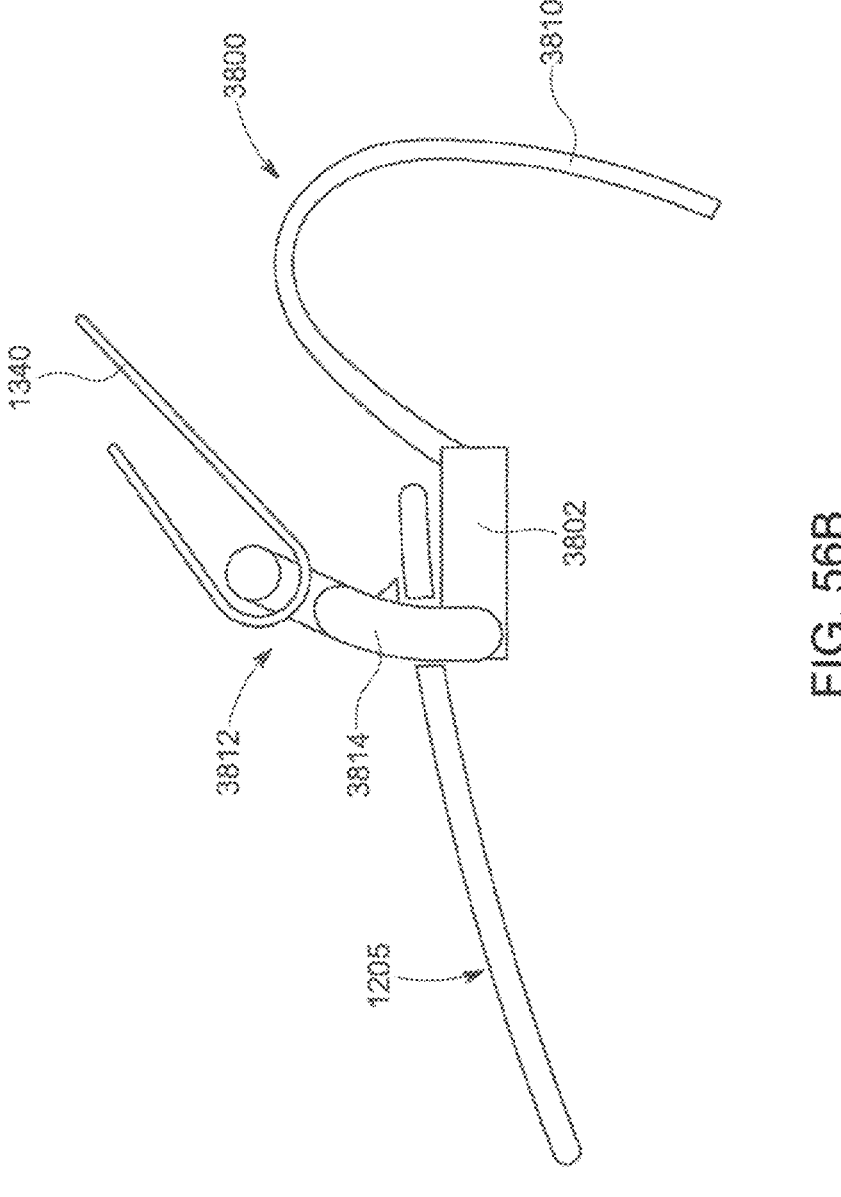

FIGS. 56A-56B show connections between a top strap portion and a display unit housing according to examples of the present technology.

FIGS. 57A-57D show a head-mounted display system according to another example of the present technology.

Figure 58B:
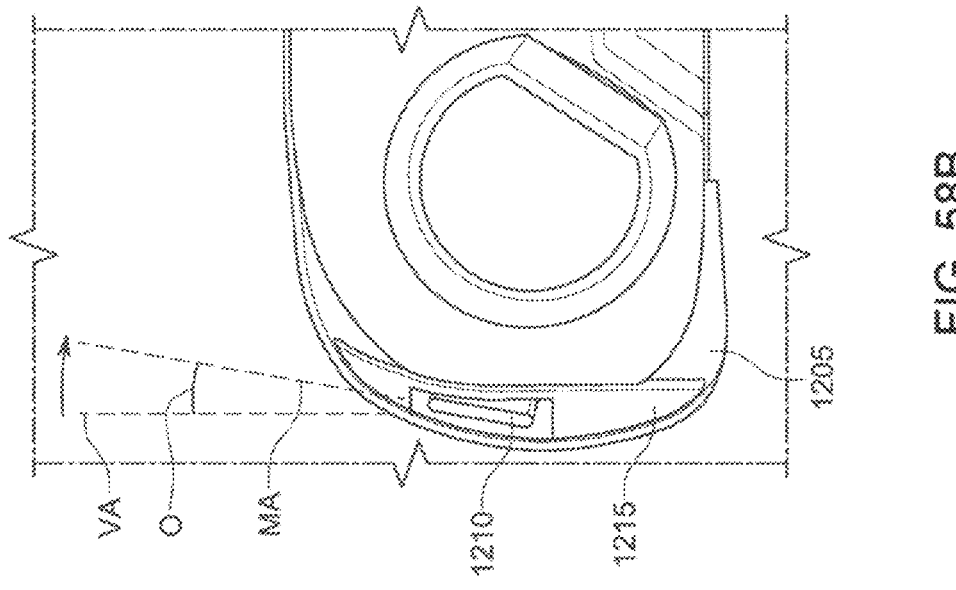
Figure 58A:
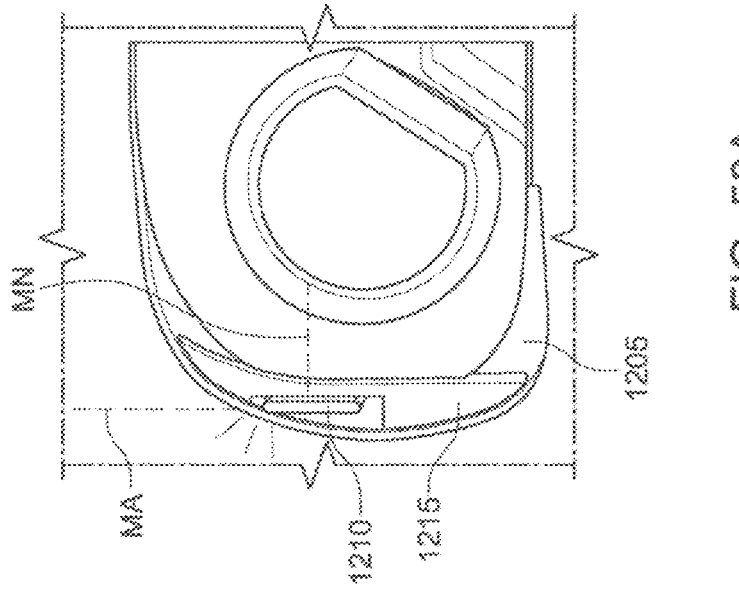

FIGS. 58A-58B show a display unit housing according to further examples of the present technology.

Figure 59A:
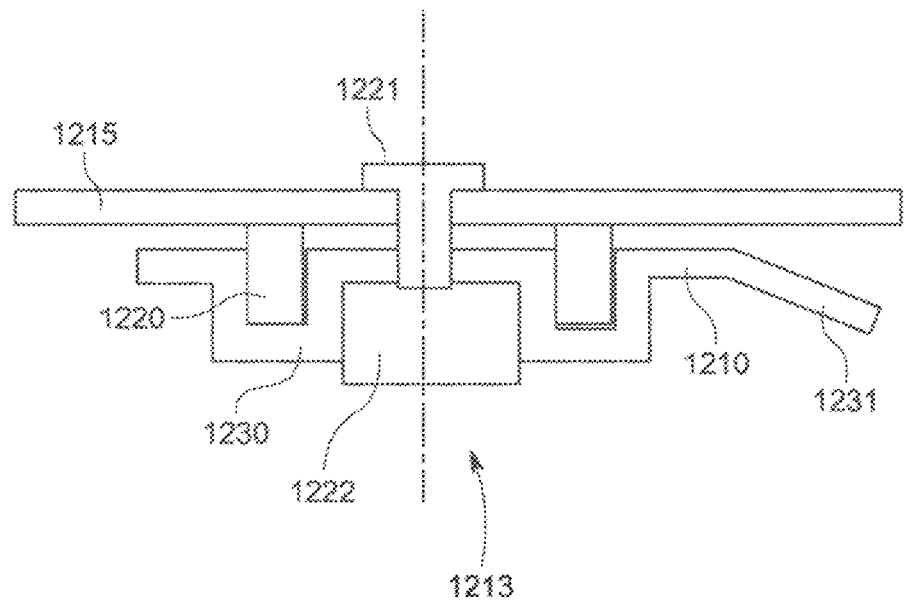
Figure 59B:
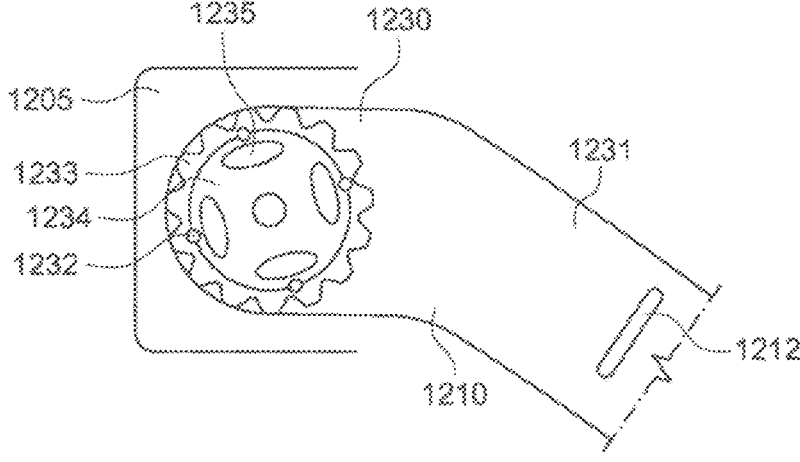

FIG. 59A shows an arm and arm mounting portion according to another example of the present technology.

59B-59N show connections between arms and display unit housings according to examples of the present technology.

Figure 60A:
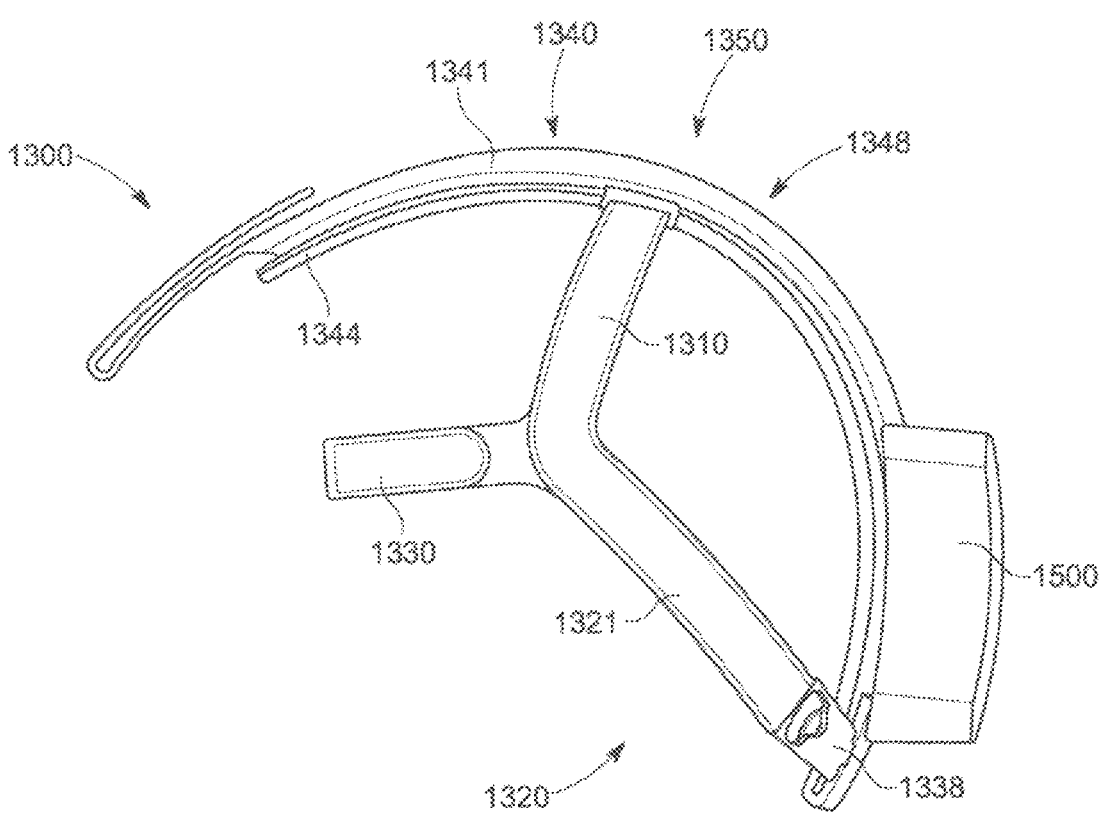
Figure 60B:
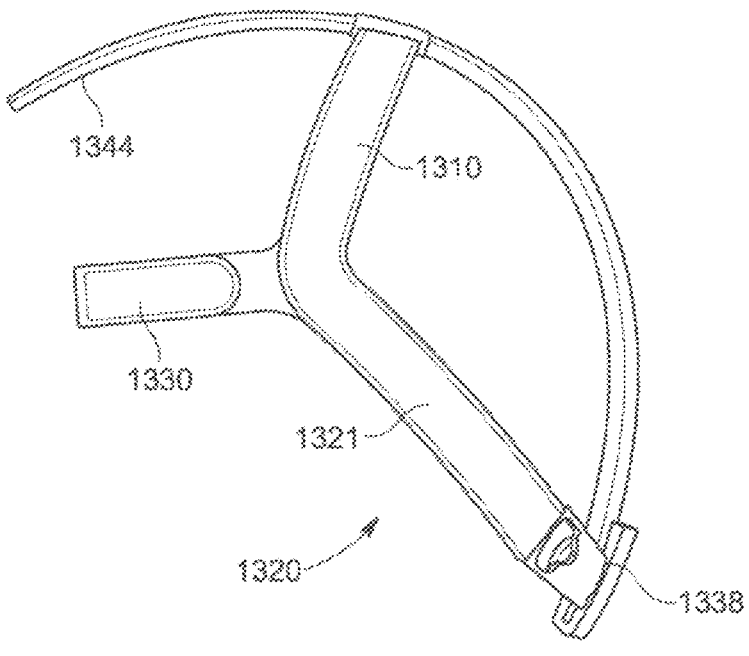
Figure 60C:
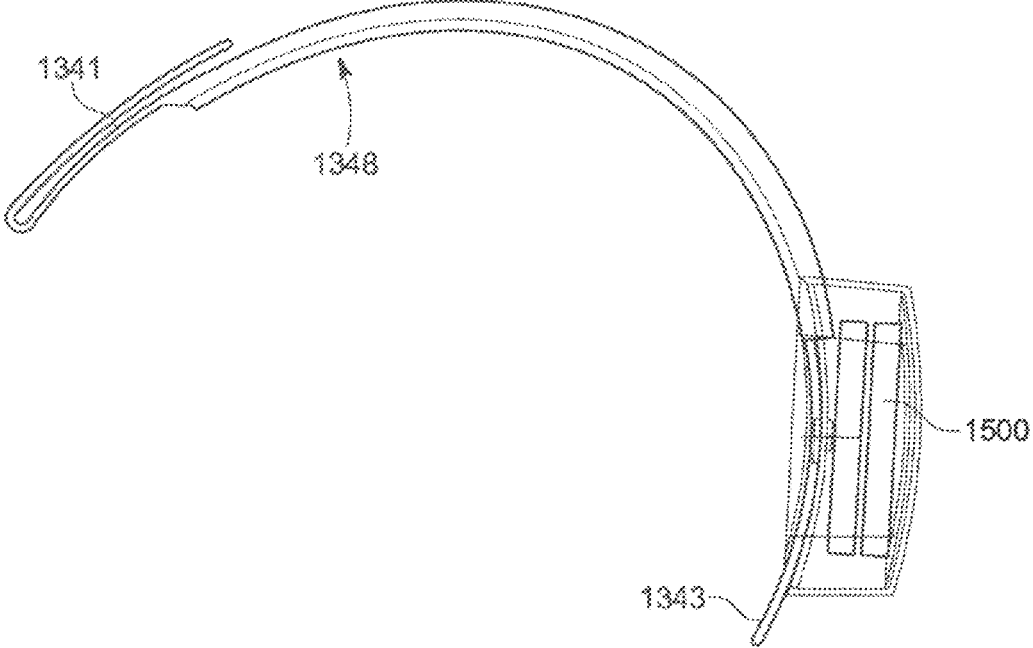

FIGS. 60A-60C show, in isolation, the positioning and stabilising structure of the head-mounted display system shown in FIGS. 57A-57D.

Figure 61A:
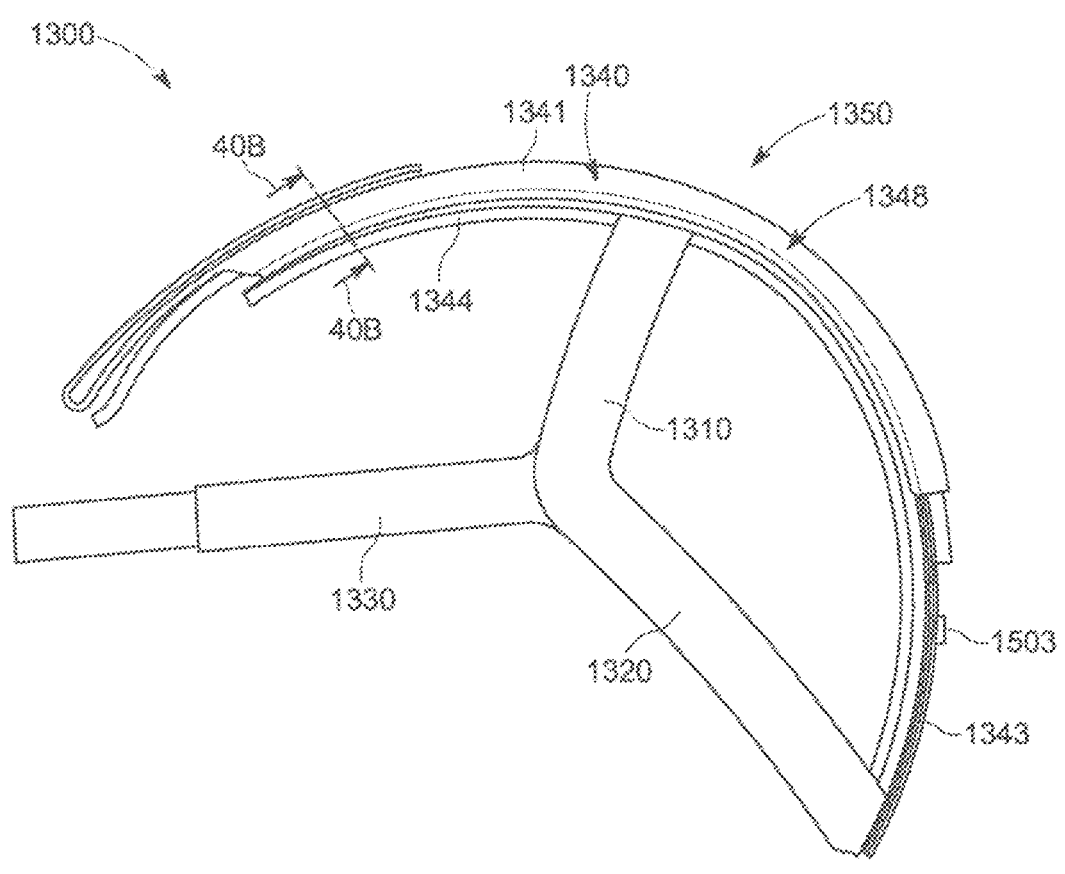
Figure 61B:
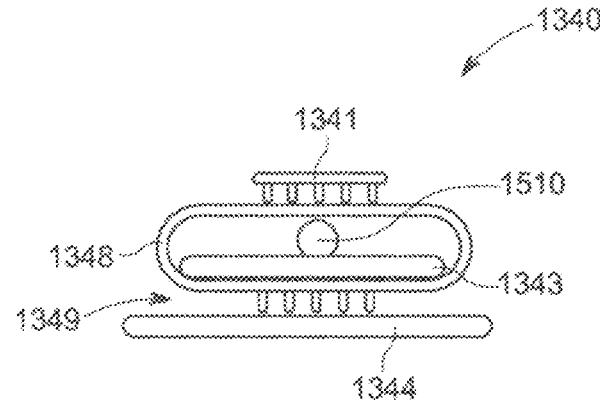

FIGS. 61A-61B show a positioning and stabilising structure according to another example of the present technology.

Figure 62A:
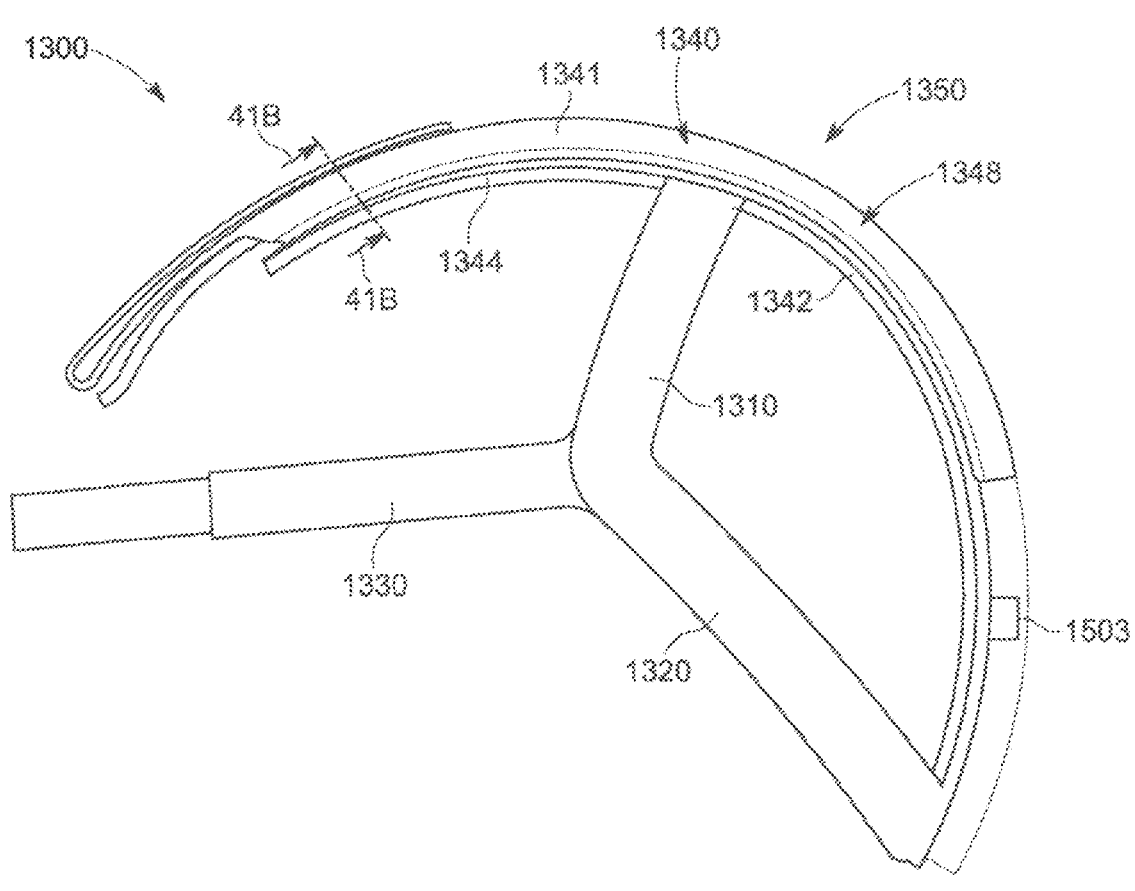
Figure 62B:
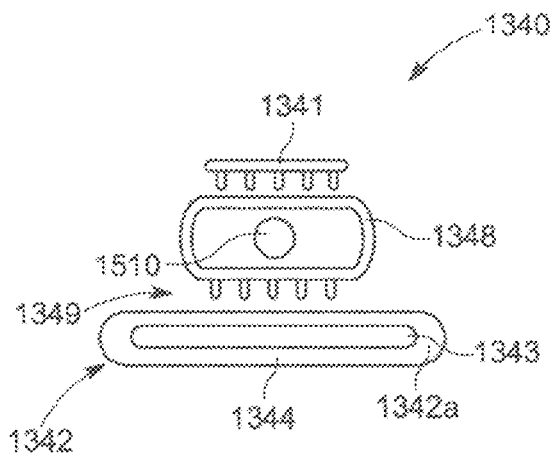

FIGS. 62A-62B show a positioning and stabilising structure according to another example of the present technology.

FIGS. 63A-63D show components of the positioning and stabilising structure show in FIGS. 62A-62B.

Figure 64A:
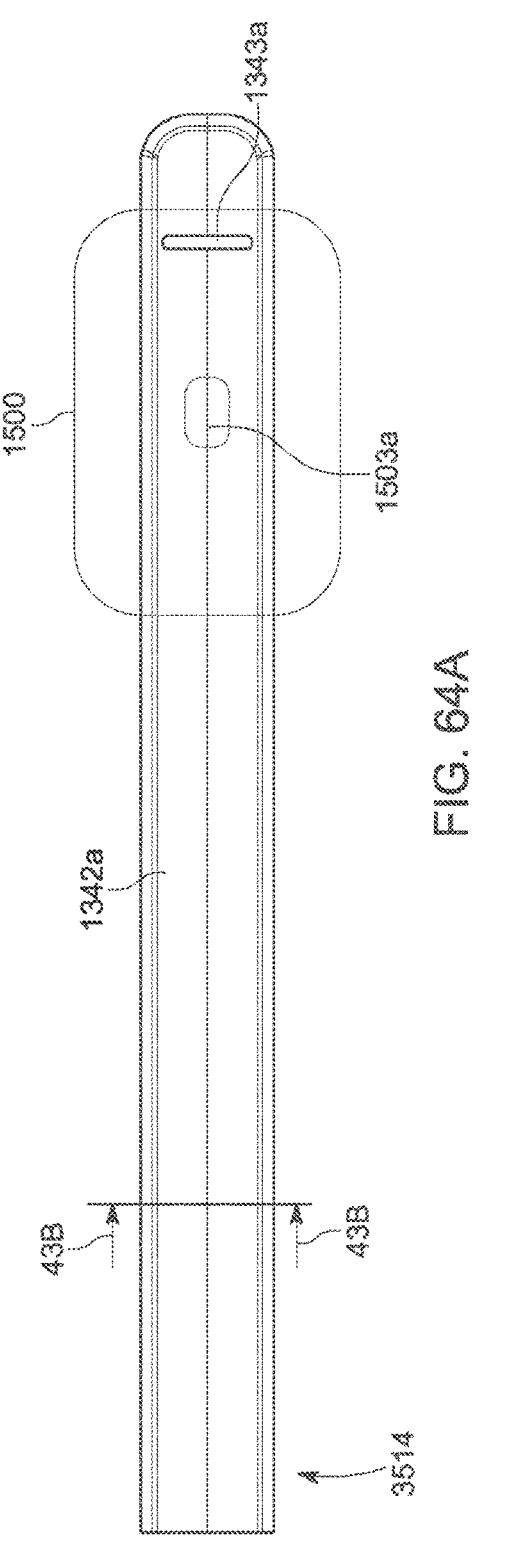
Figure 64B:
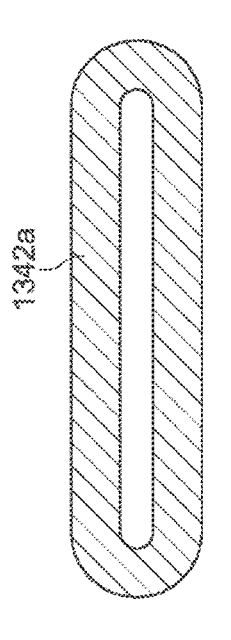
Figure 64C:
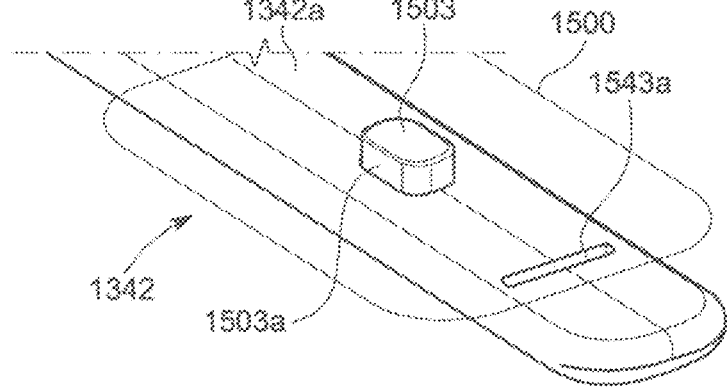

FIGS. 64A-64C show a sleeve of the positioning and stabilising structure shown in FIGS. 62A-62B.

Figure 64D:
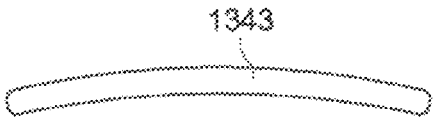

FIG. 64D is a cross section view of a substantially inextensible member according to another example of the present technology.

FIG. 65A-65D show an interfacing structure according to another example of the present technology.

Figures 65D, 66A, 66B:
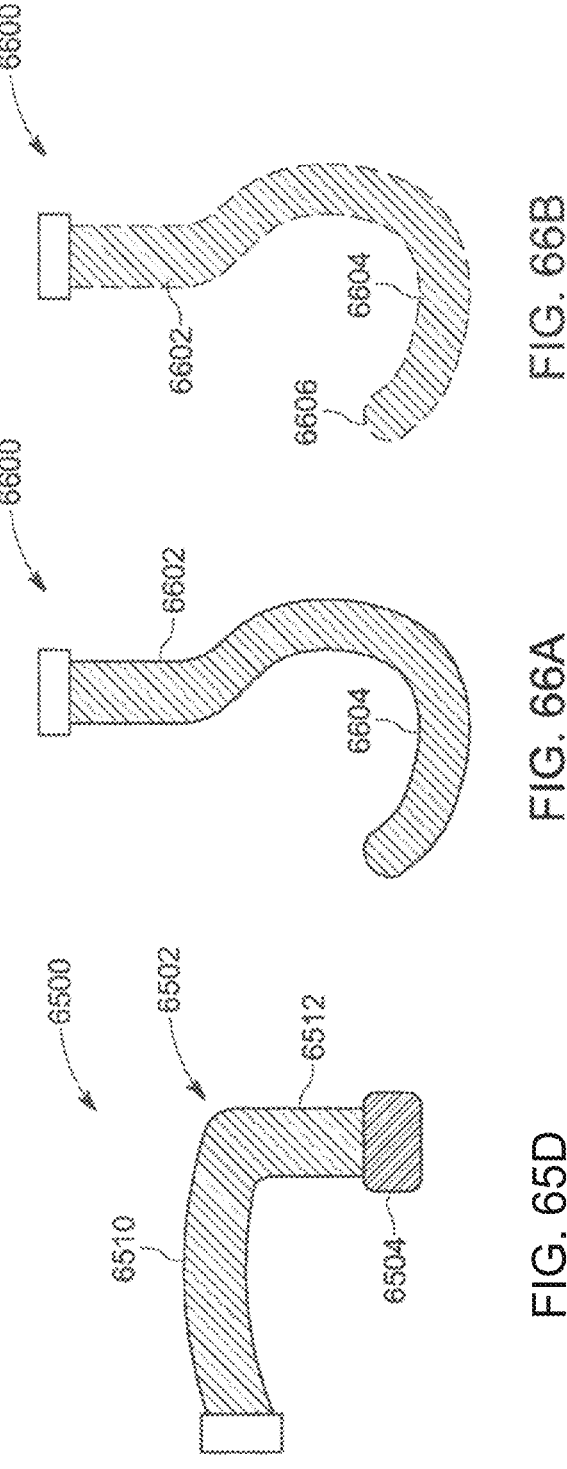

FIGS. 66A and 66B show an interfacing structure according to another example of the present technology.

Figure 67:
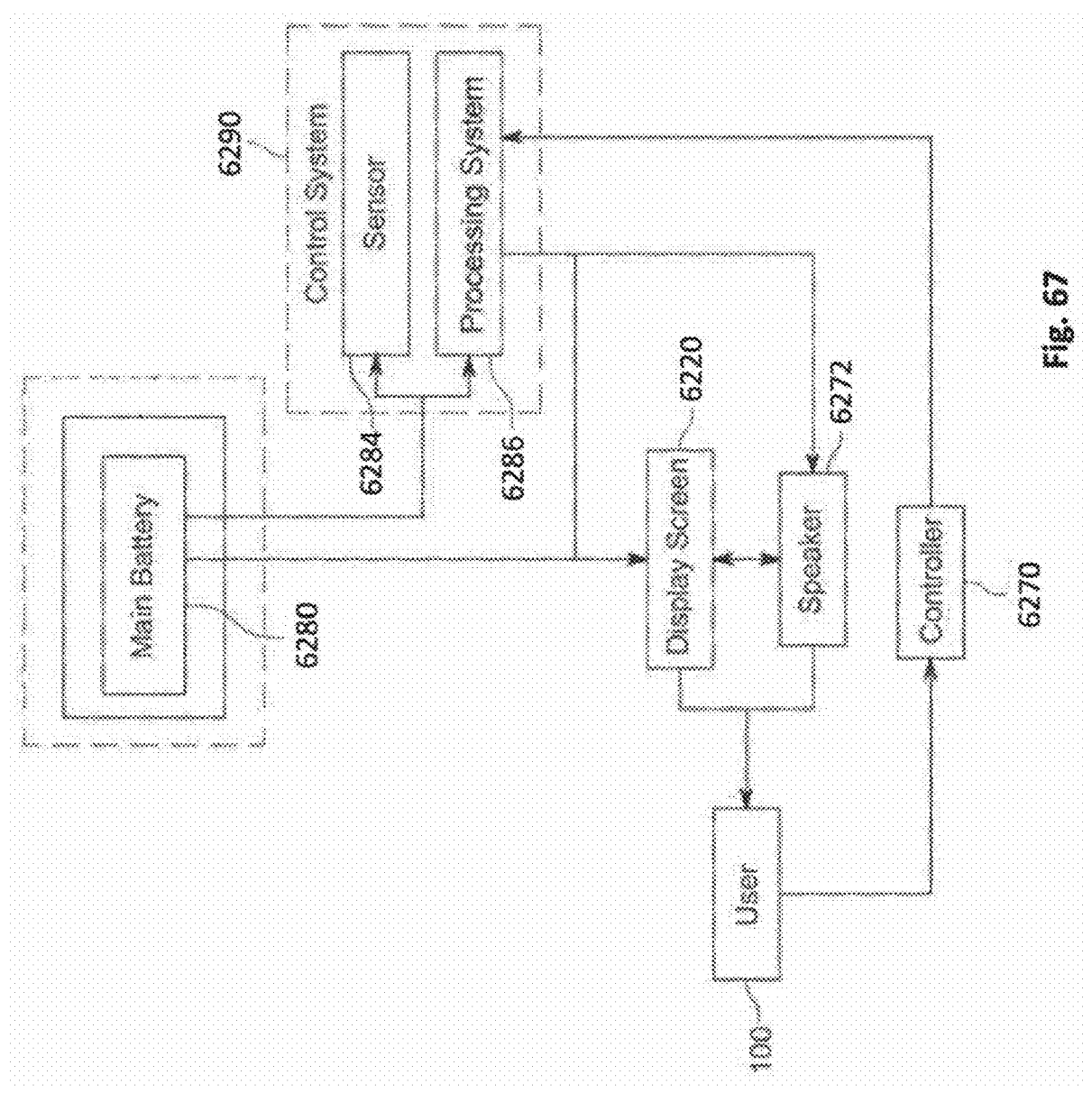

FIG. 67 shows a schematic view of a control system of one form of the present technology.

Figure 68:
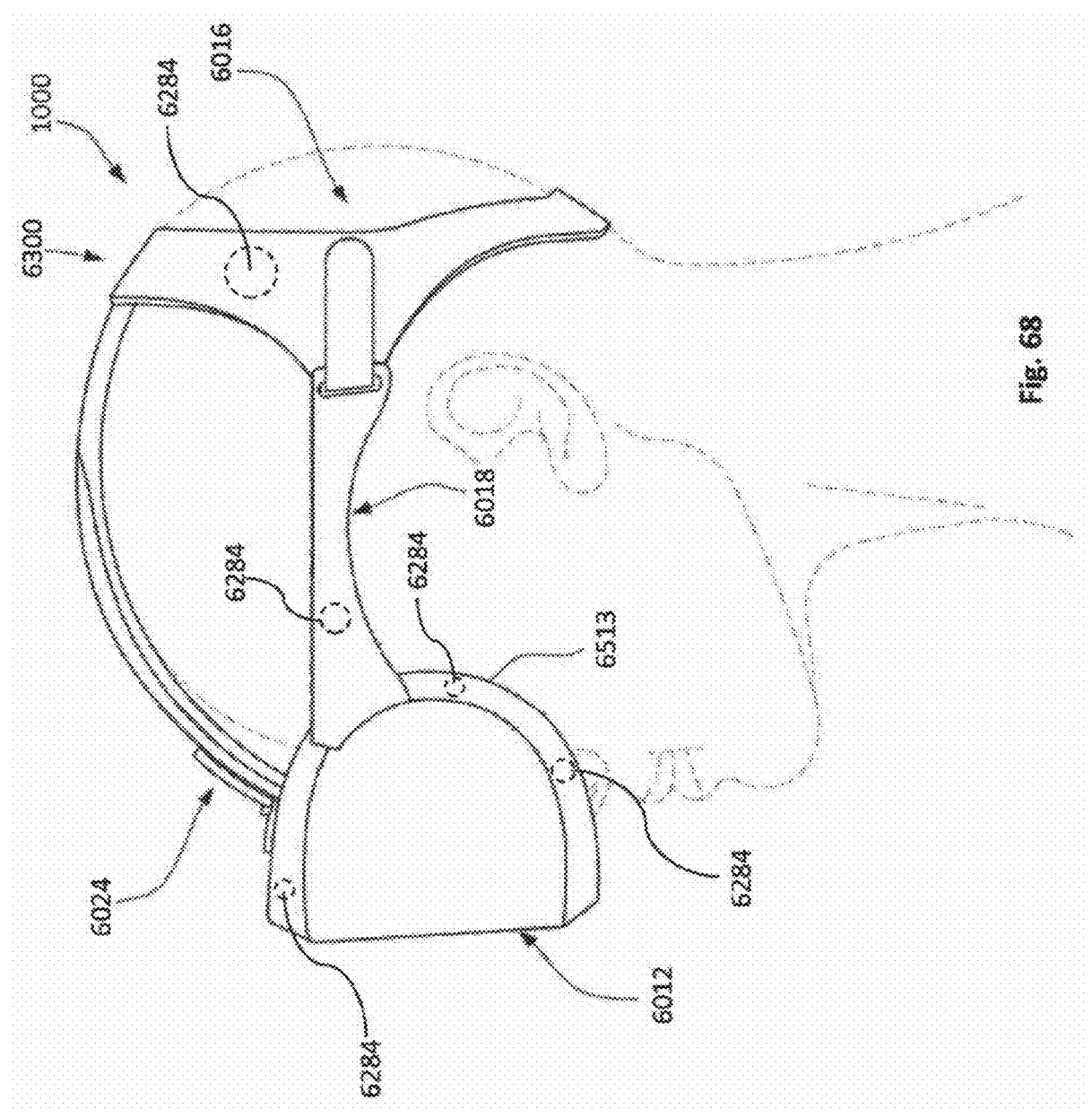

FIG. 68 shows a side view of an embodiment of a positioning and stabilising structure of a head-mounted display.

4 DETAILED DESCRIPTION OF EXAMPLES OF THE TECHNOLOGY

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

4.1 Head Mounted Displays

4.1.1 Positioning and Stabilising Structure

To hold the display unit in its correct operational position, the head-mounted display system further comprises a positioning and stabilising structure that is disposed on the user's head. The positioning and stabilising structures that are comfortable need to be able to accommodate the induced loading from the weight of the display unit in a manner that minimise facial markings and pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head mounted display may be used. As part of the immersive experience of a virtual environment, users' may communicate, i.e. speak, during while using the head mounted display. In this way, the jaw or mandible of the user may move relative to other bones of the skull. Additionally, the whole head may move during the course of a period of use of the virtual reality display. For example, movement of a users' upper body, and in some cases lower body, and in particular, movement of the head relative to the upper and lower body.

Referring to FIGS. 3a and 3b, disclosed is a first embodiment of a positioning and stabilising structure 14 for a head-mounted display system 10. The head-mounted display system 10 comprises a display unit 12, and the positioning and stabilising structure 14 to maintain the display unit 12 in position on a user's face.

In the illustrated version of FIG. 3, the positioning and stabilising structure 14 comprises a rear support hoop 16 that is positionable at a crown of the user's head, opposing temporal connectors 18 disposed on respective sides of the user's head that interconnect the rear hoop 16 to respective posterior edge regions 20 of the display unit housing 22, and a forehead support connector 24 that extends across the frontal bone of the user to interconnect the support hoop 16 with a superior edge of the display unit housing 22.

4.1.1.1 Temporal Connectors

The temporal connectors 18 each comprise temporal arms 26, having an anterior end 28 mounted to the posterior edge regions 20 of the housing 22, and a posterior end 30 that forms part of a releasable coupling to connect the temporal arms 26 to the support hoop 16.

In some forms, the temporal arms 26 comprise a rigidiser 32, a resilient (e.g. elastomeric and/or textile) component 34 and tabs 36 arranged at the posterior ends 30 for connecting to the rear support hoop 16. A portion of the temporal arms 26, in-use, are in contact with a region of the user's head proximal to the otobasion superior, i.e. above the user's ear. The arms 26 are arranged in-use to run generally along or parallel to the Frankfort Horizontal plane of the head and superior to the zygomatic bone, i.e. above the user's cheek bone.

An advantage of the positioning and stabilising structure 14 is that it is relatively self-supporting and/or able to hold its shape without being worn. This can make it more intuitive or obvious for users to understand how to use the positioning and stabilising structure and may contrast with a positioning and stabilising structure that is entirely floppy and does not retain a shape. In one form the rigidisers provide the self-supporting aspect of the positioning and stabilising structure.

4.1.1.2 Rigidisers

In some forms of the technology, for example in the rigidisers 32, the rigidisers can take the form of stiffened and/or thickened elements. The rigidisers 32 may be encapsulated within the resilient (e.g. elastomeric and/or textile) component 34 of the temporal arms 26. In some alternative forms, the rigidiser can be stitched to the resilient component. The rigidiser 32 can allow the arms 26, or other component to which it is connected or formed, to retain an in-use shape and configuration when not worn by a user. Advantageously, maintaining the rigidiser in the in-use state prior to use may prevent or limit distortion whilst the user is donning the positioning and stabilising structure and allow a user to quickly fit or wear the support assembly.

The rigidiser can be made from a rigid material e.g. hytrel (thermoplastic polyester elastomer). In the embodiment of FIGS. 3a to 3c, the rigid nature, i.e. inextensibility, of the arm 26 limits the magnitude of elongation or deformation of the arm while in-use. Advantageously, this enables a more effective, i.e. direct translation of tension through the arm.

In another embodiment, the positioning and stabilising structure may be designed so that e.g., the positioning and stabilising structure springs 'out of the box' and generally into its in-use configuration. In addition, the positioning and stabilising structure may be arranged to hold its in-use shape once out of the box, for example a rigidiser may be formed to maintain the shape of some or part of the positioning and stabilising structure. Advantageously, the orientation of the positioning and stabilising structure is made clear to the user as the shape of the positioning and stabilising structure is generally curved much like the rear portion of the user's head. That is, the positioning and stabilising structure is generally dome shaped.

Another aspect of the positioning and stabilising structure described herein is to direct the display unit 12 to direct contact with the users' face, that is, the vectors of the positioning and stabilising structure may cause the display unit to apply pressure perpendicular or normal to the users' face.

The rigidiser 32 forms a lever-arm, i.e. a means to pivot, about the rear support hoop 16. Advantageously, the support hoop 16 can provide an anchor point for the positioning and stabilising structure 14, thus forming a pivot point. The rigidiser may articulate about the anchor point of the hoop 16 to enable the forehead support connector 24 to raise or lower the position of the display unit 12 relative to the user's nose. Advantageously, this can minimise the magnitude of clamping pressure required to stabilise the display unit 12 on the user's head.

In some forms of the present technology, as shown in FIGS. 7a and 7b, the rigidiser (e.g. arm 32) may take a crescent or semi-circular shape. In other forms, as shown in FIG. 3a, the rigidiser 32 can take the form of a partial crescent shape.

The rigidiser arm 32 may have a generally elongate and flat configuration. In other words, the rigidiser arm is far longer and wider (direction from top to bottom in the paper plane) than thick (direction into the paper plane).

While the rigidiser arm may be flat as represented in FIGS. 3-5, it will be appreciated that the rigidiser arm may have a desired spatial configuration in the direction into the paper plane (see e.g., FIGS. 6-7), particularly in order to allow improved alignment with the shape of a users' face, such as the shape of a users' head side region (see specifically, e.g., FIG. 7c). Referring to FIGS. 6 and 7a, c, the rigidiser arm has a three-dimensional shape which has curvature in all three axes (X, Y and Z). Although the thickness of the rigidiser arm may be substantially uniform, its height varies throughout its length. The purpose of the shape and dimension of the rigidiser arm 32 is to conform closely to the head of the user in order to remain unobtrusive and maintain a low profile (ie. not appear overly bulky).

The rigidiser arm may have a longitudinal axis which may be understood to be the axis substantially parallel to the paper plane, along which the rigidiser arm extends (see dashed line in FIGS. 5a and 7a as examples).

In some forms of the technology, the rigidiser (such as rigidiser arm 32) is more rigid than the resilient (e.g. elastomeric and/or textile) component 34 and less rigid than the display unit housing 22. In particular, the rigidiser arm and/or the textile component are such that in combination the rigidiser arm imparts a shape, and an increased degree of rigidity in at least one direction or in or around at least one axis, to the resilient component.

The rigidiser may be able to bend or deform along its length but resist or prevent stretching of the positioning and stabilising structure along the longitudinal axis of the rigidiser (see dashed line in FIGS. 5a and 7a). The rigidiser may be substantially inextensible and resilient. A rigidiser in accordance with the present technology preferably has one or more of the following features: holds it shape, allows components to redirect force vectors around curves such as around the cheeks, or around the ears, ability to flex and/or in certain planes provides a structure to maintain a predefined form.

The rigidisers can be flexible or able to conform to the users' head along the longitudinal axis of the rigidiser. The rigidisers, however, cannot flex or deform across their width. This is so that the positioning and stabilising structure is comfortable whilst maintaining its structural function of anchoring the display in position.

In some forms, the rigidiser may have bows or bends. Bends may be provided in select region(s) of rigidiser to allow the rigidiser to readily flex or hinge at the region(s). Bends may be weakened regions to achieve a flexibility in the rigidiser so that the weakened portions act as live hinges. This may be beneficial for fitting a larger range of user head sizes. The bends may be positioned so as to allow portions of the rigidiser to flex outwards towards the ears of the user or inwards towards the centre of the users' head.

In some forms, the rigidiser comprises a plurality of slots (e.g. on each side of the arm, i.e., slots on anterior and posterior sides of the arm) forming a plurality of hinges along the component (such as temporal connector 18). The hinges form flexible portions in each arm. The hinges allow the arms to articulate and conform to micro variations of the cheek region and distribute load on the face more evenly upon headgear tension, e.g., when compared to a rigidiser arm without any flexible portions. In some forms, where the rigidises are elongate extending in a general longitudinal direction, the hinges and/or weakened regions may extend transverse to the longitudinal direction or may extend in the longitudinal direction to increase the degree of conformity allowed.

The slots are generally parallel to one another, generally evenly spaced apart from one another, and include similar widths and depths into the thickness of the arm. However, it should be appreciated that the slots may include other suitable arrangements and configurations to modify the location and flexibility characteristics of the arm, for e.g., number of slots, slots on one or both sides of the arm (anterior and/or posterior sides), spacing between slots, width, depth, orientation or angle of slot on the arm (e.g., slots angled relative to one another to provide bending in different orientations). In an example, one or more of the slots may be filled with a flexible material. In an alternative example, the hinge may be provided by a plurality of flexible sections (by material) spaced apart by rigid segments.

In some forms, the rigidiser may be comprised of a material to guide or define the direction or path of stretch for the resilient (e.g. elastomeric and/or textile) component, i.e. of the hoop 16. In other words, the user stretches the positioning and stabilising structure 14 in a direction substantially parallel to the longitudinal axis of the rigidiser 32 (see dashed line in FIG. 7a). Stretching of the positioning and stabilising structure in other directions leads to rotation of the rigidiser relative to the display unit housing 22 which is undesirable. The rigidity of the rigidiser biases the rigidiser towards its natural, unrotated, untwisted and undeformed state. To some degree, this enables the positioning and stabilising structure to be a self-adjusting head-mounted display system.

In some forms, a resilient (e.g. elastomeric and/or textile) component may be encapsulated by rigidiser. For example, a textile may be over-moulded onto one side of the rigidiser. The rigidiser may be encapsulated within a suitable resilient (e.g. elastomeric and/or textile) material to improve user comfort and wearability. The textile may be arranged on the user contacting side of the rigidiser to provide a soft contact with the users' skin.

In some forms, the rigidiser may be formed separately to the resilient component and then a sock of user contacting material (e.g., Breath-O-Prene™) may be wrapped or slid over the rigidiser. In alternative embodiments, the user contacting material may be provided to the rigidiser by adhesive, ultrasonic welding, sewing, hook and loop material, and/or stud connectors. In an embodiment, the user contacting material may be on both sides of the rigidiser, or alternatively may only be on the user contacting side of the rigidiser to reduce bulk and cost of materials.

The rigidiser may also be formed by a layer of additional material applied to the resilient component, such as silicone, polyurethane or other tacky material, that may be applied to the resilient component to reinforce the component. Silicone beading or polymeric over-moulding may also be used.

The rigidiser may have composite construction with two or more materials (rigid or semi-rigid material). For example, the rigidiser may be constructed by thickening or treating a textile such that it is stiffer or impedes the stretch of the material. In a specific example, the textile may be printed on such that the ink from the print restrains or reduces the capacity of the textile to stretch. Additionally, the textile may be stitched in selected regions to stiffen it. Also, the textile may be ultrasonically welded in selected regions to stiffen it.

In some alternative forms, the rigidiser may be constructed from a non-woven material, for example netting, such that it is resistant to stretching in at least one direction. The rigidiser may alternatively be formed from a woven material, where the grain of the material is aligned such that the textile may not stretch in the lateral direction (when positioned on the users' head) to secure and anchor the positioning and stabilising structure in position on the users' head.

In an example, the rigidiser can be formed from Hytrel® and the display unit housing 22 may be formed from polypropylene (PP). PP is a thermoplastic polymer with good resistance to fatigue. Hytrel® is desirable for forming the rigidiser 32 because this material is resistant to creep. Since these materials cannot be integrally bonded the housing may be overmolded to the rigidiser, in this example, to form a secure connection, i.e. a joint between the anterior end 28 of the arm 26 and the posterior edge regions 20 of the housing 22.

In alternative forms, the rigidiser (such as the rigidiser arm) may be made from thermoplastic elastomer (TPE) which provides high elastic properties. For example, a Dynaflex™ TPE compound or Medalist® MD-1 15 may be used. The housing may be made from polypropylene (PP) material. An advantage of the rigidiser being moulded in TPE may be that it enables the rigidiser and the housing to be permanently connected to each other. In other words, a fusion bond or chemical bond (molecular adhesion) is formed between the two components.

The joint that connects rigidiser to the housing may provide a targeted point of flexibility and the joint may be shaped and formed to allow flexing in a desired direction and degree. Thus, once the user interface is donned and the temporal arms 26 are stressed by tension from the hoop of the positioning and stabilising structure 114 the rigidiser 32 may flex at the joints to allow them to retain a face framing shape while helping to retain the temporal arms 26 in a desired position relative to the users' face.

Although the rigidiser and display unit housing have been described as permanently connected to each other, it is envisaged that the rigidiser (i.e. temporal arm) may be detachable from the housing, for example, by a mechanical clip (snap-fit) assembly.

4.1.1.3 Rear Support Hoop

The rear support hoop 16 may have a ring-like form (as best shown in FIG. 7b) and be arranged to have a three-dimensional contour curve to fit to the shape of a user's crown. The hoop 16 comprises a parietal portion 38, being in proximity to the parietal bone of head, and an occipital portion 40, being in proximity to the occipital bone. The occipital portion is preferably arranged beneath the occipital bone, and the parietal portion is preferably arranged rearward of the coronal plane.

The three-dimensional shape of the support hoop may have a generally round three-dimensional shape adapted to cup the parietal bone and occipital bone of the users' head in use.

The occipital portion 40 engages with the occipital bone in order to maintain the occipital portion 40 and the hoop 16 in position and prevent the positioning and stabilising structure from riding up the back of the users' head in-use. Further, the parietal portion 38 could capture or pass over the upper part of the user's parietal bone in-use, so as to prevent the positioning and stabilising structure from slipping back down the users' head in-use.

The hoop 16 further comprises connection straps or tabs 42 (FIG. 3a).

The support hoop 16 is orientated in a generally vertical direction, i.e. arranged in a vertical plane generally parallel to the coronal plane. This arrangement of the hoop appropriately orients the hoop at the crown of the user's head to support the transverse, i.e. horizontal, tension applied by the connection straps 42 and support the weight of the display unit 12, in-use, at the anterior of the user's head.

The support hoop 16 and straps 42 may be formed from an elastic material to assist conforming to the shape of a user's head. For example, the support hoop 16 may be a neoprene material, or other textile-foam composite, or spacer fabric. Advantageously, textiles can provide a soft support structure to stabilise the display unit 12 on a user's head and allow the positioning and stabilising structure 14 to cushion against the user's head for optimised comfort.

The hoop, including portions of the temporal arms 26, may be stretchable. This enables the positioning and stabilising structure 14 to be stretched which leads to a comfortable force-displacement profile.

4.1.1.4 Adjustable Straps

The straps or tabs will be understood to be a structure designed to resist tension. In use, a strap 42 is part of the positioning and stabilising structure 14 that is under tension. In certain forms of the present technology, the strap 42 can be bendable and e.g. non-rigid. An advantage of this aspect is that the strap is more comfortable for a user to tension against their head.

Some straps will impart an elastic force as a result of this tension, as will be described. The straps of the positioning and stabilising structure 14 provide a retention force to overcome the effect of the gravitational force on the display unit 12. In this way, a strap may for part of the positioning and stabilising structure to maintain a light-sealing position of the display unit on the users' head.

In some forms the positioning and stabilising structure 14 provides a retention force as a safety margin to overcome the potential effect of disrupting forces on the user interface in-use, such as from head and body movement, or accidental interference with the display unit. The strap may be configured in-use to direct a force to draw an interfacing surface of a display unit 12 into sealing contact with a portion of a users' face. In an example the strap may be configured as a tie.

In the form of FIGS. 3a to 3c, the straps 42 are adjustable and operate to change the distance between the hoop 16 and the display unit housing 22. The straps 42, in use, are threaded through an eyelet 44 in each end region 36 of temporal arms 26. The length of the strap 42 between the end regions 36 of opposing temporal connectors 18 may be adjusted by pulling more or less of the strap 42 through one or both of the eyelets 36. The strap 42 may be secured to itself after passing through the eyelets in the tabs, for example, with hook-and-loop fastening means. The rear hoop 16 therefore is able to be adjusted to fit around different head sizes.

In some arrangements not shown, the straps or rigidiser provide a press stud arrangement. For example, the rigidiser may include a portion with a plurality of holes and one end of strap 42 may provide a stud (e.g., over-moulded or sonically welded to the strap) adapted to be press fit into a selected one of the holes. The stud and holes are configured to provide a snap-fit arrangement. In other forms, the strap could be secured to itself with an arrangement of holes and studs.

In some arrangements an adjustment mechanism is provided for adjusting the distance between the hoop 16 and the display unit housing 22. The rigidisers may comprise an aperture to loop the strap 42 therethrough. The rigidisers may be provided with a push-tab that is pre-loaded or biased with spring so as to allow for engagement and disengagement of the looped through portion of the strap 42. A gripping portion may be provided on an opposite side of the aperture to the push-tab for the user to stabilize the positioning and stabilising structure on their face. The gripping portion may prevent disassembly of the looped portion by preventing it from pulling back through aperture.

In certain forms of the present technology, more than one positioning and stabilizing structure 14 is provided, each of the positioning and stabilising structures being configured to provide a retaining force to correspond to a different size and/or shape range. For example, one form of positioning and stabilizing structure 14 may be suitable for a large sized head, but not a small sized head, and another form of positioning and stabilizing structure may be suitable for a small sized head, but not a large sized head.

4.1.1.5 Modifications to Rear Support 4.1.1.5.1 Extended Rigidiser

Referring now to FIGS. 5a-5c, like reference numerals denote similar or like parts with the addition of 200 to allowing distinguishing between embodiments. In a third embodiment, the support for a head-mounted display assembly 210 does not comprise the forehead support.

In a fourth embodiment as shown in FIG. 6, like reference numerals denote similar or like parts with the addition of 300 to allowing distinguishing between embodiments. The support for a head-mounted display 310 assembly comprises opposing temporal connectors 318 having temporal arms 326 with extended rigidisers 358. The extended rigidiser 358 may be extended from the temporal arms 326 to the hoop 316 to enhance support of the display unit 312, in use. The rigidisers 358 can be extended along a portion of the hoop 316 and into both the parietal 338 and occipital 340 portions, i.e. to generally take a Y-shaped form or may as shown only extend along the occipital portion 340 as discussed later. The parietal and occipital portions of the extended arms are positioned proximal to the parietal and occipital bones of the user's head to support respective portions of the hoop 316.

The extended rigidisers 358 increase the length of the connectors 318 so as to increase the lever-arm moment created about the rear support hoop 316. In use, the larger lever-arm extends the moment of inertia further rearward of the user's head when compared the first and second embodiments. Advantageously, this can provide more comfort to the user by decreasing the tension applied to the forehead support connector necessary to support the display unit 312.

Additionally, the extended arms 358 may provide a more even distribution of pressure on the user's head under the weight of the display unit and any clamping force applied by tension induced in the positioning and stabilising structure.

The extended arms can help prevent the rear support hoop 316 of the positioning and stabilising structure 314 from translating vertically upwards, i.e. riding upwards on the user's head when tensioning the forehead support connector 324. The extended arm 358 can more effectively secure the occipital portion 340 of the hoop beneath the corresponding occipital bone of the user's head.

In other words, the occipital portion 340 of the extended rigidisers 358 engages with the occipital bone in order to maintain the occipital portion 40 and the hoop 16 in position when in-use. Further, the parietal portion 338 of the extended rigidisers 358 could capture or pass over the upper part of the users' parietal bone in-use, so as to prevent the positioning and stabilising structure from slipping back down the users' head when in-use.

In an embodiment, each of the parietal 338 and occipital 340 portions may have different elastic properties so as to provide increased stability to the positioning and stabilising structure on the users' face in-use.

In an example, the parietal portion 338 may be constructed from an extensible material to allow for adjustment of the positioning and stabilising structure when in-use. For example, the parietal portion 338 may be made from an elastic material. The extensibility provided by the elastic parietal portion may allow for a greater fit range of users. Additionally, the occipital portions 340 may be made from a material with lower extensibility than that of the parietal portion 338. That is, the occipital portions 340 may be constructed of a material with less stretch for a given force when compared to the material used for the parietal portion 338. This is to secure the positioning and stabilising structure in position while allowing for some adjustment of the display unit position on the face of the user.

4.1.1.5.2 Biased Extended Rigidiser

Referring now to FIGS. 7a-7c. A variation of the fourth embodiment is shown in-use wherein the temporal arms 326 comprise biased extended rigidisers 360. The biased extended rigidisers 360 may extend from the temporal arms 326 to the occipital 340 portions of the hoop 316, i.e. to generally take a J-shaped form, so as to enhance support of the display unit 312, in use.

The biased rigidisers extend below the occipital bone of the user's head to securely anchor the positioning and stabilising structure 314 so as to support the device unit 312 above the user's nose and cheek.

As best shown in FIGS. 7a and 7c, the biased extended rigidisers can further comprise a medial and temporal adjustment mechanisms 362, 364. The medial adjustment mechanism 362 can be mounted about the medial region of the occipital portion of the arms 360. The adjustment mechanism can be a strap threaded through opposing holes 363 in each of the posterior ends 368 of the opposing arms 360. The distance between the opposing arms can be controlled by pulling more or less of the strap through the tabs.

The temporal adjustment mechanism 364 can be disposed on the temporal arm, along the temporal region of the user's head. The adjustment mechanism can be adjustable and operate to change the distance between the biased extended rigidisers 360 and the display housing 322.

The biased extended rigidisers may be formed from a flat component and then bent or deformed into a shape suitable for use. For example, the rigidiser may be die cut from sheet material.

4.1.1.6 Adjustable Support Hoop and Offset Configuration

Referring to FIGS. 9a to 10c, disclosed is a further embodiment of a positioning and stabilising structure 514 for a head-mounted display system 510. The head-mounted display system 510 comprises a display unit 512, and the positioning and stabilising structure 514 to maintain the display unit 512 in position on a user's face.

The positioning and stabilising structure 514 comprises a support hoop 516 that is positionable between a frontal bone and a temporal bone of the user's head, and opposing connectors 518 disposed on respective sides of the user's head that interconnect the hoop 516 to respective posterior edge regions 520 of the display unit housing 522. Note that the connectors 518 connect to a portion of the support hoop 516 at a location closer to the mid coronal plane, as compared to the anterior coronal plane of the head, when in use.

The connectors 518 each comprise arms 526, having an anterior end 528 mounted to the posterior edge regions 520 of the housing 522, and a posterior end 530 that forms part of a coupling 564 to connect the arms 526 to the support hoop 516.

The support hoop 516 can have a three-dimensional contour curve to fit to the shape of a user's head. The hoop comprises a frontal portion 538, arranged to generally locate on, or between, either of the frontal bone or parietal bone, and an occipital portion 540, being arranged to generally locate on, or between, either of the occipital bone or parietal bone. The occipital portion 540 is preferably arranged beneath the occipital bone, and the frontal portion 538 is preferably arranged forward of the coronal plane extending through the otobasion superior.

The frontal portion 538 and occipital portion 540 can be rigid components and comprise adjustment mechanisms 562. In particular the rigid components of the frontal portion and the occipital portion may be in any of the form of rigidisers as previously described. In some forms the adjustment mechanism 540 can be disposed on both the arms and at a connection point between the frontal and occipital portion. In some alternative forms, the adjustment mechanism can be disposed on either the connector arms or at the connection point between the frontal and occipital portion. The adjustment mechanism in either arrangement can be adjustable and operate to change the distance, i.e. offset, between the frontal and occipital portion and operate to change the angle between the frontal and occipital portion.

In some forms, the frontal portion and occipital portion may articulate about the adjustment mechanism 562 of the hoop 516 to enable the frontal portion to, for example, rotate forward or rearward relative to the coronal plane, and the occipital portion to raise or lower relative to the Frankfort horizontal.

In some forms, the frontal portion and occipital portion may be articulated to adjust the distance between the frontal and occipital portions. The adjustment mechanism, in some forms, may comprise a sliding assembly where at least one of the frontal or occipital portions are slidable between an in-line position and an offset position. In the in-line position the frontal portion lies co-planar with the occipital portion. In the offset position the frontal portion lies in a parallel plane to the occipital portion.

The adjustment mechanism in this form can further comprise a guide 566 for guiding one of the frontal or occipital portions as they move relative to each other, between the in-line position and offset position. The guide 566 may take the form of an elongate slot disposed in either of the frontal or occipital portions, and a corresponding guide pin disposed in the other of the frontal or occipital portions. The guide 566 enables the guide pin to move within the elongate slot.

In some forms, the guide 566 provides a cam and slide movement to the frontal and occipital portions. The guide can take the form of a straight slot, arcuate slot, or other variation to introduce additional movement behaviour between the frontal and occipital portions. Further, the elongate slot can be arranged at specific angles relative to the Frankfort horizontal so as to adjust the movement behaviour of the two portions 538, 540.

The adjustment mechanism 562 enables the frontal and occipital portions of the hoop 516 to be configured in any one of, or combination of, parallel and co-planar to each other, parallel and offset to each other, arranged at an angle to each other and to the temporal arms. The advantages of some of the above combinations are described below.

Referring to FIG. 10a, an in-line configuration is shown wherein the frontal portion 538 is arranged in the same plane as the occipital portion 540, as indicated by a dotted line. The frontal portion and occipital portion can move outwards, i.e. away from each other, to move from the in-line position to the offset position. Referring to FIGS. 10b and 10c, an offset configuration is shown, wherein the frontal portion has been offset into a different, but parallel, plane to the occipital portion. As shown in FIGS. 10b and 10c the frontal portion can be offset more or less distant from the occipital portion.

In some forms, the frontal and occipital portions are constrained in parallel configurations to each other, i.e. the portions cannot be rotated away from a parallel configuration. Examples of this configuration are shown in FIGS. 10b and 10c. Corresponding schematic diagrams of FIGS. 10b and 10c are shown in FIGS. 11a and 11b, respectively.

Referring to the schematic representations of FIG. 11a, the in-line configuration is shown. In this configuration, a counter-clockwise moment is created by the weight of the display unit 512 and its horizontal displacement from the pivot point 541 of the display system which is located at the contacting region of the frontal portion 538 of the structure 516. As a result of both frontal and occipital portions being in alignment there is no internal moment created within the frontal and occipital portions to either assist or impede the resisting forces provide by the positioning and stabilising structure 516. By comparison, and referring to FIG. 11b, when an offset (i.e. D1) is introduced between the frontal and occipital portions, a corresponding clockwise moment is created in the hoop 516 which assist in resisting the moment induced on the system by the display system 512.

In the co-planar offset configuration of FIG. 11b, the separation introduced between the frontal and occipital portions creates a moment that is clockwise, and counter-acting to, the counter-clockwise moment created on the users' face by the display unit 512. Advantageously, this configuration can balance the acting moments place on the system 510 to thereby improve the in-use comfort when wearing the positioning and stabilising structure.

Further, as disclosed in FIGS. 11a to 11c, the location of the pivot point 541 dictates the length of the moment arm for the moment induced by display unit 512. However, as this pivot point moves forward on the forehead (under different adjustments of the support hoop 516), the more vertical the surface becomes on which the frontal portion 538 would locate. Whilst this may reduce the induced moment, it may require increased clamping pressure on the support hoop to resist sliding of the support hoop 516 down the face. Accordingly, obtaining a balance between these competing criteria allows a more optimal solution to be achieved that assists both comfort and fit for the user.

In some other forms, as shown in FIG. 11c, the occipital portion can be independently angled relative to the frontal portion in addition to being offset from the frontal portion. Adjusting the angle of the occipital portion to become more vertically oriented enables the occipital portion to more effectively apply a downward load to the positioning and stabilising structure. Advantageously, this can more effectively balance the load of the display unit and in turn, create a more stable positioning and stabilising structure. Further, in some users, adjusting the angle of the occipital portion can more effectively anchor the occipital portion to individual, i.e. unique shape of the users' head.

In some other forms, the frontal portion can be independently angled relative to the occipital portion. Angling the frontal portion can allow the centre of mass of the head-mounted display to be optimally positioned on the users' head. Advantageously, controlling the position of the centre of mass can assist with balancing the moment loads on the head-mounted display, and therefore improve the stability of the positioning and stabilising structure. In-use, this can prevent then head-mounted display from sliding down the user's face.

As shown in the embodiments of FIGS. 9a-10c, the occipital portion 540 can further comprise a medial adjustment mechanism. In some forms, the adjustment mechanism is in the form of connection strap 542. The strap 542 can be mounted about the posterior, medial region of the occipital portion 540, threaded through opposing holes 563 in each of the posterior ends 568 of the occipital portion 540.

The strap 542 may be formed from an elastic material to assist conforming to the shape of a user's head. In some forms, the distance between the posterior ends can be manually controlled, i.e. changed, by pulling more or less of the strap through the tabs. Both methods of elastic and manual control act to maintain a positive pressure on the occipital portion, and in turn, the positioning and stabilising structure in-use. Advantageously, the strap 542 maintains tension in the positioning and stabilising structure during dynamic loading scenarios, e.g. a user moving their head and body when operating the head-mounted display.

In some forms, the medial adjustment mechanism does not support the moment load of the display unit. In this form, the configuration of frontal and occipital portions act to balance the head-mounted display on the users' head and so do not require the strap 542 to support the moment load applied by the display unit. In this way, the medial adjustment mechanism is decoupled from bearing loads in the positioning and stabilising structure.

As shown in FIGS. 12 and 13, the positive pressure, i.e. pre-load, applied to the positioning and stabilising structure by the strap 542 holds the occipital portion 540 of the hoop close to the occipital bone of the users' head. The loading applied by the occipital portion can be small in magnitude, sufficient to counter-act the dynamic loads applied to the head-mounted display when in-use, and not applying excess pressure into the users' occiput. The tension applied to the strap 542 can assist preventing the head-mounted display from sliding down the users' face in-use.

In some forms, the medial adjustment mechanism can comprise a rigidly bound elastic portion. The rigidly bound elastic portion can, for example, be mounted about the posterior, medial region of the occipital portion 540 and threaded through the opposing holes 563 in each of the posterior ends 568. The length of the rigidly bound elastic portion can be manually controlled, i.e. can be adjusted, to increase or decrease the distance between the posterior ends and therefore adjust the size of the positioning and stabilising structure to fit different shaped heads.

The rigidly bound elastic portion comprises an elastic component and an inelastic component. The two components are connected, whereby the elongation of the elastic component is limited by the length of the inelastic component. In some forms, the elastic component is shorter in length than the inelastic component, so as to allow the elastic component to elongate until the length of elongation equals the length of the inelastic component. For example, when the rigidly bound elastic portion is mounted to the positioning and stabilising structure in-use, a user may be able to apply dynamic loading to the head-mounted display, e.g. the user jumps and moves around, and the elastic component applies sufficient tension to the users' head to prevent the positioning and stabilising structure from sliding off. If the user applies excess dynamic loading to the head-mounted display, the inelastic component can prevent the occipital portion displacing away from the users' head, i.e. loosening the fit, and ensure the head-mounted display does not slide off the users' head.

Referring to FIG. 12c, the positioning and stabilising structure 514 may exhibit a high degree of adjustment in a manner that provides intuitive of fit and adjustment. Further the structure provides responsive stability that can cater for dynamic movements of the user. A further feature of the design is that the reactive forces induced by the display unit is catered for by the frontal and occipital portions (538 and 540) whilst still allowing for fine independent adjustment of the unit. In particular, adjustment of the display in an anterior and posterior direction controls the contacting pressure of the interfacing structure on the face, adjustment in the frontal portion 538, assist in accommodating different head sizes and location of the display in a superior—inferior position, whilst adjustment of the occipital portion 540, assists in fit, location of contacting points, and the amount of counter-moment generated to aid comfort and load distribution in the structure 514.

Referring to FIG. 14, the forehead support connector 524 can further comprise a forehead support rigidiser 556. In some forms, the forehead support rigidiser can be pre-tensioned to apply a moment load to the positioning and stabilising structure that urges the display housing to rotate inwards, i.e. posteriorly, towards the users' face in-use. Advantageously, the display housing is directed into the user's face without requiring the positioning and stabilising structure to be tensioned by strap 542 to pull the display unit into the users' face. The moment load created by the pre-tensioned support rigidiser acts similarly to a spring loading on the display unit. The schematic lines 566 and 568 of FIG. 5 illustrate respective loading and non-loading conditions applied to the rigidiser 556. In a loading condition, the positioning and stabilising structure is in-use on a users' head, wherein the display unit is urged towards the users' face, and the rigidiser behaves like a leaf-spring, deflecting away from the users' face. In the un-loaded condition, the rigidiser 556 is pre-loaded so as to deflect the display housing inwards in readiness to receive a users' face.

4.1.1.7 Hub Support

Referring to FIGS. 14a to 14b, disclosed is a further embodiment of a positioning and stabilising structure 614 for a head-mounted display system 610. The head-mounted display system 610 differs from the embodiment shown in FIGS. 9 to 13 in that the head-mounted display 610 further comprises a hub component 662, arranged to locate around a users' ear.

The hub component 662 is rotatably connected to the frontal portion 638 and occipital portion 640. The frontal portion and occipital portion may articulate about the hub 662 to enable the frontal portion to, for example, rotate forward or rearward relative to the coronal plane, and the occipital portion to raise or lower relative to the Frankfort horizontal.

Referring to FIG. 14*b*, examples of two possible configurations of the frontal portion are illustrated. In a first example, the frontal portion is configured in a position proximal to the parietal bone (solid line) and in a second example, proximal to the frontal bone (dotted line).

In some forms, the frontal portion can be independently angled relative to the occipital portion. The frontal portion can be adjusted to move towards the centre of gravity of the system. In some forms, the occipital portion can move upwards or downwards to support the positioning and stabilising structure against the occipital bone of the users' head. In some other forms the occipital portion can comprise a type of counter-weight (w) to balance the display unit 612.

Referring to FIG. 14*c*. Advantageously, the hub 662 can, in-use, direct the force vectors of the frontal portion and occipital portion around the user's ear. For example, in some forms the occipital portion can be articulated about the hub 662 into a position offset and parallel to the frontal portion. In this configuration, the vectors applied to the occipital portion 640 can translate around the perimeter of the hub 662 and through the frontal portion 638.

Referring now to FIG. 14*d*. In some forms, the hub component 662 is also rotatably connected to the display unit 612. The display unit may articulate about the hub 662 to enable the display unit to rotate, for example, to raise or lower from the eyes of the user, i.e. move relative to the Frankfort horizontal.

In some forms, the hub component 662 may accommodate some of the weight of the display unit 612, thereby creating a pivot axis for the head mounted display 610 about the user's ears and in the region of the mid coronal plane. This can relieve loading on the frontal portion and assist in angular adjustment of the display unit about the hub Examples of two possible configurations of the display unit are illustrated in FIG. 14*d*. In a first example, the display unit 612 is configured in front of the user's eyes, i.e. generally parallel with the Frankfort horizontal. In a second example, the display unit is shown in a raised position above the users' eye, i.e. angled relative to the Frankfort horizontal. Advantageously, moving the display unit between these two positions enables the user to move the display unit away from their eyes during game play or before donning and doffing the head-mounted display.

In some forms, an audio device (A), i.e. headphones, can be located on the hub. The audio device can be configured to releasably engage with the hub about a snap-lock type feature. In some forms, an audio device can be placed on the hub to encapsulate a users' ear, in-use.

4.1.1.8 Materials and Composites

In one form of the present technology, a positioning and stabilising structure 14 comprises a strap constructed from a laminate of a resilient (e.g. elastomeric and/or textile) skin-contacting layer, a foam inner layer and a textile outer layer. In one form, the foam is porous to allow moisture, (e.g., sweat), to pass through the strap. In one form, the textile outer layer comprises loop material to engage with a hook material portion i.e. tab portion 54. In some forms of the technology the skin contacting layer is formed from a material that helps wick moisture away from the users' face. This may help to maintain comfort if the user sweats while wearing the user interface.

In one form of the present technology, a positioning and stabilising structure 14 is provided that is configured to have a low profile, or cross-sectional thickness, to reduce the perceived or actual bulk of the apparatus. In one example, the positioning and stabilising structure 14 comprises at least one strap having a generally rectangular cross-section. In another example the positioning and stabilising structure comprises at least one strap having a profile with one or more rounded edges to provide greater comfort and to reduce the risk of straps marking or irritating the user.

In some forms, the straps of the positioning and stabilising structure 14 may at least partially be made of or comprise nylon and/or lycra. Further, the straps may comprise different layers, e.g., of different materials. Different layers may be welded one to another. In an example, the straps may comprise different layers of different materials, e.g. an outer layer of an aesthetically pleasing material and/or an inner layer facing the users' head made of a soft and/or pleasing material. For example, the straps forming the parietal portion of the hoop may be made of an inexpensive and/or comfortable material.

In an example, a strap may be a single layer component such as a elastomer/fabric. The strap may alternatively be a composite or multiple layer component such as a textile and foam composite, or outer textile layers and inner spacer fabrics. The straps may be made of a spandex or elastane/foam composite or may be formed of other suitable materials (such as a 3D spacer fabric or a double-knit interlock textile).

Different materials for different layers of a strap portion and/or different straps may be selected depending on the specific properties/functions/requirements. In an example, the straps of the positioning and stabilising structure may be BPA-free and Gelamid® which may be applied at least for portions of the strap.

In a further example, the straps may be formed from a breathable neoprene substitute. For example, the neoprene substitute can have inner and outer resilient layers comprised of porous, four-way stretchable textile. The inner layer being designed to wick moisture away from the skin surface and the outer textile layer being a loop textile for receiving Velcro® hooks.

The textile on the user contacting side may preferably have the same weave as the textile on the non-user contacting side, such that the stretch characteristics of the straps are approximately equal on both sides. Also, it is preferred that the textile on the user contacting side have the same heat shrinkage characteristics as the non-user contacting side. This is to prevent the positioning and stabilising structure from deforming unevenly when processed or exposed to heat, or otherwise thermoformed.

The textile on the user contacting side may be a different textile to the non-user contacting side, such that the textile on the user contacting side is more comfortable than the non-user contacting side.

The straps may be cut from a sheet of material (e.g., flame laminated), or cut from a roll of narrow resilient (e.g. elastomeric and/or textile) strap and then thermoformed and ultrasonically welded to create rounded edges before being ultrasonically welded together. The straps may have a geometry that allows them to be nested on the sheet to increase yield, e.g., the geometry may be substantially linear.

In some forms, the positioning and stabilising structure can be comprised of straps configured as separate elements.

For example, the strap 48 can be connected, e.g., by a welded joint, to the parietal portion 38. The separate elements may be joined together during the manufacturing process. Alternatively, straps of the positioning and stabilising structure may be configured as or made of one piece. In another example, the straps 48 and the parietal portions 38 may be cut out of one material sheet.

Designing the strap pieces separately may allow flexibility for the strap pieces to be made relatively smaller which contributes to an increased yield and simpler process of manufacturing. In addition, the design of the strap pieces may allow for less material wastage when cut from a sheet, e.g., due to the substantially rectangular shape of the parietal portion straps. Moreover, manufacturing the strap assembly in separate pieces may allow for the substitution of materials that are less expensive, more comfortable and/or have an aesthetically pleasing colour.

The width of the straps of the positioning and stabilising structure 14, and thus the footprint, may be additionally reduced by using different materials, different strap thicknesses and/or different compositions. Different materials and/or cheaper materials may be used for some parts or portions of the structure 14, e.g., with the same support and/or comfort. In an example, the parietal portion of the hoop may have an increased thickness compared to the occipital portion of the hoop. This may increase comfort. Additionally, having a smaller overall size of the occipital portion of the hoop can allow a user to bend their head backwards towards their spine (e.g., in a posterior direction) with an additional freedom of movement.

The joints between adjacent strap portions may be constructed as a thinned region or thinned connection portions to encourage bending. The thinned region may function as a flex point or hinge (e.g., a living hinge) to provide increased flexibility where desired. The flex point or hinge may be reinforced using hot-melt seam tape, or thinner textile layer with an adhesive backing, or other reinforcement methods.

Such a hinge feature of the connection may permit the straps to better accommodate the shape of a users' head. A combination of linear and nonlinear joints may be utilized to achieve a desired level of flexibility and direction of flexion, as well as a desired level of three-dimensional shaping to a component made up of a series of parts which were originally a flat material (such as textile or paper, for example). Such shaping may include darts, tucks, gathers, or a curved seam.

In some examples, materials having differing degrees of flexibility may be combined in an alternating manner to form a controlled flex region. Components may be stacked one on top of the other and ultrasonically welded together in a manner that leaves no space therebetween. The user interface component may be constructed of a soft material, e.g., a soft textile.

In an example, the support connector 24 that extends across the frontal bone of the user to connect the support hoop 16 may be connected together by welding, e.g., by ultrasonic welding. In an example, portions of the support connector 24 and the hoop 16 may overlap. These members may be placed in an ultrasonic welding tool.

An advantage of the ultrasonic welding process is that a flush or butt joint does not increase the thickness of the components at the joint and is visually appealing, unlike stitching where components must be overlapped, and which results in an uneven thickness. Even if the edges of the two or more components are butted together and stitched without any or substantial overlapping, the stitches will create a rougher, stiffened and raised joint. Further, the ultrasonic flush or butt joint may result in a smooth connection that may reduce skin irritation, chaffing or facial marking, even when reinforced with seam reinforcement tape. An advantage of using an overlapped ultrasonic weld variation is that multiple components may be joined in a single machine in one operation. Furthermore, the ultrasonic welding process may be designed such that the joint is embodied as a thinned region or thinned portion between the components.

In an embodiment, the straps may be thermoformed and then edges of the strap may be ultrasonically cut. The thermoformed and ultrasonically cut strap provides rounded edges which provides substantially reduced facial marking in-use. In addition, the thermoformed and ultrasonically cut edges are softer and less abrasive, which provides a more comfortable feel on the users' face in-use, e.g., more comfortable feel around the users' ears.

In a further embodiment, at least a portion of the positioning and stabilising structure may be constructed from a spacer fabric, where the edges of the spacer fabric may be ultrasonically welded. This may cause the edges of the spacer fabric to be rounded, thereby reducing facial marking and increasing comfort for the user.

In an embodiment, one or more aspects of the positioning and stabilising structure may be structured to enhance comfort in-use. For example, the rigidiser may be relatively thin. In another example, the strap may include a nylon rigidiser enclosed in foam. In such embodiment, the density of the foam may be increased to improve comfort and reduce chances of feeling the nylon rigidiser. Alternatively, the thickness of the foam may be utilized to alter the softness or roundness of the edge of the strap. For example, thicker layers of foam are more likely to produce rounder corners than thinner layers of foam. In a further embodiment, the foam may begin at one thickness, and be compressed to another thickness during processing.

In an embodiment, foam on the user contacting side may be less dense or have a lower hardness than foam on non-user contacting side. It is also possible to have more than one layer of foam and more than one rigidiser component.

In some alternative embodiments not shown, the rigidiser may include a semi-rigid moulded component that is overmoulded with a soft polymeric material, e.g., TPE, TPU. The polymeric material provides a softer material for contacting the users' face in use. In some forms, the moulded component may be provided with soft touch or flock coatings.

4.1.1.9 Forehead Support Arrangements

Referring to FIG. 3*a*. the forehead support connector 24 of the positioning and stabilising structure 14 can be connected to the superior edge of the display unit housing 22. In some forms the connector 24 can be connected to the display unit housing, e.g., about a forehead support 25, which can be adjusted to allow the positioning and stabilising structure to accommodate the configuration of a user's face.

4.1.1.9.1 Forehead Support

Referring now to FIG. 13*a*, the forehead support 25 can be connected to the superior edge of the display unit housing 22 and in some forms can be mechanically coupled to the forehead support connector 24. The support 25 can comprise a forehead contacting portion 27 which is in contact with the users' forehead to support and stabilize the load of the display unit.

The forehead support 25 can be configured to be essentially straight or it can be curved. In the case where connector is curved, the curvature generally follows the curvature of the user's forehead. While this is the most likely structure, it is within the scope of the present invention to use a forehead support 25 that has the opposite curvature, or any combination thereof. The forehead support 25 can be made from a thermoplastic material.

The forehead support 25 can be presented at an angle which is generally parallel to the users' forehead to provide improved comfort to the user. Advantageously, this can reduce the likelihood of pressure sores which may result from an uneven presentation. In-use, some user anatomical structures may require the forehead support 25 to be positioned higher up the forehead. In this case the angle of presentation of the support 25 can be adjusted to suit the user.

The forehead support 25 can be provided with one or more openings. These openings can be adapted to serve numerous purposes including points of connection to the housing, points of connection to any another support surface, points of connection for straps to secure the head-mounted display to the user (e.g. forehead support strap 48) and apertures for a forehead contacting portion, e.g. a forehead contacting pad.

In some forms of the forehead support 25, the apertures are designed to receive the forehead pad. The apertures can be disposed about the forehead support 25 in a manner to allow a user to adjust the position of the forehead pad.

The apertures are also designed to allow a user to attach the forehead pad securely to the forehead support 25. In some forms, the apertures are designed to allow a user to attach the forehead pad securely and reversibly to the forehead support 25. In some forms, the forehead pad is adapted to releasably engage with the forehead support 25.

In one form, the forehead contacting pad is generally plate- or disc-shaped. In other forms, the pad may have a concave surface to correspond to a convex portion of the forehead of a user in-use. Possible shapes of the base portion include rectangular and oval shapes.

In an embodiment, two base portions of a forehead pad are adapted in order to be situated above left and right eyebrows of the user.

4.1.1.9.2 Forehead Contacting Portion

The forehead contacting portion 27 comprises a forehead contacting surface 29 which, in an in-use position, is seated on a forehead area of a user. In some forms, the forehead contacting portion 27 can be made of an elastomer material.

The contacting surface 29 can optionally include a raised surface pattern. The pattern reduces the possibility of a suction effect of the surface thereby reducing the drawing of blood in the region and making the contacting portion more comfortable. The raised pattern has the added benefit of reducing sweating. In another embodiment, the surface can be given a sand-blasted finish to improve ventilation and reduce the likelihood of sweating.

In some forms, the contacting surface 29 can have cut away portions to improve the flexibility of the contacting portion. Another advantage of the cut away portions is that the contacting portion 27, in-use, can better accommodate rolling and twisting of the display unit on a user's face. A further advantage of the cut away portions in the contacting portion is that they can reduce the effect of a single point of pressure on the forehead, e.g. reduce discomfort.

In some forms, the contacting portion includes a jacket, which defines a hollow chamber that is filled with a viscous medium in such a way that a wall of the jacket that forms the contacting surface 29 is subjected, on its side facing away from the forehead area of the user, essentially to the pressure of the viscous medium. The hollow chamber filled with viscous material may be used as a contacting portion between the user and other components of the positioning and stabilising structure, e.g. portions of the support hoop, and also may be used in the interfacing portion.

In some forms, the forehead contacting portion can be comprised of materials that include rubber and flexible plastics. In some embodiments the contacting portion is constructed from cured Liquid Silicone Rubber or alternatively, a silicone with a suitable hardness. These examples are merely intended to be illustrative and are not limiting in any manner.

4.1.1.9.3 Forehead Support Connector Strap

The forehead support connector 24 of the positioning and stabilising structure 14 comprises a forehead support strap 48 arranged to run generally along or parallel to the sagittal plane of the head. The strap 48 is adapted to connect to the superior edge region of the display unit housing 22 and the parietal portion 38 of the rear support hoop 16. The strap 48 can be connected, e.g., by a welded joint, to the parietal portion 38 and can be connected to the housing 22 by an adjustment mechanism 50.

The strap 48 is adjustable to enable dimensional control of the forehead support connector 24. As shown in FIGS. 3*a* and 3*c* the strap 48, in-use, is threaded through a forehead support hole 52 in a forehead tab portion 54 of the superior edge region of the display unit. The strap 48 may be secured to itself after passing through the hole in the tab, for example, with hook-and-loop fastening means.

The forehead support connector 24 supports the weight of the display unit 12. The length of the strap 48 between the tab 54 and the parietal portion 38 of the hoop 16 may be adjusted by pulling more or less of the strap 48 through the tab 54. The strap therefore is able to be adjusted to raise or lower the position of the display unit 12 relative to the user's nose. Advantageously, this adjustment can move the display unit housing 22 away from the user's nose to relieve pressure felt on either of the face, nose, or cheeks. The forehead support connector 24 secures the display unit 12 in position so that the display unit does not slide downwards or laterally on the user's head.

The adjustment mechanism 50 is positioned, in use, out of contact with a user's frontal bone region.

Referring to FIGS. 4*a*-4*c*, a second embodiment of the support for a head-mounted display unit 110 is shown in-use. In FIGS. 4*a*-4*c*, like reference numerals denote similar or like parts with the addition of 100 to allowing distinguishing between embodiments. Referring to FIG. 4*c*, the forehead support connector 124 can further comprise a forehead support rigidiser 156. The forehead support rigidiser can provide further stabilisation and support for the display unit 112 above the user's nose and cheeks. The rigidiser 156 can be connected to the superior edge region and form part of tab 154 to receive the strap 148 for dimensional adjustment of the positioning and stabilising structure.

In some forms, the adjustment mechanism 150 may further comprise an angle adjustment mechanism (not shown) for easy lifting of the visor from an in-use position to a stowed position, i.e. not in-use.

4.1.2 Interfacing Structure

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the user's nose. To the extent to which there is a mismatch between the shape of the users' face and the interfacing structure, one or both may be adaptable in order for an appropriate contact or other relationship to form.

In some embodiments of the present technology, the interfacing structure may comprise a single seal-forming or cushioning element that overlays one or more of a portion of the nasal ridge region, the frontal bone region and each of the left and right infraorbital margin regions of the face, in-use. In some embodiments the interfacing structure may be designed for mass manufacture. For example, the interfacing structure can be designed to comfortably fit a wide range of different face shapes and sizes.

Referring to FIG. 8, in one form of the present technology the head-mounted display system 410 further comprises an interfacing structure 411 that provides a facial interface 413 that is arranged to engage with, and be in opposing relation to, the user's face in use. The interfacing structure 411 can, in some forms, provide a cushioning function so as to improve the overall comfort for a user. The facial interface 413 can, in some forms, be arranged to at least partially block light from entering the display unit housing 422 in-use.

The positioning and stabilising structure 414 can be attached to the display unit housing 422 whereby the interfacing structure 411 of the present technology is held in the operable position on a user's face. In some alternative forms, the positioning and stabilising structure 414 can be attached to a portion of the interfacing structure 411 whereby the interfacing structure 411 of the present technology is held in the operable position on a user's face.

FIG. 15A illustrates a split front view of a further embodiment of an interfacing structure 611 in use, where the interfacing structure 611 is otherwise generally formed to be symmetrical on either side of central axis A-A. The left-hand side of central axis A-A illustrates an example of an interfacing structure 611 as it may be positioned in use to engage with the user's face generally around a periphery of a users' eyes. The right-hand side of central axis A-A illustrates an example of the user's face beneath the interfacing structure 611, showing the facial regions that may be in contact with the interfacing structure 611 in use. In broad terms, the interfacing structure 611 may be formed on regions of the epicranius 601, the user's sphenoid 603, across the outer cheek region 605 between the sphenoid 603 to the left or right zygomatic arch 607, over the zygomatic arch 607, across the inner cheek region 609 from the zygomatic arches 607 towards the alar crests 619, and on the users' nasal ridge 617 inferior to the sellion to enclose a portion of the users' face therebetween.

In some forms of the present technology, not shown, a system is provided where the interfacing structure is integrally formed with display unit housing. In some forms of the present technology, such as the embodiments shown in FIGS. 15B, 16, and 18 to 20, a system is provided where the interfacing structure is formed as a separate removable component that is configured to integrate with, and be retained by, the display unit housing so as to engage with, and be in opposing relation to, the user's face in use.

Referring to FIG. 8, when the interfacing structure 411 is formed as a removable component, a number of interfacing structure 411 embodiments can be formed, with each embodiment being configured to correspond to a different size and/or shape range. For example, the head-mounted display system 410 may comprise one form of an interfacing structure 411 suitable for a large sized head. This may not be suitable for users with smaller sized heads and may thus result in reduced comfort and performance. An interfacing structure 411 suitable for a small sized head may not be suitable for a large sized head and may likewise result in reduced comfort and performance for the user. Thus, a removable interfacing structure 411 may be advantageous in that it enables a user to customise the head-mounted display system 410 and to select the interfacing structure 411 that best fits their individual facial anthropomorphic features. In some further embodiments, a user can have their facial anthropomorphic features measured in order to custom design and form a suitable interfacing structure 411. A removable interfacing structure 411 also allows for applications, such as medical use, where the structure 411 may be disposable or may allow separate cleaning to comply with surgical procedures.

Referring to FIG. 15B, when the interfacing structure 611 is formed as a removable component, it can be formed to comprise a chassis 621 of rigid, or semi-rigid, material that is configured to facilitate engagement with the display unit housing 622. For example, in some embodiments the chassis can be formed of a plastic material. The chassis 621 can comprise one or more engagement elements 623 around the periphery thereof that are configured to detachably mate with a corresponding element configured on the display unit housing 622. Suitable engagement elements may include one or more of a clip, fastener, magnet, or Velcro provided that the number and location of the engagement elements utilised in any given embodiments are capable of ensuring that the chassis 621 and display unit housing 622 are relatively fixed to one another without allowing significant slippage to occur therebetween. For example, as in FIGS. 15A and B, the engagement elements 623 can be two clips that are spaced laterally from one another so as to locate on symmetrically opposing sides of the central axis A-A. Similar engagement elements 723 are shown in FIGS. 16A to 16C. In some further embodiments, a series of indents, not shown, can be formed at the in-use lower portion of the chassis in addition to the clips that are formed at the in-use upper portion of the chassis. As one skilled in the art would appreciate, other combinations of engagement elements are also considered within the functional scope of the present technology. In some further embodiments, not shown, the display unit housing can comprise a groove that captively engages with the outer peripheral rim of the chassis so as to provide additional vertical support to the engagement elements and further reduce relative movement between the display unit housing and interfacing structure.

The chassis 621 acts as a base for the rest of the interfacing structure 611. In addition, the chassis 620 can provide some rigidity and necessary structure to the interface support structure 615 of the interfacing structure 611, and therethrough also to the face engaging surfaces 613. The chassis 621 can be adhesively engaged to the support structure 615, or in some embodiments mechanically bonded to the support structure 615, with the method used to join the chassis 621 to the support structure 615 being dependent on the composition of the materials and their specific structures. The chassis 621 can be generally curved laterally across the user's face. In some embodiments, the curvature can generally correspond to a curvature of an individual user's face. In some embodiments, such as in FIG. 16B, the curvature of the chassis 721 can be relatively small, with the support structure 715 being formed to extend therefrom to bridge the distance to the user's face and thus having varying depths laterally across the user's face. In other words, the support structure 715 can extend to a greater depth in the regions adjacent the sides of the user's face, in comparison to the smaller depth formed in the region proximal the central axis A-A of the user's face. In some embodiments, the chassis 621, 721, 821 may advantageously remain the same size and shape, whilst the remainder of the interfacing structure 611, 711, 811 can be varied so as to be provide multiple modular embodiments, or custom designed modular embodiments that suit a user's individual facial anthropomorphic features.

In some embodiments, two or more of the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. For example, FIGS. AA to AC show an interfacing structure A000 comprising a support structure in the form of a support flange A002, supporting an integral face engaging flange A006 having a face engaging surface A008. In further embodiments, additional components may be provided to the interfacing structure A000. In alternative embodiments, the interfacing structure can be integrally formed as a single component from a foam or an elastomeric material.

In some embodiments, the chassis 721 can be formed as a separate component from the rest of the interfacing structure 711 which is manufactured as a singular integrally formed body (e.g. FIGS. 16A to 16C). For example, in some embodiments, one or more regions of the face engaging surface 713' can be formed together around the periphery of the interfacing structure 711' as an inwardly projecting flange-like rim that stems from the support structure 715' (e.g. FIG. 17A). Alternatively, in some embodiments, the face engaging surface 713" can be supported by a spring-like supporting flange 725" that stems from the support structure 715" and is substantially concealed beneath the face engaging surface 713" (e.g. FIG. 17B). For example, the supporting flange 725" and support structure 715" can both be formed from silicone, with the material thickness of the supporting flange 725" being thinner than that of the support structure 715" so as to provide a more compliant, yet resilient, spring-like support to the portion of the interfacing structure 711 that engages the user's face. In some embodiments, the face engaging surface 713" can be loosely overlaid over the supporting flange 725" such that each can respond independently to the compression pressure applied when interacting with a user's face in use. In some embodiments, the overlaid face engaging surface 713" can be bonded with the supporting flange 725" over which it is overlaid, whereby they effectively form a singular body that responds in unison to the compression pressure applied when interacting with a user's face in use.

The face engaging surface 713 can comprise one or more regions of silicone, or one or more layers of a textile material or foam. The one or more regions of the face engaging surface 713 can be formed to have varying thicknesses and/or varying surface finishes, whereby the resultant face engaging surface 713 can have a variable compliance therealong when compressed against a user's face in use.

Some or all of the face engaging surface 713 may be regions of (relatively) reduced friction. Where silicone is used, this may be achieved by providing a so-called frosted surface. With a region of reduced friction, the sealing surface may adhere to the users' face less than without the region of reduced friction. For example, the region of reduced friction may be provided to allow the side(s) of the users' nose to slide freely along the face engaging surface 713. Likewise, a textile or foam materials having (relatively) reduced friction outer surface finishes can be used to form part or all of the face engaging surface 713.

Some or all of the face engaging surface 713 may be regions of (relatively) high friction. Where silicone is used, this may be achieved by providing a so-called polished surface. With a region of high friction, the sealing surface may adhere to the users' face better than without the region of reduced friction, thus reducing the slippage of the display unit housing 722. Likewise, a textile or foam materials having (relatively) high friction outer surface finishes can be used to form part or all of the face engaging surface 713.

In some embodiments, one or more distinct regions of the face engaging surface 713 can be formed to have different finishes or different levels of friction so as to optimise the grip and retention performance of the face engaging surface 713 whilst also improving user comfort. In some embodiments, a combination of two or more materials can be used to form the overall face engaging surface 713, where different materials can be used in different regions. This may improve retention of the display unit housing 722 whilst also improving user comfort.

In some embodiments, the heat wicking performance of the face engaging surface can be improved by using a silicone material whereby the user comfort may be improved.

Referring to FIGS. 18 and 19, the support structure 715 can be formed to comprise one or more distinct regions 715', 715" having varying thicknesses and/or being further supported by the addition of stiffening ribs 715'''. In some regions the support structure can be thinner 715', or generally provide less resistance to compression, for example in the regions adjacent the user's zygomatic arch, cheek bones, and nose. In some other regions the support structure can be thicker 715", or can generally be structured to provide more resistance to compression, for example in the regions adjacent the user's forehead or sphenoid. In some embodiments, the thickness of the support structure 715 can be varied incrementally thereacross, rather than as distinct regions having a singular thickness. In some embodiments, stiffening ribs 715''' can be formed as wide regions of thicker material, whilst in other embodiments, stiffening ribs 715''' can be formed as a tie-like support from narrow and/or less compliant material.

Thinner regions of the support structure 715 can provide a more compliant, yet resilient, cushion support to the face engaging surface 713 above. For example, in some embodiments, thinner regions may be formed from silicone material have a thickness of 0.3-0.5 mm. By contrast, thicker regions of the support structure 715 can provide a less compliant, more resistant, and relatively rigid structural support to the face engaging surface 713 above. For example, in some embodiments, thicker regions may be formed from silicone material have a thickness of 1.5-2 mm. By forming a support structure 715 from a plurality of distinct thicker and thinner regions, or a blend of incrementally varying thicknesses, the load resistance of the support structure 715 may be optimised. The overall compliance of the interfacing structure 711 at any given point around the periphery of the user's face in use, may thus be a result of the properties of the chassis 721, support structure 715 and face engaging surface 713.

In some embodiments, it may be advantageous for the interfacing structure 711 to balance compliance against resilience and rigidity, so as to spread the resistance force applied by the interfacing structure 711 when compressed against a user's face in use. In addition, it may be advantageous to provide an interfacing structure 711 where the translation distance of the compression pressure, applied when interacting with a user's face in use, is spread across regions of the users face that are more adept at absorbing the pressure, rather than allowing the load to be focused locally on a minimal number of contact points. Thus, the overall compliance of the disclosed interfacing structure 711, can be formed to allow for the face engaging surface 713 to adaptably mould to the user's face. This may advantageously reduce regions of the face engaging surface 713 that are spaced from the users face, or that do not sufficiently interact with the user's face so as to contribute to the assist with spreading the pressure. For example, with reference to FIG. 15A, regions of the user's epicranius 601 and sphenoid 603 below the temples may be capable of bearing higher levels of pressure, whilst regions on either side of the user's zygomatic arch 607 may be capable of bearing lower levels of pressure. In addition, it may be preferable for some regions to only receive relatively light or substantially no pressure at all, such as on the zygomatic arch 607 itself, or on the user's nasal ridge 617. In regions that can only bear light or substantially no pressure, it may be advantageous for the face engaging surface 713 to be highly compliant so as to interact gently thereat whereby the ingress of undesirable light is reduced or prevented.

In some further embodiments, the interfacing structure 811 can comprise a discrete chassis 821, support structure 815 and face engaging surface 813 (e.g. FIGS. 20A to 20D). For example, the face engaging surface 813' can be formed as a foam cushion 829' that is attached directly to an upper portion 827 of the support structure 815 (e.g. FIG. 21A). The upper portion 827 of the support structure 815 can be formed to extend inwardly from the periphery of the support structure 815 wall as a spring-like ledge that functions to support the face engaging surface 813' from buckling in use.

In some alternative embodiments, the face engaging surface 813" covers a foam cushion under layer 829" that is attached directly to an upper portion 827 of the support structure 815 (e.g. FIG. 21B). For example, a silicone or textile material face engaging surface 813" can be supported loosely, or at least partially bonded, over a foam cushion under layer 829". The foam cushion under layer 829" can function as a spring-like, compliant, yet somewhat resilient, cushion support that is concealed beneath the face engaging surface 813". In such embodiments, the material that contacts the user's face can be one that is more easily cleaned than foam, and may thus improve the hygiene of the interfacing structure 811. The foam cushion may, for example, be made from any suitable material such as one or more of the following example materials: Polyethylene, Polyurethane, Ethylene vinyl acetate (EVA). In some cases, the foam cushion may be a semi-open closed cell foam, such as one made of polyurethane. The cushion of semi-open cell foam may have a limited permeability, for example, a permeability characteristic in a range of about 0 to 20 litres per minute. A transverse cross-section through the cushion 829 may take a substantially triangular or pear-like shape with a sealing face that follows the contours of a user's face. The foam used may define the physical properties of the overall interfacing structure 811. The foam may allow the interfacing structure 811 to accommodate major variations, and to successfully conform to the contours of the users' face. The compliant nature of the foam cushion may also provide micro-adjustment and may thus form a comfortable interfacing layer when interacting with the users' skin.

In another example of the present technology, the foam cushion under layer 829 can be fixed (either removably or permanently) to the support structure 815, or in some further embodiments, directly to the chassis 821. The foam cushion under layer 829 can be configured to have a varied rigidity in different regions therealong in order to increase comfort for the user in use.

In certain forms of the present technology, the face engaging surface of the interfacing structure can comprise a cushion formed from semi-compressible materials such as a dense foam or other similar materials such as rubber that may be formed to be generally resiliently compressible, whilst simultaneously being somewhat resistant to the compression. The resulting semi-rigid, yet resiliently compressible, cushion may additionally be formed to maintain a curvature with a relatively small radius, thereby providing a "one-size-fits-most" user interface cushion.

In some forms of the present technology, the interfacing structure can be adjustably sized across a range of widths and/or shapes so as to be customisable to the facial anthropomorphic features of the user. For example, with reference to FIG. 22, the interfacing structure 911 can comprise two adjustable face engaging surfaces 913', each being located at a respective one of the left and right hand sides of the interfacing structure 911. Each of the adjustable face engaging surfaces 913' can be slidably moved relative to each other, and relative to a substantially rigid chassis 920. When the adjustable face engaging surfaces 913' are moved away from one another the overall width of the interfacing structure 911 can be increased. When the adjustable face engaging surfaces 913' are moved towards one another the overall width of the interfacing structure 911 can be decreased. In some embodiments, the interfacing structure 911 can further comprise two static face engaging surfaces 913", one bridging across the users nose region, and one bridging across the user's forehead region. Each of the two static face engaging surfaces 913" can be formed to have a length that is sufficient, whereby the respective distal ends 914" of the two static face engaging surfaces 913" overlap with the respective distal ends 914' of the adjustable face engaging surfaces 913'. In this way, the adjustable and static face engaging surfaces 913', 913" can together form a functionally continuous interfacing structure 911 around the users' eyes. The resulting interfacing structure 911 may provide an improved fit for the user's individual facial anthropomorphic features which may advantageously improve the ability of the interfacing structure 911 to increase the translation distance of the clamping pressure applied to a user's face when tightening the positioning and stabilising system. This may also thus improve the comfort of the interfacing structure 911, and may reduce instances of localised pressure points. In some further embodiments, the static face engaging surfaces 913" can be formed to have a shape and length whereby they can also shield the interior of the display unit housing 922 from the ingress of undesirable light. In some further embodiments, the static face engaging surfaces 913" can be formed to have a shape and length whereby an air gap is formed between the static face engaging surfaces 913" and the adjustable face engaging surfaces 913'. This may advantageously improve the breathability and comfort of the head-mounted display system 910.

In some embodiments, the adjustable face engaging surfaces 913' can be moved relative to the chassis 920 or display unit housing 922 by a corresponding adjustment of the relative position of the ocular lenses within the display unit housing 922. For example, with reference to FIG. 23, the relative position of the axis D-D, E-E through the ocular lenses of the display unit housing 922 may be adjustable. In some embodiments, the adjustment can be made by moving a sliding tab that projects outwardly from the display unit housing 922. As the spacing between a user's eyes may be proportional the width of the user's head, an adjustment of the relative position of the ocular lenses may thus also provide a suitable adjustment to the width of the interfacing structure 911. For example, the relative position of the axis D-D, E-E through the ocular lenses can be moved from a wider width XX to a narrower width YY, thus also reducing the overall width of the face engaging surfaces' by a proportionally corresponding distance, from a wider width XX' to a narrower width YY'. Likewise, the ocular lenses can be moved from a narrower width YY to a wider width XX, thus increasing the overall width of the face engaging surfaces' by a proportionally corresponding distance, from a narrower width YY' to a wider width XX'. In some embodiments, the face engaging surfaces around the nasal ledge 931 can also be adjustably moved by a movement of the relative position of the axis D-D, E-E through the ocular lenses. For example, the nasal ledge 931 can be adjustably narrowed and positioned into the space between the ocular lenses in the display unit housing 922 when the interfacing structure 911 is moved into a narrower configuration (e.g. FIG. 23B), or adjustably pulled wider and removed from the space between the ocular lenses in the display unit housing 922 when the interfacing structure 911 is moved into a wider configuration (e.g. FIG. 23A).

In some alternative embodiments, not shown, the adjustable face engaging surfaces can be moved relative to the chassis by a uniquely configured adjustment mechanism, such as a sliding tab or rack-and-pinion style adjustment mechanism.

The sides of the nose, including above the nasal bones, proximal to the frontal process of the maxilla, and lateral cartilage can be highly variable in profile between users. In addition, the nasal bridge may be particularly sensitive when a force is applied thereupon by an interfacing structure. Furthermore, it may be important to avoid occlusion of a user's air passageway in use. The interfacing structure can thus be formed to avoid application of a compressive pressure against the nasal region. With reference to FIGS. 15A and 15B, the chassis 621 comprises a nasal ledge 631 that effectively leaves a gap in the otherwise substantially continuous face engaging surfaces 613. The nasal ledge 631 can be formed to be substantially wider and deeper than a user's nose so as to avoid one or more of the potential problems identified above. In some further embodiments, the nasal ledge 631 can be generally saddle-shaped. The nasal ledge 631 can be formed as a continuation of the rest of the face engaging surfaces 613, or in some embodiments, the nasal ledge 631 can be formed as a discrete section of the face engaging surfaces 613. In embodiments where the nasal ledge 631 is a discrete section, the nasal ledge 631 can be formed to be removable. This may advantageously improve the ease with which the nasal ledge 631 is cleaned.

For example, in some embodiments, the face engaging surfaces 1013 of the nasal ledge 1031 can be formed from a pliable material that is able to easily elastically bend inwards, like a flap 1033, so as to accommodate the user's nose (e.g. FIG. 24). The flaps 1033 can rest on the sides of the user's nose bridge in use. In some embodiments, the face engaging surfaces 613 of the nasal ledge 631 can be formed as a hood of loose material that allows the user's nose to enter therein without applying any substantial resistance force. Alternatively, in some embodiments, the face engaging surfaces 613 of the nasal ledge 631 can be formed from a section of highly stretchable and depressible material, such as one or more of a textile or a foam.

In general, the interfacing structure in accordance with the present technology can be constructed from one or more materials such as silicone, a textile material or foam. In certain forms of the present technology, the interfacing structure may advantageously be constructed from a biocompatible material, e.g. silicone rubber.

In some forms of the present technology, one or more portions of the interfacing structure can be formed to be substantially opaque. In some further forms of the present technology, one or more portions of the interfacing structure can be coloured matt black. This may advantageous in reducing the ingress of undesired light through the interfacing structure itself.

It should be understood that material selection may affect the compressibility, compliance and/or resilience properties of the interfacing structure. For example, different foams with different densities will have correspondingly different compressibility characteristics. Further, different silicone materials with differing thicknesses or flexibility will have different compressibility characteristics.

In certain forms of the present technology, the interfacing structure can be constructed from a biocompatible material, e.g. silicone rubber. In some further forms, the face engaging surface of the interfacing structure can be removable. For example, the face engaging surface can be a removable single-use, or washable cover.

The interfacing structure may have advantages in one or more forms of the present technology. For example, in addition to the advantages described above, the human facial structure may include variations from person to person that provide challenges when designing a face engaging surface that can adapt for use with many facial variations. The variations may include different shapes of the facial structure (e.g., differently shaped noses and/or differently curved cheeks) and/or different tissue content (e.g. more or less fatty tissue). These variations may result in an interfacing structure that works very well for one person but poorly for another. Also, perceived comfort may vary from person to person independent of facial structure.

In some forms of the present technology, not shown, interfacing structure can further comprise one or more forehead interfacing structures. The forehead interfacing structures can be adapted to engage with the user's forehead above the display unit housing. The forehead interfacing structures can also be integrated with the positioning and stabilising system, or as a stand alone region of the interfacing structure.

Medical Applications

The positioning and stabilising structure and/or interfacing structure can be adapted to comprise biocompatible materials, as in-use, multiple components of the positioning and stabilising structure and interfacing structure may contact, e.g. the skin, of the user. Designing the positioning and stabilising structure and interfacing structure to comprise such materials aims to protect users from potential biological risks arising from the use of the structure.

4.1.2.1 Material Biocompatibility

Biocompatible materials are considered to be materials that undergo a full evaluation of their biological responses, relevant to their safety in use, according to ISO 10993-1 standard. The evaluation considers the nature and duration of anticipated contact with human tissues when in-use. In some forms of the present technology, the materials utilised in the positioning and stabilising structure and interfacing structure may undergo at least some of the following bio-compatibility tests:

Cytotoxicity—Elution Test (MeM Extract): ANSI/AAMI/ISO 10993-5

Skin Sensitisation: ISO 10993-10

Irritation: ISO 10993-10

Genotoxicity—Bacterial Mutagenicity Test: ISO 10993-3

Implantation: ISO 10993-6

4.1.2.2 Cleaning

In some forms, the positioning and stabilising structure and the interfacing structure are designed to be used by a single user, and cleaned in a home of the user, e.g., washed in soapy water, without requiring specialised equipment for disinfection and sterilisation.

In some other forms, the components of the positioning and stabilising structure and interfacing structure are used in labs, clinics and hospitals wherein a single head-mounted display may be reused on multiple persons or used during medical procedures. In each of the labs, clinics and hospitals the head-mounted displays, or relevant components thereof, can be reprocessed and be exposed to, for example, processes of thermal disinfection, chemical disinfection and sterilisation. As such, the design of the positioning and stabilising structure and interfacing structure may need to be validated for disinfection and sterilisation of the mask in accordance with ISO17664.

Materials may be chosen to withstand reprocessing. For example, robust materials may be used in the positioning and stabilising structure to withstand exposure to high level disinfection solutions and agitation with a brush. Further, some components of the positioning and stabilising structure are separable, and in-use may be disconnected to improve the reprocessing efficacy.

In a further example, the contacting portion of the forehead support connector 24 will, in use, be in contact with the user's head and therefor may become dirty. The contacting portion may be designed to be removed from the forehead support connector 24, to provide the ability to remove it for cleaning and/or replacement. It may be desirable to wash the contacting portion while not getting the positioning and stabilising structure wet. This may be facilitated by allowing these components to disconnect for such a purpose. In a further example, the rear support hoop can be in contact with the user's hair or skin when worn. The rear support hoop is therefore preferably made from a material that is easily cleaned and further, designed to be removed from the positioning and stabilising structure for independent cleaning.

4.1.3 Anthropometrical Data Models

The geometry of the head-mounted display can be designed with reference to anthropometrical data models. The anthropometrical data models can be developed from a collection of three-dimensional head shapes. The anthropometrical data models can be used to represent sizing and clustering based on head shape variation as shown in FIG. 25a-25b, sizing based on nominated facial zones as shown in FIG. 26a-26b, and sizing based on anthropometrical landmarks as shown in FIG. 27a-27b.

For example, anthropometrical data models can be used to determine sizing requirements for the interfacing structure. These requirements can consider head shape variations and facial feature variations based on anthropometrical landmarks. Further, relationships between facial landmarks may be derived from the data; for example, a relationship between eye location and face width. Advantageously, the interfacing structure can be configured to accommodate these variations.

In a further example, anthropometrical data models can be used in conjunction with software applications, e.g. mobile phone applications, to compare three-dimensional scans of a users' head and identify their head size. In this example, a user may operate the camera of their mobile phone to produce the three-dimensional scan. The software application may be used inform the user of their head size compared to the anthropometrical data models and recommend the appropriate size, e.g. positioning and stabilising structure to provide the best fit. For example, a medium size may be suggested out of a given plurality of size options, e.g. small, medium or large. Alternatively, a custom sized positioning and stabilising structure can be made according to the three-dimensional scan for a user according to their individual facial landmarks.

4.2 Additional Aspects of the Present Technology 4.2.1 Head-Mounted Display Systems with Battery Packs FIGS. 28A-28C, 29, 30, 42A-42E, 44A-44D, 49A-49E, 52A-52B, 53A-53C and 54 show examples of head-mounted display systems 1000. In these particular examples the head-mounted display systems 1000 are configured for use as virtual reality (VR) headsets. The head-mounted display system 1000 in each of these examples comprises a head-mounted display unit 1200 and a battery pack 1500. The head-mounted display unit 1200 may comprise a display configured for VR. The battery pack 1500 is configured for powering the head-mounted display system 1000. While various features are described herein in the context of a head-mounted display system 1000 comprising a battery pack 1500 separate from a head-mounted display unit 1200, it is to be understood that, unless the context requires otherwise, each feature may also be applied in head-mounted display system 1000 which does not comprise a battery pack 1500 separate from a head-mounted display unit or which includes a battery pack 1500 located elsewhere than posterior to the user's head.

Each head-mounted display system 1000 comprises a positioning and stabilising structure 1300 configured to hold the head-mounted display unit 1200 anterior to a user's eyes such that the display is viewable by the user in use. The head-mounted display unit 1200 may also be configured to hold the battery posterior to the user's head in use.

The positioning and stabilizing structure 1300 comprises a posterior support portion 1350 configured to engage a posterior portion of a user's head, the posterior support portion 1350 in these examples comprising a parietal strap portion 1310 configured to overlie the parietal bones of the user's head in use and an occipital strap portion 1320 configured to overlie or lie below an occipital bone of the user's head in use.

In these examples, the positioning and stabilizing structure 1300 further comprises a pair of lateral strap portions 1330 configured to connect between the posterior support portion 1350 and the head-mounted display unit 1200, each configured to be located on a respective lateral side of the user's head in use.

The positioning and stabilizing structure 1300 may further comprise a top strap portion 1340 configured to connect between the battery pack 1500 and the head-mounted display unit 1200. The top strap portion 1340 may be configured to overlie a superior portion of the user's head in use.

4.2.1.1 Parietal Strap Portion

In the examples shown in FIGS. 28A-28C, 29, 30, 42A-42E, 44A-44D, 49A-49E, 52A-52B, 53A-53C and 54, the position of the parietal strap portion 1310 is moveable with respect to the top strap portion 1340 in the anterior and posterior directions. That is, the user is able to move the parietal strap portion 1310 through a range of positions on their head without also moving the top strap portion 1340. The ability to move the parietal strap portion 1310 may advantageously allow the user to spread the parietal strap portion 1310 and occipital strap portion 1320 apart without moving the top strap portion 1340. Spreading the parietal strap portion 1310 and occipital strap portion 3120 may advantageously create hoop stress within the loop formed by these two portions, providing for a secure fit to the posterior surfaces of the user's head. In particular, an angle between the parietal strap portion 1310 and the occipital strap portion 1320 may be able to be adjusted by the user.

The parietal strap portion 1310 passes underneath the top strap portion 1340 in this example. By passing underneath, the parietal strap portion 1310 may advantageously be able to engage the user's head securely (e.g. sufficiently tightly) without limiting the ability of the top strap portion 1340 to be moved in the anterior-posterior directions.

As shown in particular in FIGS. 28B and 28C, the top strap portion 1340 may pass through a buckle 1312 connected to the parietal strap portion 1310. The buckle 1312 may be configured to limit lateral movement of the top strap portion 1340, which may advantageously keep the top strap portion 1340 centred on the user's head in use. In this example, the buckle 1312 is located in the sagittal plane of the user's head in use. In this example the buckle 1312 is substantially rigid and may be formed from a thermoplastic material, for example. The buckle 1312 could alternatively be formed from a flexible material, such as a textile material.

In other examples the parietal strap portion 1310 may be immovable with respect to the top strap portion 1340. In some examples the parietal strap portion 1310 is fixedly connected to the top strap portion 1340.

4.2.1.2 Top Strap Portion

As shown in FIGS. 28A and 28B in particular, the top strap portion 1340 is connected to the occipital strap portion 1320 in this example.

In this example, the top strap portion 1340 is adjustable in length. This may advantageously allow a user to achieve a more secure, stable and/or comfortable fit when wearing the head-mounted display system 1000. The top strap portion 1340 may be adjustable in length between the head-mounted display unit 1200 and the battery pack 1500. Alternatively or additionally, the top strap portion 1320 may be adjustable in length between the head-mounted display unit 1200 and the occipital strap portion 1320.

In this example, the top strap portion 1340 is connected to the head-mounted display unit 1200 through an eyelet 1202 connected to the head-mounted display unit 1200 and looped back and secured to itself. An end portion of the top strap portion 1340 may secure to another portion of the top strap portion 1340 with a hook-and-loop fastener connection.

In the examples shown in FIGS. 28A and 29, an outer layer 1341 of the top strap portion 1340 is configured to be passed through the eyelet 1202 and looped back and secured to itself. However, a user-facing layer 1344 does not pass through the eyelet. The user-facing layer 1344 remains in contact with the user's head. The top strap portion 1340 may be substantially inextensible.

As shown in FIG. 28A and FIG. 29, the top strap portion 1340 comprises a layered construction. That is, the top strap portion 1340 may be formed from a plurality of layers. The top strap portion 1340 comprises a substantially inextensible layer 1343 in these examples, which may prevent the top strap portion 1340 from extending in length (optionally along with other components or layers which may also prevent the top strap portion 1340 from extending in length). As shown in FIG. 28A and FIG. 29, an anterior end of the substantially inextensible layer 1343 is spaced along the length of the top strap portion from the head-mounted display unit. This may advantageously allow the length of the top strap portion 1340 to be adjusted without the head-mounted display unit 1200 interfering with the substantially inextensible layer 1343.

In these examples, the top strap portion comprises a textile user-facing layer 1344. That is, the user-facing layer 1344 may be formed from a textile material. Additionally or alternatively, the top strap portion 1340 may comprise a textile outer layer 1341.

In the examples shown in FIGS. 28A-28C and FIG. 29, the top strap portion 1340 comprises a power cable 1510 connecting the battery pack 1500 to the head-mounted display unit 1200 to provide power from the battery pack to the head-mounted display unit 1200 in use. The battery pack 1500 may power the display and other electronic components. In these examples, the power cable 1510 is internal to the top strap portion 1340.

Figure 42A:
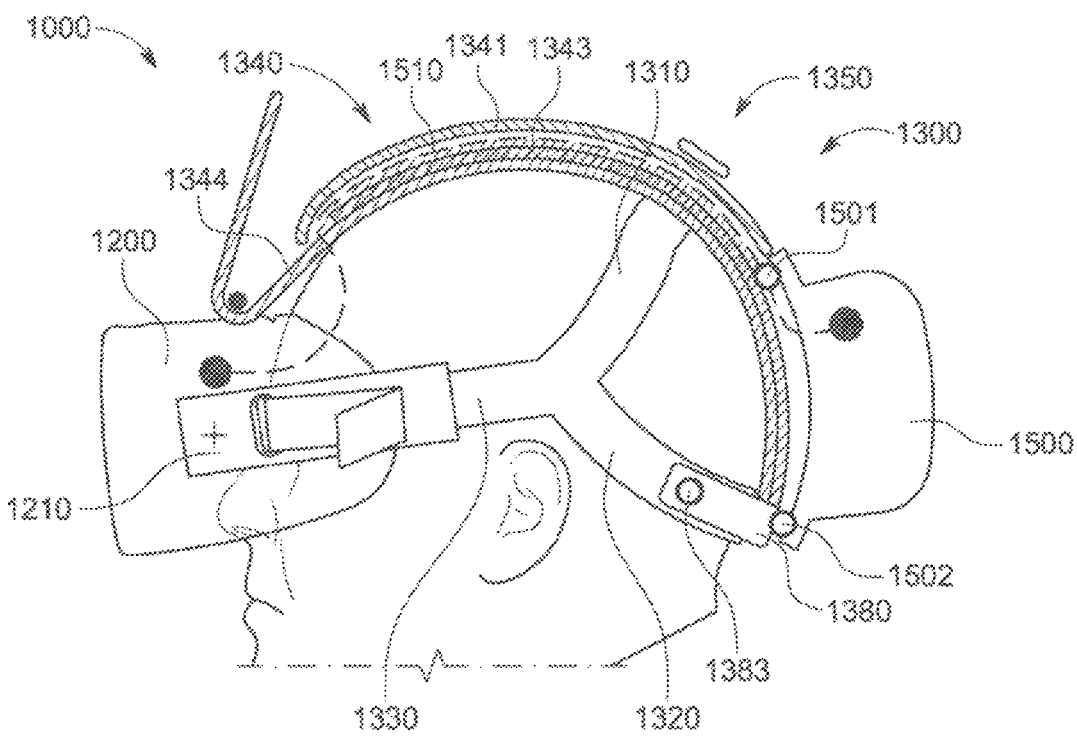
Figure 42B:
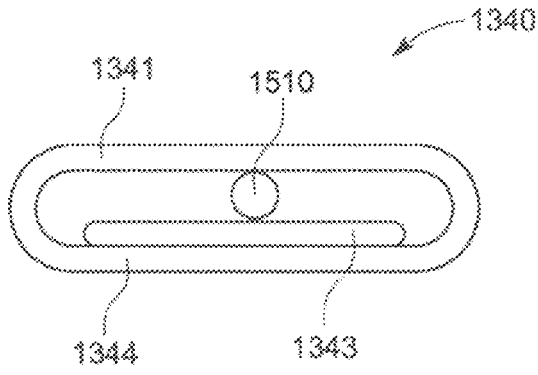
Figure 42C:
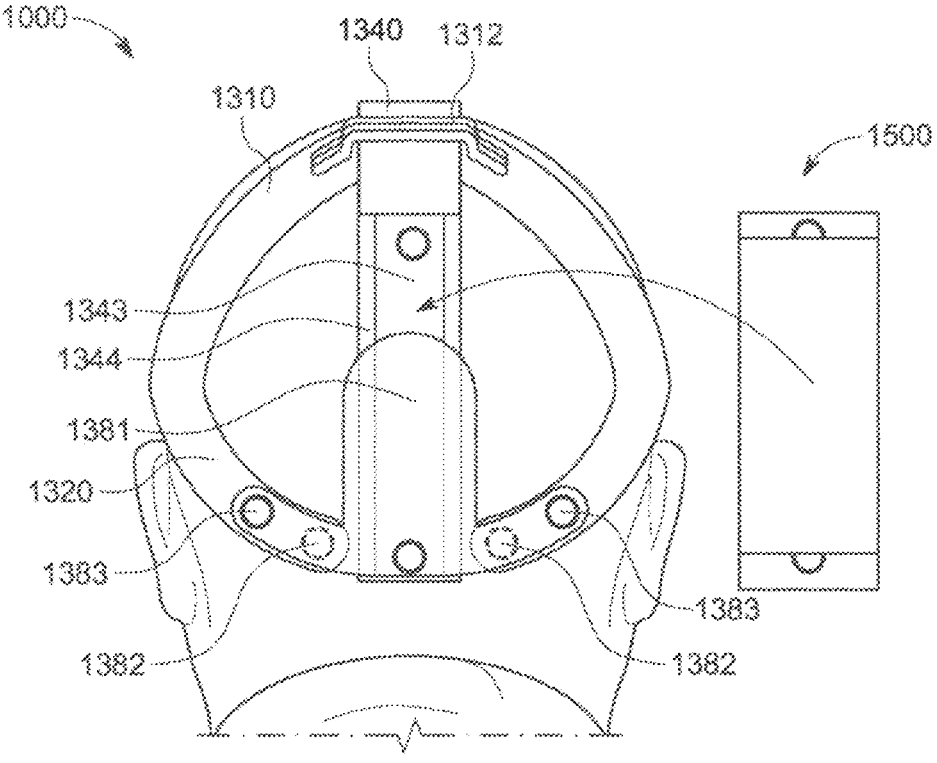

FIG. 43A-43D shows another example of the present technology in which the power cable 1510 is internal to the top strap portion 1340. In this example, the power cable 1510 is insertable through an interior of the top strap portion 1340 by the user. In particular, the power cable 1510 is insertable through the top strap portion 1340 between the substantially inextensible layer 1343 and the outer layer 1341. FIG. 42E shows the positioning and stabilising structure 1300 in a disassembled state and FIGS. 42A and 42C show the head-mounted display system 100 assembled. FIG. 42B is a cross section view showing the interior of the top strap portion 1340 with internal power cable 1510 visible.

4.2.1.3 Anterior and Posterior Portions of Top Strap Portion

FIG. 54 shows another example of the present technology. In this example the top strap portion 1340 comprises an anterior portion 1345 and a posterior portion 1346. The posterior portion 1346 is configured to engage the user's head in use. However, the anterior portion 1345 is configured to not engage the user's head in use. The anterior portion 1345 is spaced from the user's head. Advantageously, the spacing partially or fully avoids the anterior portion 1345 compressing, impinging or otherwise interfering with the user's hair on the user's head in the area over which the anterior portion 1345 lies in use.

Excessive compression of or interference with the user's hair may result in a lack of comfort during use or embarrassment when the user doffs the head-mounted display system. The top strap portion 1340 with an anterior portion 1345 which does not engage the user's head (e.g. does not press against the user's head) in use may at least partially address these problems or concerns. The amount of contact the anterior portion 1345 may make with a particular user's hair will depend on the length and style of the user's hair. The anterior portion 1345 may not engage the user's head but, if a user has a sufficiently long hair length and/or style, the user's hair may nevertheless contact the anterior portion 1345. However, as the anterior portion 1345 does not engage the user's head, it may not overly compress, interfere with or mess up the user's hair.

The anterior portion 1345 may not engage the user's head by, for example, not being in contact with the user's head (e.g. if it would not be in contact with the user's skin even if the user had no hair), by not pressing, wrapping and/or fitting against and/or exerting force on the user's head. The posterior portion 1346 may engage the user's head by being in contact with the user's head (e.g. if it would be in contact with the user's skin if the user had no hair), by pressing, wrapping and/or fitting against and/or exerting force on the user's head.

As shown in FIG. 54, in this particular example the top strap portion 1340 comprises a shape having a bend between the posterior portion 1346 and the anterior portion 1345. The top strap portion 1340 may be shaped to follow a curvature of the user's head in the posterior portion 1346 of the top strap portion 1340 and deviate from the curvature of the user's head in the anterior portion 1345 of the top strap portion 1340. In some examples, the top strap portion 1340 is rigidised to support the anterior portion 1345 in spaced relation to the user's head. The anterior portion 1345 may be spaced superiorly from a fringe, forehead and/or frontal bone region of the user's head.

As shown in FIG. 54, the anterior portion 1345 curves inferiorly towards the head-mounted display unit 1200. Additionally, the anterior portion 1345 of the top strap portion 1340 may extend in a partially superior direction from the posterior portion 1346 of the top strap portion 1340 (e.g. extends from an anterior end 1347 of the posterior portion 1346).

The anterior portion 1345 of the top strap portion 1340 may be connected to the posterior portion 1346 of the top strap portion 1340 at an anterior end 1347 of the posterior portion 1346.

The anterior end 1347 of the posterior portion 1346 may be located in a number of different locations with respect to the user's head, in various examples of the present technology. The anterior end 1347 may be located posteriorly to a fringe region of the user's head. For example, the anterior end 1347 may be located between a fringe region and coronal suture of the user's head in use. In some examples the anterior end 1347 is located posteriorly to the frontal bone of the user's head in use. In some examples the anterior end 1347 is located proximate a coronal plane of the user's head in use, the coronal plane aligned with each otobasion superior of the user's head. In some examples the anterior end 1347 is located posterior to the coronal plane aligned with each otobasion superior of the user's head in use. In some examples the anterior end 1347 of the posterior portion 1346 may be located proximate a parietal strap portion 1310 of the positioning and stabilising structure 3300 in use. As described above, the top strap portion 1340 may comprise a bend. The bend may be located at or proximate the anterior end 1347 of the posterior portion 1346, for example as shown in FIG. 54.

As shown in FIG. 54, the top strap portion 1340 connects between the head-mounted display unit 1200 and a battery pack 1500 for powering the head-mounted display system 1000. The battery pack 1500 may be located against a posterior surface of the user's head in use. The top strap portion 1340 may advantageously transfer the downwards weight force of the battery pack 1500 to an upwards supportive force on the head-mounted display unit 1200 countering a downwards weight force of the head-mounted display unit 1200.

The top strap portion 1340 may be adjustable in length. As shown in FIG. 54, the top strap portion 1340 is configured to be connected to the head-mounted display unit 1200 through an eyelet 1202 connected to a display unit housing 1205 of the head-mounted display unit 1200 and looped back and secured to itself (for example with a hook-and-loop fastening or a buckle). In particular, a user-facing layer 1344 of the top strap portion 1340 is configured to be passed through the eyelet 1202 and looped back and secured to itself (e.g. with a hook-and-loop fastening, buckle or the like). In this particular example, no outer layer of the top strap portion 1340 passes through the eyelet 1202.

A user-facing layer 1344 may be user-contacting (e.g. it may be a user-contacting layer) or non-user-contacting (e.g. it may be a non-user-contacting layer). Some or all of the user-facing layer 1344 may contact the user (e.g. against their hair/head). At least some of the user-facing layer 1344 may not contact the user and/or may not engage the user's head. For example, in the FIG. 54 positioning and stabilising structure 1300, a portion of the user-facing layer 1344 (e.g. the anterior portion 1345) does not contact the user (e.g. it is spaced from the user's head). Additionally, in the FIG. 54 example, a portion of the user-facing layer 1344 (e.g. the posterior portion 1346) contacts the user (e.g. it is in contact with the user's hair/head).

The top strap portion 1340 (e.g. both the anterior portion 1345 and posterior portion 1346) may be substantially inextensible and may comprise a layered construction. In the example shown in FIG. 54, the top strap portion 1340 comprises a substantially inextensible layer 1343. In this example the substantially inextensible layer 1343 at least partially rigidises the top strap portion 1340. The substantially inextensible layer in some examples (e.g. the FIG. 54 example and in other examples) may function as a rigidiser. For example, the substantially inextensible layer 1343 may rigidise the top strap portion 1340 by imparting a shape to the top strap portion 1340. It is to be understood that a rigidised strap may still be bendable, but may be rigidised in the sense that it is self-supporting or more rigid than a floppy strap portion. The substantially inextensible layer 1343 extends along both the anterior portion 1345 and the posterior portion 1346. The substantially inextensible layer 1343 may rigidise the anterior portion 1345 to support the anterior portion 1345 in spaced relation to the user's head. That is, the anterior portion 1345 may be rigidised such that it is supported off the user's head so that it does not engage the user's head in use. As illustrated in FIG. 54, an anterior end of the substantially inextensible layer 1343 is spaced along the length of the top strap portion 1340 from the head-mounted display unit 1200. For example, there is a gap between an anterior end of the substantially inextensible layer 1343 and the head-mounted display unit 1200. In some examples the top strap portion 1340 comprises a textile user-facing layer 1344. In some examples the top strap portion 1340 comprises a textile outer layer, for example covering the substantially inextensible layer 1343.

In some examples a top strap portion 1340 comprising an anterior portion 1345 that does not engage the user's head comprises a power cable 1510 (not shown in FIG. 54) for connecting the battery pack 1500 to the head-mounted display unit 1200 to provide power from the battery pack 1500 to the head-mounted display unit 1200 in use. The power cable 1510 may be internal to the top strap portion 1340. For example, the power cable 1510 may be insertable through an interior of the top strap portion 1340 by the user. In some examples the power cable 1510 is insertable through the top strap portion 1340 between the substantially inextensible layer 1343 and a textile outer layer.

The substantially inextensible layer 1343 may be a portion of an adjustment rigidiser 1380. Adjustment rigidisers 1380 are described below, the features of which may be applied to an adjustment rigidiser forming the substantially inextensible layer 1343 of the positioning and stabilising structure 1300 shown in FIG. 54.

It is to be understood that the top strap portion 1340 described with reference to FIG. 54 (e.g. a top strap portion 1340 having an anterior portion 1345 that does not engage the user's head in use) may have any one or more of the features described with reference to any of the other exemplary top strap portions described herein. Likewise, a top strap portion 1340 having an anterior portion 1345 that does not engage the user's head may be applied to any of the other head-mounted display systems 1000 described herein.

4.2.1.4 Battery Pack

As shown by way of example in FIG. 28A, the battery pack 1500 in some examples of the present technology is connected to the top strap portion 1340 at a superior location 1501 and an inferior location 1502. In other examples the battery pack 1500 may be connected to the top strap portion 1340 at only one of these locations and/or or to a different component.

In the FIG. 28A example, the battery pack 1500 is removably connected to the top strap portion 1340. The battery pack 1500 may be connected to the top strap portion 1340 by a hook-and-loop connection. Alternatively, the battery pack 1500 may be connected via buttons, studs (e.g. domes) or the like. In this example the inferior location 1502 at which the battery pack 1500 connects to the top strap portion 1340 is proximate the occipital strap portion 1320.

Connecting the battery pack 1500 in this manner may advantageously allow the parietal strap portion 1310 and/or the occipital strap portion 1320 to engage the user's head unimpeded by the battery pack 1500.

The battery pack 1500 may comprise a concave inner surface configured to correspond approximately to a curvature of the user's head.

FIGS. 43A-43C show battery packs 1500 according to various examples of the present technology, suitable use in head-mounted display systems 1000 shown in FIGS. 28A-28C, 29, 30, 42A-42E, 44A-44D, 49A-49E, 52A-52B, 53A-53C and 54 for example. The posterior surface of a user's head is indicated by 1010 to illustrate an in-use position of each battery packs 1500 and its internals. As shown in each view, the battery pack 1500 comprises a battery pack housing 1505 and a plurality of cells 1502 contained within the housing 1505, in these examples. The cells 1502 may be spaced equidistantly in the battery pack housing 1505 from an anterior wall of the battery pack housing 1505, as shown in FIG. 43A. One of more of the cells 1502 may be spaced further from an anterior wall of the battery pack housing 1505 than another one or more of the cells 1502, as shown in FIG. 43B. Spacing the cells 1502 further posteriorly may advantageously enable the battery pack 1500 to create a larger moment to counter the weight of the head-mounted display unit 1200. Alternatively or additionally, each of the plurality of cells 1502 may be spaced from an anterior wall of the battery pack housing 1505, as shown in FIG. 13C.

The battery pack housing may contain a counterweight 1512 configured to contribute to a balance of weight between the battery pack 1500 and the head-mounted display unit 1500, as show in FIG. 43C. In the FIG. 43C example, the battery pack housing 1505 is spaced from a posterior surface 1010 of the user's head (in this particular example by a pad 1511, which may be designed for comfort). The counterweight 1512 may be a dead-weight formed from metal, water, sand, or other dense material, in permanent or removable configuration. In some examples the battery pack 1500 may be replaced by a counterweight alone, for example if the battery is located in the head-mounted display unit 1200. The battery pack housing 1505 may also comprise supports to increase the offset distance from the posterior surface 1010 of the user's head.

4.2.1.5 Power Cable Strap Portion

As described above, the head-mounted display system 1000 may comprise a power cable 1510 connected between the battery pack 1500 and the head-mounted display unit 1200. FIGS. 46A-46C and 47A-47B show such examples. The power cable 1510 may be located within the top strap portion 1340 in use (FIGS. 46B and 46C) or may be located alongside the top strap portion 1340 in use (FIG. 46A).

In the example shown in FIGS. 47A-47B, the power cable 1510 is attached to a power cable strap portion 1520 proximate the head-mounted display unit 1200. The power cable strap portion 1520 in this examples is extendable in length. A serpentine portion of the power cable 1510 is attached to the power cable strap portion 1520 in a serpentine pattern, enabling the power cable strap portion 1520 and the serpentine portion of the power cable 1510 to extend in length. Further, in these examples, the power cable 1510 is attached to the parietal strap portion 1320.

4.2.1.6 Power Cable Management

FIGS. 48 and 49A-49E show further examples of the present technology in which a power cable 1510 connects a head-mounted display unit 1200 and a battery pack 1500. As described herein, the head-mounted display unit 1200 may comprise a display unit housing 1205 comprising a display, and an interfacing structure 3800 constructed and arranged to be in opposing relation with the user's face and engage the user's face.

As shown in FIG. 48, the power cable 1510 may enter the display unit housing 1205 outside of a periphery of the interfacing structure 3800. In this example, the display unit housing 1205 comprises a posterior-facing side (visible in FIG. 48) and an interfacing structure 3800 extending posteriorly from the posterior-facing side. The posterior-facing side may be larger than the periphery of the interfacing structure 3800 allowing the power cable 1510 to enter the display unit housing 1205 through an opening 1206 in the posterior-facing side of the display unit housing 1205.

More particularly, the posterior facing side of the display unit housing 1205 in this example comprises a rectangular shape and the interfacing structure 3800 comprises a rounded shape. The opening 1206 in the posterior-facing side is located proximate a corner of the rectangular shape of the posterior-facing side.

FIGS. 49A-49E show examples of head-mounted display systems 1000 having positioning and stabilising structures 1300 which comprise a posterior support portion 1350 comprising a parietal strap portion 1310 configured to overlie the parietal bones of the user's head in use and an occipital strap portion 1320 configured to overlie or lie below an occipital bone of the user's head in use. The positioning and stabilising structures 1300 further comprise a pair of lateral strap portions 1330 configured to connect between the posterior support portion 1350 and the head-mounted display unit 1200, each configured to be located on a respective lateral side of the user's head in use. Further, the positioning and stabilising structures 1300 comprise a top strap portion 1340 configured to connect between the battery pack 1500 and the head-mounted display unit 1200, the top strap portion 1340 configured to overlie a superior portion of the user's head in use.

Figure 49A:
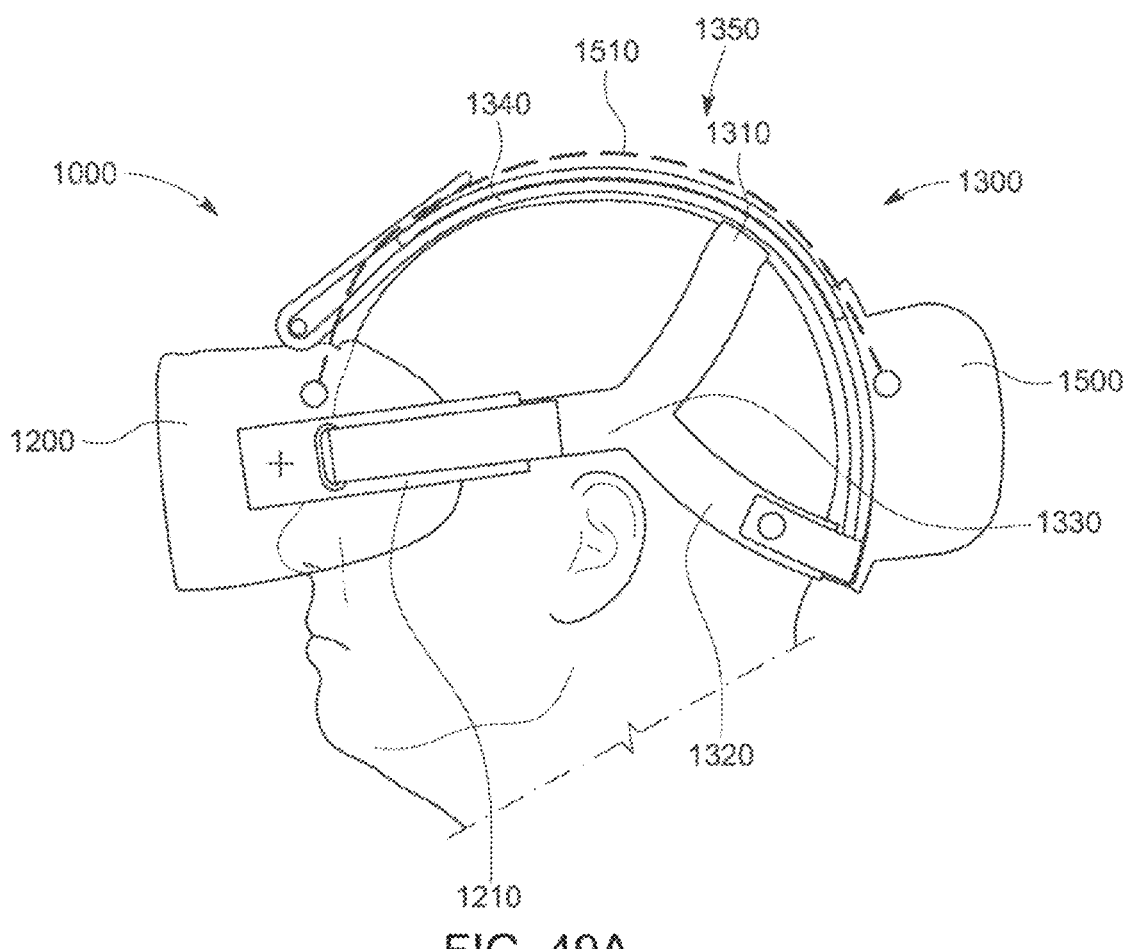

In each of these examples, the power cable 1510 runs along (e.g. is attached to, otherwise secured at or aligned with) the top strap portion 1340 from the battery pack 1500 to the head-mounted display unit 1200 (as shown in FIG. 49A).

Figure 49B:
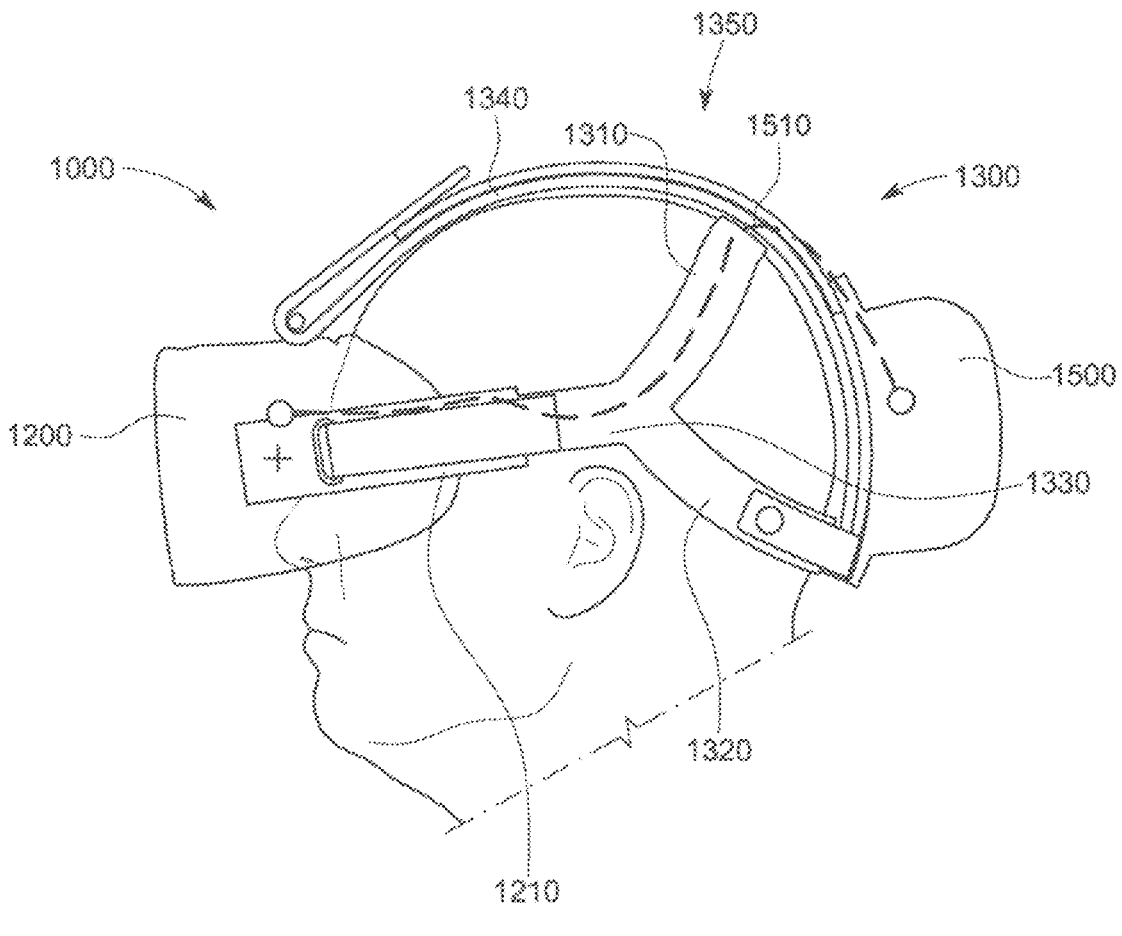
Figure 49C:
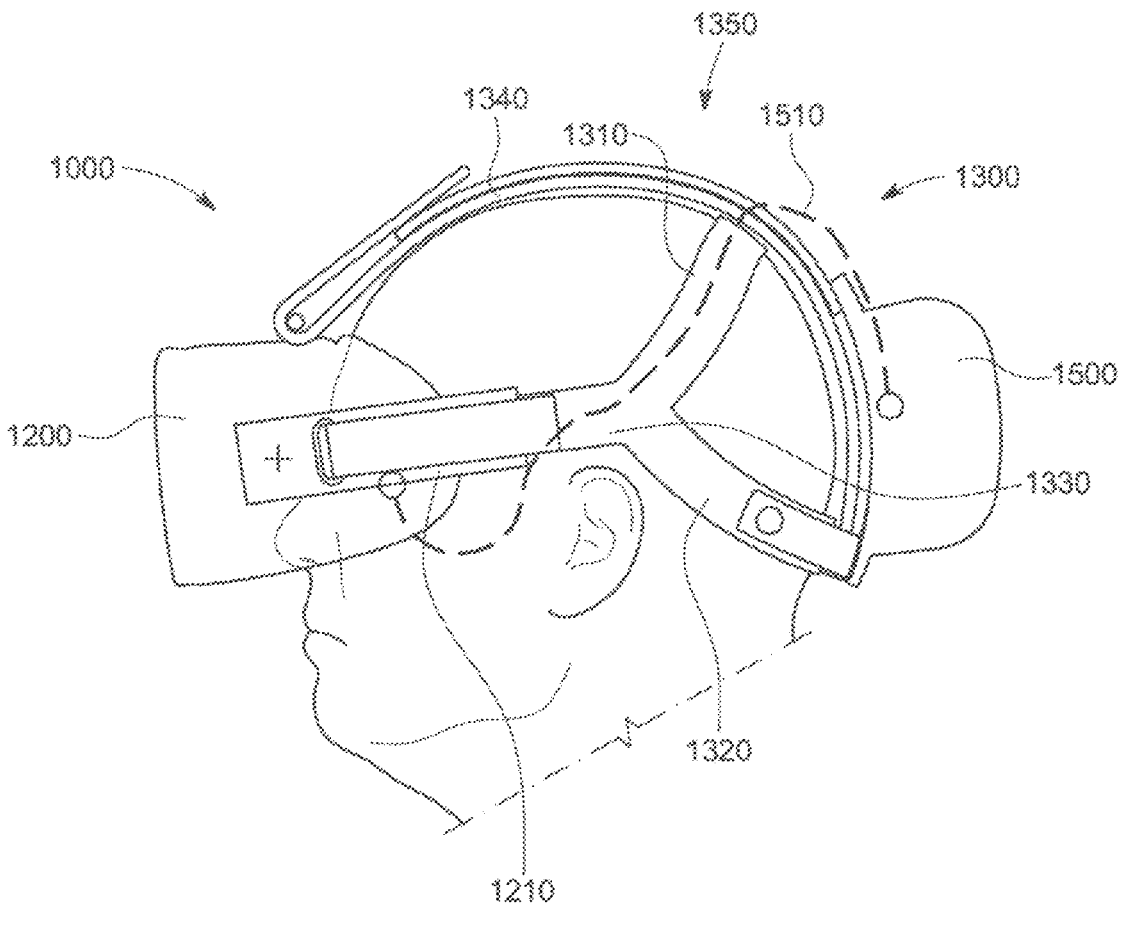

The power cable 1510 may run along the parietal strap portion 1310 and one of the lateral strap portions 1330 from the battery pack 1500 to the head-mounted display unit 1200 (as shown in FIGS. 49B and 49C). The power cable 1510 may connect to the head-mounted display unit at a laterally-facing side thereof (as shown in FIG. 49C).

Figure 49D:
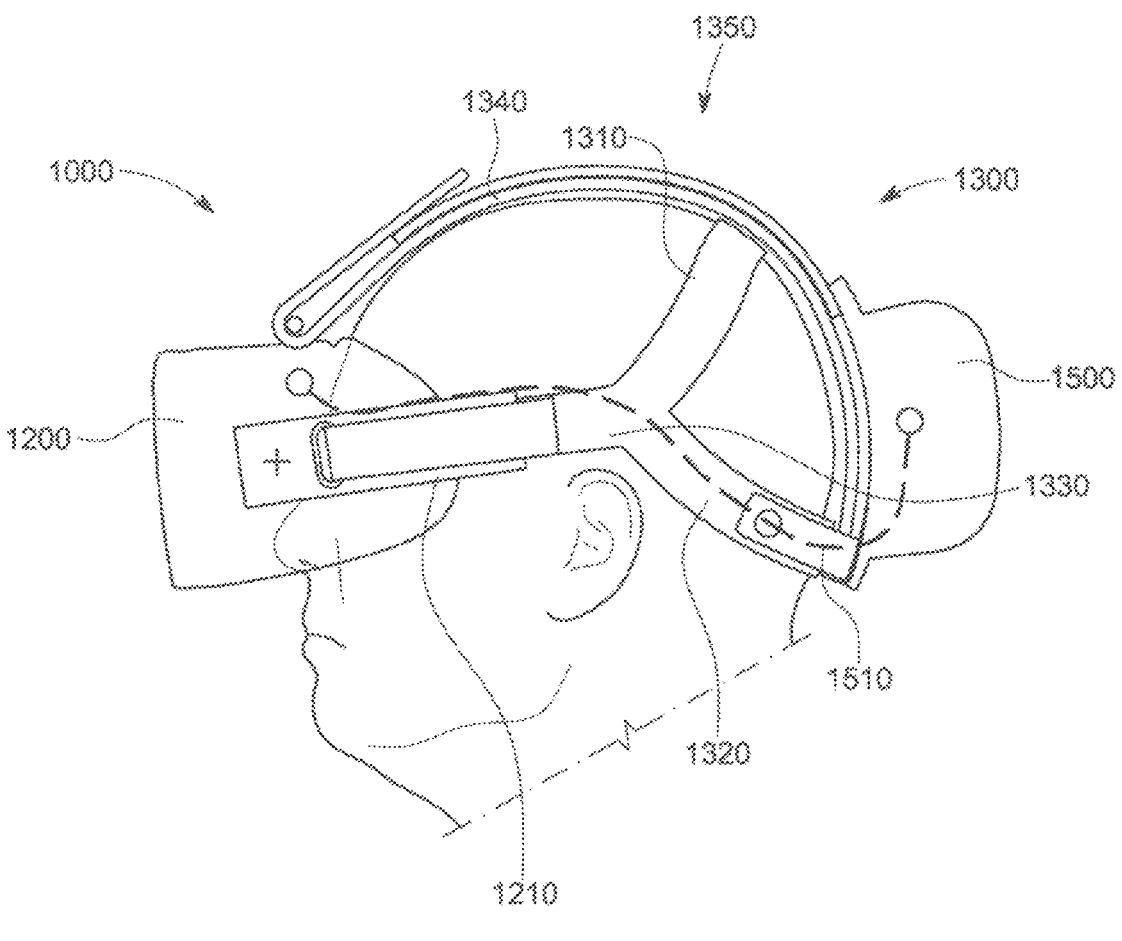
Figure 49E:
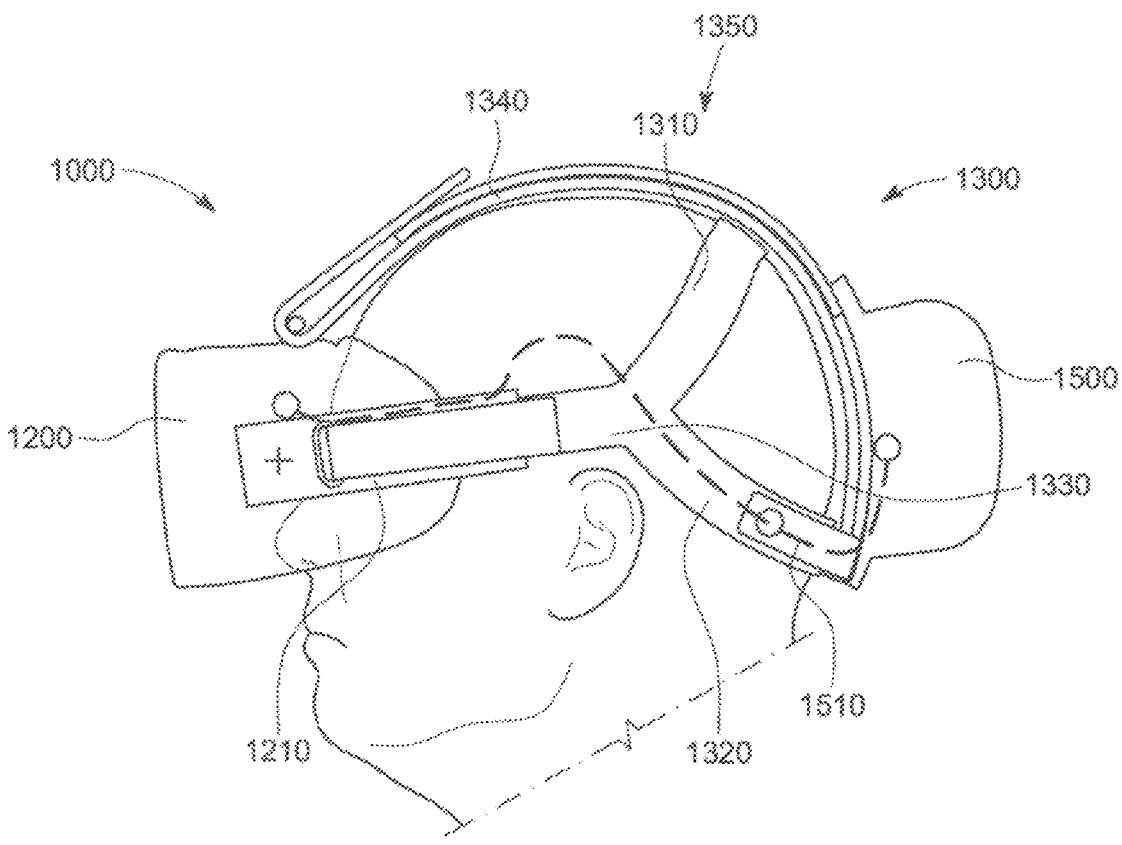

The power cable 1510 may run along the occipital strap portion 1320 and one of the lateral strap portions 1330 (as shown in FIG. 49D). The power cable 1510 may comprise a slack portion configured to tolerate movement between the head-mounted display unit 1200 and the battery pack 1500 (for example during active use, adjustment or transport, for example), as shown in each of FIGS. 49C and 49E.

4.2.1.7 Retractable Power Cable

In some examples of the present technology, such as the example shown in FIG. 29, a portion of the power cable 1510 is located within the battery pack 1500 and is able to be extended from and retracted into the battery pack 1500. This may advantageously allow the length of the top strap portion 1340 to be adjusted without affecting the location of the battery pack 1500 and/or the occipital strap portion 1320. A retractable power cable 1510 may also be incorporated into other examples, such as any of the other head-mounted display systems 1000 described herein.

One or more layers of the top strap portion 1340 may be partially located within the battery pack 1500 and may be able to be extended from and retracted into the battery pack 1500 together with the power cable 1510.

As shown in FIG. 29, the outer layer 1341 of the top strap portion 1340 is, in this example, located within the battery pack 1500 and is able to be extended from and retracted into the battery pack 1500 together with the power cable 1510. Additionally, the substantially inextensible layer 1343 of the top strap portion 1340 is located within the battery pack 1500 and is able to be extended from and retracted into the battery pack 1500 together with the power cable 1510. In other examples, such as the example shown in FIG. 28A, the substantially inextensible layer 1343 is located between the battery pack 1500 and the user's head. In this example (and also in the example shown in FIG. 28A) the user contacting layer 1344 of the top strap portion 1340 is located between the battery pack 1500 and the user's head.

The portion of the power cable 1510 located within the battery pack 1500 and the one or more layers of the top strap portion 1340 partially located within the battery pack 1500 may form a retractable portion of the top strap portion 1340 able to be extended from and retracted into the battery pack 1500 to adjust a length of the top strap portion 1340 between the battery pack 1500 and the head-mounted display unit 1200. That is, power cable 1510 and one or more layers of the top strap portion 1340 may form a retractable portion that the user can extend from and retracted into the battery pack 1500. The retractable portion may comprise the outer layer 1341, the power cable 1510, and the substantially inextensible layer 1343, for example. The user-facing layer 1344 may not form part of the retractable portion. The user-facing layer 1344 may be located between the battery pack 1500 and the user's head. The user-facing layer 1344 may split from one or more other layers of the top strap portion 1340. The battery pack 1500 may slide over the user-facing layer 1344 (and any other layers not located within the battery pack 1500), to enable adjustment of the length of the top strap portion 1340 between the battery pack 1500 and the head-mounted display unit 1200 and/or to enable the position of the battery pack 1500 on the user's head to be adjusted.

In some examples of the present technology, the retractable portion of the top strap portion 1340 is able to be moved between a plurality of predetermined positions with respect to the battery pack 1500 at which the position of the retractable portion is able to be fixed with respect to the battery pack 1500. For example, the retractable portion may be moveable with respect to the battery pack 1500 between three positions corresponding to Small, Medium and Large sizes. The user may adjust the top strap portion 1340 to a chosen one of these sizes. In some examples, the top strap portion 1340 may be fixed to the head-mounted display unit 1200. In the example shown in FIG. 29, the top strap portion 1340 is adjustable at the head-mounted display unit 1200 in that a user is able to pull more or less of the top strap portion 1340 (or at least an end portion of the outer layer 1341 thereof) through the eyelet 1202. The user may make course adjustments to a length of the top strap portion 1340 by changing the amount of the top strap portion 1340 within the battery pack, and may make fine adjustments with by changing the amount of the top strap portion 1340 pulled through the eyelet 1202. The positioning and stabilizing structure 1300 may therefore provide for two mechanisms of adjustment of a length of the top strap portion 1340, which may include a coarse adjustment mechanism and a fine adjustment mechanism.

In other examples, the retractable portion of the top strap portion 1340 is able to be moved continuously within a range of possible positions with respect to the battery pack 1500. The retractable portion may be held in place by a locking mechanism (e.g. a spring loaded buckle or other catch) or may be held in place in use by the tension in the top strap portion 1340.

4.2.1.8 Arms

As shown in FIG. 28A, FIG. 29 and FIG. 30, the head-mounted display unit 1200 comprises a display unit housing 1205 and a pair of arms 1210 extending from the display unit housing 1205. In each example, the lateral strap portions 1330 of the positioning and stabilizing structure 1300 each connect to a respective one of the arms 1210. Features of arms described herein may also be incorporated into other examples, such as any of the other head-mounted display systems 1000 described herein.

As shown in each of FIG. 28A, FIG. 29 and FIG. 30, each lateral strap portion 1330 connects to a posterior end of a respective one of the pair of arms 1210. As shown in FIG. 28A, FIG. 29, in this example, each lateral strap portion 1330 passes through an eyelet 1212 at the posterior end of the respective arm 1210 and is fastened back onto itself.

As shown in FIG. 30, in this example, each lateral strap portion 1330 connects to a respective one of the pair of arms 1210 proximate an anterior end of the arm 1210. In particular, each lateral strap portion 1330 passes through an eyelet 1214 at or proximate the posterior end of the respective arm 1210 and through a hole 1216 proximate the anterior end of the arm and is fastened to the arm 1210. As illustrated, in this example, each lateral strap portion 1330 is fastened to a laterally facing side of the respective arm 1210. As shown in FIG. 30, an end portion 1332 of each lateral strap portion 1330 is secured to the arm 1210. The lateral strap portion 1330 may fasten to the respective arm 1210 with a hook and loop fastening arrangement, by one or more of a series of domes, or by another suitable mechanism. In other examples, the arm 1210 may comprise a spring loaded buckle or other catch that prevents retraction of the lateral strap portion 1330 through the hole 1216.

In each of the examples shown in FIG. 28A, FIG. 29 and FIG. 30, each of the pair of arms 1210 is able to pivot with respect to the display unit housing 1205. Each of the arms 1210 may be covered with a textile material. Each arm 1210 may be sheathed by a tubular textile material.

Figure 42D:
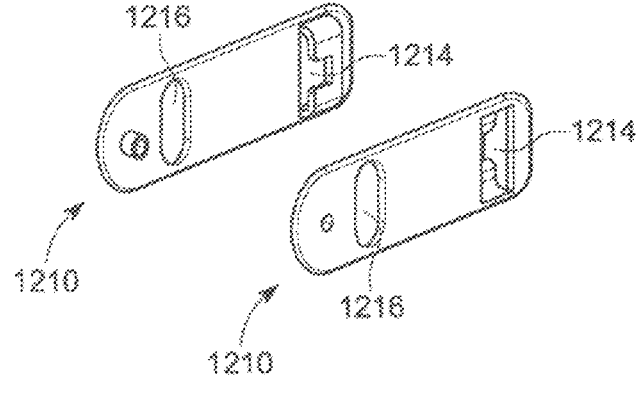
Figure 42E:
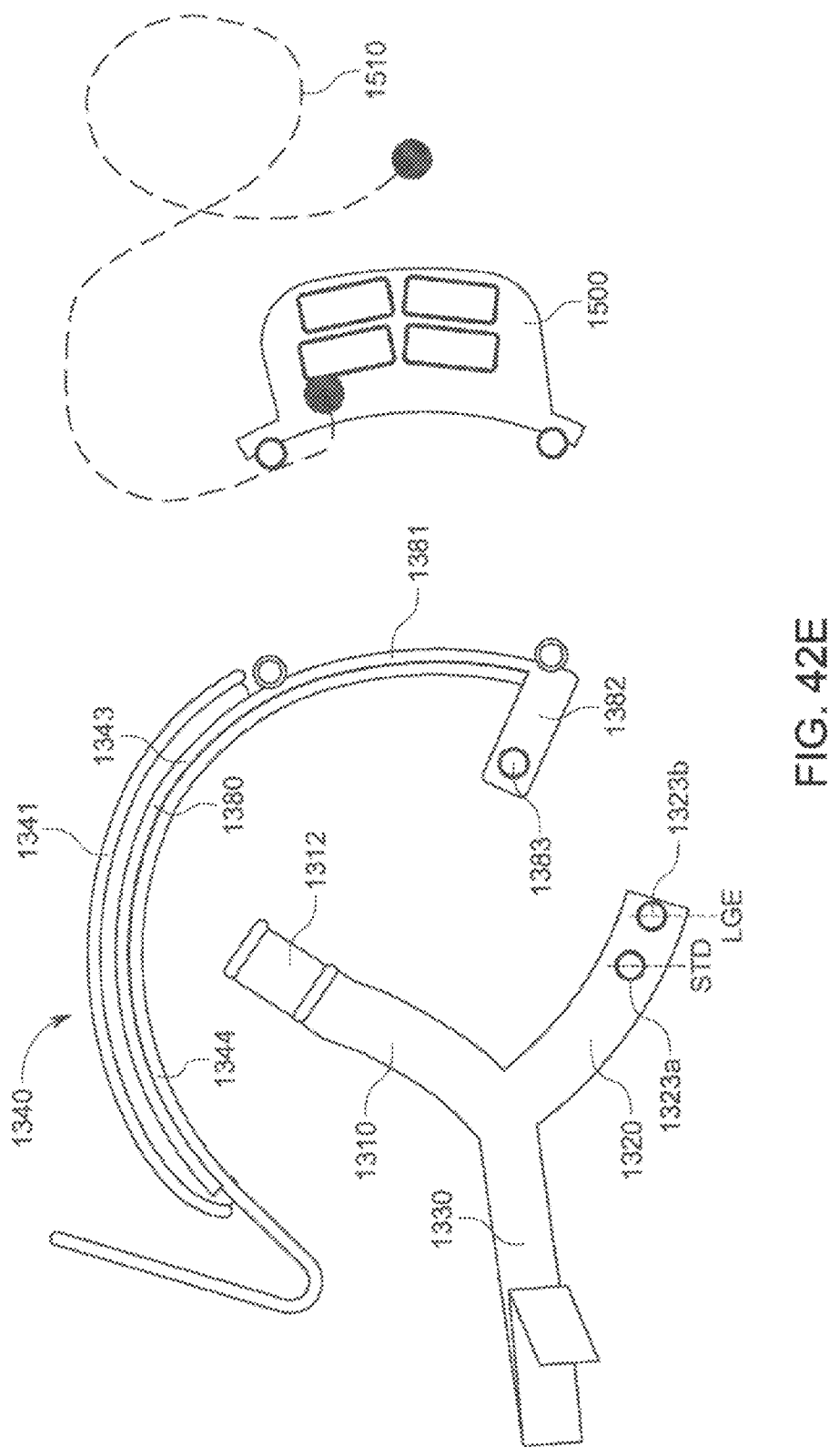

FIG. 42D shows a pair of arms 1210 according to another example of the present technology. Each arm 1210 has an eyelet 1214 (in this example in the form of an open slot into which a strap portion can be slipped) and a hole 1216 through which a strap portion can be pulled through and fastened back on itself or on another portion configured for attachment.

Figure 50A:
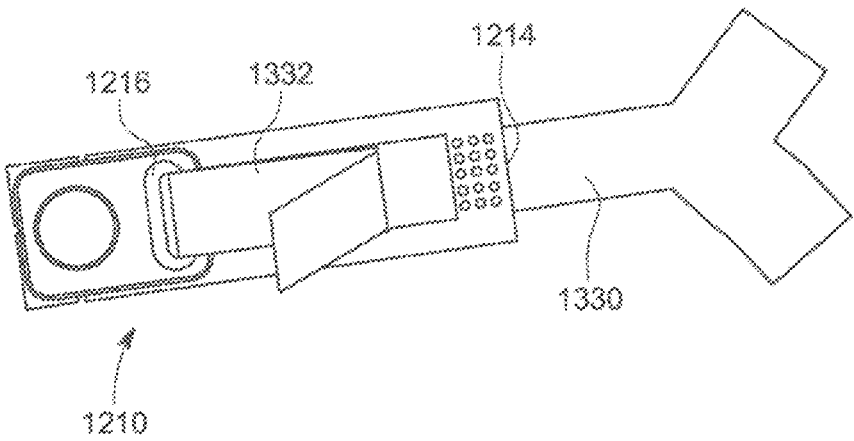
Figure 50B:
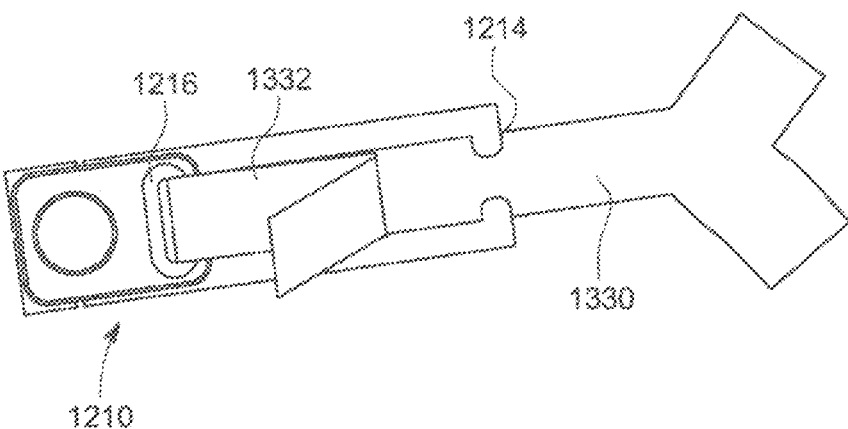
Figure 50C:
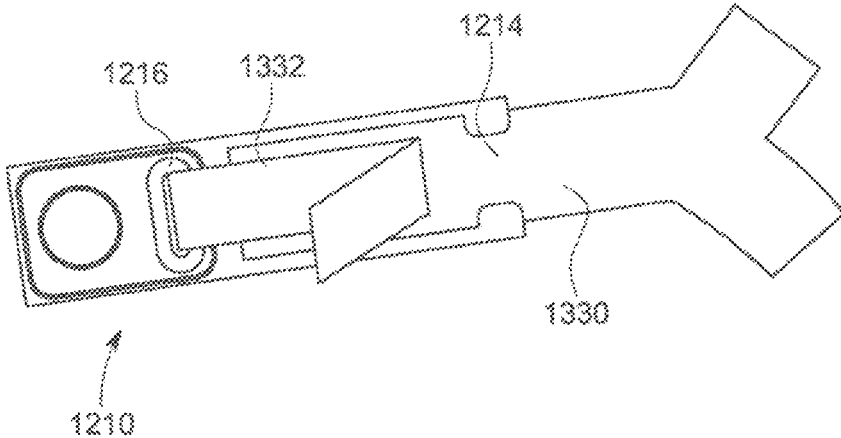
Figure 50D:
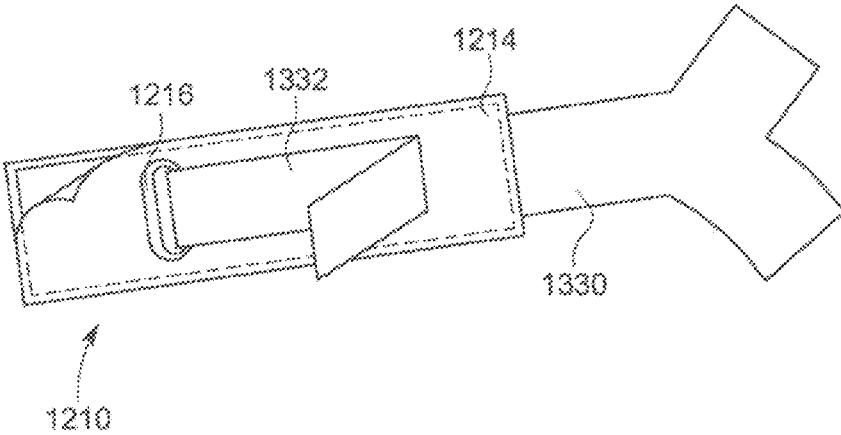

FIGS. 50A-50D show arms 1210 according to further examples of the present technology. Each lateral strap portion 1330 may be fastened to an exposed portion of itself within the arm 1210, as shown in FIGS. 50A, 50B and 50C. As shown in each of FIGS. 50A, 50B and 50C, end portions 1332 of the lateral strap portions 1330 are fastened back onto the lateral strap portions 1330. As shown in FIGS. 50B and 50C, the eyelet 1214 at or proximate the posterior end of the arm 1210 is partially open allowing the strap 1330 to move in a transverse direction with respect to the strap 1330 into/out of the eyelet 1214. In some examples, as depicted in FIG. 50D, each arm 1210 is covered in a sock, each lateral strap portion 1330 (e.g. the end portion 1332 thereof) being fastened to the sock (e.g. with a hook-and-loop type fastening).

As shown in FIGS. 51A and 51B, in some examples each arm 1210 comprises a substantially rigid portion 1217 overmoulded to a textile portion 1218. In these examples (or in other examples), the strap connecting to the arm 1210 may comprise a feature to prevent run-through of the strap, for example a widened portion of the strap.

4.2.1.9 Adjustment Rigidiser

FIGS. 42A-42E and FIGS. 44A-44E show head-mounted display systems 1000 according to further examples of the present technology, although share features with the examples shown in FIGS. 28A-28C, 29 and 30A, not all of which will be repeated. The following description will focus on differences. FIGS. 45A, 45C and 45D show adjustment rigidisers 1380, which will be described below. FIG. 45B shows a positioning and stabilising structure 1300 having a parietal strap portion 1310, occipital strap portion 1320 and top strap portion 1340 configured for use with the adjustment rigidisers 1380. An adjustment rigidiser 1380 as described herein may also be applied to other examples, such as any of the other head-mounted display systems 1000 described herein.

In the examples shown in FIGS. 42A-42E and 44A-44D, the positioning and stabilising structures 1300 comprise lateral strap portions 1330 configured to connect to arms 1210. In other examples the positioning and stabilising structures 1300 may comprise elastic elements configured to connect to covers on arms 1210 and connect via a button connection and/or a hook-and-loop fastening.

With reference to FIGS. 42A-42E, 44A-44D and 45A-45D, the positioning and stabilising structure 1300 may comprise an adjustment rigidiser 1380 comprising a substantially inextensible member. In these examples the adjustment rigidiser 1380 is configured to connect to the occipital strap portion 1320. The adjustment rigidiser 1380 may be configured to reduce a length of the occipital strap portion 1320.

The occipital strap portion 1320 may comprise three or more occipital strap connection points 1323, the adjustment rigidiser 1380 being selectively connectable to a first pair of the occipital strap connection points 1323 and to a second pair 1323 of the occipital strap connection points 1323. When the adjustment rigidiser 1380 is connected to the first pair of the occipital strap connection points 1323, the occipital strap portion may have a first effective length (e.g. corresponding to a small size). When the adjustment rigidiser 1380 is connected to the second pair of the occipital strap connection points 1323, the occipital strap portion may have a second effective length longer than the first effective length. (e.g. corresponding to a large size). The different connection options allow an effective length of a strap portion to be varied by the user to achieve a good fit when using the head-mounted display system 1000.

In some examples, the adjustment rigidiser 1380 constrains the occipital strap portion 1320 to the first effective length when the adjustment rigidiser 1380 is connected to the first pair of the occipital strap connection points 1320.

As shown in FIGS. 45A, 45C and 45D, the adjustment rigidiser 1380 comprises a pair of adjustment rigidiser connection points 1383 configured to connect to the occipital strap connection points 1323. The occipital strap portion 1320 shown FIG. 45B comprises four occipital strap connection points 1323 (two points 1323a corresponding to a standard size and two points 1323b corresponding to a large size, in this example).

The second pair of occipital strap connection points 1323b may be located medially of the first pair of occipital strap connection points 1323a.

In other examples, the occipital strap portion 1320 may comprise a left portion separated from a right portion, the adjustment rigidiser 1380 being configured to connect the left portion and the right portion.

With reference again to FIGS. 42A-E, 44A-D and 45A-D, the adjustment rigidiser 1380 in these examples comprises a medial rigidising portion 1381 and a pair of lateral rigidising portions 1382 extending laterally from the medial rigidising portion 1381, the adjustment rigidiser connection points 1383 being located on the lateral rigidising portions 1382. One adjustment rigidiser connection point 1383 is located on each lateral rigidising portion 1382 in these examples.

In these examples, the medial rigidising portion 1381 is configured to be located in use overlying the user's occipital bone and overlying a junction between the user's parietal bones. More particularly, the medial rigidising portion 1381 is configured to be located on the user's head at or proximate the user's frontal bone, overlying a junction between the user's parietal bones and connecting to the occipital strap portion 1320.

The adjustment rigidiser 1380 may form part of the top strap portion of the positioning and stabilising structure 1300, as illustrated. The adjustment rigidiser may form a substantially inextensible layer 1343 of the top strap portion 1340.

In the example shown in FIGS. 42A-E, the adjustment rigidiser 1380 is permanently attached within the top strap portion 1340. In particular, the adjustment rigidiser 1380 is permanently attached to a user-facing layer 1344 of the top strap portion 1340. The top strap portion 1340 may be foldable, for example at a hinge region, for transport.

In each of the examples shown in FIGS. 42A-E and 44A-D, the battery pack is configured to connect to the adjustment rigidiser 1380. Additionally, a power cable 1510 is located in use between the adjustment rigidiser 1380 and an outer layer 1341 of the top strap portion 1340. The power cable 1510 is insertable between the adjustment rigidiser 1380 and the outer layer 1341 of the top strap portion 1340.

Figure 44A:
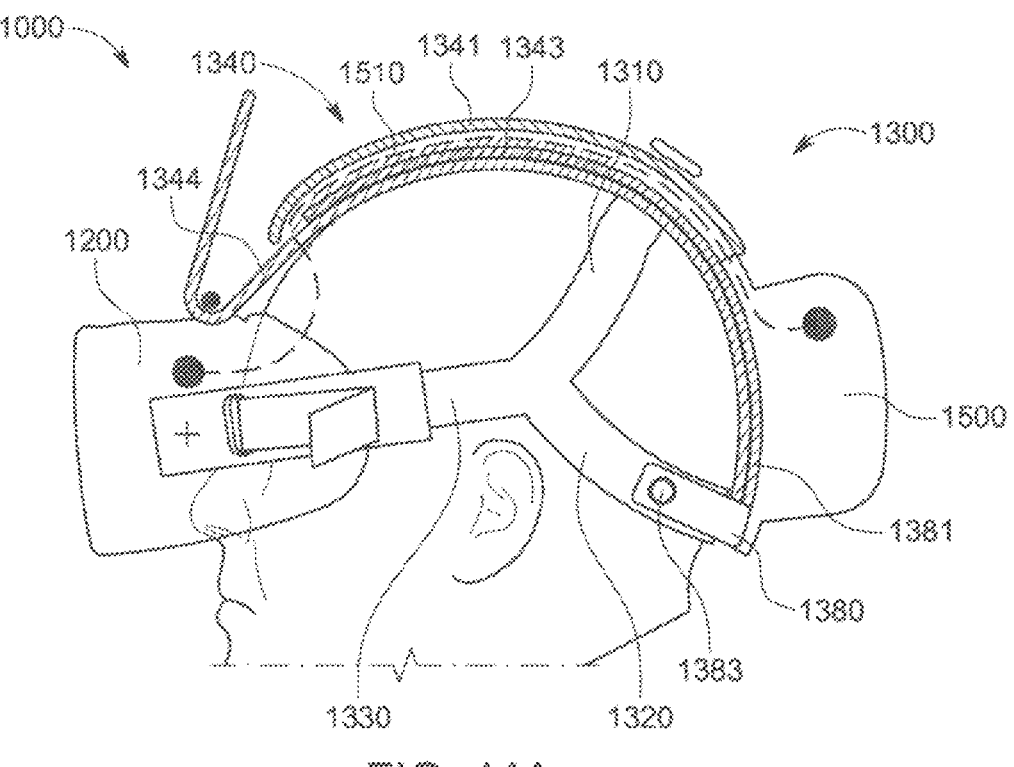
Figure 44B:
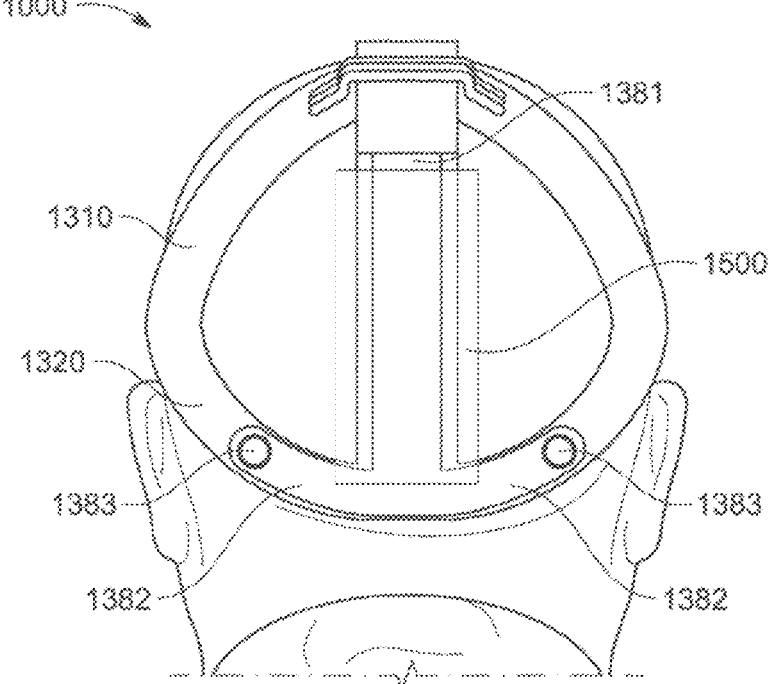
Figure 44C:
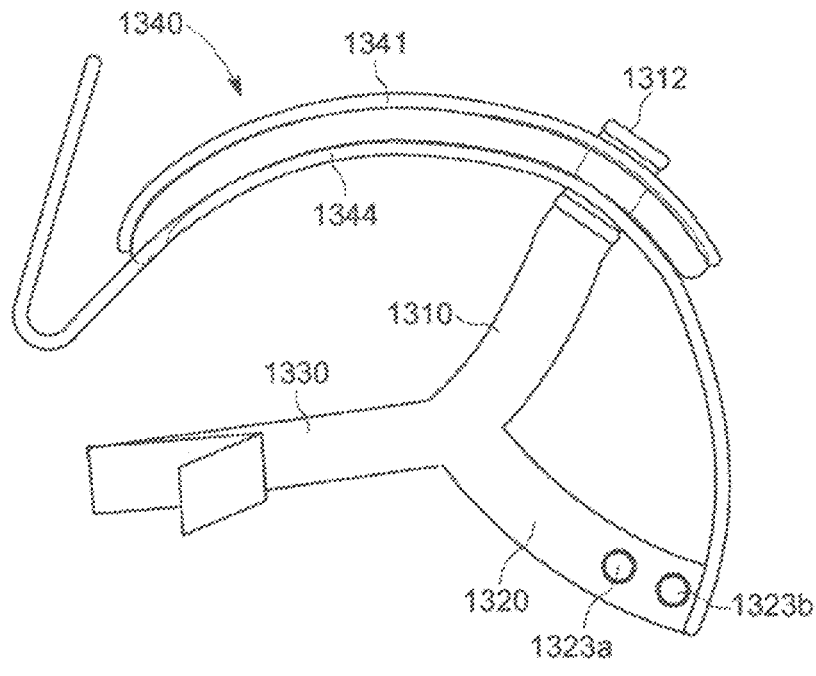
Figure 44D:
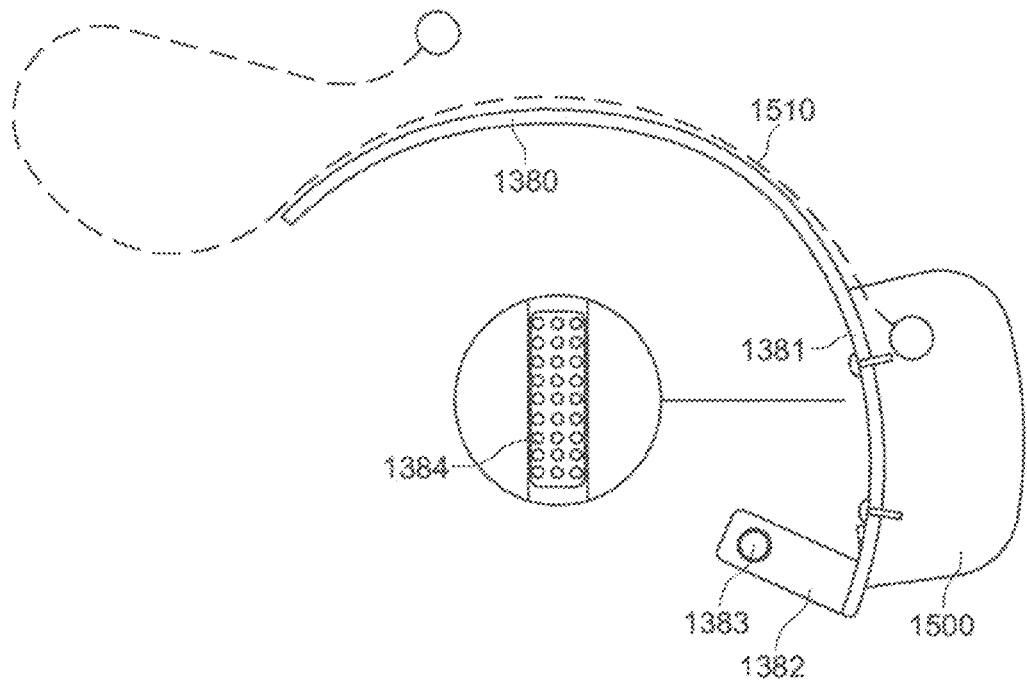
Figure 45A:
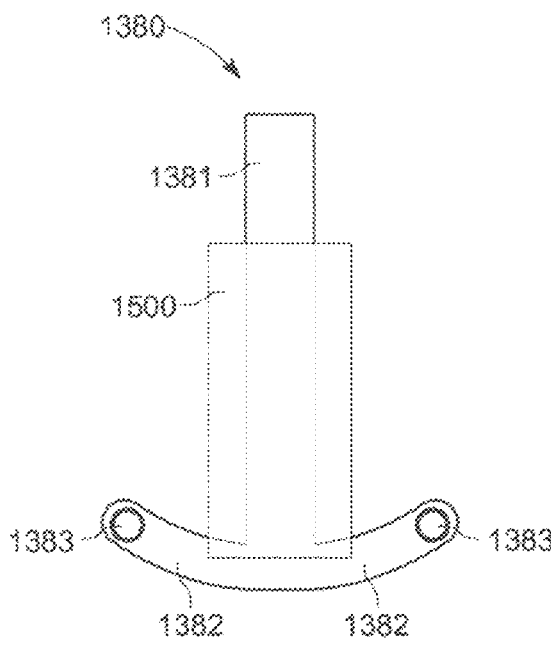
Figure 45B:
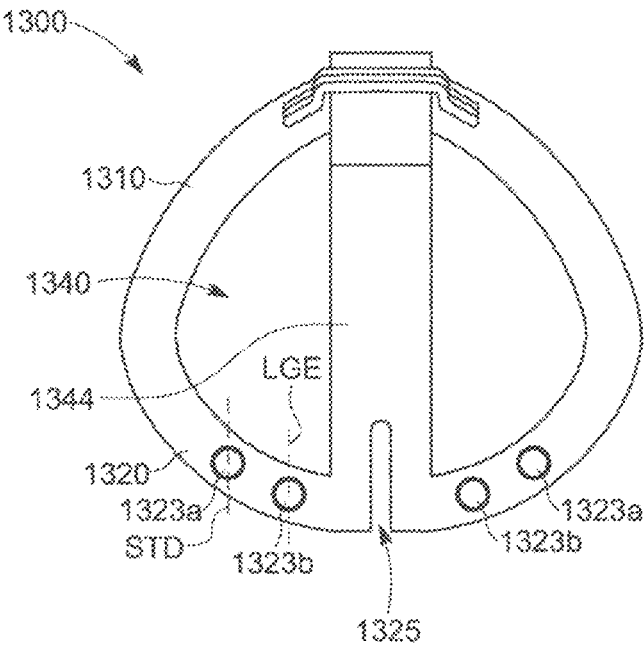
Figure 45C:
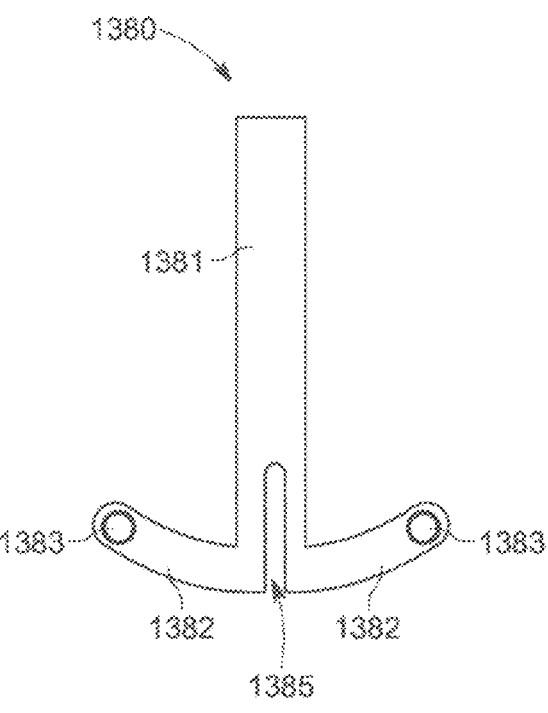
Figure 45D:
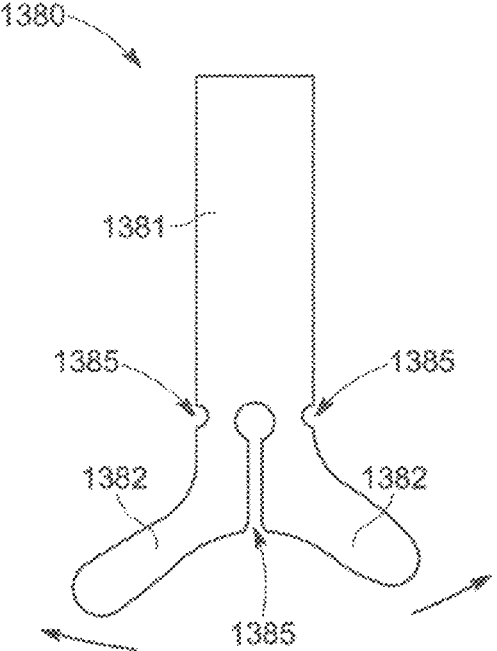

In the example shown in FIGS. 44A-44D, the adjustment rigidiser 1380 is separable from a user-facing layer 1344 of the top strap portion 1340, as illustrated in particular in FIG. 44D. In this example, the adjustment rigidiser 1380 is insertable between the user-facing layer 1344 and an outer layer 1341 of the top strap portion 1340. The adjustment rigidiser 1380 is configured to connect to the user-facing layer 1344. In particular the adjustment rigidiser 1380 comprises hook material 1384 configured to form a hook-and-loop connection to the user-facing layer 1344 of the top strap portion 1340. The adjustment rigidiser 1380 may be foldable, for example at a hinge region, for transport.

The power cable 1510 may be permanently attached to the adjustment rigidiser 1380, as illustrated in FIG. 44D. Additionally, the battery pack 1500 may be permanently attached to the adjustment rigidiser 1380 (for example with screws or an otherwise permanent attachment).

In the examples shown in FIGS. 45C and 45D, the adjustment rigidiser 1380 comprises an inferior cutout 1385 between the pair of lateral rigidising portions 1382 allowing the adjustment rigidiser 1380 to flex at or proximate the connection of the lateral rigidising portions 1382 to the medial rigidising portion 1381. The adjustment rigidiser 1380 shown in FIG. 45D also comprises lateral cutouts 1385 on opposing lateral sides of the medial rigidising portion 1381 proximate the lateral rigidizing portions 1382 allowing the adjustment rigidiser 1380 to flex proximate the lateral cutouts 1385. In the example shown in FIG. 45B, the user-facing layer 1344 of the top strap portion 1340 comprises a cutout 1325 corresponding to (e.g. aligned with) the inferior cutout 1385 in the adjustment rigidiser 1380. The cutouts 1385 and/or 1325 provide a flexing behaviour that allows the occipital strap portion 1320 (or other strap to which an adjustment rigidiser may be connected) to stretch. The stretch may advantageously provide for adapting to head size variation, or dynamic forces during use, by means of adaptation.

4.2.1.10 Stretchable Adjustable Connection

FIGS. 52A, 52B and 53A-C show head-mounted display systems 1000 according to further examples of the present technology, in these examples comprising lockable extendable connection portions 1335. Lockable extendable connection portions 1335 may also be provided to any of the other head-mounted display systems 1000 described herein.

In general, a positioning and stabilising structure 1300 may comprise a first strap portion and a second strap portion connected by a lockable extendable connection portion 1335, which may comprise both an elastically extendable connector strap portion 1338 and a substantially inextensible connector strap portion 1336. The elastically extendable connector strap portion 1338 may be configured to allow a predetermined amount of separation of the first strap portion from the second strap portion. That is, it may elastically extend to an extent to allow the first and second strap portions to separate (this may assist a user in donning the positioning and stabilising structure 1300). The substantially inextensible connector strap portion 1336 may be configured to releaseably attach the first strap portion to the second strap portion to prevent separation of the first strap portion from the second strap portion (or at least reduce the degree of possible separation). That is, when the substantially inextensible connector strap portion 1336 attaches the first and second strap portions, it prevents them from separating as the elastically extendable connector strap portion 1338 may otherwise allow (this may secure the positioning and stabilising structure 1300 on the user's head in use). The elastically extendable connector strap portion 1338 may also advantageously hold the head-mounted display system 1000 on the user's head with sufficient stability to enable the user to make adjustments to the fit prior to connection of the substantially inextensible connector strap portion 1336.

The user may don the head-mounted display system 1000 with the first and second strap portions unattached by the substantially inextensible connector strap portion 1336 (FIG. 52A). The elastically extendable connector strap portion 1338 may expand to allow the positioning and stabilising structure 1300 to fit over and/or around the user's head, after which the user may attach the first and second strap portions to each other with the substantially inextensible connector strap portion 1336 to hold them securely together for use of the head-mounted display system 1000 (FIG. 52B).

The substantially inextensible connector strap portion 1336 may be able to be adjusted in length. As shown in FIGS. 52A and 52B the substantially inextensible connector strap portion 1336 comprises a clip 1339 having an eyelet through which a portion of the substantially inextensible connector strap portion 1336 is threaded and fastened back onto itself (for example with a hook-and-loop fastening), allowing for more or less of the strap to be pulled through the eyelet.

The substantially inextensible connector strap portion 1336 in this example comprises a magnetic clip 1339 configured to magnetically attach to a connection point 1337 on the positioning and stabilising structure 1300.

In some examples, the elastically extendable connector strap portion 1338 may connect to the head-mounted display unit 1200 at an internal surface of an arm 1210, directly to a pivot point or to a side of the head-mounted display unit 1200.

In some examples, the positioning and stabilising structure 1300 comprises a lockable extendable connection portion 1335 in each lateral strap portion 1330. As shown in FIGS. 52A and 52B, the lockable extendable connection portion 1335 is provided to the lateral strap portion 1330. In this example the lockable extendable connection portion 1335 connects the lateral strap portion 1330 to a strap portion formed by the junction of a parietal strap portion 1310 and an occipital strap portion 1320.

As shown in FIG. 53A, each lockable extendable connection portion 1335 may be located at an arm 1210, extending posteriorly from the head-mounted display unit 1200 (e.g. an arm as has been described herein). In some examples lockable extendable connection portions 1335 may connect directly to a connection point on the head-mounted display unit 1200 (e.g. there may be no arms 1210). In such an examples the lockable extendable connection portion 1335 may pivot about its connection to the head-mounted display unit 1200.

As shown in FIG. 53B, each lockable extendable connection portion 1335 may be located proximate a junction between each lateral strap portion 1330, the parietal strap portion 1310 and the occipital strap portion 1320.

As shown in FIG. 53C, the positioning and stabilising structure 1300 may comprise a lockable extendable connection portion 1335 in an occipital strap portion 1320. In some examples the lockable extendable connection portion 1335 may connect a portion of the occipital strap portion 1320 to an adjustment rigidiser 1380 at this location.

In other examples, the positioning and stabilising structure 1300 may comprise a lockable extendable connection portion 1335 elsewhere, such as in a parietal strap portion 1310, in a top strap portion 1340, or elsewhere.

4.2.1.11 Frontal Support Portion

FIGS. 40A and 40B show head-mounted display systems 1000 according to further examples of the present technology. Each comprises a head-mounted display unit 1200 comprising a display, and a positioning and stabilising structure 1300 configured to hold the head-mounted display unit 1200 in an operable position on a user's head in use.

In these examples, the positioning and stabilising structure 1300 comprises a posterior support portion 1350 configured to engage a posterior portion of a user's head. The positioning and stabilising structure 1300 also comprises a pair of lateral strap portions 1330 configured to connect between the posterior support portion 1350 and the head-mounted display unit 1200, each configured to be located on a respective lateral side of the user's head in use.

Each positioning and stabilising structure 1300 also comprises a frontal support portion 1360 configured to engage the user's head at a location overlying a frontal bone of the user's head, in use. This is shown in FIGS. 40A and 40B.

The frontal support portion 1360 is connected to the head-mounted display unit 1200 in each example. The frontal support portion 1360 may be connected to the head-mounted display unit at one or more locations as will be described.

4.2.1.12 Frontal Support Portion Connects to Head-Mounted Display Unit

As shown in each of FIGS. 40A and 40B, the positioning and stabilising structure 1300 comprises a frontal connector 1362 connected between the frontal support portion 1360 and the head-mounted display unit 1200. In these examples, the frontal connector 1362 is located substantially in the sagittal plane of the user's head. In other examples, the positioning and stabilising structure 1300 may comprise two or more frontal connectors 1362, which may be spaced apart, for example symmetrically across the sagittal plane. The frontal connector 1362 may restrict (e.g. limit or prevent) downwards movement of the head-mounted display unit 1200 in use, especially when the user moves their head.

The frontal connector 1362 may be formed from a flexible material. In some examples the flexible material comprises a flexible inelastic material, such as a thermoplastic material. In other examples the flexible material may comprise an elastic material, such as one of silicone, TPE or an elastic textile strap. The frontal connector 1362 may advantageously hold the head-mounted display unit 1200 steady as the user moves. A frontal connector 1362 formed from elastic material may advantageously act as a shock-absorber during active movement of the user.

In other examples, the frontal connector 1362 is formed from a substantially rigid material, such as a thermoplastic material.

4.2.1.13 Frontal Support Portion Connects to Posterior Support Portion

The frontal support portion 1360 may additionally or alternatively be connected to the posterior support portion 1350.

With reference to FIG. 40A, the positioning and stabilising structure 1300 comprises a pair of lateral connectors 1364 each connected between the frontal support portion 1360 and the posterior support portion 1350. In this particular example, the posterior support portion 1350 comprises a parietal strap portion 1310 configured to overlie the parietal bones of the user's head in use and an occipital strap portion 1320 configured to overlie or lie below an occipital bone of the user's head in use. Each of the lateral connectors 1364 may be connected to a respective side of the posterior support portion 1350 proximate the occipital strap portion 1320, or connected to a respective side of the occipital strap portion 1320. In the illustrated example the positioning and stabilising structure 1300 also comprises lateral strap portions 1330 connecting the posterior support portion 1350 to the head-mounted display unit 1200. In other examples the lateral connectors 1364 may connect to respective lateral support straps 1330.

Each lateral connector 1364 may be elastically extendable. Alternatively, or additionally, each lateral connector may be adjustable in length.

Each lateral connector 1364 may be fixedly connected to the frontal support portion 1360 and releasably attachable to the posterior support portion 1350. Alternatively, each lateral connector 1364 may be releasably attachable to the frontal support portion 1360 and releasably attachable to the posterior support portion 1350. In further examples, each lateral connector 1364 may be releasably attachable to the frontal support portion 1360 and fixedly connected to the posterior support portion 1350. Each lateral connector 1364 may be connected to the posterior support portion 1350 and/or to the frontal support portion 1360 by a snap button, a clip or a hook-and-loop connection.

The lateral connectors 1364 connecting the frontal support portion 1360 to the posterior support portion 1350 (and to the occipital strap portion 1320 in this particular example) enables the frontal support portion 1360 to be held securely (e.g. sufficiently tightly) against the user's head overlying the frontal bone. In particular, this may advantageously allow the frontal support portion 1360 to support a large amount of the weight of the head-mounted display unit 1200, and hold the head-mounted display unit 1200 in position during active movement in use.

4.2.1.14 Arms

As illustrated in each of FIGS. 40A and 40B, the head-mounted display unit 1200 may comprise a display unit housing 1205 and a pair of arms 1210 extending from the display unit housing 1205. The lateral strap portions 1330 each connect to a respective one of the arms 1210, in these examples. In particular, each lateral strap portion 1330 connects to a posterior end of a respective one of the pair of arms 1210. As shown, each lateral strap portion 1330 passes through an eyelet 1212 at the posterior end of the respective arm 1210 and is fastened back onto itself. Each of the pair of arms 1210 is able to pivot with respect to the display unit housing 1205 in these examples.

4.2.1.15 Frontal Support Portion Connects to Arms

With reference to FIG. 40B, the positioning and stabilising structure 1300 in this example comprises a pair of lateral connectors 1364 each connected between the frontal support portion 1364 and a respective one of the pair of arms 1210.

Each lateral connector 1364 may be elastically extendable. Alternatively, or additionally, each lateral connector may be adjustable in length.

Each lateral connector 1364 may be fixedly connected to the frontal support portion 1360 and releasably attachable to a respective one of the arms 1210. Alternatively, each lateral connector 1364 may be releasably attachable to the frontal support portion 1360 and releasably attachable to a respective one of the arms 1210. In further examples, each lateral connector 1364 may be releasably attachable to the frontal support portion 1360 and fixedly connected to a respective one of the arms 1210. Each lateral connector 1364 may be connected to a respective one of the arms 1210 and/or to the frontal support portion 1360 by a snap button, a clip or a hook-and-loop connection.

Lateral connectors 1364 connecting the frontal support portion 1360 to the arms 1210 may enable the frontal support portion 1360 to support some or all of the weight of the head-mounted display unit 1200, via the arms, optionally in addition to the frontal connector 1362, and hold the head-mounted display unit 1200 in position during active movement in use.

4.2.1.16 Hair Strap Portion

FIGS. 41A and 41B show a head-mounted display system 1000 according to another example of the present technology. The head-mounted display system 1000 comprises a positioning and stabilising structure 1300 configured to hold a head-mounted display unit 1200 in an operable position on the user's head (as shown in FIGS. 41A and 41B in use).

In this example, the positioning and stabilising structure 1300 comprises a posterior support portion 1350 configured to engage a posterior portion of a user's head and one or more anterior support portions (in this example particular example a pair of lateral strap portions 1330 and a top strap portion 1340) configured to connect the posterior support portion 1350 and the head-mounted display unit 1200 in use. In other examples the top strap portion 1340 may be omitted, or the positioning and stabilising structure may have a pair of upper lateral strap portions and a pair of lower lateral strap portions, for example.

In this example, the positioning and stabilising structure 1300 comprises a hair strap portion 1370 connected to the posterior support portion 1350. The hair strap portion 1370 may be positionable in use between the user's head and hair descending from the posterior portion of the user's head. The hair strap portion 1370 may be able to be put under the user's hair, if the user has sufficiently long hair. The hair strap portion 1370 may anchor under the hair, e.g. between the hair and neck or hair and head, to provide further stability to the head-mounted display system 1000. FIG. 41B shows the hair strap portion 1370 under the user's hair.

As discussed above, in this example the one or more anterior support portions comprises a pair of lateral strap portions 1330 connecting the posterior support portion 1350 to the head-mounted display unit 1200.

As illustrated, the hair strap portion 1370 comprises a pair of ends 1371 and 1372 connected to respective lateral sides of the posterior support portion 1350. Each end of the hair strap portion 1370 is located proximate the Frankfort horizontal plane of the user's head in use. The hair strap portion 1370 may be removably attachable at one or both ends of the hair strap portion 1370 to the posterior support portion 1350.

In some examples, the hair strap portion 1370 comprises a left strap portion and a right strap portion removably attached to the left strap portion. The left strap portion may be removably attached to the right strap portion proximate a sagittal plane of the user's head in use. The user may separate the two strap portions and reconnect them under their hair when donning the head-mounted display system 1000.

In some examples, the hair strap portion 1370 is elastically extendable. In other examples, the hair strap portion 1370 is substantially non-extendable.

As shown in FIGS. 41A and 41B, in this illustrated example the posterior support portion 1350 comprises a parietal strap portion 1310 configured to overlie the parietal bones of the user's head in use and an occipital strap portion 1320 configured to overlie or lie below an occipital bone of the user's head in use. In particular, the hair strap portion 1370 is connected to the occipital strap portion in use. The hair strap portion 1370 may be connected to the occipital strap portion 1320 proximate ends of the occipital strap portion 1320.

A hair strap portion 1370 as described herein may be incorporated into any of the positioning and stabilising structures 1300, having an occipital strap portion, described herein.

4.2.1.17 Releasable Attachment of Posterior Portion

Figure 57A:
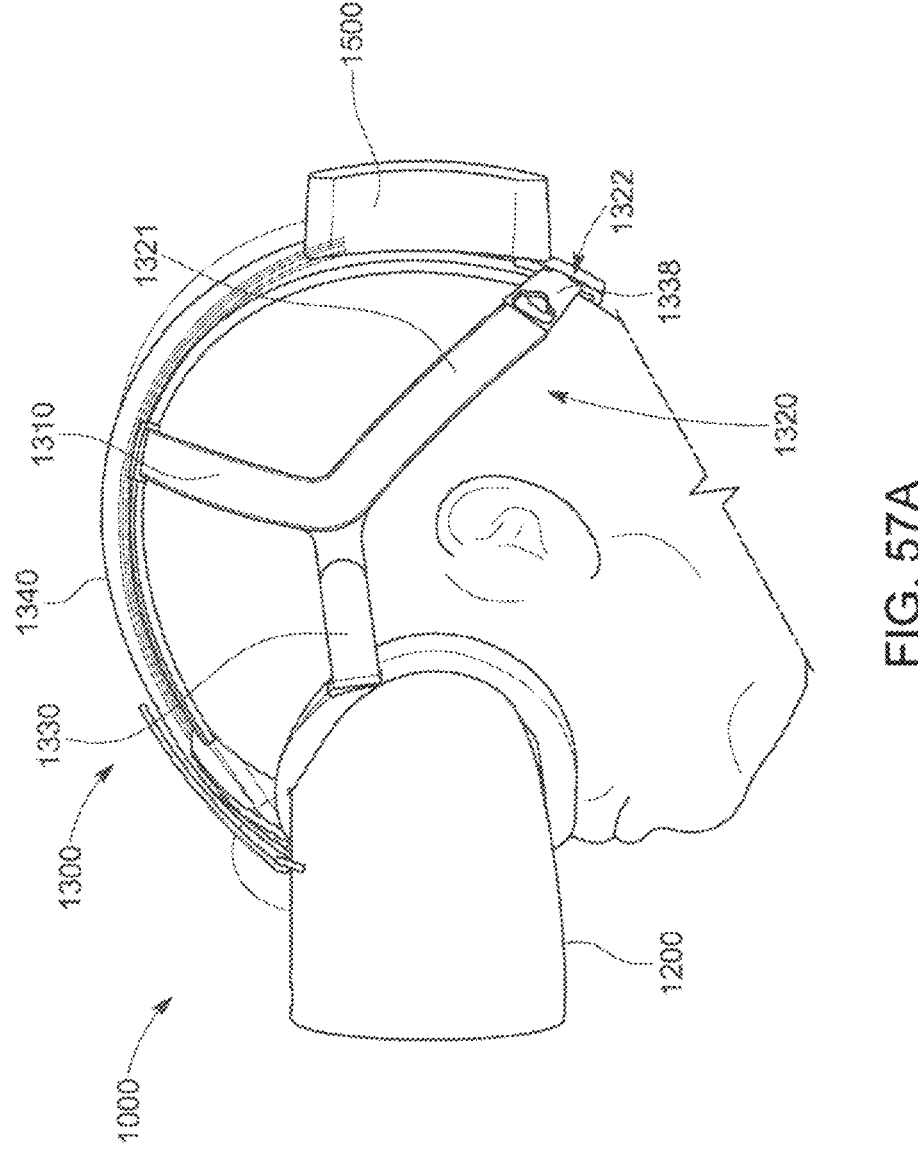
Figure 57B:
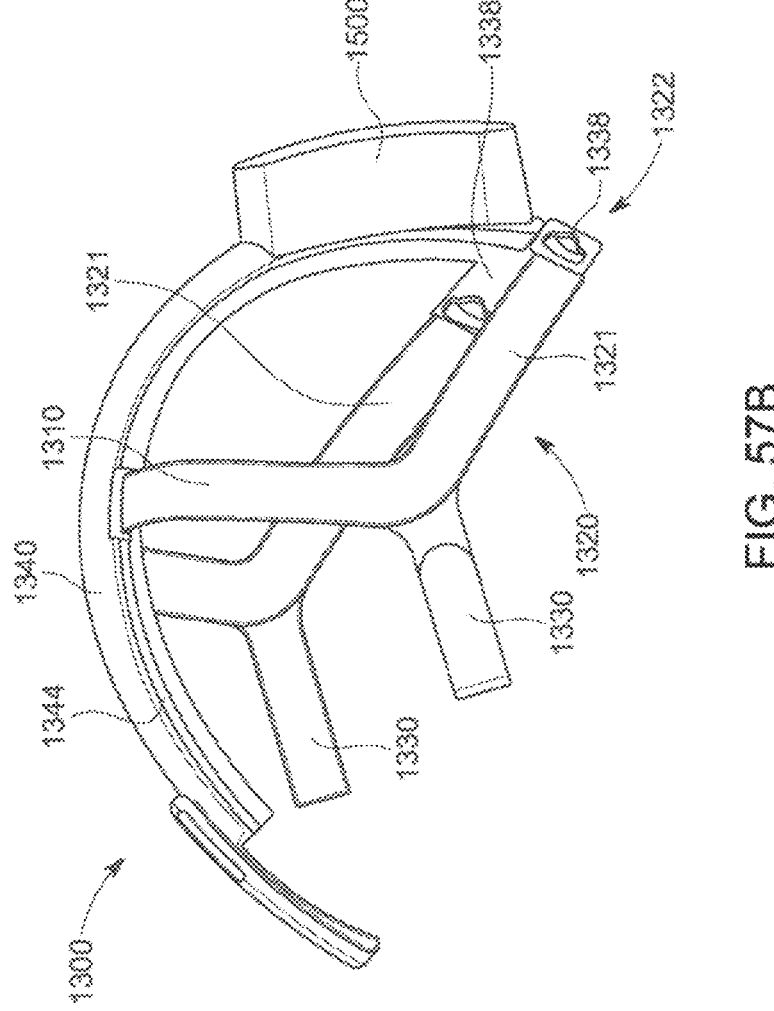
Figure 57C:
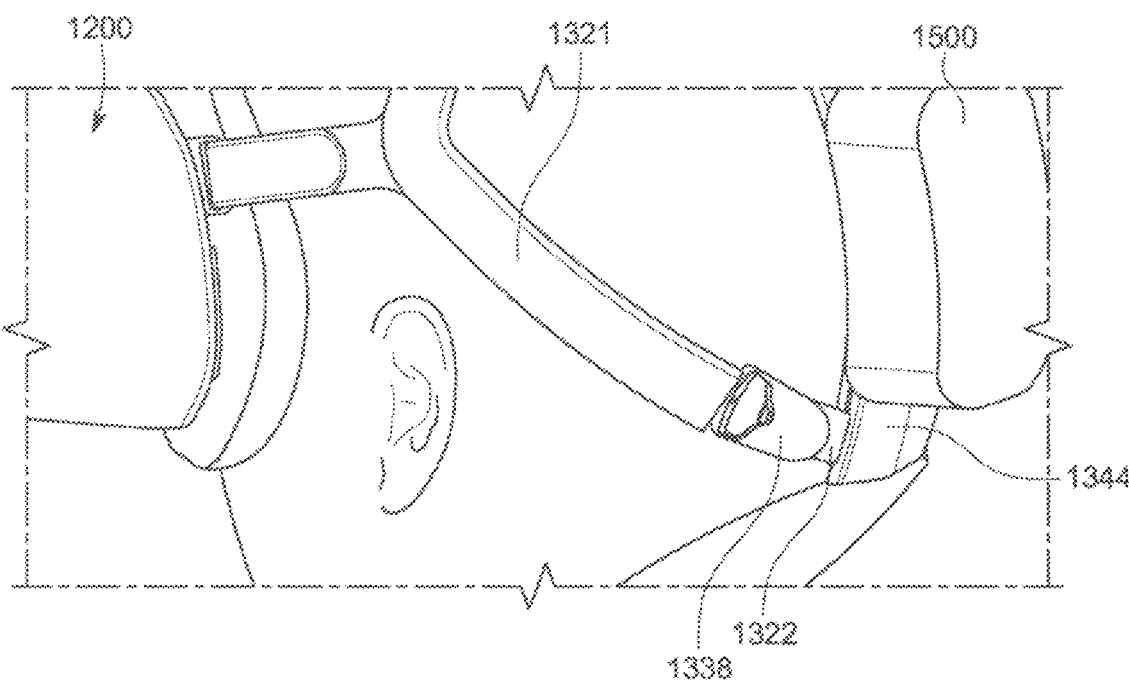

FIGS. 57A-57D show head-mounted display systems 1000 according to further examples of the present technology, although share features with the examples described elsewhere, not all of which will be repeated. FIGS. 57A and 57B show a positioning and stabilising structure 1300 having a parietal strap portion 1310, a pair of lateral strap portions 1330, and a top strap portion 1340.

The positioning and stabilising structure 1300 further has an occipital strap portion 1320 formed by a pair of lateral occipital strap portions 1321 extending from the parietal strap portion 1310, each of the lateral occipital strap portions 1321 releasably attached to a medial occipital portion 1322 configured to overlie or lie below an occipital bone of the user's head in use. In other examples the lateral occipital strap portions 1321 may not extend from a parietal strap portion 1310 and may instead extend (e.g. in a partially inferior and partially posterior direction) from another component of the positioning and stabilising structure 1300 or head-mounted display system 1000.

The parietal strap portion 1310, the medial occipital portion 1322 and the lateral occipital strap portions 1321 may form a posterior support portion 1350 configured to engage a posterior portion of a user's head in use. The parietal strap portion 1310 is configured to overlie the parietal bones of the user's head in use. The pair of lateral occipital strap portions 3122 are each configured to be located on a respective lateral side of the user's head in use. As shown in FIG. 57A for example, the positioning and stabilising structure 1300 may comprise a top strap portion 1340 configured to connect between the posterior support portion 1350 and the head-mounted display unit 1200.

In some examples the top strap portion 1340 connects directly to the posterior support portion 1350 (e.g. connecting directly to the parietal strap portion 1310 or occipital strap portion 1320). In other examples the top strap portion 1350 connects to the posterior support portion 1350 via another component, such as a battery pack 1500. That is, in some examples the top strap portion 1340 is connected to the posterior support portion 1350 by connecting to a battery pack 1500 which is connected to a component of the posterior support portion 1350, such as the occipital strap portion 1320.

The head-mounted display system 1000 may comprise a battery pack 1500 for powering the head-mounted display system 1000. The battery pack 1500 may be located posteriorly to the user's head in use. The battery pack 1500 may be configured to be connected to the top strap portion 1340 in use. Any features of a top strap portion 1340 and battery pack 1500 described elsewhere herein may be applied to the top strap portion 1340 and battery pack 1500 shown in FIGS. 57A-57D, unless context clearly requires otherwise.

In the example illustrated, the medial occipital portion 1322 is rigidised. The medial occipital portion 1322 may comprise an occipital rigidiser. In alternative examples the medial occipital portion 1322 may comprise a flexible strap, e.g. a medial occipital portion strap. In some examples, the medial occipital portion 1322 may form part of the top strap portion 1340. The medial occipital portion 1322 may be permanently attached within the top strap portion 1340, for example permanently attached to a user-facing layer In some examples the medial occipital portion 1322 may be secured to the top strap portion 1340, for example stitched or welded in place to a user-facing layer 1344 of the top strap portion 1340. In alternative examples, the medial occipital portion 1322 may be secured in a similar manner as described elsewhere with reference to the adjustment rigidiser 1380.

In some examples, the positioning and stabilising structure 1300 comprises a releasable fastener between each of the pair of lateral occipital strap portions 1321 and the medial occipital portion 1322. Each releasable fastener may comprise a fastener portion configured to be attached to a corresponding connection point 1337. In the FIG. 57A-57D example, the medial occipital portion 1322 comprises a pair of connection points 1337 configured to connect to corresponding fastener portions provided to the respective lateral occipital strap portions 1321.

Figure 57D:
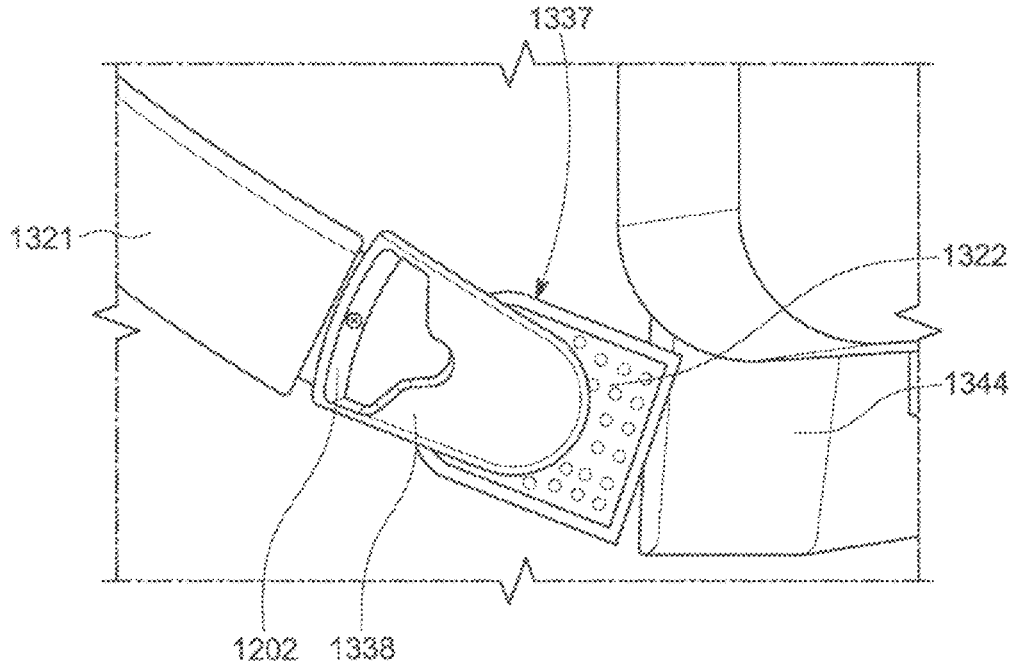

As shown in FIG. 57D, in some examples the releasable attachment is provided by a magnetic fastener. Each magnetic fastener may comprise a magnetic clip portion configured to magnetically attach to a respective one of the connection points 1337. As shown in FIG. 57D, a magnetic clip 1339 is secured to the lateral occipital strap portion 1321, the magnetic clip 1339 configured to magnetically attach to a connection point 1337 on the posterior occipital portion 1322.

In examples, the length of each of the lateral occipital strap portions 1321 may be adjustable. For example, each magnetic clip 1338 may have an eyelet 1202, and a portion of each of the pair of lateral occipital strap portions 1321 may be threaded through the eyelet and fastened back onto itself at a desired length.

4.2.1.18 Washable Portion of Positioning and Stabilising Structure

FIGS. 60A-60C show further illustrations of the positioning and stabilising structure 1300 shown in FIGS. 57A-57D described above. FIGS. 61A-61B, 62A-62B and 63A-63D show positioning and stabilising structures 1300 and components thereof according to further examples of the present technology. Many of the features described above in relation to other examples of the present technology will not be repeated here but are applicable in combination with the concepts described below. The positioning and stabilising structures 1300 shown in FIGS. 57A-57D, 60A-60C, 61A-61B, 62A-62B and 63A-63D also share some features with the examples shown in FIGS. 42A-42D and 44A-44D and with each other. Unless required otherwise, the features of each of these examples are to be understood to be applicable to each of the other examples as alternatives or in combination.

In each of the examples shown in FIGS. 57A-57D, 60A-60C, 61A-61B, 62A-62B and 63A-63D, the head-mounted display system 1000 comprises a battery pack 1500 for powering the head-mounted display system 1000, the battery pack 1500 configured to be located posteriorly to the user's head in use. The top strap portion 1340 of each positioning and stabilising structure 1300 is connected to the battery pack 1500 in use.

4.2.1.18.1 Outer Layer of Top Strap Portion Separable from User-Facing Layer

In the examples shown in FIGS. 60A-60C, 61A-61B and 62A-62B, the top strap portion 1340 comprises a user-facing layer 1344 and an outer layer 1341 (on an opposite side of the top strap portion 1340 to the user-facing layer 1344). In these examples, the user-facing layer 1344 of the top strap portion 1340, the parietal strap portion 1310, the occipital strap portion 1320 and lateral strap portions 1330 are separable from the outer layer 1341 of the top strap portion 1340. With respect to the FIG. 60A-60C example, FIG. 60B shows these components separated from the outer layer 1341 of the top strap layer 1340. FIG. 60C shows the separated outer layer 1341 of the top strap portion 1340 (in this example the outer layer 1341 is formed by an outer sleeve 1348, to be described below). FIGS. 63A-63D show components of the positioning and stabilising structure 1300 of FIG. 62A-62B in isolation.

An advantage of this type of configuration is that the user-facing layer 1344 of the top strap portion 1340, the parietal strap portion 1310, the occipital strap portion 1320 and lateral strap portions 1330 may form a washable portion (e.g. a washable subassembly) of the positioning and stabilising structure 1300 (washable portion shown in isolation in FIG. 60B). These components may be user-contacting parts of the positioning and stabilising structure 1300 and may all be formed from washable materials, e.g. textile materials, plastic materials, non-electronic components (machine-washable or otherwise easily washable materials). The washable portion can be separated from the outer layer 1341 of the top strap portion 1340 for washing by the user, for example periodically or when dirty as required. Additionally, as will be described below, the head-mounted display system 1000 comprises a power cable 1510 connecting the battery pack 1500 to the head-mounted display unit 1200. The washable portion can be separated from the power cable 1510 (and battery pack 1500) at the same time as it is separated from other non-user contacting components, without the user being required to manipulate the power cable 1510 (e.g. unplug it, withdraw it from a sleeve or otherwise consider the power cable 1510 when removing the washable parts of the positioning and stabilising structure 1300).

The outer layer 1341 of the top strap portion 1340 may be configured to connect to a head-mounted display unit 1200 of the head-mounted display system 1000. As shown in each of FIGS. 60A, 61A and 62A an anterior portion of the outer layer 1341 is able to be passed through a portion of the head-mounted display unit 1200 (not shown) such as an eyelet, lug or the like, looped back and secured to itself, for example with a hook-and-loop connection (or another suitable connection such as by a buckle or one of a series of press studs). This connection may be as described elsewhere herein.

As shown by way of example in FIGS. 63A-63D, the positioning and stabilising structure 1300 may comprise a buckle 1312 attached to the parietal strap portion 1310, similar to the buckle 1312 described above with reference to FIGS. 28B and 28C. In use a user-contacting portion 1342 (e.g. at least a user-facing layer 1344) may be located between the buckle 1312 and the parietal strap portion 1310. The buckle 1312 may be configured to limit lateral movement of the user-contacting portion 1342, which may advantageously keep the top strap portion 1340 centred on the user's head in use. In this example, the buckle 1312 is located in the sagittal plane of the user's head in use. In the FIGS. 63A-63D example the buckle 1312 is formed by a length of flexible material extending between two points along the parietal strap portion 1310 on opposing sides of the centre of the parietal strap portion (e.g. symmetrically opposed on either side of the sagittal plane of the user's head in use). The buckle 1312 may be stitched or welded to the parietal strap portion 1310 or connected in another suitable manner (e.g. glue, further buckles).

4.2.1.18.2 Connection Between Occipital Strap Portion and Top Strap Portion

The occipital strap portion 1320 may be removably connected to the top strap portion 1340. In the FIG. 60A-60C example, the occipital strap portion 1320 comprises a pair of lateral occipital strap portions 1321 configured to connect between the parietal strap portion 1310 and the top strap portion 1340, each lateral occipital strap portion 1321 configured to be located on a respective lateral side of the user's head in use. In this example, each of the lateral occipital strap portions 1321 is adjustable in length. According, the length of the occipital strap portion 1320 is adjustable. In this example, the occipital strap portion 1320 connects to the top strap portion 1340 via a magnetic connection. In particular, each of the lateral occipital strap portions 1321 is configured to connect to the top strap portion 1340 via a magnetic fastener. As shown in FIGS. 60A and 60B, the occipital strap portion 1320 connects to the top strap portion 1340 via magnetic clips 1338.

In the FIGS. 61A-61B and 62A-62B examples the occipital strap portion 1320 removably connects to the top strap portion 1340, but in a manner in which the occipital strap portion 1320 is not length adjustable, which may advantageously make the positioning and stabilising structure 1300 more intuitive to set up.

Figure 63A:
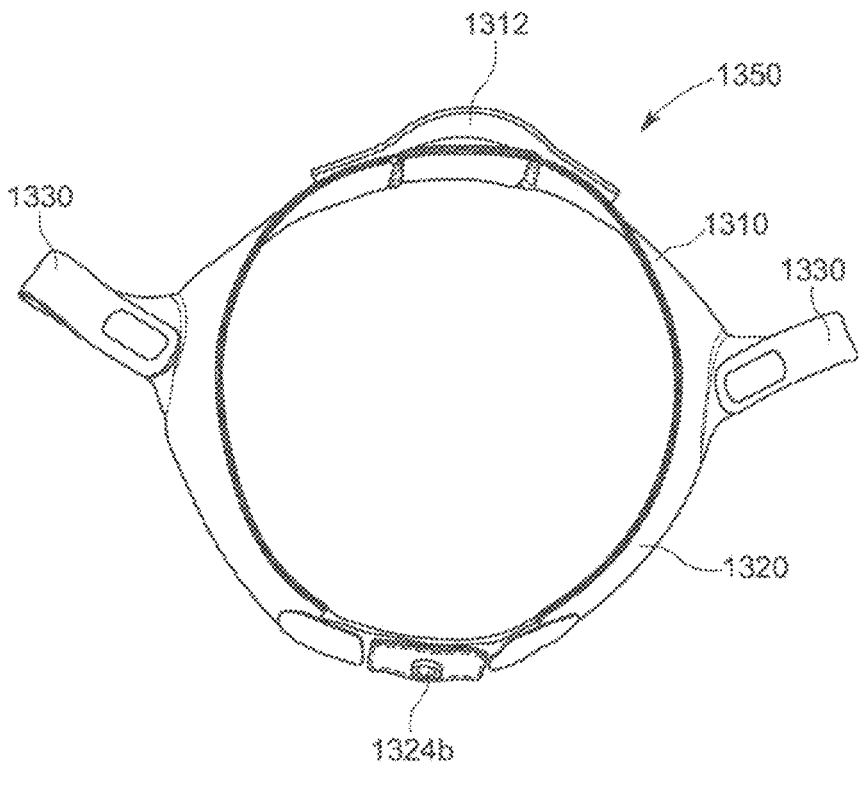
Figure 63B:
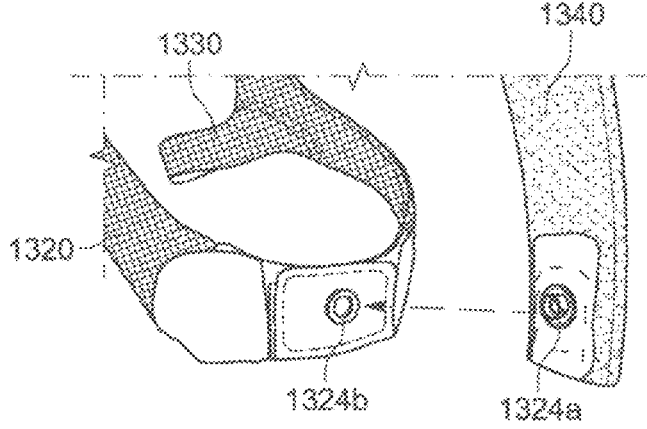

FIGS. 63A and 63B show the connection between the occipital strap portion 1320 and the top strap portion 1340 shown in FIGS. 62A-62B. The top strap portion 1340 is configured to connect to the occipital strap portion 1320 in this example via a pivotable connection. That is, the occipital strap portion 1320 is able to pivot with respect to the top strap portion 1340 (or vice versa), which may improve comfort. As shown in FIGS. 63A and 63B, the pivotable connection comprises a press stud connection. The press stud connection comprises a male press stud part 1324*a* and a female press stud part 1324*b*, configured to snap together during assembly of the top strap portion 1340 and occipital strap portion 1320. The male and female parts of the press stud connection may be reversed. In other examples, an occipital strap portion 1320 may connect to the top strap portion 1340 in this manner but may be length adjustable. In other examples, the top strap portion 1340 and occipital strap portion 1320 connect via an alternative mechanism, such as a hook-and-loop connection, magnetic clip or other suitable connection.

In some other examples of the present technology, the occipital strap portion 1320 is permanently connected to the top strap portion 1340, for example at the posterior end where the occipital strap portion 1320 removably connects to the top strap portion 1340 in the examples shown in FIG. 60A-60C.

4.2.1.18.3 Outer Sleeve of Top Strap Portion

In each of the examples shown in FIGS. 60A-60C, 61A-61B, 62A-62B and 63A-63D, the top strap portion 1340 comprises an outer sleeve 1348. The outer sleeve 1348 forms the outer layer 1341 of the top strap portion 1340. In these examples, the outer sleeve 1348 is connected to the battery pack 1500. The outer sleeve 1348 may be removably connected to the battery pack 1500 or may be permanently connected (e.g. not configured for separation from the battery pack 1500 by the user). For example, the outer sleeve 1348 may be glued, heat staked, screwed, or connected to the battery pack 1500 in another suitable manner.

As described above, a head-mounted display system 1000 may comprise a power cable 1510 connected between the battery pack 1500 and the head-mounted display system 1000 in use. In the examples shown in FIGS. 60A-60C, 61A-61B, 62A-62B and 63A-63D, the head-mounted display systems 1000 comprise a power cable 1510 located within the outer sleeve 1348. The power cable 1510 is able to slide within the outer sleeve 1348 along a length of the outer sleeve 1348.

In these examples, the power cable 1510 is able to retract into and extend out of the battery pack 1500. The ability for the power cable 1510 to also slide within the outer sleeve 1348 enables the length of the outer sleeve 1348 and top strap portion 1340 to be adjusted without affecting the amount of slack in the power cable 1510. A power cable 1510 that can retract into and extend from the battery pack 1500 may also enable the power cable 1510 to be fixed with respect to the head-mounted display unit 1200. A power cable 1510 that does not retract into and extend from the head-mounted display unit 1200 may enable the head-mounted display unit 1200 to be kept to a small size (or at least smaller than would be required to accommodate a retractable power cable 1510). In other examples the power cable 1510 is fixed with respect to the outer sleeve 1348. In other examples the power cable 1510 does not retract into or extend from the battery pack 1500.

4.2.1.18.4 Hook-and-Loop Connections

The washable portion of the positioning and stabilising structure 1300 may be connected to other components of the positioning and stabilising structure 1300 by hook-and-loop connections. Advantageously, this may enable the washable portion to be "peelable" away from the other parts of the head-mounted display system 1000. For example, the washable portion of the positioning and stabilising structure 1300 may be connected to the outer sleeve 1348 by one or more hook-and-loop connections 1349. For example, the user-contacting layer 1344 (part of the washable portion, at least in some examples) of the top strap portion 1340 may connect to the outer sleeve 1348 by hook-and-loop connections 1349. In the example shown in FIG. 61B, the user-contacting layer 1344 connects to the outer sleeve 1348 via a hook-and-loop connection 1349 as illustrated.

In some examples, such as the example shown in FIGS. 62A-62B and 63A-63D, the positioning and stabilising structure 1340 comprises a user-contacting portion 1342, which will be described in more detail below. The user-contacting portion 1342 comprises the user-contacting layer 1344. The user-contacting portion 1342 connects to the outer sleeve 1348, for example with hook-and-loop connections or alternatively with press stud connections, bands or another suitable connection. As shown in FIG. 62A, the user-contacting portion 1342 connects to the outer sleeve 1348 by a hook-and-loop connection 1349.

Figures 63C, 63D:
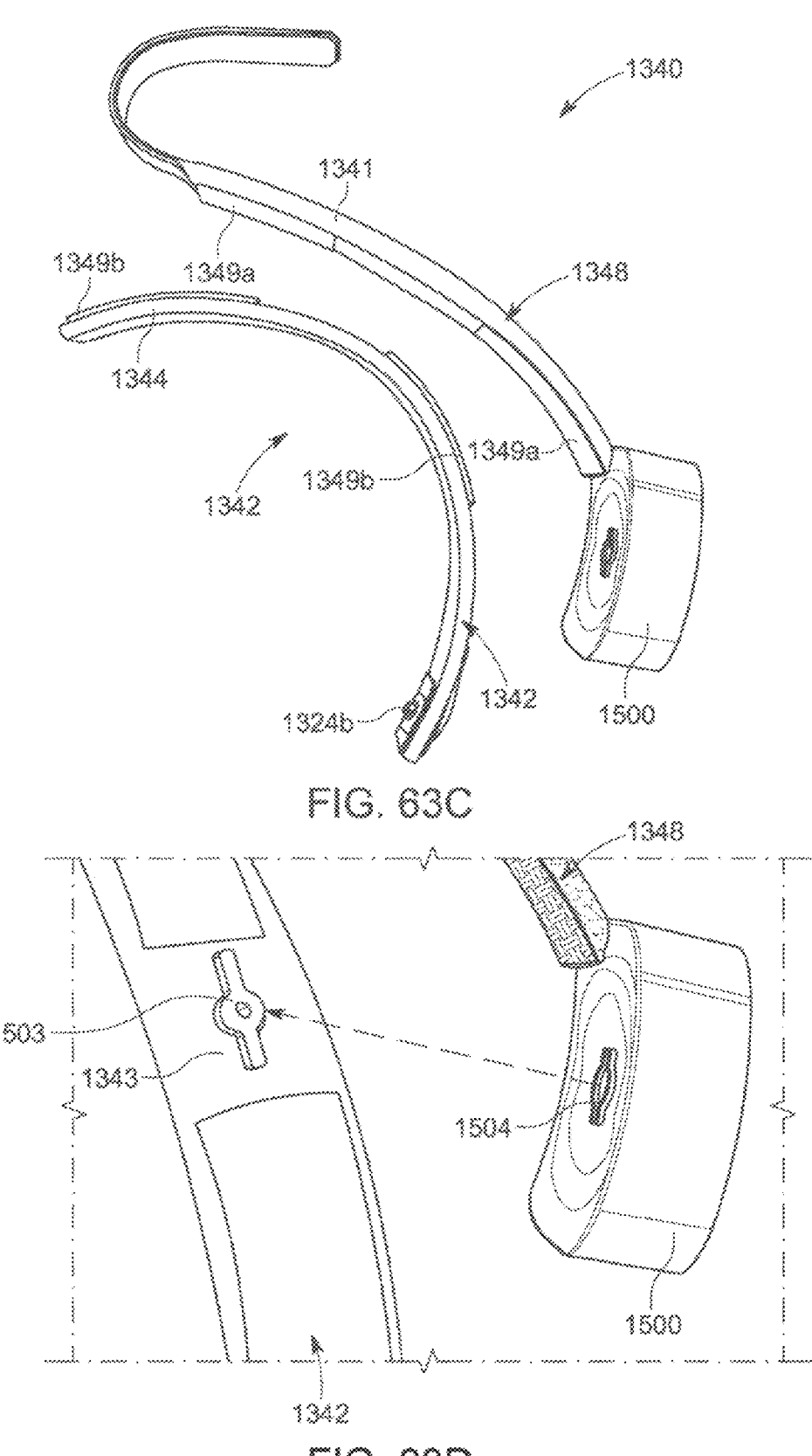

The outer sleeve 1348 may comprise one or more hook portions 1349*a*. In the example shown in FIG. 63C, the outer sleeve 1348 comprises a plurality of hook portion 1349*a*. In this example there are two hook portions 1349*a* while in other examples there may be one, three or more hook portions 1349*a*. In some examples the washable portion comprises a plurality of unbroken loop portions 1349*b* corresponding to hook portions 1349*a* and to which the hook portions 1349*a* are able to be attached. As shown in FIG. 63C, the user-contacting portion 1342 of the washable portion comprises a pair of unbroken loop portions 1349*b* corresponding to hook portions 1349*a* to form the hook-and-loop connections 1349.

In other examples of the present technology the washable portion, which may be a user-contacting portion 1342 or user-contacting layer 1344, for example, may comprise a surface formed from unbroken loop material to which one or more hook portions 1349*a* are able to be attached, forming hook-and-loop connections 1349. The outer sleeve 1348 or other portion of the top strap portion 1340 comprising hook portions 1349*a* may then connect directly to a surface of the washable portion of the positioning and stabilising structure 1300.

In other examples, the washable portion comprises hook portions 1349*a* and the outer sleeve 1348 or other part of the non-washable portion comprises unbroken loop portions 1349*b* or a surface formed from unbroken loop material.

4.2.1.18.5 Other Hook-and-Loop Connection Examples

The above concepts relating to hook-and-loop connections within a top strap portion 1340 may be applied in other examples of the present technology as well. In some examples, a head-mounted display system 1000 is provided comprising a head-mounted display unit 1200 comprising a display, and a positioning and stabilising structure 1300 configured to hold the head-mounted display unit 1200 in an operable position on the user's head in use, as described elsewhere herein.

With reference to FIGS. 62A-62C and 63A-63D for the purpose of illustrating a more generally applicable aspect of the present technology, the positioning and stabilising structure 1300 may comprise a posterior support portion 1350 configured to engage a posterior portion of a user's head, a pair of lateral strap portions 1310 configured to connect between the posterior support portion 1350 and the head-mounted display unit 1200 (each located on a respective lateral side of the user's head in use), and a top strap portion 1340 configured to connect between the posterior support portion 1350 and the head-mounted display unit 1200, the top strap portion 1340 configured to overlie a superior portion of the user's head in use, the top strap portion 1340 comprising a user-contacting portion 1342 and an outer layer 1341. As illustrated, in these examples the user-contacting portion 1342 of the top strap portion 1340 and the outer layer 1341 of the top strap portion 1340 are detachably connected by one or more hook-and-loop connections 1349.

The user-contacting portion 1342 and outer layer 1341 being separable from one another by hook-and-loop connections 1349 may advantageously enable the user-contacting portion 1342 to be washed separately from the outer layer 1341 and any electronics that may be connected to or form part of the outer layer 1341. Alternatively or additionally, one of the user-contacting portion 1342 or outer layer 1341 may be replaced separately of the other.

In some examples, the posterior support portion 1350 comprises a parietal strap portion 1310 configured to overlie the parietal bones of the user's head in use and an occipital strap portion 1320 configured to overlie or lie below an occipital bone of the user's head in use. However, the hook-and-loop connections between a user-contacting portion 1342 and outer layer 1341 may also be applied to other configurations of the positioning and stabilising structure 1300. The parietal strap portion 1310, the occipital strap portion 1320 and lateral strap portions 1330 may be separable from the outer layer 1341 of the top strap portion 1340 together with the user-contacting portion 1342 by separation of the hook-and-loop connections.

The top strap portion 1349 may comprise an outer sleeve 1348 forming the outer layer 1341 of the top strap portion 1340. The outer sleeve 1348 may be connected to a battery pack 1500 (in examples in which there is a battery pack 1500).

Any of the exemplary configurations of hook portions 1349*a*, unbroken loop portions 1349*b* and/or a surface formed from unbroken loop material may be applied to produce hook-and-loop connections 1349 between the outer sleeve 1348 and user-contacting portion 1342, or more generally between the outer layer 1341 and user-contacting portion 1342 or user-contacting layer 1341.

4.2.1.18.6 Substantially Inextensible Layer

The top strap portion 1340 in this example comprises a substantially inextensible layer 1343 (e.g. a rigidiser in some examples, being at least partially rigid in the sense that it is able to at least partially hold its shape under its own weight) located between the outer layer 1341 and the user-facing layer 1344 in use. The substantially inextensible layer 1343 may transfer the weight of a rear-mounted battery pack 1500 into an upwards force on the head-mounted display unit 1200. The substantially inextensible layer 1343 may be formed from a thermoplastic material, in some examples. In examples in which there is no rear-mounted battery pack 1500 (e.g. in which any battery is in the head-mounted display unit 1200), the substantially inextensible layer 1343 may support the head-mounted display unit 1200 by anchoring it to the posterior support portion 1350. As described above, in the examples shown in FIGS. 60A-60C, 61A-61B, 62A-62B and 63A-63D, the head-mounted display system 1000 comprises a battery pack 1500 for powering the head-mounted display system 1000, the battery pack 1500 is configured to be located posteriorly to the user's head in use. The top strap portion 1340 is connected to the battery pack 1500 in use.

The battery pack 1500 may be removably connected to the substantially inextensible layer 1343. The substantially inextensible layer 1343 and the battery pack 1500 may comprise corresponding fastener portions (e.g. corresponding first and second fastener portions 1503, 1504) configured to removably connect the battery pack 1500 to the substantially inextensible layer 1343. For example, as shown in FIGS. 61A, 62A and 63D, the substantially inextensible layer 1343 comprises a first fastener portion 1503. The first fastener portion 1503 in these examples is located on a posteriorly facing surface of the top strap portion 1340 in use. As shown in FIG. 63D, the battery pack comprises a second fastener portion 1504 corresponding to the first fastener portion 1503. The first and second fastener portions 1503 and 1504 are configured to connect together to connect the battery pack 1500 to the substantially inextensible layer 1343 in use. The first and second fastener portions 1503 and 1504, in these examples, connect the substantially inextensible layer 1343 to the battery pack 1500 such that the substantially inextensible layer 1343 at least partially supports the weight of the battery pack 1500 in use, for example supporting a majority of the weight of the battery pack 1500.

The first and second fastener portions 1503 and 1504 may be configured to snap fit together. In other examples the battery pack 1500 may connect to the substantially inextensible layer 1343 via hook-and-loop connections, may fit into a pocket or may be connected directly or indirectly to the substantially inextensible layer 1343 in another suitable manner. In the example shown in FIG. 63D the first fastener portion 1503 is a male portion and the second fastener portion 1504 is a female portion. In other examples the first fastener portion 1503 may be a female portion configured to receive a male second fastener portion 1504.

In some examples the substantially inextensible portion 1343 is flat (as illustrated in FIG. 64B). In other examples, the substantially inextensible portion 1343 is curved in transverse cross section, as shown in FIG. 64D. The curvature may result in greater comfort for the user, for example by avoiding pressure points by matching the curvature to an expected curvature of the human head at the sagittal plane. In some examples, the substantially inextensible portion may be within the range of 1-3 mm thick, such as 1.5 mm-2 mm thick, for example 1.8 mm thick.

4.2.1.18.7 Washable Portion Separable from Substantially Inextensible Portion

The washable portion may be separable from the substantially inextensible layer 1343. As described above, the top strap portion 1340 comprises an outer sleeve 1348 forming the outer layer 1341. In the example shown in FIGS. 61A-61B, the substantially inextensible layer 1343 is located within the outer sleeve 1348. The outer sleeve 1348 is connected to the battery pack 1500, as shown in FIG. 60C.

In this example, when the washable portion is separated from the remainder of the positioning and stabilising structure 1300 for washing, the user-facing layer 1344 is separated from the outer sleeve 1348. The substantially inextensible layer 1343 remains within the outer sleeve 1348. The battery pack 1500 may or may not be disconnected from the substantially inextensible layer 1343, as there may be not be a need for the user to do so since the washable portion can now be washed. In some examples in which the substantially inextensible layer 1343 does not form part of the washable portion (e.g. in which the washable portion is separable from the substantially inextensible layer 1343), the battery pack 1500 may not be configured for disconnection from the substantially inextensible layer 1343 by the user.

4.2.1.18.8 Washable Portion Including Substantially Inextensible Portion

In other examples, the substantially inextensible layer 1343 forms part of the washable portion. In the example illustrated in FIGS. 62A-62B, 63A-63D and 64A-64D, the top strap portion 1340 comprises a user-contacting portion 1342 forming the user-facing layer 1344, as described above. The substantially inextensible layer 1343 in this example is provided to the user-contacting portion 1342. The user-contacting portion 1342 forms part of the washable portion and is separable from the outer sleeve 1348, such that the substantially inextensible layer 1343 forms part of the washable portion and is separable from the outer sleeve 1348.

In this example the user-contacting portion 1342 comprises a user-contacting sleeve 1342a. As shown in FIG. 62B the substantially inextensible layer 1343 is located within the user-contacting sleeve 1342a.

With reference to FIGS. 64A-64D, the user-contacting sleeve 1342 may comprise a rigidiser opening 1343a through which the substantially inextensible layer 1343 is able to be inserted. The rigidiser opening 1343a may be a slit or narrow hole within the material of the user-contacting sleeve 1342 and may be shaped and sized such that it corresponds to the shape and size of the cross section of the substantially inextensible layer 1343, to enable insertion of the substantially inextensible layer 1343. The rigidiser opening 1343a may be located at or proximate an end of the user-contacting sleeve 1342 to enable a first end of the substantially inextensible layer 1343 to be inserted into the interior of the user-contacting sleeve 1342 and may wrap over a second end of the substantially inextensible layer 1343 to substantially encapsulate the substantially inextensible layer 1343. The substantially inextensible layer 1343 may be removably inserted into the user-contacting sleeve 1342. Advantageously, this may enable the user-contacting sleeve 1342 to be replaced if necessary.

The user-contacting sleeve 1342 may comprise a fastener opening 1503a through which the battery pack 1500 is able to be removably attached to the substantially inextensible layer 1343. As described above, the substantially inextensible layer 1343 may comprise a first fastener portion 1503 configured to connect to a corresponding second fastener portion 1504 of the battery pack 1500. When assembled, the first fastener portion 1503 may extend through the first fastener opening 1503a, configured to connect to the second fastener portion 1504, thereby configured to connect the substantially inextensible layer 1343 to the battery pack 1500.

The battery pack 1500 may cover either or both of the rigidiser opening 1343a and the fastener opening 1503a in use. FIGS. 64A and 64C show an outline of the shape of the battery pack 1500. As illustrated, in use both the rigidiser opening 1343a and the fastener opening 1503a are within the perimeter/periphery of the battery pack 1500.

The user-contacting sleeve 1342a and/or outer sleeve 1348 may each be formed from a textile material and may be formed by cutting a textile sheet (e.g. by die cutting, ultrasonic cutting or RF cutting), folding it into a tubular shape and ultrasonically welding the seam along the length of the sleeve, along with any other edges. The sleeve may be turned inside out such that any sharp welded edge is provided on the inside and the outside is advantageously free of sharp edges that may result in discomfort in use or an unsightly appearance. Any other suitable manner of forming the user-contacting sleeve 1342a and outer sleeve 1348. Hook or loop portions for forming hook-and-loop connections may be welded or sewn onto the textile material. In other examples the textile material may be stitched to form a tubular shape. In other examples the substantially inextensible layer 1343 may not be encapsulated by a user-contacting sleeve and may instead be provided to the user-contacting portion 1342 by being secured to a user-facing layer 1344 (e.g. adhered, fastened by hook-and-loop connections, inset, overmoulded or otherwise connected).

The outer sleeve 1348 and/or user-contacting sleeve 1342a may be formed from a material that is elastic or inelastic, may be formed from a soft material that is comfortable if it contacts the user, is washable (e.g. machine-washable) and/or is formed from a material conducive to wicking moisture away from the user's face or head. In some examples the sleeves (i.e. outer sleeve 1348 and/or user-contacting sleeve 1342a) are formed from any one of elastane, TPE or nylon. The sleeves may be formed from an elastic material which, in the case of the user-contacting sleeve 1342a, facilitates insertion of the substantially inextensible layer 1343. The sleeves may be formed from a low-friction material (or a material having a low friction interior surface) which, in the case of the outer sleeve 1348, facilitates movement of a power cable 1510 within the outer sleeve 1348 during adjustment of the length of the outer sleeve 1348.

As described above, the head-mounted display system 1000 may comprise a power cable 1510 connected between the battery pack 1500 and the head-mounted display unit 1200. As shown in both the FIGS. 61B and 62B examples, the power cable may be located within the sleeve 1348 (e.g. in a manner described elsewhere herein).

4.2.2 Arms Inside of Head-Mounted Display Unit Periphery

While in some examples of the present technology, arms 1210 of a head-mounted display unit 1200 may extend from an outside of a display unit housing, in some examples of the present technology, arms 1210 may extend from inside of a head-mounted display unit 1200.

As shown in FIGS. 55A-55I, a head-mounted display system 1000 may comprise a head-mounted display unit 1200 and a positioning and stabilising structure 1300 (not shown in FIGS. 55A-55I) structured and arranged to hold the head-mounted display unit 1200 in an operational position over a user's face in use (e.g. in the position shown in FIG. 55A). The positioning and stabilising structure 1300 may comprise a posterior support portion 1350 configured to engage a posterior portion of a user's head, and a pair of lateral strap portions 1330 configured to connect between the posterior support portion 1350 and the head-mounted display unit 1200, each configured to be located on a respective lateral side of the user's head in use. The head-mounted display unit 1200 may comprise a display unit housing 1205 comprising a display, and an interfacing structure 3800 configured to contact the user's face in use.

The head-mounted display unit 1200 may further comprise a pair of arms 1210, as shown in FIG. 55A for example. Each arm 1210 may extend posteriorly from the display unit housing 1205, the arms 1210 each being configured for attachment to a respective one of the lateral strap portions 1330 of the positioning and stabilising structure 1300.

In the example shown in FIGS. 55A-55I, the display unit housing 1205 has a posterior side having a periphery (e.g. an outermost periphery). Each of the arms 1210 extend from the display unit housing 1205 from within the periphery of the posterior side of the display unit housing 1205. Arms 1210 extending from inside of the periphery of the display unit housing may reduce the overall width of the head-mounted display unit 1200 and/or may facilitate closer to optimal headgear force vectors (e.g. closer to parallel with the anterior-posterior axis).

As shown in FIGS. 55A-55C in particular, the interfacing structure 3800 has a periphery, and each of the arms 1210 is located between the periphery of the posterior side of the display unit housing 1205 and the periphery of the interfacing structure 3800. The arms 1210 may each be located medially of an adjacent portion of the display unit housing 1205. Additionally, the arms 1210 may each be located laterally of an adjacent portion of the interfacing structure 3800. The lateral-most portions of the display unit housing 1205 may be lateral to some or all of the arms 1210. The lateral-most portions of the display unit housing 1205 may be located laterally of the connection between a respective one of the arms 1205 and the display unit housing 1205, for example.

Each of the arms 1210 may comprise an eyelet 1212 configured to receive a respective one of the lateral strap portions 1330 of the positioning and stabilising structure 1300. The eyelet 1212 of each arm may be located at or proximate a posterior end of the respective arm 1210.

4.2.2.1 Pivoting of Arms

Each of the pair of arms 1210 may be able to pivot with respect to the display unit housing 1205. FIGS. 55D-55G and 55I show a pivot point 1213 of each arm. The pivot point 1213 may be proximate the display within the display unit housing 1205 and may be located anterior to the user's face. Each of the arms 1210 may be configured to pivot about a horizontal axis perpendicular to the sagittal plane of the user's head in use. Each of the arms 1210 may be configured to pivot through an angular range A of at least 9 degrees (FIGS. 55F and 55G). In some examples the angular range A may be at least 19 degrees.

As shown in FIGS. 55D-55G and 55I, each arm 1210 in this example comprises a hub portion 1230 and an elongate portion 1231 extending away from the hub portion. The eyelet 1212 of the arm 1210 is formed at a distal (posterior) end of the elongate portion 1231. The hub portion 1230 is secured to the display unit housing 1205 (optionally via an arm mounting portion 1215, to be described below) at the pivot point 1213. The hub portion 1230 rotates about the pivot point 1213 and, as the elongate portion 1231 is rigidly connected to the hub portion 1230 (e.g. by being integrally formed with the hub portion 1230), the elongate portion 1231 rotates about the pivot point 1213 with the hub portion 1230.

In another example of the present technology, as shown in FIG. 55J, each arm 1210 is slidably connected to the display unit housing 1205 and configured to be slidably moved to pivot about a pivot point 1213. FIG. 55J shows one side of the head-mounted display only, but it is to be understood that where a feature of a singular arm is described, that feature may be applied to both arms 1210 of a head-mounted display.

In this example each pivot point 1213 is a theoretical/imaginary pivot point about which an arm 1210 rotates. The pivot points 1213 in this example are not points at which the arms 1213 are connected to the display unit housing 1205, but are points in space about which the arms 1210 rotate due to their connections to the display unit housing 1205 at other locations. In particular, each arm 1210 is slidably connected to the display unit housing 1205 at a location spaced from its respective pivot point 1213.

As shown in FIG. 55J, each arm 1210 is slidably connected to a respective one of a pair of guides 1219 (depicted by a broken line) of the display unit housing 1205 so as to slide along the respective guide 1219 and pivot about the respective pivot point. Each guide 1219 may be elongate to allow a respective arm 1210 to slide along it. Furthermore, each guide 1219 may be curved to force a pivoting motion of the arm 1210 during sliding. Accordingly, each guide 1219 may be elongate and curved. In this way, each arm 1210 is configured to pivot about a pivot point 1213 with respect to the display unit housing 1205 without the physical connection between the arm 1210 and the display unit housing 1205 being located at the pivot point 1213.

Each of the arms 1210 comprises an eyelet 1212 configured to receive a respective lateral strap portion 1330 of a positioning and stabilising structure 1300. In this example the eyelet 1212 of each arm 1210 is located at or proximate a posterior end of the respective arm 1212, as illustrated in FIG. 55J. In other examples the arms 1210 may connect with strap portions of the headgear 1300 in other suitable manners, such as clips (e.g. magnetic clips) or a hook and loop connection between a strap portion and each arm 1210.

In FIG. 55J, the anterior end of an arm 1210 hidden behind a portion of the display unit housing 1205 is shown in phantom. In this example, the arm 1210 does not need to be longer than required to span between an intended position for the eyelet 1212 and the guide 1219. As illustrated, an anterior end of the arm 1210 is located proximate the guide 1219. Further, the display unit housing 1205 has a pair of posterior-most points 1205_p_, the posterior-most points 1205_p_ being located on respective lateral sides of the display unit housing 1205. In this example, each guide 1219 is located proximate a respective one of the posterior-most points 1205_p_ of the display unit housing 1205.

The guides 1219 and arms 1210 may comprise any configuration which allows the arms 1210 to slide along the guides 1219 but restrains movement of the arms 1210 to pivoting/rotation about the pivot point 1213. The guides 1219 and arms 1210 may comprise complementary configurations. The guides 1219 and arms 1210 may connect in a complementary or male-female relationship, such as in the examples shown in FIGS. 55K and 55L. In some examples the guides 1219 each comprise a female portion configured to receive a male portion of a respective arm 1210. In other examples the arms 1210 each comprise a female portion that receives a male portion of a respective guide 1219 (such as is shown in FIG. 55M by way of example). In some examples the guides 1219 and arms 1210 are joined in an interlocking configuration that resists separation of the arm 1210 and guide 1219. For example, the arms 1210 and guides 1219 may comprise a dovetail connection (shown by way of example in FIG. 55K), an L-shaped connection, a T-shaped connection or another connection which both restrains the arms 1210 to pivoting motion about the pivot point 1213 and also prevents the arms 1210 from separating from the guides.

Alternatively, the connection between the arms 1210 and guides 1219 may not itself prevent separation of the arms 1210 from the guides 1219. FIG. 55L shows a configuration in which the guide 1219 is in the form of a slot which receives a projection of the arm 1210 and guides the arm 1210 to move along the slot, but the arm 1210 is prevented from separating from the guide 1219 by a portion of an arm mounting portion 1215 adjacent the arm rather than by the guide 1219 itself. The guide 1215 may be formed in an arm mounting portion 1215, in a portion of the display unit housing 1205 or in another component of the head-mounted display unit 1200. FIG. 55M shows an example in which the arm 1210 comprises a slot that receives a guide 1219 in the form of a projection configured to fit into the slot. In this example the arm 1210 may be prevented from separating from the guide 1219 by a portion of the arm mounting portion 1215 or by another component within the head-mounted display unit 1200.

The use of guides 1219 for the arms 1210 may advantageously allow the arms 1210 to be short, which may allow ample space for other components of the head-mounted display unit 1200 proximate the arms 1210.

The arms 1210 and head-mounted display unit 1200 of the examples of the present technology shown in FIG. 55J-55M may also include any of the other features described herein with reference to other examples of the present technology, including but not limited to the arms 1210 being between a periphery of the posterior side of the display unit housing 1205 and a periphery of the interfacing structure 3800, arm mounting portions 1215, pivoting range of motion of the arms 1210, predetermined resistance to pivoting motion, pivoting between predetermined incremental orientations and/or static torque resistance, for example.

4.2.2.2 Resistance of Arms to Pivotal Movement

In some examples, each of the arms 1210 has a predetermined resistance to pivotal movement with respect to the display unit housing 1205. As depicted in FIG. 55E, each of the arms 1210 may be configured to pivot between a plurality of predetermined incremental orientations (e.g. the arms 1210 may snap, fall or fit into place at a plurality of orientations). The predetermined resistance to pivotal movement being required to be overcome before the arms 1210 are able to pivot from one predetermined incremental orientation to another.

In some examples, each of the arms 1210 comprises one or more first engagement features 1232 configured to engage sequentially with a plurality of second engagement features 1233 of the head-mounted display unit 1200 (e.g. of the display unit housing 1205, of an arm mounting portion 1215 or of another component) during pivoting of the arms 1210 between the predetermined incremental orientations. FIGS. 55E and 59B-59N depict various such examples of the present technology.

Figure 59C:
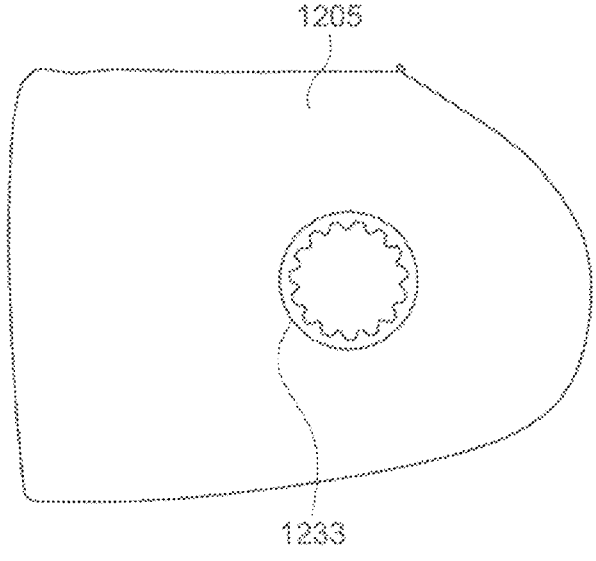
Figure 59D:
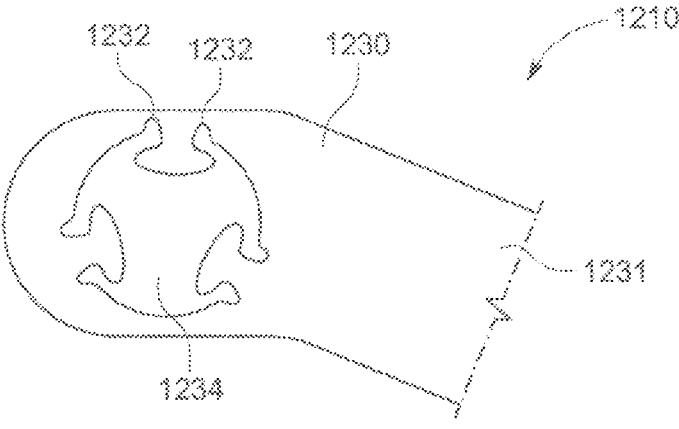
Figure 59E:
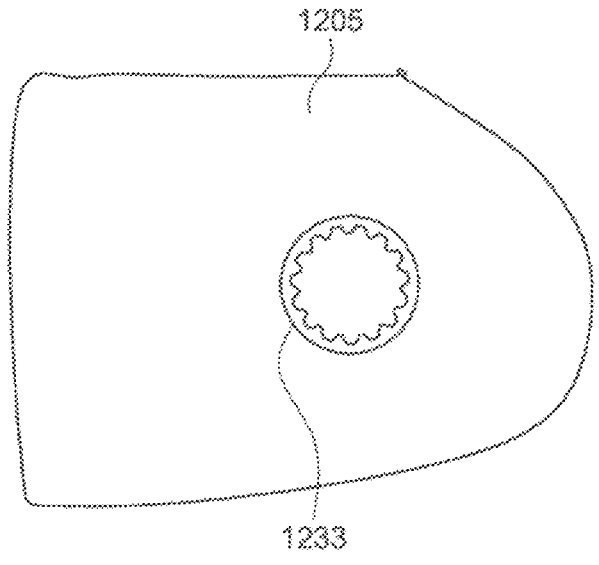
Figure 59F:
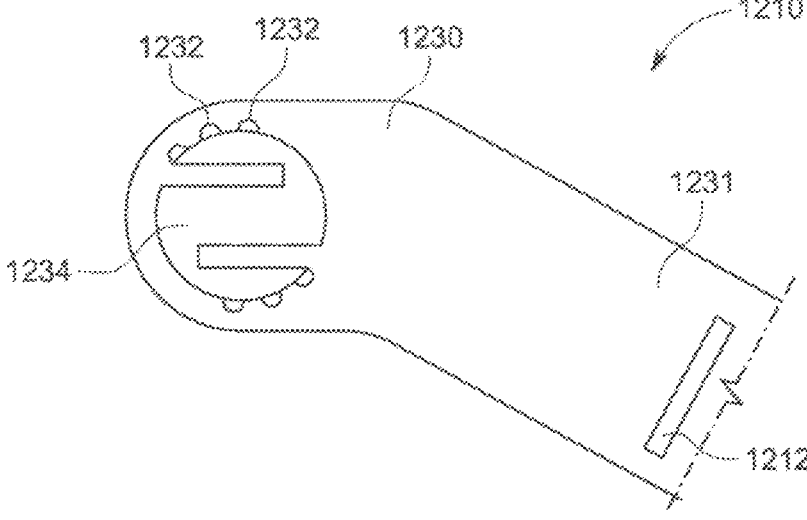
Figure 59G:
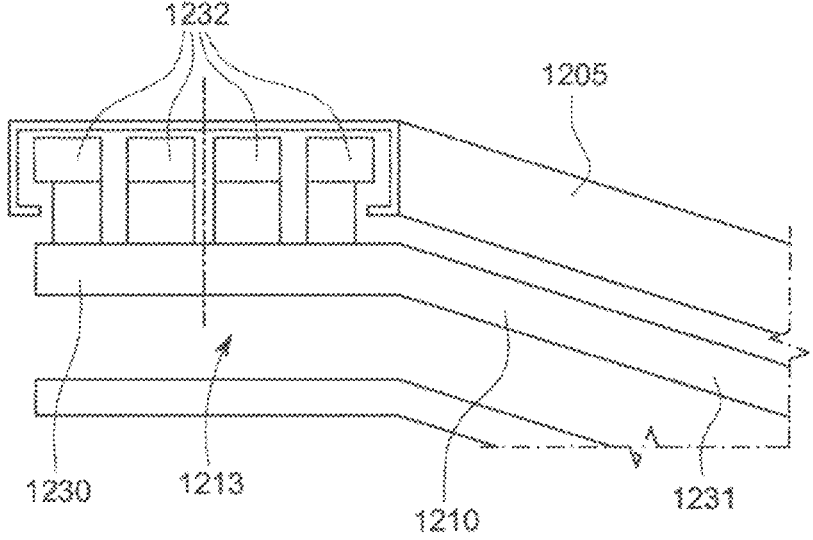
Figure 59H:
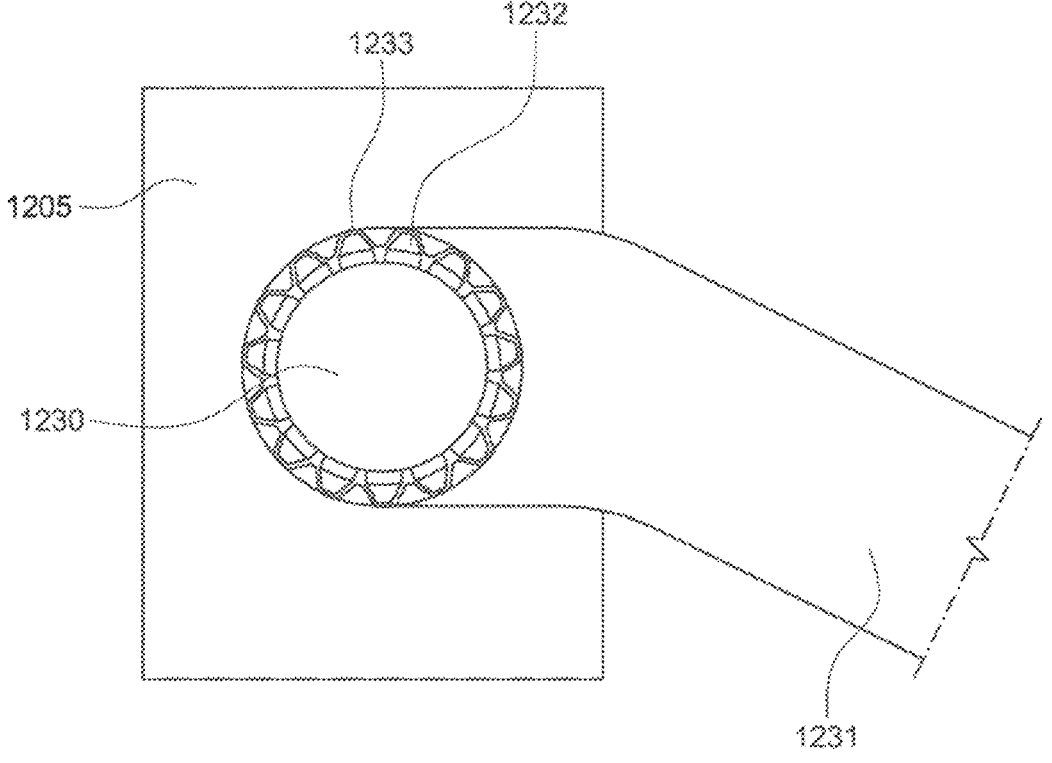
Figure 59I:
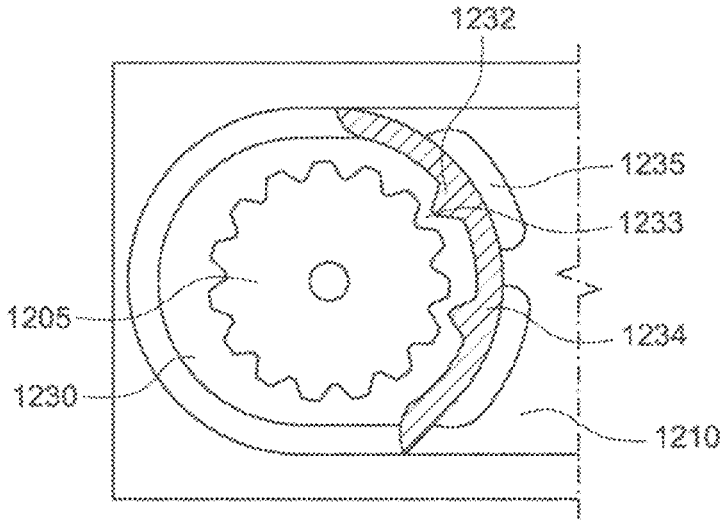
Figure 59J:
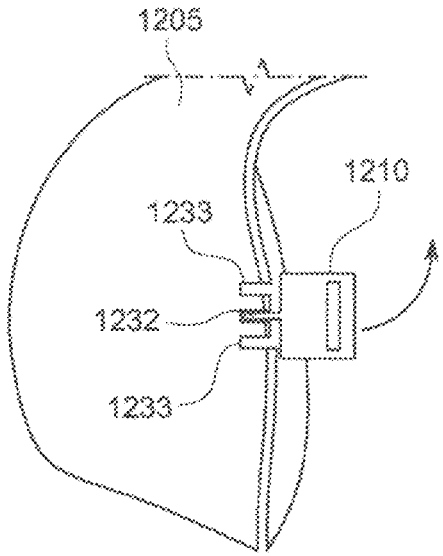
Figure 59K:
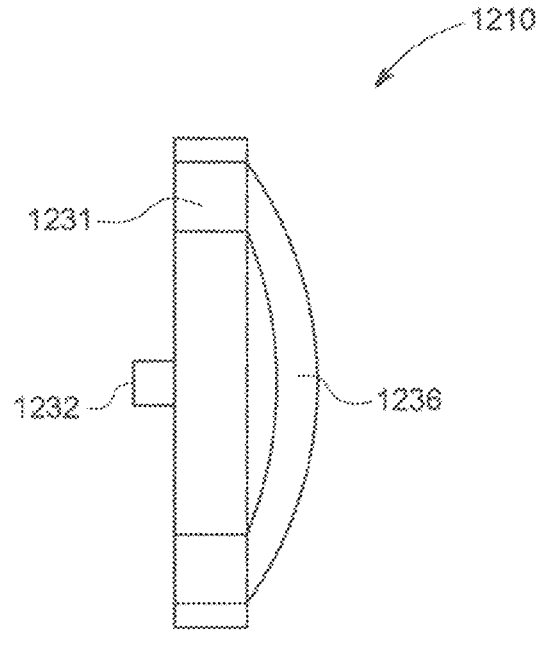

Each of the arms 1210 may comprise a single first engagement feature 1232, as shown in FIG. 55E or FIGS. 59J and 59K for example. Alternatively, each of the arms 1210 may comprise a plurality of first engagement features 1232, where each first engagement feature 1232 is configured to engage with a respective one of the second engagement features 1233 at a time and configured to move sequentially between the second engagement features 1233 during pivoting of the arms 1210. This type of configuration is shown in the examples of FIGS. 59B-59I, and 59L.

In some examples, each of the arms 1210 comprises a plurality of first engagement features 1232 configured to engage with one or more second engagement features 1233 of the head-mounted display unit 1200, the one or more second engagement features 1233 being configured to engage sequentially with the first engagement features 1232 during pivoting of the arms 1210 between the predetermined incremental orientations.

In some examples, the first engagement features 1232 are protrusions and the second engagement features 1233 are recesses. In other examples, the first engagement features 1232 are recesses and the second engagement features 1233 are protrusions. The first and second engagement features may be complementary, for example male and female features.

In some examples, each arm 1210 comprises a hub portion 1230 pivotably connected to the display unit housing 1205 (e.g. directly or via an arm mounting portion 1215) and an elongate portion 1231 extending from the hub portion 1230. In some examples, such as those shown in FIGS. 55E, 59J, 59K and 59L, the one or more first engagement features 1232 of each arm 1210 are provided to the elongate portion 1231 of the arm 1210.

The display unit housing 1205 in the FIG. 55E example comprises a plurality of second engagement features 1233 (e.g. recesses formed by a plurality of bumps) corresponding to the predetermined incremental orientations. Additionally, each of the arms 1210 comprises a first engagement feature 1232 configured to fit to each of the second engagement features 1233. A predetermined force (e.g. predetermined resistance to pivotal movement) may be required to move each arm 1210 from one second engagement feature 1233 to another.

In some examples, each arm 1210 is configured to deform to allow the one or more first engagement features 1232 to move sequentially between the second engagement features 1233 during pivoting of the arms 1210, as depicted in FIG. 59J.

In some examples, each arm 1210 comprises a spring 1236 configured to bias the elongate portion 1231 of the arm 1210 towards the second engagement features 1233 such that the one or more first engagement features 1231 are biased into engagement with the second engagement features 1232. In FIG. 59K, the arm 1210 comprises a spring 1236 in the form a leaf spring. The spring 1236 may be compressed against a portion of the display unit housing 1205 or arm mounting portion 1215, for example.

Figure 59L:
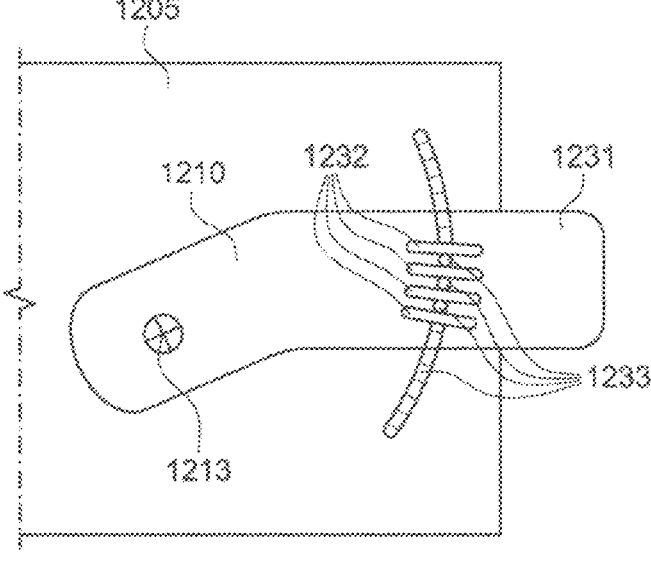

In the example shown in FIG. 59L, the arm comprises a plurality of first engagement features 1232 configured to engage with the second engagement features 1233.

In some examples, such as those shown in FIGS. 59B, 59C-59D, 59E-59F, 59G-59H, 59I, 59M and 59N, the first engagement features 1232 of each arm 1210 are provided to the hub portion 1230 of the arm 1210 in a circular arrangement and configured to rotate with the hub portion 1230 about a pivot point 1213 of the arm 1210. In the examples shown in FIGS. 59B, 59C-59D, 59E-59F, 59G-59H, and 59I, the first engagement features 1232 of each arm 1210 face radially away from the pivot point 1213, and the second engagement features 1233 face radially towards the pivot point 1213. In other examples, the first engagement features 1232 of each arm 1210 face radially towards the pivot point 1213, and the second engagement features 1233 face radially away from the pivot point 1213.

The first engagement features 1232 in some examples are provided to a deformable portion of the hub portion 1230, the deformable portion being configured to deform to allow the first engagement features 1232 to move sequentially between second engagement features 1233 when the arm 1210 is pivoted. As shown in FIGS. 59B, 59C-59D, 59E-59F and 59I, the hub portion 1230 may comprise a raised portion 1234 being raised with respect to the arm 1210 and comprising the deformable portions and the first engagement features 1232. The raised portion 1234 may comprise a hole 1235 adjacent each deformable portion, the holes 1235 allowing the deformable portions and first engagement features 1232 to deform towards the holes 1235 to allow the first engagement features 1232 to move sequentially between second engagement features 1233 when the arm 1210 is pivoted. The absence of material in the holes 1235 may allow the arm 1210 to be flexible enough in the deformable portion to deform sufficiently to allow the arm 1210 to rotate through the predetermined increments.

In some examples, such as shown in FIGS. 59C-59D and 59E-59F, each deformable portion comprises one or more cantilever arm portions having at least one of the first engagement features 1232 thereon, the cantilever arm portions configured to deform to allow the first engagement features 1232 to move sequentially between second engagement features 1233 when the arm 1210 is pivoted. Each cantilever arm portion may have a single first engagement feature 1232 at the end thereof, as shown in FIGS. 59C-59D or may have multiple first engagement features thereon, as shown in FIGS. 59E-59F. In some examples the raised portion 1234 has an S-shape, as shown in FIG. 59F.

In some examples, the first engagement features 1232 of the arm 1210 form a snap-fit connection to the head-mounted display unit 1200 to connect the arm 1210 to the head-mounted display unit 1200, as shown in FIGS. 59G and 59H. In this example, each first engagement feature 1232 is able to deform radially inwardly. The first engagement features 1232 snap-fit to the second engagement features 1233.

Figure 59M:
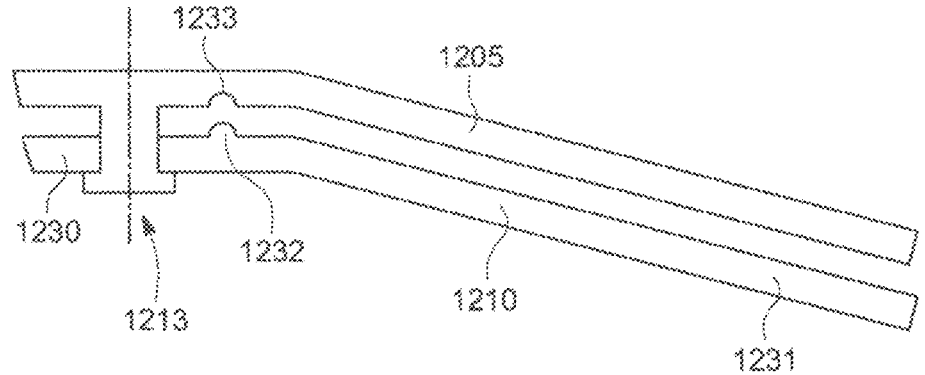
Figure 59N:
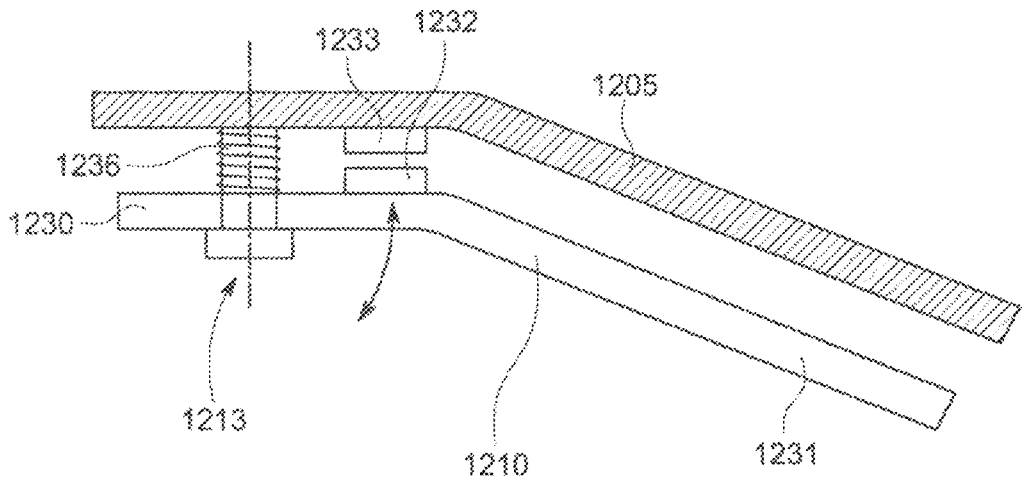

In some examples, the first engagement features 1232 face away from the hub portion 1230 of the arm 1210 and towards the second engagement features 1233 in a direction parallel to the axis of rotation of the arm 1210 (e.g. an axis through the pivot point 1213), as shown in FIGS. 59M and 59N. The first engagement features 1232 may be located on or in a face of the hub portion 1230 as opposed to at sides. The hub portion 1230 may be configured to move parallel to the axis of rotation of the arm 1210 to move away from the second engagement features 1233 to allow the first engagement features 1232 to move sequentially between second engagement features 1233 when the arm 1210 is pivoted. In the example shown in FIG. 59N, the hub portion 1230 is biased towards the second engagement features 1233 by a spring 1236. The spring may be a coil spring provided around a pin, bolt or screw that connects the arm 1210 to the display unit housing 1205, for example.

4.2.2.2.1 Static Torque Resistance

In another example, each of the arms 1210 is connected to the display unit housing 1205 such that a predetermined static torque resistance is required to be overcome for each arm 1210 to pivot with respect to the display unit housing 1205. In some examples, the predetermined static torque resistance is provided by static friction. The static friction is provided by static friction. The static friction may act between each arm 1210 and a respective portion of the display unit housing 1205 or respective arm mounting portion 1215 (to be described below).

In some examples, the head-mounted display system 1000 comprises a pair of friction rings 1220 (e.g. O-rings, washers or the like). FIG. 59 shows a schematic cross section view through the pivot point 1213 of an arm 1210. Each friction ring 1220 may be mounted in contact with a respective one of the arms 1210 and with an adjacent surface within the head-mounted display unit 1200 (which may be a surface of an arm mounting portion 1215. The friction rings 1220 provide static friction required to be overcome for each arm 1210 to pivot with respect to the display unit housing 1205. As shown in FIG. 59, each friction ring 1220 may be received in a correspondingly shaped recess within the arm 1210. This may hold the friction ring 1220 in place without the friction ring 1220 occupying excessive space within the head-mounted display unit 1200. The friction ring 1220 may be attached to or received in the hub portion 1230 of the arm 1210. In this example a bolt 1221 and nut 1222 secure the arm 1210 to the arm mounting portion 1215. The nut 1222 may be received in or attached to the hub portion 1230 of the arm 1210. A portion of the bolt 1221 may extend through the hub portion 1230 of the arm 1210 and may define the pivot point 1213. The friction rings 1220 may be formed from a high-friction material and/or clamped to result in the desired friction and predetermined static torque resistance.

The arms 1210 may have a length such that the posterior end of each arm 1210 is located proximate a respective one of the user's ears.

4.2.2.3 Arm Mounting Portions

As shown in FIGS. 55B, 55C, 55H and 55I in particular, each of the arms 1210 is attached to a respective one of a pair of arm mounting portions 1215, in this particular example. The display unit housing 1205 may comprise a pair of lateral portions 1207 on opposing lateral sides of the display unit housing 1205, each of the arm mounting portions 1215 being attached to a medial side of a respective one of the lateral portions 1207. In this example, each of the arms is located between a respective arm mounting portion 1215 and a respective lateral portion 1207 of the display unit housing 1205. Each arm 1210 may be pivotably connected to a respective arm mounting portion 1215. In other examples, each arm mounting portion 1215 is attached to or is integrally formed with the display unit housing 1205 or other component, such as a lens plate.

4.2.2.4 Arm Orientation

As shown in FIGS. 58A and 58B, in some examples each of the arms 1210 has a transverse cross sectional shape comprising a major axis MA and a minor axis MN. Each arm 1210 is larger in the major axis MA than in the minor axis MN in this example (e.g. the arms 1210 each have a flat shape, which may be rectangular for examples). In some examples of the present technology, the major axis MA is aligned parallel to the sagittal plane of the user's head in use along the length of the arm 1210. FIG. 58A shows a cross section of the arm 1210 having a vertical orientation (e.g. aligned with the sagittal plane). One drawback of this arrangement is that the arm 1210 may be limited in how much it can pivot before interfering with the display unit housing 1205 (as depicted in FIG. 58A). Accordingly, in some examples of the present technology, at a point along the length of each arm 1210 located interior to the display unit housing (e.g. where interference may occur), the major axis MA is oriented at an oblique angle O to the sagittal plane of the user's head in use (equal to an angle O with a vertical axis VA), as depicted in FIG. 58B. The angular range through which the arm 1210 may be able to be pivoted may be increased in this example in comparison to the FIG. 58A example with no or only a small amount of extra space occupied by the arm 1210 and associated surrounding components.

In some examples, at the point along the length of each arm 1210 located interior to the display unit housing 1205, the major axis MA of the transverse cross sectional shape has a superomedial-inferolateral orientation in use. This is the orientation shown in FIG. 58B.

In some examples, each of the arms 1210 is shaped such that the major axis MA of the transverse cross section changes orientation along the length of the arm 1210. For example, the shape or cross sectional orientation of each arm 1210 may have one orientation inside of the head-mounted display unit 1200 (e.g. a major axis MA having a superomedial-inferolateral orientation) and another orientation outside of the head-mounted display unit 1200 (e.g. a vertical orientation). In some examples, at a point along the length of each arm 1210 located exterior to the display unit housing 1205, the major axis MA is oriented substantially parallel to the sagittal plane of the user's head in use.

A head-mounted display system 1000 having arms 1200 as described with reference to FIGS. 55A-55I may have any one or more of the other features described in herein (such as a top strap portion 1340), unless the context clearly requires otherwise).

4.2.3 Headgear Buckle Integrated into Interface Structure

With reference to FIGS. 56A and 56B, in some examples the head-mounted display unit 1200 comprises a display unit housing 1205 and an interfacing structure 3800. The interfacing structure 3800 may be constructed and arranged to be in opposing relation with the user's face. The interface structure 3800 may comprise a face-engaging portion 3810 configured to engage the user's face in use, and a chassis 3802 connected to the face-engaging portion 3810 and further connected to the display unit housing 1205 to attach the interfacing structure 3800 to the display unit housing 1205.

FIGS. 56A and 56B are schematic cross section views of a superior portion of the interfacing structure 3800 and display unit housing 1205 aligned with the sagittal plane of the user's head.

In the FIGS. 56A and 56B examples, the chassis 3802 of the interfacing structure 3800 is configured for attachment to a top strap portion 1340 of a positioning and stabilising structure 1300 for holding the head-mounted display unit 1200 in an operable position on a user's head in use. The positioning and stabilising structure 1300 may further comprise a posterior support portion 1350 configured to engage a posterior portion of a user's head, and a pair of lateral strap portions 1330 configured to connect between the posterior support portion 1310 and the head-mounted display unit 1205, each configured to be located on a respective lateral side of the user's head in use. Features of top strap portions 1340 and positioning and stabilising structures 1300 are described elsewhere herein.

As shown in FIGS. 56A and 56B, the chassis 3802 may comprise an eyelet 3812 through which the top strap portion 1340 is able to be looped back and secured to itself. In the FIG. 56A example, the eyelet 3812 is formed by both the chassis 3802 and the display unit housing 1205 such that the top strap portion 1340 is able to be looped around both a portion of the chassis 3802 and a portion of the display unit housing 1205. In the FIG. 56B example, the eyelet 3812 is formed in a superiorly projecting portion 3814 of the chassis

3802. As illustrated, the superiorly projecting portion 3814 may project through an opening in the display unit housing 1205.

The top strap portion 1340 may pass through the eyelet 3812, loop back and secure to itself, e.g. with a hook-and-loop fastening, a buckle, a magnetic connection or the like.

The chassis 3802 may be a substantially rigid portion and may be formed from a thermoplastic material or an elastomer, such as a high durometer elastomer.

4.2.4 Interfacing Structure

Figure 31B:
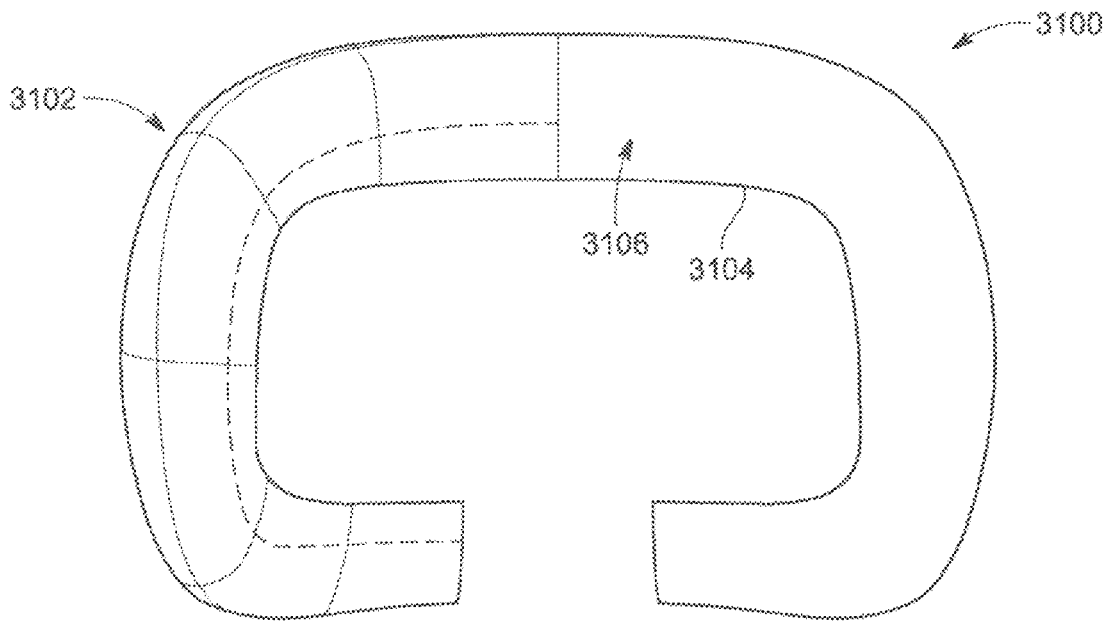
Figure 31C:
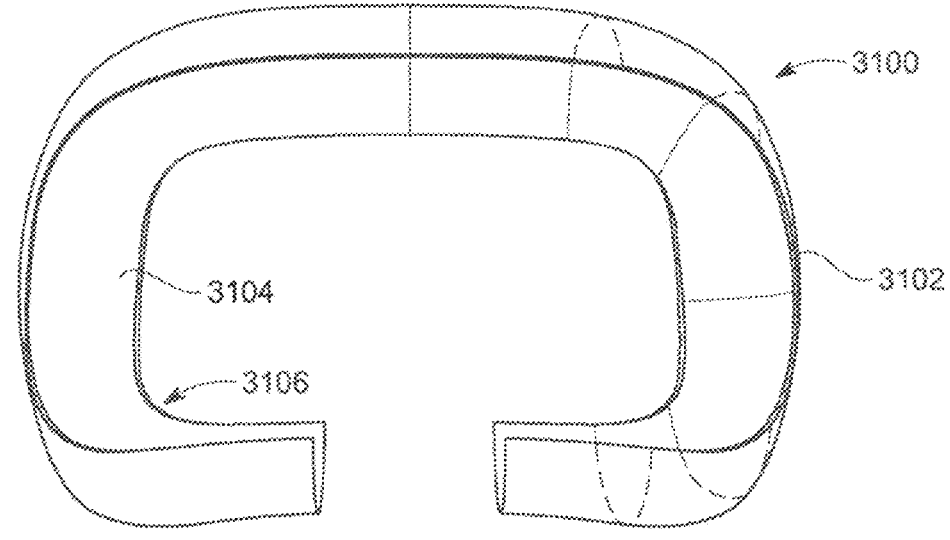

In some embodiments, two or more of the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. For example, FIGS. 31A to 31C show an interfacing structure 3100 comprising a support structure in the form of a support flange 3102, supporting an integral face engaging flange 3106 having a face engaging surface 3108. In further embodiments, additional components may be provided to the interfacing structure 3100. In alternative embodiments, the interfacing structure can be integrally formed as a single component from a foam or an elastomeric material.

In some forms of the present technology, an interfacing structure may comprise a face engaging portion constructed from a flexible and resilient material (for example, an elastomer such as silicone), supported by a more rigid support portion (for example, constructed from a plastics material). In embodiments the rigid support portion may comprise a chassis.

For example, with reference to FIG. 32A, the interfacing structure 3200 may comprise a rigid support portion 3202 to which a flexible and resilient face engaging portion 3204 may be provided. The face engaging portion 3204 may be curved in cross-section, having a support flange 3206 and an integral face engaging flange 3208 having a face engaging surface 3210. An overlapping portion 3212 of the face engaging portion 3204 may be secured to the rigid support portion 3202.

In a further example, with reference to FIG. 32B, the rigid support portion 3202 may comprise a locating portion, for example recess 3214. The face engaging portion 3204 may comprise a biasing portion, for example spring 3216, received within the recess 3214 and configured to provide a biasing force to the face engaging portion 3204 in the direction of the user's face.

In a further example, with reference to FIG. 32C, the face engaging portion 3204 may comprise a concertina section 3218 between the rigid support portion 3202 and the face engaging flange 3208. The concertina section 3218 comprises one or more folds, and may provide a higher degree of flexibility or increased movement to assist with compliance against the user's face.

In some forms of the present technology, the interfacing structure may comprise a foam portion supported by the resilient and flexible face engaging portion, wherein the foam portion provides the face engaging surface.

For example, with reference to FIG. 33A, the interfacing structure 3300 may comprise a rigid support portion 3302 to which a flexible and resilient face engaging portion 3304 may be provided, in a configuration similar to that described with reference to FIG. 32A. The face engaging portion 3304 has a support flange 3306 and an integral face engaging flange 3308, with an overlapping portion 3310 secured to the rigid support portion 3302. A foam cushion 3312 having a face engaging surface 3314 is provided to a user facing side of the face engaging flange 3308. In examples the foam cushion 3312 may be permanently attached to the face engaging flange 3308. In alternative embodiments the foam cushion 3312 may be releasably attached to the face engaging flange 3308. In the example of FIG. 33A, the foam cushion 3312 may comprise a textile-foam composite (e.g. a foam core with a textile outer layer). In the example of FIG. 33B, the foam cushion 3312 may comprise a flocked foam. In the example of FIG. 33C, the foam cushion 3312 may comprise a raw foam.

In some forms of the present technology, the interfacing structure may comprise a textile layer provided to the resilient and flexible face engaging portion, wherein the textile layer provides the face engaging surface.

For example, with reference to FIG. 34A, the interfacing structure 3400 may comprise a rigid support portion 3402 to which a flexible and resilient face engaging portion 3404 may be provided, in a configuration similar to that described with reference to FIG. 32A. The face engaging portion 3404 has a support flange 3406 and an integral face engaging flange 3408, with an overlapping portion 3410 secured to the rigid support portion 3402. A textile layer 3412 having a face engaging surface 3414 is provided to a user facing side of the face engaging flange 3408. In the example of FIG. 34A the textile layer 3412 is releasably attached to the face engaging portion 3404 using retaining means 3416. In one example the retaining means 3416 may be a rigid element clipping the textile layer 3412 in place. In another example the retaining means 3416 may be elasticised, fitting over the face engaging portion 3404 to hold it in place. In an alternative embodiment, with reference to FIG. 34B, the textile layer 3412 may be permanently attached to the face engaging flange 3308. It is envisaged that in this embodiment, the surface area of the textile layer 3412 may be smaller in comparison with that of FIG. 34A, as the textile layer 3412 may be delimited to the region likely to contact the user's skin—i.e. does not need to extend as far around the exterior of the face engaging portion 3404. This may also have the effect of reducing the impact of the textile layer 3412 on spring properties of the exposed region of the support flange 3406.

In some forms of the present technology, an interfacing structure may comprise a face engaging portion supported by a more rigid support portion (for example, constructed from a plastics material), wherein the face engaging portion comprises a foam cushion and an elastomeric cover over the foam cushion.

Figure 35A:
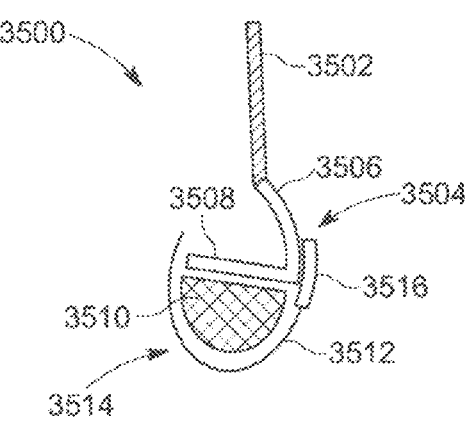

For example, with reference to FIG. 35A, the interfacing structure 3500 may comprise a rigid support portion 3502 to which a flexible and resilient face engaging portion 3504 may be provided. The face engaging portion 3504 may have a support flange 3506, and a cushion support flange 3508 extending from the support flange 3506. A foam cushion 3510 is provided on cushion support flange 3508. A cushion cover 3512 (made of, for example, an elastomer) extends over the foam cushion 3510 and provides a face engaging surface 3514 in use. In this example, the cushion cover 3512 is releasably attached, for example using securing means 3516. The free edge of the cushion cover 3512 extends beyond the cushion support flange 3508.

Figure 35B:
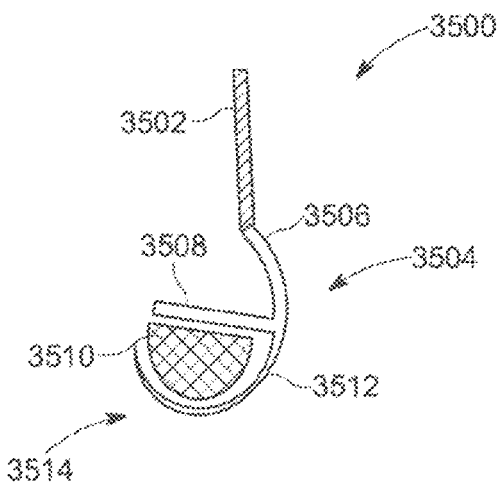

In another example, with reference to FIG. 35B, the cushion cover 3512 is permanently attached to the support flange 3506 and cushion support flange 3508 (for example, being integrally formed). In the example of FIG. 35B the cushion cover 3512 does not extend around the foam cushion 3512 so far as to reach the cushion support flange 3508.

Figure 35C:
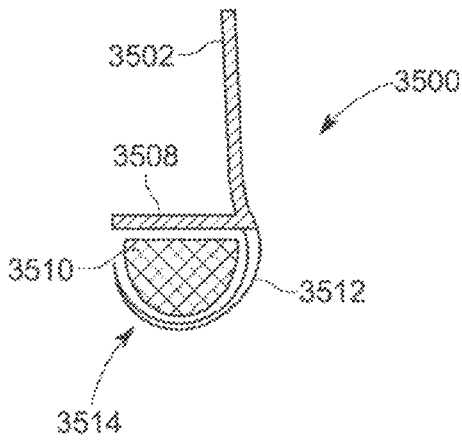

FIG. 35C shows an example in which the cushion support flange 3508 extends from the rigid support portion 3502, and is made of a more rigid material than the cushion cover 3012.

Figure 35D:
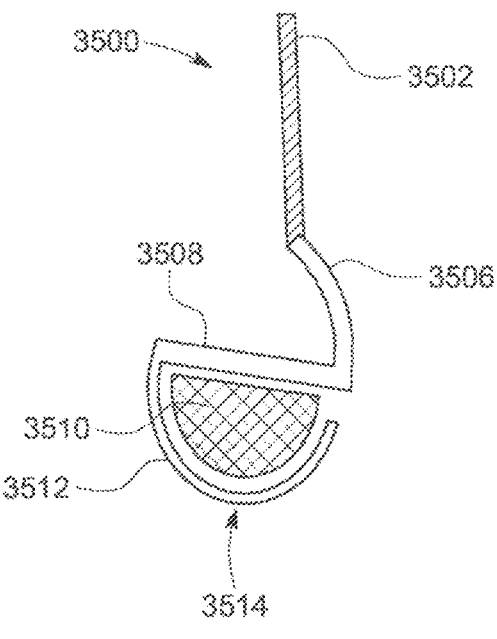

In examples, such as that illustrated in FIG. 35D, the cushion cover 3512 may extend from a position on the cushion support flange 3508 proximal to the user's face in use. In such an example, the exposure of the foam cushion 3510 may be considered to be "outward" facing, in comparison with an "inward" facing exposure of the foam cushion 3510 in the example of FIG. 35B.

Figure 35E:
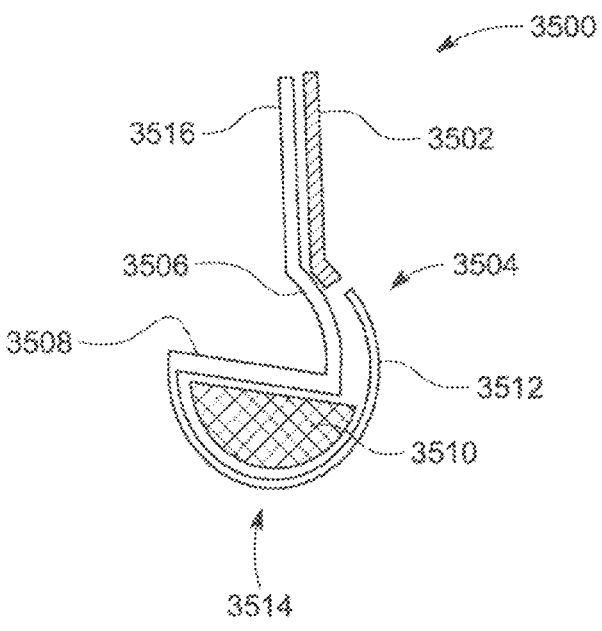
Figure 36A:
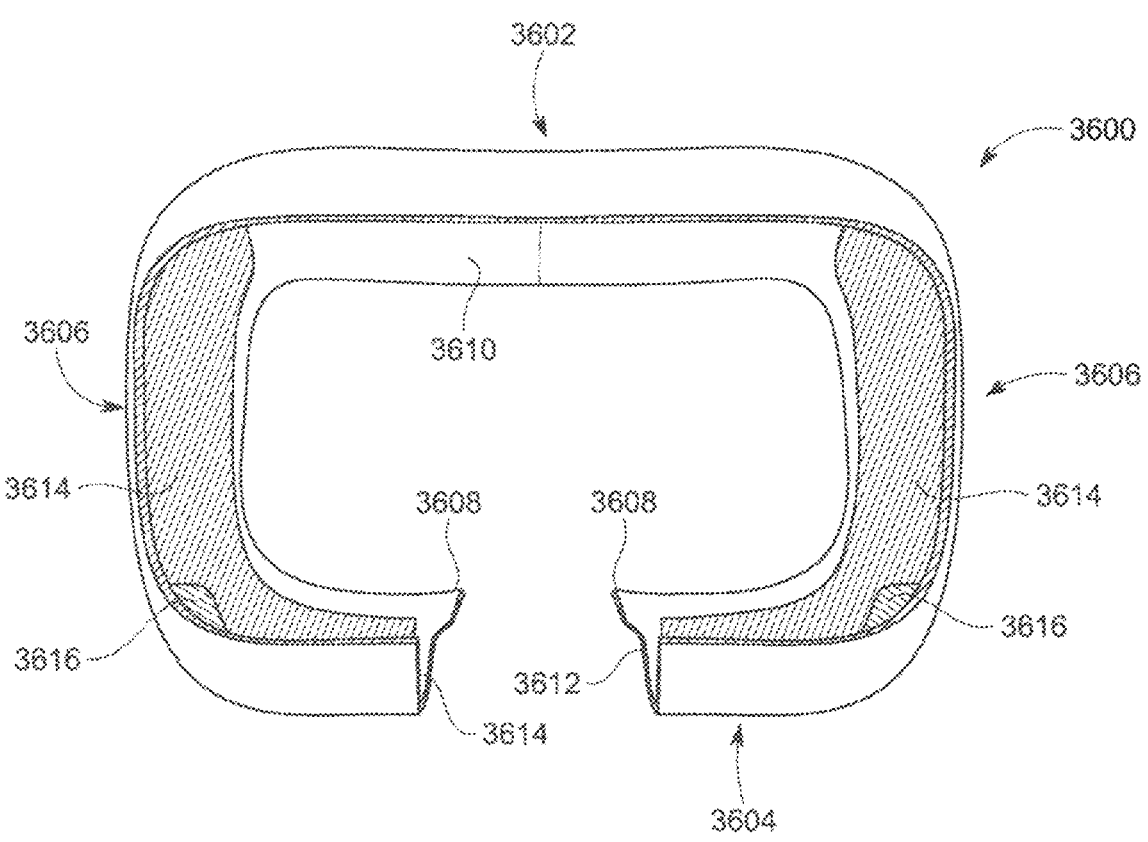
Figure 36B:
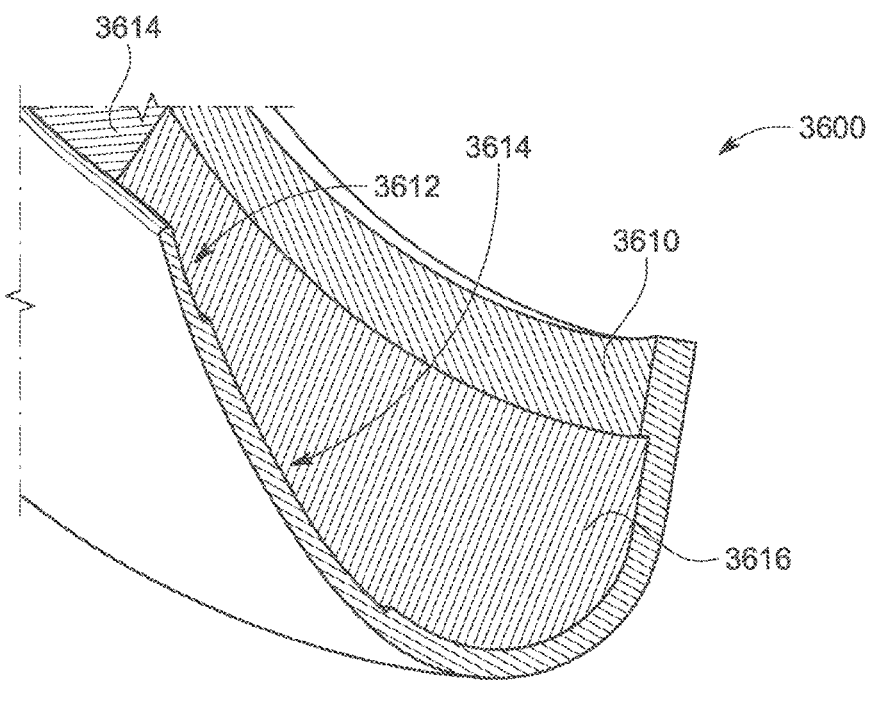
Figure 36C:
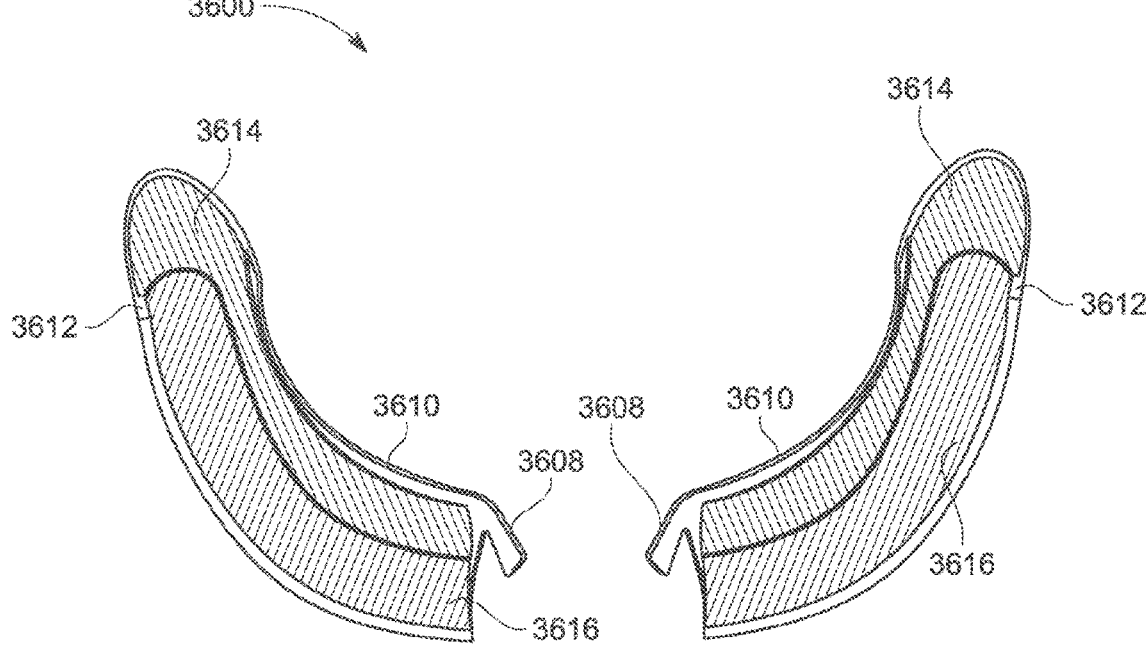
Figure 36D:
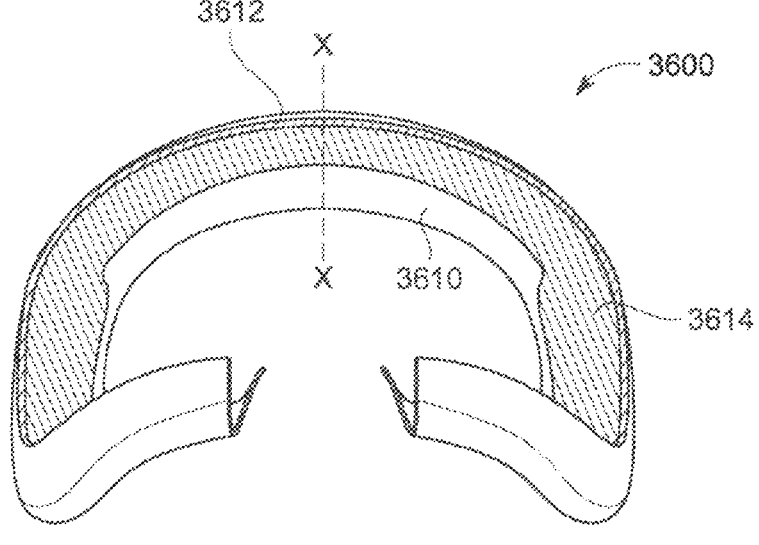
Figure 36E:
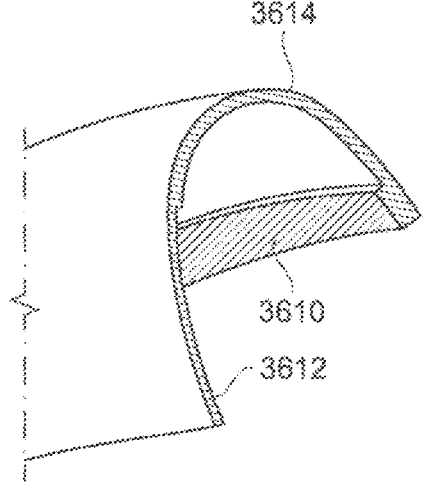

In another example, with reference to FIG. 35E, the face engaging portion 3504 comprises an overlapping portion 3516 secured to the rigid support portion 3502. The cushion cover 3512 may overlay the foam cushion 3510 and the 3506 support flange. In an example, the edge of the cushion cover 3512 may sit proximal to the rigid support portion 3502. In alternative examples, the cushion cover 3512 may be connected to the rigid support portion 3502.

In some forms of the present technology, an interfacing structure may be provided in which support structure and face engaging portions of the interfacing structure may be integrally formed as a single component comprising varying thicknesses so as to provide the desired levels of rigidity and/or cushioning effect at the face engaging surfaces.

For example, FIGS. 36A to 36E show an integrally formed interfacing structure 3600 generally comprising a forehead portion 3602, two cheek portions 3604, and two side portions 3606 proximate the user's sphenoid regions in use and connecting the forehead portion 3602 to the respective cheek portions 3604. A tab 3608 extends from a free end of each cheek portion 3604. The interfacing structure 3600 comprises a plurality of regions of varying thickness. A first region 3610 extends around the inner periphery of the interfacing structure 3600—i.e. the edge of the interfacing structure 3600 closest to the user's face. A second region 3612 extends around the outer periphery of the interfacing structure 3600. A third region 3614 extends around the inner periphery of the interfacing structure 3600, positioned between the first region 3610 and the second region 3612. Fourth regions 3616 are provided in each cheek portion 3604, bounded by the first region 3610 and the third region 3614. In this example, the first region 3610 has a greater thickness (for example about 2 mm) than the fourth regions 3616 (for example about 1.5 mm). The fourth regions 3616 have a greater thickness than the third region 3614 (for example about 1 mm). The third region 3614 has a greater thickness than the second region (for example about 0.7 mm).

In the example shown in FIGS. 36A to 36E, the width of the first region 3610 is wider through the forehead portion 3602 than at the cheek portions 3604, or side portions 3606. Further, the width of the second region 3612 is greater through the forehead portion 3602 than at the cheek portions 3604.

In some forms of the present technology, an interfacing structure may be provided in which the face engaging portion of the interfacing structure is configured to be biased towards engagement with a user's face, in use. In embodiments, only selected regions of the face engaging portion may be biased towards engagement with a user's face. In embodiments, the interfacing structure may be shaped such that, when unloaded, regions of the face engaging portion extend towards the user at an angle non-parallel to the surface of the user's face with which the face engaging portion is intended to engage. With reference to FIG. 37A, the interfacing structure 3700 comprises a support flange 3702, supporting an integral face engaging flange 3704 engaging the user's face 3706 in use. At least a portion of the cross-section of the interfacing structure 3700 may be shaped to be "pre-loaded"—i.e. biased towards the user's face when brought into engagement. For example, a resting position (indicated by dashed line 3708) of the face engaging flange 3704 may be such that the face engaging flange 3704 is non-parallel with the user's face (indicated by dashed line 3710), angled towards the user. This may assist with encouraging engagement with the user's face, and friction between the interfacing structure 3700 and the user.

In embodiments it may be desirable to provide such "pre-loading" in select regions. Referring to FIG. 37B, a first region 3712 of the user's face may typically be recessed. Such recessed areas may be prone to permitting light to enter through gaps between the user's face and the interfacing structure 3700. As such, a corresponding first interface region 3714 of the interfacing structure 3700 may be shaped to bias the face engaging flange 3704 towards engagement with the user's face in the first region 3712. Conversely, a second region 3716 of the user's face may typically protrude and be prone to discomfort cause by pressure from the interfacing structure 3700. A corresponding second interface region 3718 of the interfacing structure 3700 may be shaped to avoid biasing the face engaging flange 3704 towards engagement with the user's face in the first region 3712, or at least to a reduced extent in comparison with the first interface region 3714.

4.2.5 Airflow Through Interfacing Structure

In some forms of the present technology, an interfacing structure may comprise a chassis configured to permit airflow into the space between the interfacing structure and the user. In an example, with reference to FIG. 38A, the interfacing structure 3800 may comprise a chassis 3802 comprising a main chassis portion 3804 configured to extend laterally across the user's face in use, and side chassis portions 3806 configured to extend a generally posterior direction. The chassis 3802 comprises an opening 3808 between the main chassis portion 3804 and each side chassis portion 3806. A face engaging portion 3810 is provided to the chassis 3802.

Referring to FIG. 38B, a display unit 3820 having a display unit housing 3822 is shown being worn by the user. Air may flow through the opening 3808 and between the display unit housing 3822 and face engaging portion 3810.

In examples, reinforcing may be provided between the main chassis portion 3804 and each side chassis portion 3806. For example, as shown in FIG. 38C, the chassis 3802 may comprise one or more reinforcing members span between the main chassis portion 3804 and side chassis portion 3806.

FIGS. 38D and 38E show another example of a display unit 3820 having an interfacing structure 3800 comprising a chassis 3802 configured to permit airflow into the space between the interfacing structure 3800 and the user. In this example, the chassis 3802 is configured to be secured to a mounting plate 3824 of the display unit 3820, the mounting plate 3284 having a generally flat configuration and extending laterally across the user's face in use. Side chassis portions 3806 extend in a generally posterior direction from the mounting plate 3824, towards the sides of the user's head.

A face engaging portion 3810 is provided to the chassis 3802. In an example, the face engaging portion 3810 may be a singular structure, such as described with reference to FIGS. 36A to 36E, constructed from a flexible and resilient material such as an elastomer, while the chassis may be constructed of a more rigid material.

In examples, the face engaging portion 3810 may be integral with the chassis 3802 to provide a singular component. The singular component comprising the face engaging portion 3810 and the chassis 3802 may be releasably fastened to the display unit 3820, such as to the mounting plate 3284. For example, a releasable fastening arrangement may be provided comprising one or more of: hook-and-loop fastening means, magnetic fastening means, and clips or retainers that allow a friction, interference, snap or other mechanical fixing arrangement.

The chassis 3802 comprises a lateral opening 3808 in each side chassis portion 3806. One or more gaps between the housing of the display unit 3820 and the interfacing structure 3800 permit air to flow through the lateral openings 3808 to and from the external environment (as indicated by the dashed arrows in FIG. 38D and FIG. 38E).

In examples, one or more superior openings may be provided in the chassis 3802, permitting airflow between the external environment and the space within the interfacing structure 3800. In examples, one or more inferior openings may be provided in the chassis 3802, permitting airflow between the external environment and the space within the interfacing structure 3800. In examples, the chassis 3802 may comprise one or more of: a lateral opening 3808, a superior opening, and an inferior opening.

4.2.6 Inwardly Biased Interfacing Structure

FIG. 39A shows an interfacing structure 3800 according to another example of the present technology. Similarly to the interfacing structure 3800 described above with reference to FIGS. 38A-38C, the interfacing structure 3800 comprises a chassis comprising a main chassis portion 3804 configured to extend laterally across the user's face in use, and side chassis portions 3806 configured to extend in a generally posterior direction. Each side chassis portion 3806 extends in a generally posterior direction from a respective lateral side of the main chassis portion 3804. The interfacing structure 3800 further comprises a face engaging portion 3810 connected about at a periphery of the chassis 3804, the face engaging portion 3810 configured to contact the user's face in use.

In this example, each of the side chassis portions 3806 is biased medially towards the user's head to bias the face engaging portion 3810 into contact with the user's head on each side of the user's head at or proximate the user's sphenoid bone. That is, the side chassis portions 3806 are biased inwards to cause the face engaging portion 3810 to engage lateral-facing surfaces of the user's head lateral to eyes (e.g. at or proximate the user's sphenoid bone).

The chassis 3802 may be flexible (e.g. as a whole or having particular flexible portions) allowing the side chassis portions 3806 to be spread laterally to a splayed configuration by the user's head and biased medially towards an unsplayed configuration in use. The side chassis portions 3806 may be flexible so as to flex or pivot with respect to the main chassis portion 3804 allowing the side chassis portions 3806 to be spread laterally to a splayed configuration by the user's head and biased medially towards an unsplayed configuration in use.

In some examples, the side chassis portions 3806 are able to flex or pivot with respect to the main chassis portion 3804 allowing the side chassis portions 3806 to be spread laterally to a splayed configuration by the user's head and biased medially towards an unsplayed configuration in use, each side chassis portion 3806 biased medially by a biasing component.

The biasing component may comprise a spring element configured to pull each side chassis portion 3806 medially. In other examples, the biasing component comprises a spring element configured to push each side chassis portion 3806 medially.

The face engaging portion 3810 may have one of the configurations described herein in relation to a portion of an interfacing structure which engages the user's face. The face engaging portion 3810 may comprise a face engaging flange. The face engaging flange may curve inwardly from the chassis 3804. The face engaging flange is formed from silicone.

In some examples, the chassis 3802 comprises at least one opening 3808 between the main chassis portion 3804 and each side chassis portion 3806. In some examples the head-mounted display unit 1200 comprises a display unit housing, and an air pathway is provided between the interfacing structure 3800 and the display unit housing through the at least one opening 3808.

4.2.7 Positioning and Stabilising Structure that Connects to Interfacing Structure In some examples of the present technology, a head-mounted display system 1000 comprises a positioning and stabilising structure 1300 (e.g. one or more straps) that connects to an interfacing structure 3800 of the head-mounted display unit 1200 of the head-mounted display system 1000 (e.g. straps connect to the interfacing structure 3800 instead of a display unit housing 1205).

FIGS. 39B-39C show a positioning and stabilising structure 1300 for a head-mounted display system 1000 connected to an interfacing structure configured to contact the user's face in use. The positioning and stabilising structure 1300 in this example comprises a posterior support portion 1350 configured to engage a posterior portion of a user's head and a pair of strap portions 1332, 1334 connected to the posterior support portion 1350 and configured to connect to the interfacing structure 3800 of a head-mounted display unit. FIG. 39D shows an example in which lateral strap portions 1330 connect to an interfacing structure 3800.

4.2.8 Positioning and Stabilising Structure that Pulls Sides Inwards

FIGS. 39B-39C show head-mounted display systems 1000 (with most components of the head-mounted display unit 1200 not shown save for the interfacing structure 3800) according to examples of the present technology. In each example the interfacing structure 3800 comprises a chassis 3802 comprising a main chassis portion 3804 configured to extend laterally across the user's face in use, and a pair of side chassis portions 3806 each configured to extend in a generally posterior direction from a respective lateral side of the main chassis portion 3804. A face engaging portion 3810 is connected about a periphery of the chassis 3802, the face engaging structure 3810 configured to contact the user's face in use.

The head-mounted display systems 1000 each further comprise a positioning and stabilising structure 1300 comprising a posterior support portion 1350 configured to engage a posterior portion of a user's head, and a pair of lateral strap portions configured to connect the posterior support portion 1350 and the head-mounted display unit 1200 in use. In the example shown in FIGS. 39B and 39C, the pair of lateral strap portions comprises a pair of upper lateral strap portions 1332 and a pair of lower lateral strap portions 1334. In the example shown in FIG. 39D, the pair of lateral strap portions comprises a lateral strap portion 1330 on each side of the user's head.

In each example, the positioning and stabilising structure 1300 is connected to the head-mounted display unit 1200 such that in use the side chassis portions 3806 are urged medially towards the user's head by the lateral strap portions, to urge the face engaging portion 3810 into contact with the user's head on each side of the user's head at or proximate the user's sphenoid bone.

As illustrated, each lateral strap portion may be configured to connect to a respective one of the side chassis portions 3806. Each lateral strap portion may be configured to pull the respective side chassis portion 3806 rearwardly causing the side chassis portion 3806 to flex or pivot medially to urge the face engaging portion 3810 into contact with the user's head at or proximate the user's sphenoid bone.

In other examples, each lateral strap portion may be configured to push the respective side chassis portion 3806 medially causing the side chassis portion 3806 to flex or pivot medially to urge the face engaging portion 3810 into contact with the user's head at or proximate the user's sphenoid bone. For example, each lateral strap portion may be configured to push the respective side chassis portion 3806 medially via a substantially rigid member (e.g. an arm) or a portion of the side chassis portion 3806 in contact with the lateral strap portion.

As shown in FIG. 39D, the posterior support portion 1350 may comprise a parietal strap portion 1310 configured to overlie the parietal bones of the user's head in use and an occipital strap portion 1320 configured to overlie or lie below an occipital bone of the user's head in use. In some examples, the posterior support portion 1350 comprises a loop strap portion having a superior portion overlying the parietal bones of the user's head and an inferior portion overlying the occipital bone of the user's head.

As shown in FIGS. 39B and 39C, as described above, the pair of lateral strap portions comprises a pair of upper lateral strap portions 1332 each configured to connect between the posterior support portion 1350 and the head-mounted display unit 1200 (only the interfacing structure 3800 thereof visible) on a respective side of the user's head in use and a pair of lower lateral strap portions 1334 each configured to connect between the posterior support portion 1350 and the head-mounted display unit 1200 (only the interfacing structure 3800 thereof visible) on a respective side of the user's head in use. In this example, the upper lateral strap portions 1332 are each configured to apply a force to the head-mounted display unit 1200 having both a superior and posterior component. In some examples, the lower lateral strap portions 1334 are each configured to be removably connected to a respective side chassis portion 3806 with a magnetic connection.

4.2.9 Interfacing Structure Comprising Two or More Components

In some forms of the present technology, an interfacing structure may comprise a chassis, wherein one or more of a support portion and/or a face engaging portion of the interfacing structure, or portions thereof, may be releasably attached to the chassis.

It is envisaged that the ability to releasably attach the support portion and/or face engaging portion may assist with one or more of: cleaning of the interfacing structure, replacement of components thereof, and/or selection of characteristics of the components (for example, level of hardness or softness, surface finish or material, shape, and/or size).

In an example, the releasably attached portion of the interfacing structure may be provided at discrete locations to the chassis, i.e. may not extend along the entire periphery of the chassis. For example, the releasably attached portion(s) may be provided in one or more of: a forehead region, and/or one or more cheek regions, of the interfacing structure. In alternative examples the releasably attached portion of the interfacing structure may be provided to the entire periphery of the chassis, or at least a substantial portion thereof.

In examples, a releasably attached portion of the interfacing structure may be made of one or more of: a foam material, an elastomeric material, a textile material, or a composite material.

In an example, the interfacing structure may comprise at least one elastomeric portion, and at least one foam portion. In an example, the at least one foam portion may be attached to the interfacing structure such that the elastomeric portion covers the foam portion to provide a face engaging surface. In an example, the at least one foam portion may be attached to the chassis, the elastomeric portion, or both the chassis and the elastomeric portion.

In examples, a portion of the support portion and/or face engaging portion of the interfacing structure may be permanently attached to the chassis (e.g. integrally moulded) at select locations. Spaces may be provided in which the removeable portions may be positioned and attached relative to the chassis.

4.2.10 Interfacing Structure Comprising Foam Components

In some forms of the present technology, an interfacing structure may comprise a face engaging portion supported by a more rigid support portion, wherein the face engaging portion comprises a first foam portion and the support portion comprises a second foam portion.

For example, with reference to FIG. 65A, the interfacing structure 6500 may comprise a support portion 6502, made of a first foam, to which a face engaging portion 6504 may be provided—the face engaging portion 6504 being made of a second foam. The first foam may be configured to provide greater rigidity than the second foam, with the support portion 6502 acting to maintain the position of the softer face engaging portion 6504, which provides a comfortable point of contact to the user.

In examples, the first foam and the second foam may be made of the same material, but at different densities. In examples the first foam may have a first density, and the second foam may have a second density lower than the first density. In examples, the foam may be a viscoelastic foam or polyurethane foam.

In examples the face engaging portion 6504 may comprise a raw foam. In examples, e.g. as illustrated by FIG. 65B the face engaging portion 6504 may comprise a textile-foam composite (e.g. a foam core with a textile outer layer 6506), or a flocked foam, to provide a soft point of contact for the user's skin.

In examples, as shown in FIG. 65D, the support portion 6502 may include a first support portion 6510 extending in a first direction, and a second support portion 6512 extending from the first support portion 6510 in a second direction. For example, the first support portion 6510 may extend in a generally radial direction across the face of the user, while the second support portion 6512 may extend in a generally posterior direction towards the face of the user.

In some forms of the present technology, an interfacing structure may comprise a support portion and a face engaging portion integrally formed as a single component, the support portion and the face engaging portion being made of a foam material.

For example, with reference to FIG. 66A, the interfacing structure 6600 may comprise a support portion 6602 from which a curved face engaging portion 6604 extends. In the example illustrated, a recurve transition between the support portion 6602 and the face engaging portion 6604 produces a generally hook shaped cross-section.

In examples, the integral form of the support portion 6602 and the face engaging portion 6604 may be thermoformed.

In examples the interfacing structure 6600 may comprise a raw foam. In alternative examples, e.g. as illustrated by FIG. 66B the interfacing structure 6600 may comprise a textile-foam composite (e.g. a foam core with a textile outer layer 6606), or a flocked foam, to provide a soft point of contact for the user's skin.

4.3 Control Systems

Referring to FIG. 67, the head-mounted display system 1000 may include a control system 6290 that assists in controlling the computer-generated output received by the user 100. In other words, the control system can control visual output from the display screen 6220, which the user can observe.

The head-mounted display system of the present technology can comprise various configurations (e.g. types) and arrangements of control systems. One example of the control system includes sensors 6284 that monitor different parameters or values of the user's physical condition during use of the head-mounted display system. The control system is configured to monitor the physical conditions to detect changes in those physical conditions associated with digital eye strain (DES), i.e. asthenopia, attributed to prolonged use of the head-mounted display. In some instances, the control system may also detect pre-existing physical conditions, e.g. uncorrected vision problems that can contribute to DES. In some forms the control system may monitor the time the display system is in use, or the time a user has used the display system rather than detecting specific physical conditions attributed to DES of the user.

The sensors of the control system in some forms are configured to communicate measured parameters of the user's physical conditions, other conditions, or time to a processor/processing system, e.g. a microprocessor. The physical conditions, i.e. parameters associated with DES generally relate to eye activity but, in some cases, can extend to e.g. a user's posture.

The physical conditions can be broadly grouped into subjective symptoms and objective symptoms. The subjective symptoms may include blurred or double vision, eye discomfort, eye fatigue, eye itching, eye tearing and headaches. These symptoms can be felt by the user but can be difficult to directly measure with sensors. The objective symptoms may include a user's blink-rate, blink completeness and pupillary characteristics, e.g. reaction to light, eye movement, and posture. In most cases, these symptoms are not felt or observed by the user but can be measured with sensors.

In an example of the control system, the sensors are configured to measure objective symptoms, i.e. parameters, of DES and communicate these measurements to the processor. Based on these measured values, the processor is configured to effect change on the output in response to the measured values. In the present example, the processor can communicate with the display screen 6220 in order to change the image being output. The change of output image may be to alert the user of DES from prolonged use of the head-mounted display, or alternatively, initiate preventative actions to prevent, or alleviate, DES in the user. In this way, the output of the display received by the user can be either passive or active in nature in response to the sensors measuring objective symptoms that indicate the user is experiencing DES.

For example, when DES is detected (based on a measured value), the processor effects a change on the output via the control system which may produce a responsive passive output whereby the brightness, contrast, etc of the display screen 6220 is automatically changed to reduce strain on the user's eyes. In another example, the processor can be configured to automatically change (e.g. enlarge) the size of text generated on the display screen in response to a measured parameter of the user.

Alternatively, or additionally, the control system may produce an active output whereby the output of the display screen changes to prompt the user to e.g. 'take a break' from using the head-mounted display.

As set forth in further detail hereafter, the types of prompts (i.e. content of messages) displayed to the user (for active outputs) can change according to the types, magnitudes and combinations of objective symptoms detected by the sensors. Similarly, the passive outputs can change according to the types, magnitudes and combinations of objective symptoms detected by the sensors.

In addition to the control system 6290 controlling the visual output from the display unit 6012 in response to detected symptoms of DES, the control system can also control an audible output from the speakers 6272. It is envisaged that the audible output can take the form of e.g. a beeping sound or audible warning, so as to discreetly warn/alert the user of e.g. prolonged use, upcoming warnings, etc.

As set forth in more detail later, the types of output received by the user can change according to the types of sensors used and the parameters measured by those sensors. One or more sensors can be provided to measure the different objective symptoms of the user.

4.4 Sensors

Various types of sensors may be provided to measure specific physical conditions of the user. The sensors may measure time in use and may comprise a simple timer or a timer associated with a particular type of display. Alternatively the sensors may measure a specific condition of the user.

As set forth above, the physical conditions can be divided into subjective and objective symptoms, whereby the sensors subject to the control system are configured to measure the objective symptoms. The sensor may be configured to measure these symptoms, i.e. blink-rate, blink completeness and pupillary characteristics, e.g. reaction to light, eye movement, and posture. Other examples of parameters that can indicate DES include, critical flicker-fusion frequency (CFF) and accommodative function, each of which may also be measured. For each of these symptoms, specific sensors and associated processing systems are provided in the control system.

Referring to FIG. 68, the sensors 6284 can be located at various regions of the head-mounted display according to the type of sensor being used. In the form shown in FIG. 68, representative locations of the sensors 6284 are illustrated in dotted-lines. It should be known that the location, orientation and number (i.e. one or more) of the sensors can vary from the example illustrated in FIG. 68.

In some forms, the user interface structure 6513 at the user's forehead can be configured to comprise one or more sensors 6284. Additionally, or alternatively, sensors can be mounted within the positioning and stabilising structure

6300. That is, the sensors can be mounted on the forehead support connector 6024, temporal connector 6018 and/or the rear support hoop 6016.

The arrangement of sensors can be configured such that each sensor operates independently, i.e. separately of another sensor, or are integrated together with other sensors. For example, measurements made by sensors located at the user interface structure 6513 can be integrated with measurements taken by sensors in the forehead support connector 6024 (of the positioning and stabilising structure). In this way, a complex and diverse range of inputs, e.g. temperature, head position, eye movement, etc can be measured, combined and processed to determine an appropriate output for reducing the DES experienced by the user.

The sensors of the head-mounted display unit 6012 and positioning and stabilising structure 6300 can be electrically connected to the control system via wires mounted within each of the respective components.

It is envisioned that one or more sensors, when used alone or in combination with each other, can measure one or more of blink-rate, blink completeness, pupillary characteristics, eye movement, posture, critical flicker-fusion frequency (CFF) and accommodative function. Set forth below are examples of sensors that can be used with the control system to measure some of these parameters.

In a first example of the head-mounted display, the control system may be configured with sensors to measure parameters such as the user's posture, i.e. head orientation with respect to their spine/back. A user's posture can contribute to the perception of eye strain when e.g. the user's head position is not correctly orientated with respect to the spine. A sensor, such as an orientation sensor, can be provided to measure (and monitor) how the user's head is orientated during use of the head-mounted display.

The measurement of orientation can include magnitude of angle and duration for which that angle is held. For example, the sensor can be configured to detect and measure tilt in the user's head/neck e.g. in excess of +/−5 to 10 degrees of an axis generally parallel to the user's spinal cord. The orientation sensor may also be provided with a timer to measure the duration which the user's head is held at angles to their spine. The combined measure of both angle (magnitude) and duration can provide an indication of fatigue in the user's neck muscles, that may correlate with perceived DES of the user.

When detecting excessive or prolonged angling of the user's head (with respect to their spine), the control system may be configured to effect change on the output e.g. generate a warning message on the display screen 6220. In some forms, the message may instruct the user to remove the head-mounted display to 'take a break' so as to alleviate the stress on the neck muscles and prevent further development of DES. Alternatively, the warning message may include a live measure (i.e. display) of the user's neck position, in addition to measurements recorded over time to visually represent the user's fatigue status. In this way, the display can informatively prompt the user to adjust their posture as they use the head-mounted display, so as to prevent further development of muscle fatigue that can lead to perceived DES.

In alternative forms, the orientation sensor can be configured to sense the orientation of the user's body. For example, the sensor may sense when the user rotates their body as a whole, and/or their head individually about the axis generally aligned with their spine. In other words, the orientation sensor may measure a rotational position of the user's body (rather than a tilt position of the user's head). By sensing the rotation, the control system can be configured to alert the user when their body rotates, i.e. pivots excessively relative to the head. Advantageously, this can provide a detailed analysis, i.e. monitoring, of how the user's body moves so as to be correlated with muscular strain that may contribute to perceived DES.

In some examples, an external orientation sensor may be configured as an external position sensor, positioned in the physical environment where the user is wearing the head-mounted display system 1000. The external position sensor may track the user's movements similar to the orientation sensor described above. Advantageously, external position sensor can measure the user's whole body, to monitor its movement. This information/measure can be utilised by the control system to identify particular movements or behaviours that could contribute to DES in the user.

In other forms of the external position sensor, at least one camera can be provided on the head-mounted display unit 6012 to view the physical environment of the user to determine their orientation with respect to a surrounding environment.

The control system may also be configured with sensors to measure one or more properties of air, e.g. temperature, humidity, etc, in the space surrounding the user's eyes, i.e. within the display housing. For example, monitoring the humidity of the air in this region may assist in the prevention of dry eye in the user, which can be a cause of DES. That is, by maintaining a suitable humidity in the air surrounding the eyes, the symptoms of DES experienced by the user (due to dry eye) may be minimised.

The properties of temperature and humidity can be measured by e.g. a temperature sensor (e.g. a thermistor) and a humidity sensor (e.g. a capacitive humidity sensor), respectively.

In some forms, the humidity sensor(s) can be arranged in the head-mounted display unit 6012 and oriented to measure humidity in the air proximal to the user's eyes. The measurement of humidity is particularly relevant for VR systems, whereby light, and in turn, the free movement of air is generally restricted from entering the head-mounted display unit. While ventilation is generally provided in the head-mounted display unit of VR systems, the rate at which air moves into, and out from (i.e. circulating within) the display unit can vary during use.

For example, as ventilation systems, e.g. fans, ducts, are activated to cool electronics in the head-mounted display unit, the humidity of the air surrounding the eyes may change according to the movement of air. In this way, humidity sensors can be utilised to monitor the humidity around the user's eyes and, together with the control system, alert a user when the humidity level is reduced (for a prolonged period of time) such that DES may occur.

Similarly, a temperature sensor may be provided to sense overheating of the air inside the head-mounted display unit so as alert the user to changes that, over time, may contribute to DES. Alternatively, the temperature sensor may be configured to measure the temperature of the user, so as to detect when the user may be 'overheating'.

In this form, the temperature sensor may be positioned proximal to the user's skin to sense the temperature of the user. For example, the sensor may be located in the interface 6513 or in the positioning and stabilising structure 6300. The control system may be configured to monitor for measurements of 'high' temperature, whereby the user is alerted, and then prompted, to e.g. remove the head-mounted display system to allow their eyes to recover from the parameter which may lead to, or be causing, DES.

The control system can be configured to effect a change to the output for example by implementing both active and passive outputs when the sensors measure adverse conditions of humidity and temperature proximal to the user's eyes. For example, and as mentioned above, upon detecting adverse conditions of either temperature or humidity (or both), the user can be alerted by warning messages generated on the display screen 6220. These messages can e.g. alert the user to the e.g. excess humidity or temperature, and prompt the user to remove the head-mounted display to 'take a break'.

Alternatively, the control system can be configured to trigger/activate fans mounted adjacent to the display unit for generating airflow into the display to circulate fresh air (i.e. to flush existing air from) inside the head-mounted display unit around the user's eyes. Advantageously, this may reduce physiological strain on the user which may contribute to DES.

In other alternative forms, the temperature and humidity sensors can be utilised to trigger/activate (via the control system) the opening and closing of ventilation apertures in the head-mounted display unit. Advantageously, this can assist in the regulation of humidity within head-mounted display unit. That is, if the humidity is too low, the ventilation apertures can be closed to allow humid air to accumulate, and conversely, the ventilation apertures can be opened if the humidity is too high.

In some forms, the ventilation apertures can be opened and closed together with the respective activation/deactivation of the cooling fans so as to optimise the regulation of temperature and humidity in the head-mounted display unit.

In some forms of the present technology, the control system 6290 may include an eye sensor that can track movement of the user's eyes. For example, the eye sensor may be able to measure an orientation of at least one of the user's eyes and determine which direction at least one of the user's eyes are looking. In some forms, the control system 6290 may include two eye sensors, where each sensor may correspond to one of the user's eyes.

The eye sensors can be located proximate to the user's eyes and measure the orientation, i.e. an angular position of the user's eyes. This can determine which direction at least one of the user's eyes are looking and additionally, measure/monitor the range of eye movement, i.e. the angle through which the eyes move from left to right during e.g. 'gameplay'. The frequency of the eye(s) movement (e.g. though the angles) can also be measured. Advantageously, the measurements of range and frequency of movement can be utilised together with the control system to indicate development of DES in the user.

Movement (i.e. turning) of the user's eyes to the far left or far right (i.e. extremes of eye rotation) can apply strain to the muscles controlling the movement of the eyes. Additionally, the more frequently the eyes move within their sockets over a period of time, the more likely it is that the muscles controlling the eye movement can fatigue. Therefore, by monitoring the range and frequency of movement in the user's eyes, the control system can alert the user when the muscles of the eye are beginning to strain and/or fatigue with prolonged use of the head-mounted display.

As set forth previously, the control system may generate warning messages on the display screen 6220 to alert the user of the potential DES (due to eye movement), and advise remedial action, e.g. to remove the head-mounted display system and 'take a break'.

In other forms of the head-mounted display, different types of eye sensors can be implemented. For example, the control system my utilise blink-counters to measures the frequency of blinking in the user as a method of detecting DES.

The frequency of a user's blinking can be correlated with the instigation of a cycle of secretion, dispersal, evaporation and drainage of tears. In this way, when the sensors measure e.g. a low blink-count (i.e. number of blinks) for a duration of use (e.g. 'gameplay'), it may be an indication of DES. In other words, the low blink-count can indicate that the user's ocular surface is poorly maintained. In this case, the control system can be configured to alert the user to the increased risk of DES and prompt temporary removal of the head-mounted display.

In further forms, the eye sensor and control system can be configured to detect 'completion of blink'. In this form, the control system may be configured to detect incomplete blinking, whereby the upper eyelid does not cover the entire corneal surface as the user blinks, i.e. the upper eyelid does not meet the lower eyelid during a blink cycle. Incomplete blinking may lead DES as a result of increased evaporation of tear film and a resulting breakdown in the tear film.

Measuring and alerting the user of incomplete blinking can allow for corrective action. This may take the form of an alert to the user, identifying the detection of incomplete blinking, and recommending the user seek medical assistance (as set forth in more detail later). In other forms, the display screen may generate a prompt for the user to engage in eye-exercises, such as blink-training, that may reduce the development of DES.

In some forms, together or separately to the display of an alert message, the display may also provide the user with blink training. In this form, an interactive display is generated to guide the user through blinking exercises. Advantageously, this can assist the user to e.g. perform complete blinking cycles. In some forms, an image may be displayed to the user which depicts a 'normal' complete blink, alongside a live display of the user's eye(s).

In a similar way, a user may be alerted when their rate of blinking is e.g. too low, or too high, with respect to a 'normal' blink rate measure. Guided eye-exercises may be provided to the user to assist with e.g. slowing their blink rate, so as to maintain their tear film stability.

Similar to blink-completeness, by instructing the user to blink at more regular intervals, or to match a 'normal' blink rate measure, the user can instigate the cycle of secretion, dispersal, evaporation and drainage of tears to minimise the development DES.

In some forms of the present technology, the head-mounted display unit may include an image sensor for capturing image data of a user. The captured image data may contain one or more facial features of the user that can be compared with a predetermined reference feature having a known dimension. The predetermined reference feature may be generated from an image capture of the user when first wearing the head-mounted display, e.g. at initial setup of the head-mounted display system.

The control system of the head-mounted display can be configured to capture a series of images during use, e.g. during 'gameplay', and process pixel data of the images to compare with the predetermined reference feature so as to measure changes in an aspect of the one or more facial features.

Comparison of the aspects of facial features can be used to determine DES in the user. For example, deformations, e.g. 'drooping', of facial features (e.g. 'bags' under a user's lower eyelids) may be detected and provide an indication of prolonged use that may lead to DES. In other examples, the control system and sensors may be configured to measure and detect squinting of the eyes or detect colour changes, e.g. 'redness' around the user's eyes. In further examples again, the user's pupil characteristics may be measured and monitored to detect changes that may indicate DES in the user.

The user's pupil characteristics may include pupil diameter and amplitude of pupillary reflexes. Measurements of pupil diameter may be useful to determine whether the user is experiencing visual fatigue. In this case, increases in the diameter of pupils over a period of time can indicate visual fatigue. Measurements of pupillary reflexes, i.e. rate of pupillary reflex in response to light, may also be used to determine visual fatigue.

The control system and sensors can be configured to alert the user when measurements of e.g. pupil diameter, reflex, etc, are outside 'normal' standards, and require remedial action to prevent or reduce the development of DES resulting from these symptoms.

In some alternative forms of the head-mounted display, the sensors and control systems may be configured to measure critical flicker-fusion frequency (CFF) as an indicator of DES. In this form, the sensors may be configured to measure CFF by detecting the frequency at which a flickering light is registered by the user as being indistinguishable from a steady, non-flickering light.

Measurements of CFF can be conducted at predetermined intervals, e.g. after one hour of constant use, or alternatively, the tests may be strategically conducted when other control systems e.g. for blink-rate, prompt the user to 'take a break'.

In some forms of the head-mounted display, the sensors and control systems may be configured to detect accommodative function of the user's eyes as an indication of DES. In this form, the sensors can be configured together with the display to measure the ability of the user's eye(s) to change focus from distant to near objects. As for CFF measurement, accommodation can be conducted at predetermined intervals, e.g. after one hour of constant use, or alternatively, the tests may be strategically conducted when other control systems e.g. for blink-rate, prompt the user to 'take a break'.

As described previously, when the sensors of the control system detect that the user may be experiencing DES, the output of the display can be active and/or passive in nature so as to alert the user of the potential for DES. Referring now to active outputs in particular, the types of prompts (i.e. messages) displayed to the user can change according to the types, magnitudes and combinations of objective symptoms detected by the sensors.

These prompts may be configured such that operation of the head-mounted display system by the user is prevented until the user performs, i.e. satisfies, predetermined conditions set by the instructions of the prompt. For example, the processor may pause 'game-play' of the user until certain exercises, e.g. eye-blink exercises, have been performed. When the user completes the required actions as instructed (so as to alleviate DES), the 'game-play' can be allowed to resume.

In addition to the examples of prompts (i.e. active outputs) already set forth, e.g. instructions to remove the head-mounted display, guiding blink-exercises, etc, other types of instructions may also be provided as set forth below.

In a first example, the user may be provided with a questionnaire to be completed either at predetermined intervals, or during periods where the user has been prompted to 'take a break'. Advantageously, the questions may be selected to target subjective symptoms, i.e. symptoms that cannot be measured objectively by e.g. sensors.

These questions may aim to determine the level of ocular discomfort experienced by the user. For example, a set of ten questions may be asked to the user, relating to e.g. if the user is experiencing of blurred or double vision, eye discomfort, eye fatigue (i.e. feeling tired), eye itching, eye tearing and/or experiencing headaches. According to the user's responses to these questions, the control system may determine whether the user is experiencing DES.

In some forms, the control system may be provided with a controller 6270 connected with the control system. The controller may be wireless, or in some forms the controller may have wire(s) electrically connecting each of the sensors to communicate signals to the control system. The controller 6270 can be engagable by the user in order to provide responses to the questionnaire, i.e. to interact with objects output to the user from the display. For example, the controller may have at least one button selectively engageable by a user, that when e.g. the questionnaire is overlaid on the display, asks a selection of questions. The user can depress/engage the button in response to the questions so as to communicate with the processor (i.e. by sending a signal to the processor).

In some forms, the user's eye(s) may act as a controller, and the user may move their eyes in order to interact with virtual objects. For example, a virtual cursor may follow the position of the user's eyes. The eye sensor may track and measure the movement of the user's eyes and communicate with a processing system 6286 in order to move the virtual cursor.

In some alternative forms, the questionnaire (or other type of output triggered/activated by the control system) can be audibly presented to the user via speakers 6272. For example, prompts to remove the head-mounted display may presented to the user as both a written message generated on the display screen 6220, or generated through speakers 6272 as an audible message read aloud to the user.

In some forms of the head-mounted display system, the control systems as set forth above can be configured to generate active outputs (i.e. prompts) when the control system detects multiple, or repeated objective (or subjective) symptoms of DES. For example, if the sensors of the control system measures repeated signals of e.g. incomplete blinking or repeated squinting, a prompt may be generated that instructs the user to seek medical assistance, e.g. to see an optometrist.

Advantageously, these prompts can alert the user to potentially underlying eye conditions, for example, 'dry-eye', or other uncorrected problems such as poor eyesight. Additionally, prompting a user to seek correction for vision problems e.g. by wearing prescription glasses or by administering lubricating eye-drops, may alleviate the user's predisposition to DES, such that future alerts/prompts are minimised.

It is anticipated that the control system may be configured to generate any of the active or passive outputs as set forth above, when any of the sensors set forth above (or combination thereof) detects symptoms of DES. It is anticipated that the control system may be configured to generate one or more than one of the active or passive outputs or to ask the user for approval of one or more than one of the active of passive outputs.

For example, if one or more sensors detect DES in a user by e.g. measurement of the user's pupil characteristics, the control system may be configured to change the output of the display by e.g. reducing brightness, and/or by generating prompts to instruct the user to 'take a break'. In this example, both active and passive outputs are generated. In some forms multiple outputs (e.g. change of brightness, ventilation, prompt via message, etc) can be initiated together (e.g. either simultaneously or in a sequence) in response to the detection of DES. These outputs may be any combination of passive and/or active.

In some further forms of the outputs generated upon detection of DES, the control system can be configured to change a focal length of the ocular lenses of the head-mounted display. By changing the focal length of the ocular lenses, the images displayed to the user can be e.g. blurred, during use, such that the focal point of the user's eyes changes so as to focus, i.e. re-focus, on the images. As the user's eyes change focus to adapt to the blurred images, muscles controlling the lenses of the user's eyes are urged to contract or relax. In other words, the muscles are prompted to 'exercise' as a result of the changing focal length of the ocular lenses. Advantageously, such 'exercise' of the user's eyes may assist in reducing DES in the user.

The focal length of ocular lenses may be changed by providing movable lens assemblies within the display unit housing. For example, the ocular lenses may be movable towards or away from the user's eye by a gearing arrangement that can be activated by e.g. a motor. The movable lens assembly can be connected with the control system 6290 such that upon detection of DES by the one or more sensors 6284, the focal length of ocular lenses can be automatically changed as one of the one or more (passive and/or active) outputs set forth above.

In some forms of the head-mounted display system, the control system may be configured without sensors for generating active outputs, i.e. prompts. In this form, the control system may generate the prompts based on timers. In other words, after a predetermined period of constant use of the head-mounted display system, the control system generates prompts for the user.

As set forth previously, these prompts may simply instruct the user to remove the head-mounted display system. In other examples, a prompt may be issued every 20 minutes requesting the user to remove the head-mounted display system and look at (i.e. focus on) a distant object (e.g. at least 5 meters away) for e.g. 20 seconds. In other examples, the user may be prompted at regular intervals, (e.g. hourly) to drink fluids and partake in blink exercises (as set forth previously). In any case, the prompts are directed to reducing the development of DES in the user.

In some other forms, rather than manually removing head-mounted display, the control system may be configured to automatically change the focal length of the ocular lenses, as set forth above. Such changes in the focal length be triggered when e.g. a timer is activated, so as to simulate the effect of the user removing the head-mounted display to look at/focus on distant objects. This may reduce the frequency at which the user removes the head-mounted display to reduce the development of DES.

Advantageously, this can prevent interruptions to use of the head-mounted display in situations where removal of the head-mounted display may not be desirable. For example, surgeons using the head-mounted display to perform remote surgical procedures may not be required to remove the head-mounted display during use to prevent development of DES. Yv In some forms, the control system may be configured to change the output of the display for example by reducing brightness, contrast, clarity or size of a display to assist in ameliorating DES or discouraging continued use.

4.5 Glossary

For the purposes of the present technology disclosure, in certain forms of the present technology, one or more of the following definitions may apply. In other forms of the present technology, alternative definitions may apply.

4.5.1 General

Leak: The word leak will be taken to be an unintended exposure to light. In one example, leak may occur as the result of an incomplete seal between a display unit and a users' face.

4.5.2 Materials

Closed-cell foam: Foam comprising cells that are completely encapsulated, i.e. closed cells.

Elastane: A polymer made from polyurethane.

Elastomer: A polymer that displays elastic properties. For example, silicone elastomer.

Ethylene-vinyl acetate (EVA): A copolymer of ethylene and vinyl acetate.

Foam: Any material, for example polyurethane, having gas bubbles introduced during manufacture to produce a lightweight cellular form.

Neoprene: A synthetic rubber that is produced by polymerization of chloroprene. Neoprene is used in trade products: Breath-O-Prene.

Nylon: A synthetic polyamide that has elastic properties and can be used, for example, to form fibres/filaments for use in textiles.

Open-cell foam: Foam comprising cells, i.e. gas bubbles that aren't completely encapsulated, i.e. open cells.

Polycarbonate: a typically transparent thermoplastic polymer of Bisphenol-A Carbonate.

Polyethylene: A thermoplastic that is resistant to chemicals and moisture.

Polyurethane (PU): A plastic material made by copolymerizing an isocyanate and a polyhydric alcohol and, for example, can take the form of foam (polyurethane foam) and rubber (polyurethane rubber).

Semi-open foam: Foam comprising a combination of closed and open (encapsulated) cells.

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Spacer Fabric: A composite construction comprised of two outer textile substrates joined together and kept apart by an intermediate layer of monofilaments.

Spandex: An elastic fibre or fabric, primarily comprised of polyurethane. Spandex is used in trade products: Lycra.

Thermoplastic Elastomer (TPE): Are generally low modulus, flexible materials that can be stretched at room temperature with an ability to return to their approximate original length when stress is released. Trade products that use TPE include: Hytrel, Dynaflex, Medalist Thermoplastic Polyurethane (TPU): A thermoplastic elastomer with a high durability and flexibility.

4.5.3 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use.

As an example, an I-beam may comprise a different bending stiffness (resistance to a bending load) in a first direction in comparison to a second, orthogonal direction. In another example, a structure or component may be floppy in a first direction and rigid in a second direction.

4.5.4 Anatomy

The following definitions correspond references identified in FIGS. 1-2.

4.5.4.1 Anatomy of the Face

Ala: the external outer wall or "wing" of each nostril (plural: alar)

Alare: The most lateral point on the nasal ala.

Alar curvature (or alar crest) point: The most posterior point in the curved base line of each ala, found in the crease formed by the union of the ala with the cheek.

Bridge (nasal): The nasal bridge is the midline prominence of the nose, extending from the Sellion to the Pronasale.

(nose) Cartilaginous framework: The cartilaginous framework of the nose comprises the septal, lateral, major and minor cartilages.

Cheilion: A point located at the corner of the mouth.

Endocanthion: The point at which the upper and lower eyelids meet, proximal to the Sellion.

Epicranius: The epicranius, or frontal belly, refers to structures that cover the cranium.

External occipital protuberance: A protuberance on the outer surface of the occipital bone.

Frankfort horizontal plane: A line extending from the most inferior point of the orbital margin to the left tragion. The tragion is the deepest point in the notch superior to the tragus of the auricle.

Glabella: Located on the soft tissue, the most prominent point in the midsagittal plane of the forehead.

Lateral nasal cartilage: A generally triangular plate of cartilage. Its superior margin is attached to the nasal bone and frontal process of the maxilla, and its inferior margin is connected to the greater alar cartilage.

Lip, superior (labrale superius): A point on the face between the mouth and nose, lying in the median sagittal plane.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Sagittal plane: A vertical plane that passes from anterior (front) to posterior (rear) dividing the body into right and left halves.

Sellion: Located on the soft tissue, the most concave point overlying the area of the frontonasal suture.

Subnasal point: Located on the soft tissue, the point at which the columella merges with the upper lip in the mid sagittal plane.

Superciliary arch: A protuberance of the frontal bone above the eye.

Temporalis muscle: A muscle in the temporal fossa that serves to raise the lower jaw.

Temporomandibular joint: A freely moveable joint between the temporal bone and mandible that allows for the opening, closing, protrusion, retraction, and lateral movement of the mandible.

Vermillion, upper: A red part of the lips covered with stratified squamous epithelium which is in continuity with the oral mucosa of the gingivolabial groove.

4.5.4.2 Anatomy of the Skull

Frontal bone: The frontal bone includes a large vertical portion, the squama frontalis, corresponding to the region known as the forehead.

Lateral cartilage: Portion of cartilage lateral of the Septal cartilage and inferior to the Nasal bones.

Mandible: The mandible forms the lower jaw. The mental protuberance is the bony protuberance of the jaw that forms the chin.

Masseter minor: A lower portion of the Masseter muscle of which raises the lower jaw.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the "bridge" of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Septal cartilage: Cartilage of the nasal septum.

Sphenoid bone: A wedge shaped bone of the base of the cranium.

Supraorbital foramen: An opening in the inferior bone of the orbit for the passage of the Supraorbital nerve, artery and vein.

Temporal bones: The temporal bones are situated on the bases and sides of the skull, and support that part of the face known as the temple.

Trapezius minor: A triangular-shaped superficial muscle of the upper back.

Zygomatic arch/bone: The face includes two zygomatic bones, located in the upper and lateral parts of the face and forming the prominence of the cheek.

4.5.5 User Interface

Frame: Frame will be taken to mean the display housing unit that bears the load of tension between two or more points of connection with a hoop.

Interpupillary Distance: The distance between the centres of the pupils of the eyes.

Hoop: Hoop will be taken to mean a form of positioning and stabilizing structure designed for use on a head. For example the hoop may comprise a collection of one or more struts, ties and stiffeners configured to locate and retain a user interface in position on a users' face for holding a display unit in an operational position in front of a user's face. Some ties are formed of a soft, flexible, elastic material such as a laminated composite of foam and fabric/textile.

Membrane: Membrane will be taken to mean a typically thin element that has, preferably, substantially no resistance to bending, but has resistance to being stretched.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a display unit housing may be a shell. In some forms, a shell may be faceted.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees.

Tie (noun): A structure designed to resist tension.

4.5.6 Shape of Structures

Products in accordance with the present technology may comprise one or more three-dimensional mechanical structures, for example the seal forming portion of the display unit. The three-dimensional structures may be bounded by two-dimensional surfaces. These surfaces may be distinguished using a label to describe an associated surface orientation, location, function, or some other characteristic. For example, a structure may comprise one or more of an anterior surface, a posterior surface, an interior surface and an exterior surface. In another example, a seal forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 2a to FIG. 2e, which illustrate examples of cross-sections at point p on a surface, and the resulting plane curves. FIGS. 2a to 3e also illustrate an outward normal vector at p. The outward normal vector at p points away from the surface. In some examples we describe the surface from the point of view of an imaginary small person standing upright on the surface.

4.5.6.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 2a (relatively large positive curvature compared to FIG. 2b) and FIG. 2b (relatively small positive curvature compared to FIG. 2a). Such curves are often referred to as concave.

Zero curvature: If the curve at p is a straight line, the curvature will be taken to be zero (if the imaginary small person leaves the point p, they can walk on a level, neither up nor down). See FIG. 2c.

Negative curvature: If the curve at p turns away from the outward normal, the curvature in that direction at that point will be taken to be negative (if the imaginary small person leaves the point p they must walk downhill). See FIG. 2d (relatively small negative curvature compared to FIG. 2e) and FIG. 2e (relatively large negative curvature compared to FIG. 2d). Such curves are often referred to as convex.

4.5.6.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 2a to 3e could be examples of such multiple cross-sections at a particular point.

Principal curvatures and directions: The directions of the normal planes where the curvature of the curve takes its maximum and minimum values are called the principal directions. In the examples of FIG. 2a to FIG. 2e, the maximum curvature occurs in FIG. 2a, and the minimum occurs in FIG. 2e, hence FIG. 2a and FIG. 2e are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill). A saddle region is shown, for example, in FIG. 2h.

Dome region: A region where at each point the principal curvatures have the same sign, e.g. both positive (a "concave dome") or both negative (a "convex dome"). A dome region is shown, for example, in FIG. 2g.

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region. An edge on a surface is shown, for example, in FIG. 2g.

Path: In certain forms of the present technology, 'path' will be taken to mean a path in the mathematical—topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path). A path on surface is shown, for example, in FIG. 2g.

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.) A straight line distance is shown, for example, in FIG. 2g.

4.5.6.3 Space Curves

Space curves: Unlike a plane curve, a space curve does not necessarily lie in any particular plane. A space curve may be considered to be a one-dimensional piece of three-dimensional space. An imaginary person walking on a strand of the DNA helix walks along a space curve. A typical human left ear comprises a helix, which is a left-hand helix, see FIG. 2i. A typical human right ear comprises a helix, which is a right-hand helix, see FIG. 2k. FIG. 2j shows a right-hand helix. The edge of a structure, e.g. the edge of a membrane, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 2*m*), or alternatively by a left-hand rule (FIG. 2*l*).

Osculating plane: The plane containing the unit tangent vector and the unit principal normal vector. See FIGS. 2*l* and 2*m*.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 2*j*, since T2>T1, the magnitude of the torsion near the top coils of the helix of FIG. 2*j* is greater than the magnitude of the torsion of the bottom coils of the helix of FIG. 2*j*

With reference to the right-hand rule of FIG. 2*k*, a space curve turning towards the direction of the right-hand binormal may be considered as having a right-hand positive torsion (e.g. a right-hand helix as shown in FIG. 2*j*). A space curve turning away from the direction of the right-hand binormal may be considered as having a right-hand negative torsion (e.g. a left-hand helix).

Equivalently, and with reference to a left-hand rule (see FIG. 2*l*), a space curve turning towards the direction of the left-hand binormal may be considered as having a left-hand positive torsion (e.g. a left-hand helix). Hence left-hand positive is equivalent to right-hand negative.

4.5.6.4 Holes

A surface may have a one-dimensional hole, e.g. a hole bounded by a plane curve or by a space curve. Thin structures (e.g. a membrane) with a hole, may be described as having a one-dimensional hole. See for example the one-dimensional hole in the surface of structure shown in FIG. 2*n*, bounded by a plane curve.

A structure may have a two-dimensional hole, e.g. a hole bounded by a surface. For example, an inflatable tyre has a two-dimensional hole bounded by the interior surface of the tyre. See the two-dimensional hole through the structure shown in FIG. 2*o*, bounded by a surface as shown.

The invention claimed is:

1. A head-mounted display system comprising:
   a head-mounted display unit producing a computer-generated output for a user;
   at least one sensor, the at least one sensor configured to measure at least one parameter associated with digital eye strain (DES) on the user;
   the at least one sensor configured to communicate a measured parameter to a processor, wherein the processor is configured to effect change on the computer-generated output based on the measured parameter,
   wherein the at least one sensor is configured to measure the user's posture as an indicator of DES, including the user's head orientation relative to a remaining part of the user's body.

2. A head-mounted display as defined in claim 1, wherein the sensor is configured to measure the time the display unit is in use.

3. A head-mounted display as defined in claim 1, wherein the sensor is configured to measure a parameter relating to eye activity of a user.

4. A head-mounted display as defined in claim 3, wherein the at least one parameter comprises at least one of a user's blink-rate, blink completeness, pupillary characteristics, and eye movement.

5. A head-mounted display as defined in claim 1, wherein the change effected on the output comprises an alert for the user.

6. A head-mounted display as defined in claim 1, wherein the change effected on the output comprises at least one preventative change to reduce or ameliorate DES in the user.

7. A head-mounted display as defined in claim 1, wherein the processor is configured to:
   generate a message to prompt the user to perform a predetermined instruction; and
   pause operation of the display unit until the user performs the predetermined instruction.

8. A head-mounted display as defined in claim 1, wherein, based on input from the at least one sensor, the processor is configured to alert the user of a pre-existing condition and to seek medical evaluation.

9. A head-mounted display as defined in claim 1, wherein the at least one sensor is configured to measure forward or rearward tilt in the user's head or neck relative to the spine or back.

10. A head-mounted display as defined in claim 1, wherein the at least one sensor is configured to measure relative angular rotation of the user's head relative to the user's body.

11. A head-mounted display as defined in claim 1, wherein the at least one sensor is configured to measure forward or rearward tilt in the user's head or neck relative to the spine or back, and the at least one sensor is configured to measure relative angular rotation of the user's head relative to the user's body.

12. A head-mounted display as defined in claim 1, further comprising a timer, and wherein the processor is configured to determine the time duration that the user's head or neck is tilted and/or rotated more than a predetermined amount.

13. A head-mounted display as defined in claim 1, wherein the processor is configured to prompt the user to adjust the user's posture to reduce muscle fatigue in the user's neck, based on input from the at least one sensor.

14. A head-mounted display as defined in claim 1, wherein the processor is configured to receive subjective input from the user that is indicative of DES.

15. A head-mounted display as defined in claim 1, wherein the subjective input includes blurred vision, double vision, discomfort, fatigue, itching and/or headaches.

16. A head-mounted display as defined in claim 1, wherein the at least one sensor is configured to generate a signal indicative of a critical flicker-fusion frequency of the user as an indication of the user's DES.

17. A head-mounted display as defined in claim 1, wherein the at least one sensor is configured to generate a signal indicative of turning of the user's eyes.

18. A head-mounted display as defined in claim 1, wherein the at least one sensor is configured to capture image data of the user's face, and the processor is configured to compare the captured image data with a predetermined reference feature to determine likely impact on the user's DES.

19. A head-mounted display as defined in claim 1, wherein the at least one sensor is configured to generate a focus signal indicative of the user's ability to change focus of the user's eyes, and the processor is configured to evaluate the focus signal as a measure of the user's DES.

\* \* \* \* \*